United States Patent
Katsumata et al.

(10) Patent No.: US 6,360,011 B1
(45) Date of Patent: *Mar. 19, 2002

(54) DATA MEDIUM HANDLING APPARATUS AND DATA MEDIUM HANDLING METHOD

(75) Inventors: Yutaka Katsumata, Kawasaki; Kazunori Yamamoto, Maebashi; Kazuhito Watanabe, Maebashi; Yoshiyuki Kijima, Maebashi, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,594
(22) PCT Filed: Jul. 30, 1996
(86) PCT No.: PCT/JP96/02150
  § 371 Date: Mar. 31, 1997
  § 102(e) Date: Mar. 31, 1997
(87) PCT Pub. No.: WO97/05561
  PCT Pub. Date: Feb. 13, 1997

(30) Foreign Application Priority Data

Jul. 31, 1995 (JP) .............................................. 7-194851
Jul. 31, 1995 (JP) .............................................. 7-194852
Jul. 31, 1995 (JP) .............................................. 7-195626

(51) Int. Cl.$^7$ ................................................. G06K 9/00
(52) U.S. Cl. ....................................................... 382/181
(58) Field of Search ................................ 382/176, 181, 382/189, 190, 193, 197, 198, 199

(56) References Cited

FOREIGN PATENT DOCUMENTS

| JP | 60-239884 | * 11/1985 |
| JP | 62-38984  | *  2/1987 |
| JP | 1-191986  | *  1/1988 |

(List continued on next page.)

OTHER PUBLICATIONS

A. Pizano: "A Business Form Recognition System", Proc. Compsac 91 The Fifteenth Annual Int. Computer Software & Applications Conference; Sep. 11, 1991, Tokyo, Japan, pp. 626–632.

T. Watanabe: "Layout Recognition of Multi–Kinds of Table–Form Documents", IEEE Trans. on Patterns Analysis and Machine Intelligence, vol. 17, No. 4, Apr. 1995, New York, U.S., pp. 432–445.

(List continued on next page.)

Primary Examiner—Samir Ahmed
(74) Attorney, Agent, or Firm—Arent Fox Kintner Plotkin & Kahn, PLLC

(57) ABSTRACT

A data medium handling apparatus and a data medium handling method suitable for use for handling of documents, for example, in a financial organ. The data medium handling apparatus (30) for recognizing, based on an image (19) read from a data medium on which information is described in an arbitrary format, the information, is constructed such that it comprises means (2) for extracting characteristics unique to the data medium including the format from the read image data (19) and specifying, from the characteristics, a position at which information to be recognized is present, and image recognition means (3) for recognizing the image (19) at the position specified by the preceding means (2) to discriminate the information, so that the data medium handling apparatus (30) can handle documents having various formats such as private slips.

16 Claims, 115 Drawing Sheets

FOREIGN PATENT DOCUMENTS

| | | | |
|---|---|---|---|
| JP | 1-191986 | | 8/1988 |
| JP | 1-142074 | | 9/1989 |
| JP | 4-23185 | * | 5/1990 |
| JP | 3-263282 | | 11/1991 |
| JP | 03-263282 | * | 11/1991 |
| JP | 4-23185 | | 1/1992 |
| JP | 4-343190 | * | 11/1992 |
| JP | 7-152856 | * | 6/1995 |
| JP | 7-182459 | | 7/1995 |
| JP | 61-182459 | * | 7/1995 |

OTHER PUBLICATIONS

T. Saitoh et al: "Document Image Segmentation and Layout Analysis", IEICE Trans. on Information and Systems, vol. e77–d, No. 7, Jul. 1994, Tokyo, Japan, pp. 778–784.

R. G. Casey Et D. R. Ferguson: "Intelligent Form Processing", IBM Systems Journal, vol. 29, No. 3, 1990, Armonk, NY, U.S. pp. 435–450.

* cited by examiner (FOR DOCUMENT HAVING RULED LINE ITEM)

(FOR DOCUMENT HAVING NO RULED LINE ITEM)

(FOR DOCUMENT HAVING RULED LINE ITEM)

| 項 | 区 間 | 金 額 |
|---|---|---|
| | 出張旅費精算書 | |
| 1 | 東京 – 大阪 | 25,000 |
| 2 | 横浜 – 長野 | 13,000 |

320

↓

M: RULED LINE ITEM

| 項 | 区 間 | 金 額 |
|---|---|---|
| 1 | 東京 – 大阪 | 25,000 |
| 2 | 横浜 – 長野 | 13,000 |

- HORIZONTALLY ELONGATED RULED LINE ITEMS : 6
- OTHER RULED LINE ITEMS : 3

FIG. 11

<FOR DOCUMENT HAVING NO RULED LINE ITEM>

|  出張旅費清算書  |
| --- |
| 項　区　間　　　金　額 |
| 1　東京－大阪　　25,000 |
| 2　横浜－長野　　13,000 |

⇩

N: LABELING INFORMATION

⇩

O: CHARACTER REGION INTEGRATION RESULT

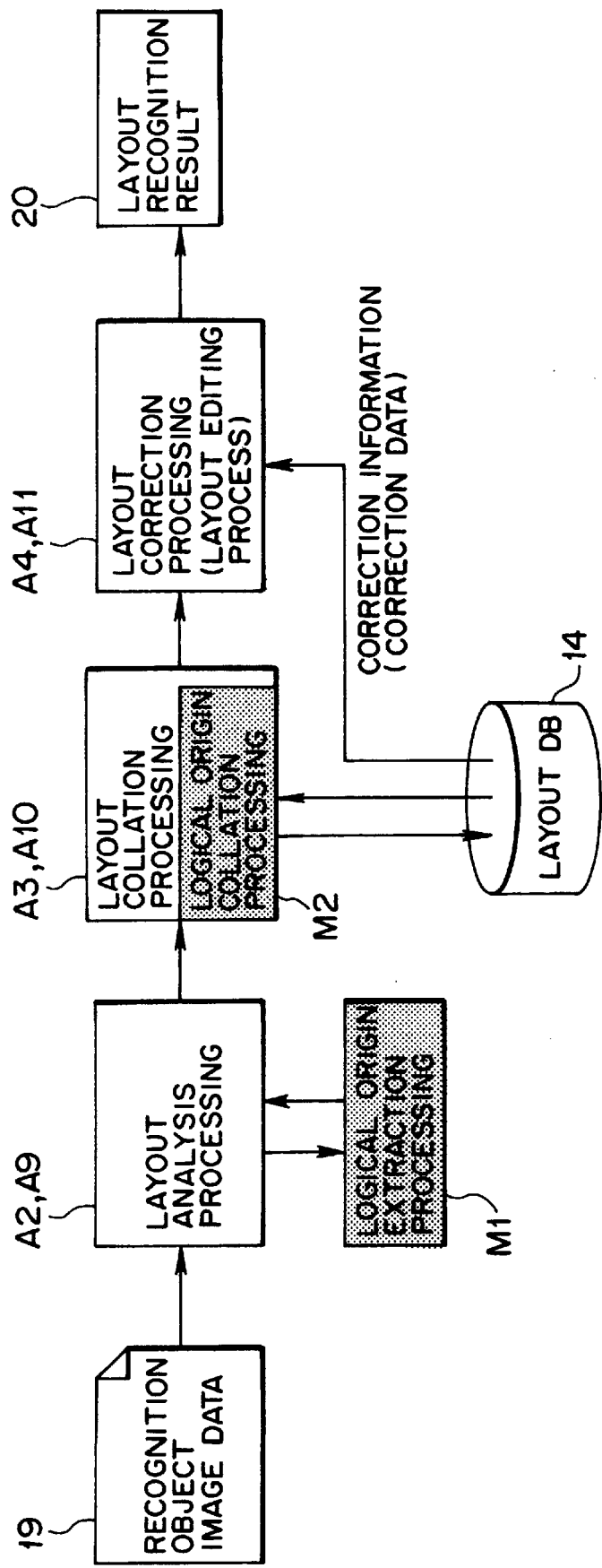

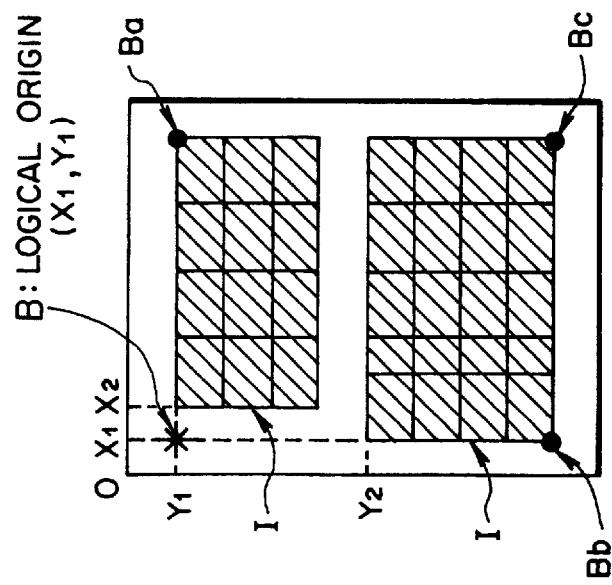
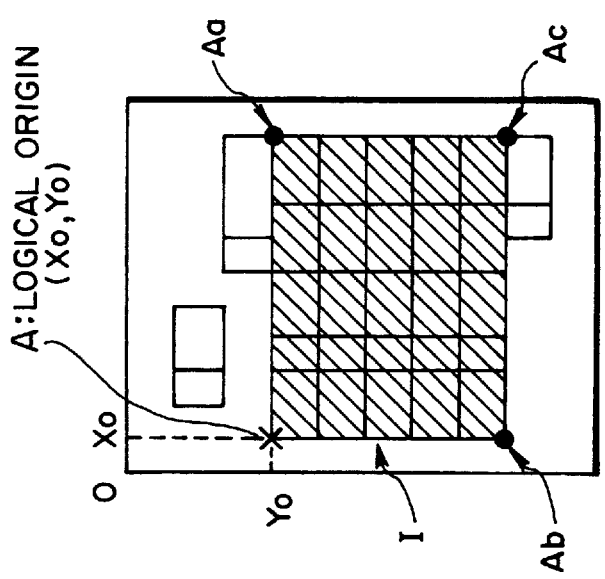

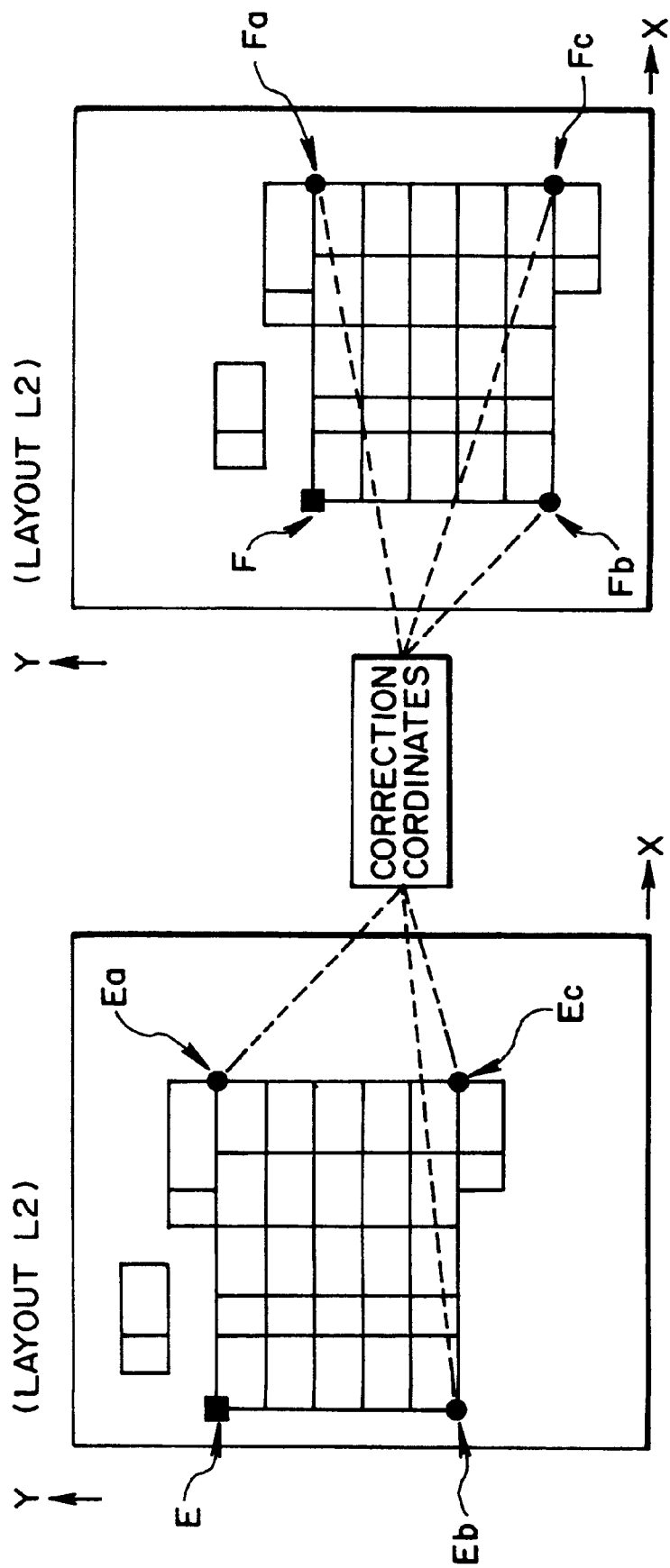

✻ SLANTING PART T IS REGION OF CHARACTERISTIC DATA RECOGNITION OBJECT, & UNDERLINED PART U IS CODE DATA OF RECOGNITION RESULT

FIG. 35

```
CLIENT NAME
   "FUJITSU KABUSHIKI KAISHA"

RECIPIENT NAME
   "TARO FUJITSU"
   "HANAKO FUJITSU"
   "TARO ATSUGI"
   "HANAKO ATSUGI"
```
— 400

FIG. 38

| RULED LINE ITEM ID | GROUP ID | BLOCK ID |
|---|---|---|
| KID | GID | BID |

| TABLE STRUCTURE | TABLE STRUCTURE ROW NUMBER | TABLE STRUCTURE COLUMN NUMBER | RULED LINE ATTRIBUTE | ROW INFORMATION | COLUMN INFORMATION | HIERARCHY INFORMATION | TOP/LAST |
|---|---|---|---|---|---|---|---|
| Y/N | RMAX | CMAX | ※1 | RNO | CNO | HI | T/E |

※1: RULED LINE ATTRIBUTES ARE CODED IN TERMS OF 1/2/B/I/H/F/D/U/L IN ORDER CORRESPONDING TO (a) to (i)

FIG. 39

GENERAL TRANSFER NOTICE  No. 0001

HANDLING DATE: FEBRUARY 14, HEISEI 8

CLIENT
FAMILY NAME: FUJITSU
FIRST NAME: TARO

NUMBER OF CASES: 5 CASES

| BANK NAME | BRANCH OFFICE NAME | TITLE | ACCOUNT NUMBER | RECIPIENT | TRANSFER AMOUNT |
|---|---|---|---|---|---|
| FUJITSU | ATSUGI | ORDINARY | 1234 | KOICHI CHIBA | 1,0 0,0 0 0 |
| FUJITSU | ATSUGI | ORDINARY | 1234 | HIDEKI MATSUNO | 1,0 0,0 0 0 |
| FUJITSU | ATSUGI | ORDINARY | 1234 | MINORU SOGA | 1,0 0,0 0 0 |
| FUJITSU | ATSUGI | ORDINARY | 1234 | YOSHIHIRO NAKAMURA | 1,0 0,0 0 0 |
| FUJITSU | ATSUGI | ORDINARY | 1234 | TOMIO SAWADA | 1,0 0,0 0 0 |
|  |  |  |  |  |  |
|  |  |  | TOTAL AMOUNT OF MONEY | | ¥5,0 0,0 0 0 |

HANDLED BY ATSUGI TECHNICAL CENTER (a) 1 RULED LINE ITEM
(b) 2 RULED LINE ITEM
(c) BLOCK RULED LINE ITEM
(d) NESTING RULED LINE ITEM
(e) HEADER PART
(g) BODY PART
(h) UPWARDLY CONVEX PART
(i) DOWNWARDLY CONVEX PART

FIG. 40

<503: RULED LINE ITEM CONSTRUCTION INFORMATION TBL>

| No. | A: RULED LINE ITEM INFORMATION | B: ANALYSIS RULE RETRIEVAL INDEX PART | C: CAPTION PART EVALUATION INFORMATION | D: DATA PART EVALUATION INFORMATION |
|---|---|---|---|---|
| 1 | RULED LINE ITEM ID1 | TABLE STRUCTURE INFORMATION OF RULED LINE ITEM ID1 | CAPTION PART EVALUATION 1 | DATA PART EVALUATION 1 |
| ≀ | ≀ | ≀ | ≀ | ≀ |
| n | RULED LINE ITEM IDn | TABLE STRUCTURE INFORMATION OF RULED LINE ITEM IDn | CAPTION PART EVALUATION n | DATA PART EVALUATION n |

FIG. 41(a)

A: RULED LINE ITEM INFORMATION

| RULED LINE ITEM ID | GROUP ID | BLOCK ID |
|---|---|---|
| 0001 | 0001 | 0001 |

FIG. 41(b)

B: ANALYSIS RULE RETRIEVAL INDEX PART

| TABLE STRUCTURE | ITEM ROW NUMBER | ITEM COLUMN NUMBER | RULED LINE ITEM ATTRIBUTE | ROW INFORMATION | COLUMN INFORMATION | HIERARCHY INFORMATION | TOP/RAST |
|---|---|---|---|---|---|---|---|
| N | 1 | 1 | 1 | 1 | 1 | 0 | T |

FIG. 41(c)

C: CAPTION PART EVALUATION INFORMATION

| CAPTION PART RULE EVALUATION NUMBER | CAPTION PART RULE EVALUATION SCORE | CAPTION PART DISCRIMINATION RESULT | EVALUATION HISTORY OF CAPTION PART RULE |
|---|---|---|---|
| *EVALUATION TIME BY CAPTION PART RULE | *TOTAL SCORE OF EVALUATION RESULT BY CAPTION PART RULE | *TOTAL LAST EVALUATION RESULT | *HISTORY OF EVALUATED CAPTION PART RULES (max=32) |

FIG. 41(d)

D: DATA PART EVALUATION INFORMATION

| DATA PART RULE EVALUATION NUMBER | DATA PART RULE EVALUATION SCORE | DATA PART DESCRIPTION RESULT | EVALUATION HISTORY OF DATA PART RULE |
|---|---|---|---|
| *EVALUATION TIME BY DATA PART RULE | *TOTAL SCORE OF EVALUATION RESULT BY DATA PART RULE | *TOTAL LAST EVALUATION RESULT | *HISTORY OF EVALUATED CAPTION PART RULES (max=32) |

FIG. 42

<CAPTION POSITION SEARCHING RULE>

| No. | A: ANALYSIS RULE INDEX PART | B: EVALUATION POINT INFORMATION |
|---|---|---|
| 1 | CAPTION PART ANALYSIS RULE No.1 | CAPTION PART EVALUATION P1 |
| ≀ | ≀ | ≀ |
| n | CAPTION PART ANALYSIS RULE No.n | CAPTION PART EVALUATION Pn |

FIG. 43(a)

A: ANALYSIS RULE RETRIEVAL INDEX PART

| TABLE STRUCTURE | ITEM ROW NUMBER | ITEM COLUMN NUMBER | RULED LINE ITEM ATTRIBUTE | ROW INFORMATION | COLUMN INFORMATION | HIERARCHY INFORMATION | TOP/LAST INFORMATION |
|---|---|---|---|---|---|---|---|
| N | 1 | 1 | 1 | 1 | 1 | 0 | T |

FIG. 43(b)

B: EVALUATION POINT INFORMATION

| EVALUATION EFFECTIVENESS FLAG | ADDITION POINT OF EVALUATION RESULT |
|---|---|
| ※EFFECTIVE/INEFFECTIVE OF EVALUATION | ※SET POINT BY RULE FOR EVALUATION |

EXAMPLE NORMAL CAPTION ITEM

EXAMPLE OF COMPLEX CAPTION ITEM DATA

EXAMPLE OF COMPLEX CAPTION

EXAMPLE OF VERTICALLY WRITTEN CAPTION

EXAMPLE I OF PLURAL ROW CAPTION

EXAMPLE II OF PLURAL ROW CAPTION

EXAMPLE I WHEREIN DISTINCTION BETWEEN COMPOSITE CAPTION & PLURAL ROW CAPTION IS IMPOSSIBLE

EXAMPLE II WHEREIN DISTINCTION BETWEEN COMPOSITE CAPTION & PLURAL ROW CAPTION IS IMPOSSIBLE

EXAMPLE OF COMPLICATED CAPTION CONSTRUCTION

FIG. 51(a)

| No | CATEGORY ID | CAPTION IMAGE ID | DIFFERENCE DEGREE OF COLLATION RESULT |
|----|-------------|------------------|---------------------------------------|
| 01 | 0001H | 0001H | 350 |
| 02 | 0001H | 0003H | 500 |
| 03 | 0001H | 0006H | 720 |
| 04 | 0001H | 0001H | 2700 |
| ~ | ~ | ~ | ~ |
| 20 | 0001H | 0004H | 3100 |

FIG. 51(b)

<CANDIDATE IMAGES>

| | |
|---|---|
| TOP | 銀行名 |
| SECOND | 銀行名 |
| THIRD | 銀行名 |
| FOURTH | 支店名 |
| ⋮ | ⋮ |
| TWENTIETH | 口座番号 |

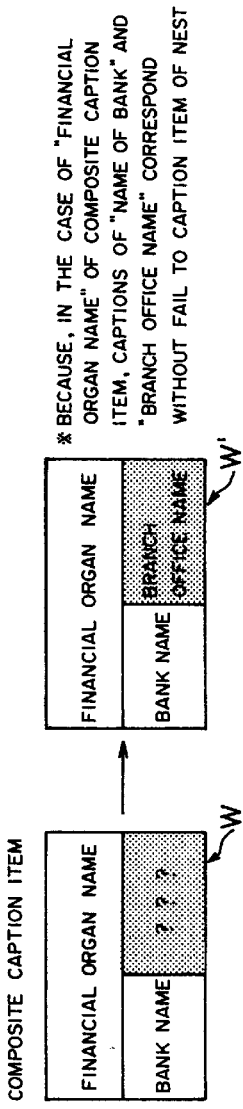
FIG. 52(a)
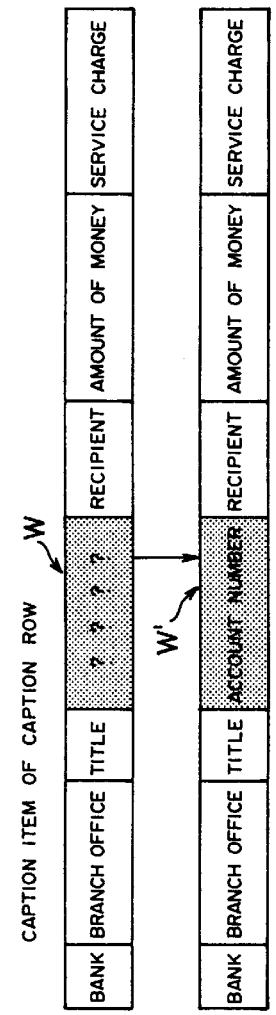
FIG. 52(b)
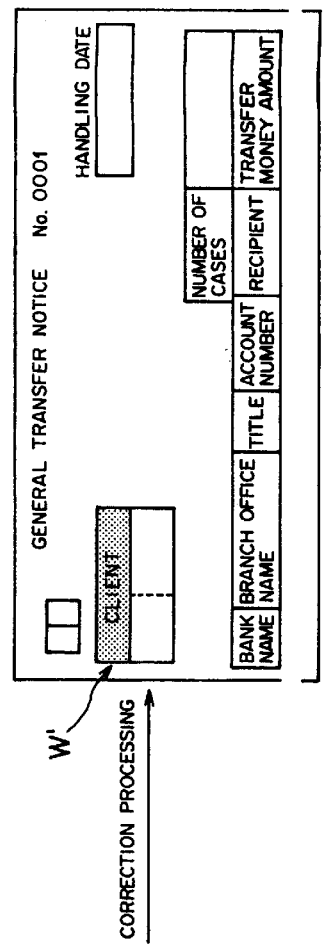
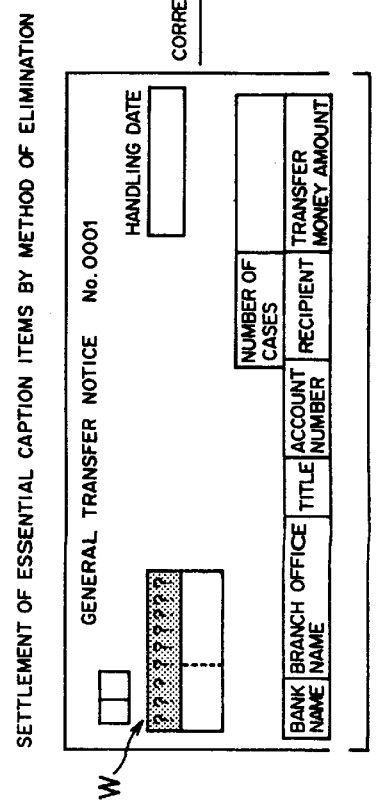
FIG. 52(c)

FIG. 54(a)

RULED LINE ITEM I FOLLOWING CAPTION ITEM PART

FIG. 54(b)

RULED LINE ITEM I FOLLOWING CAPTION ITEM PART

FIG. 54(c)

SAME RULED LINE ITEM AS THAT OF CAPTION ITEM PART

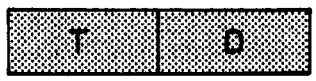

FIG. 54(d)

RULED LINE ITEM BEFORE ANOTHER CAPTION APPEARS

FIG. 54(e)

RULED LINE ITEM BEFORE ANOTHER CAPTION APPEARS

FIG. 54(f)

RULED LINE ITEM I CORRESPONDING TO NESTED PART OF NESTING

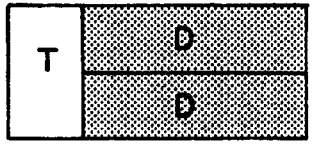

FIG. 54(g)

RULED LINE ITEM I CORRESPONDING TO NESTED PART OF NESTING

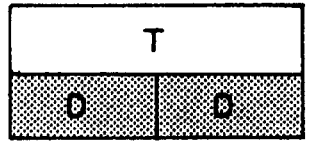

FIG. 54(h)

CAPTION ITEM & DATA ITEM ARE PRESENT MIXED

※ T: CAPTION
D: DATA

FIG. 55(a) ONE DIMENSIONAL TABLE FOR VERTICAL DIRECTION

FIG. 55(b) CAPTION INCLUDING SETS OF TWO ROWS

FIG. 55(c) CAPTION OF NESTING STRUCTURE

FIG. 55(d) COMPOSITE CAPTION

FIG. 55(e) ONE DIMENSIONAL TABLE FOR HORIZONTAL DIRECTION

FIG. 55(f) TWO DIMENSIONAL TABLE

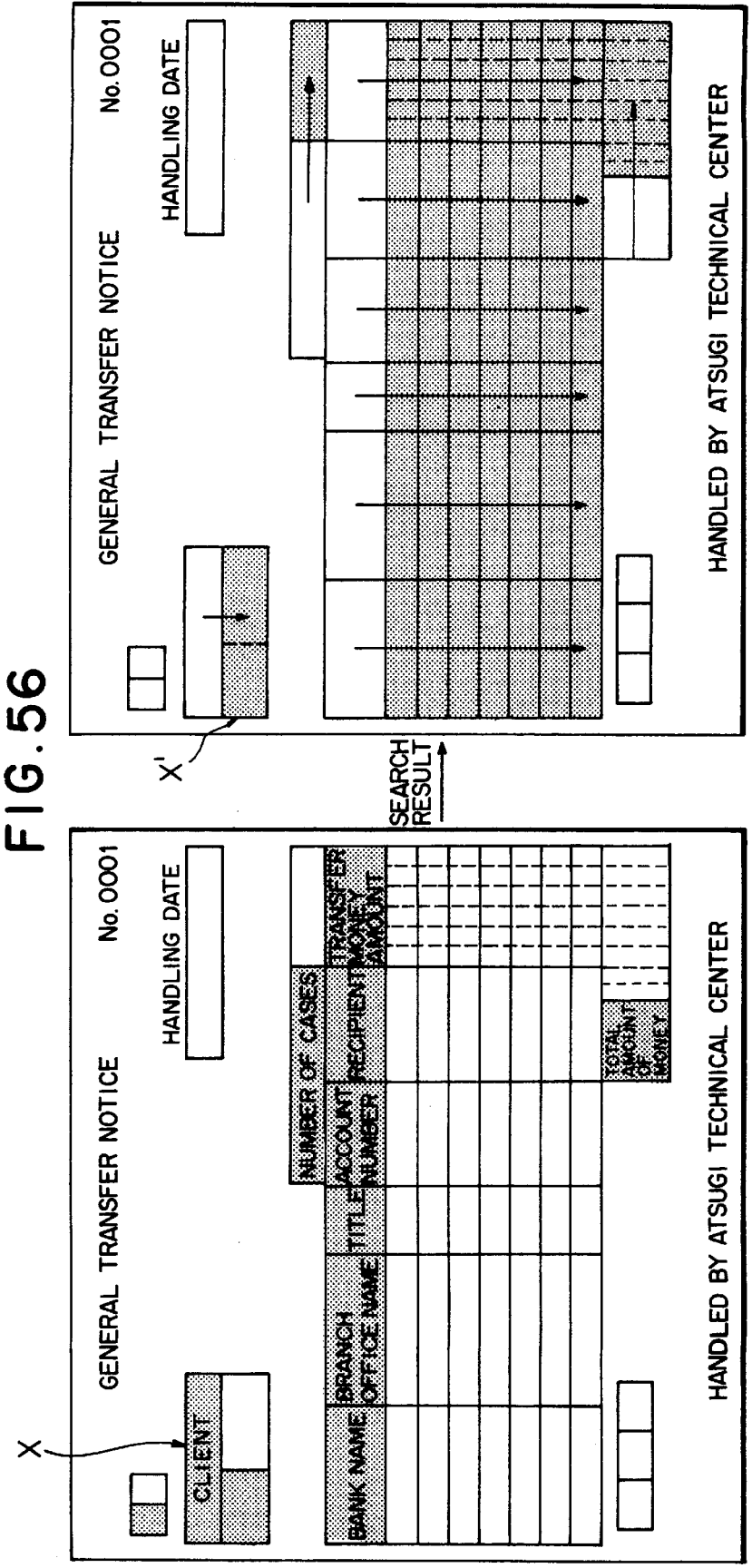

FIG. 58

| INFORMATION NAME | | CONTENTS OF DEFINITION |
|---|---|---|
| CAPTION PART INFORMATION | · RULED LINE ITEM CONSTRUCTION INFORMATION | : INFORMATION REGARDING STRUCTURE OF RULED LINE ITEM OF CAPTION PART |
| | · CONNECTION FUNCTION ITEM ID | : FUNCTION ITEM ID CORRESPONDING TO CAPTION IN CAPTION PART RULED LINE ITEM |
| | · CONNECTION FUNCTION ITEM NUMBER | : FUNCTION ITEM NUMBER CORRESPONDING TO CAPTION IN CAPTION PART RULED LINE ITEM (*SINGLE CAPTION/COMPOSITE CAPTION) |
| FUNCTION NAME INFORMATION | · DATA PART RULED LINE ITEM | : RULED LINE ITEM ID IN WHICH DATA PART CORRESPONDING TO FUNCTION ITEM EXISTS |
| | · DATA PART RULED LINE ITEM NUMBER | : RULED LINE ITEM NUMBER OF DATA PART CORRESPONDING TO FUNCTION ITEM (*SINGLE DATA PART/PLURAL DATA PART) |
| | · DATA PART ITEM ATTRIBUTE | : ITEM ATTRIBUTE INFORMATION OF DATA PART CORRESPONDING TO FUNCTION ITEM (*KANJI/KANA/NUMBER ETC.) |
| DATA PART INFORMATION | · ITEM DATA ID | : ITEM DATA ID IN DATA PART RULED LINE ITEM |
| | · ITEM DATA NUMBER | : ITEM DATA NUMBER IN DATA PART RULED LINE ITEM |
| | · ITEM DATA ROW NUMBER | : CONSTRUCTION ROW NUMBER OF ITEM DATA IN DATE PART RULED LINE ITEM |
| ITEM DATA INFORMATION | · ITEM DATA POSITION | : RECTANGULAR REGION COORDINATES IN WHICH ITEM DATA EXISTS |
| | · ITEM DATA COLUMN NUMBER | : CHARACTER FRAME COLUMN NUMBER CONSTRUCTING ITEM DATA |
| | · CONTINUED ITEM DATA ID | : CONTINUED ITEM DATA ID WHERE CONSTRUCTED FROM ITEM DATA OF A PLURALITY OF ROWS |

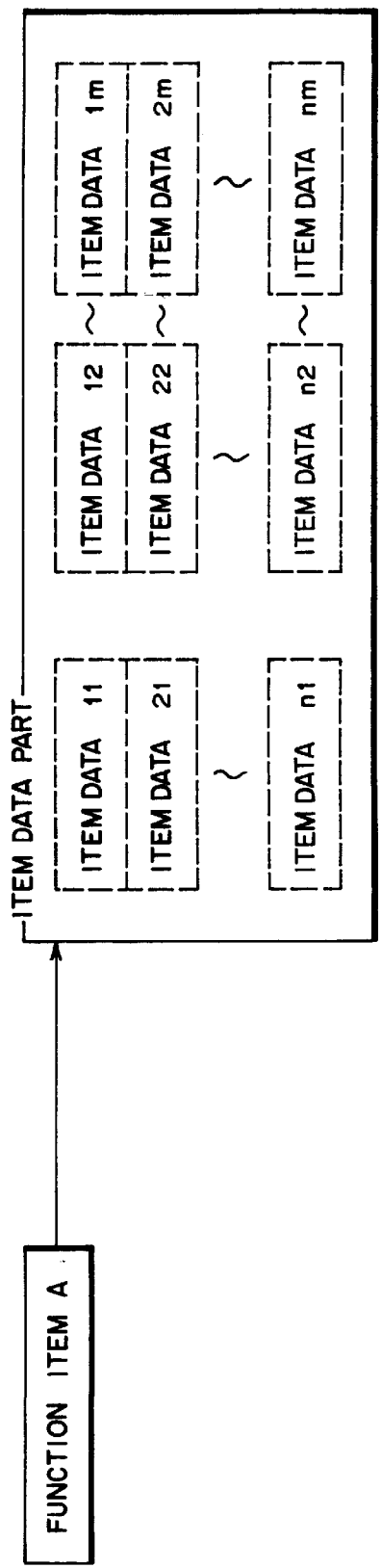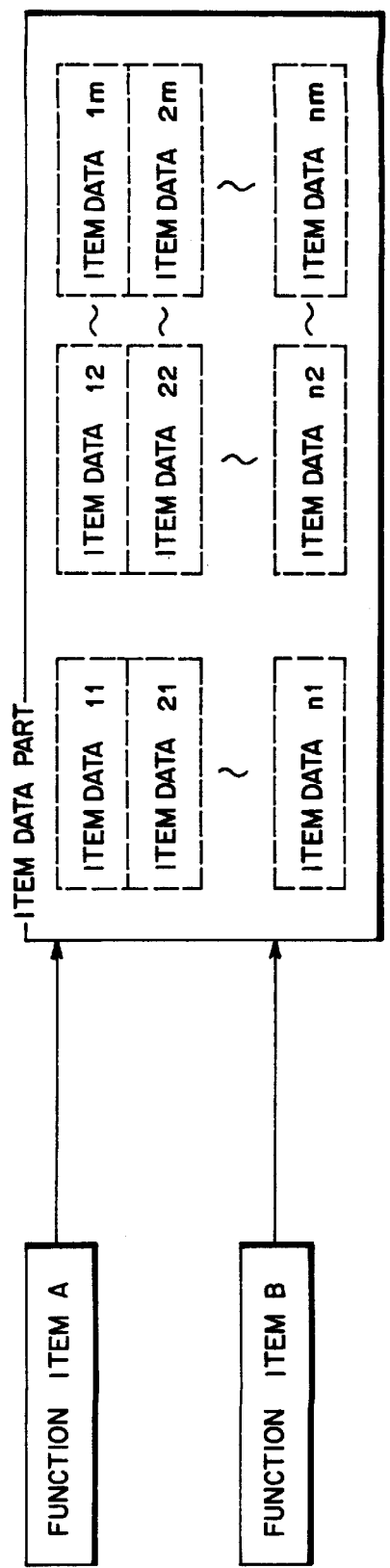

FIG. 60(a)

<CRITERIA>

※ RULED LINE ITEM MORE THAN DESIGNATED NUMBER

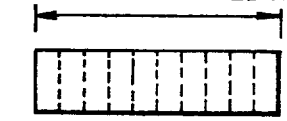

RULED LINE ITEM SMALLER THAN DESIGNATED SIZE

FIG. 60(b)

<EXAMPLE OF ONE COLUMN DELIMIT>

| TRANSFER MONEY (YEN) | : CAPTION ITEM ROW |
| --- | --- |
| ///////// | : ITEM DATA ROW 1 |
| ///////// | : ITEM DATA ROW 2 |

FIG. 60(c)

REPRESENTATIVE RULED LINE ITEM → 01 02 03 04 05 06 07 08 09

※ LINK IS SET IN ORDER FROM REPRESENTATIVE RULED LINE ITEM (01) TO RULED LINE ITEM (09)

FIG. 60(d)

INTEGRATED ITEM DATA → C1 C2 C3 C4 C5 C6 C7 / ¥ 1 2 3 4 5 6

※ ITEM DATA ARE SET INTEGRATING CHARACTERS IN ORDER FROM TOP ITEM DATA (C1) TO (C7)

FIG. 60(e)

※ RULED LINE ITEM MORE THAN 2

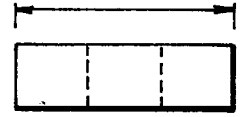

※ RULED LINE ITEM SMALLER THAN DESIGNATED SIZE

FIG. 60(f)

| TRANSFER MONEY (YEN) | : CAPTION ITEM ROW |
| --- | --- |
| ///////// | : ITEM DATA ROW 1 |
| ///////// | : ITEM DATA ROW 2 |

FIG. 67

| ACCOUNT No. | NAME | TRANSACTION | AMOUNT OF MONEY |
|---|---|---|---|
| 0 0 0 1 | TARO FUJI | 0 1 0 | ¥12,000 |
| 0 0 1 0 | JIRO GUNMA | 0 1 0 | ¥2,000 |
| 0 0 1 1 | HAJIME AKAGI | 0 0 1 | ¥777,777 |
| 1 2 3 4 | TAMAKO MINAMI | 0 1 1 | ¥26 |
| 1 2 7 8 | SHIZUMU HIGASHI | 0 0 1 | ¥1,234,567 |
| 2 0 0 0 | GURASU HARUNA | 1 1 0 | ¥1,000 |
| 2 0 1 0 | NISHIKI ASAMA | 0 1 1 | ¥1,765 |

ITEM 1 _____   ITEM 2 _____
ITEM 3 _____   ITEM 4 _____

612
611: IMAGE DATA DISPLAY AREA
614: ITEM DISPLAY AREA (INPUT SCREEN)
615
630

| | |
|---|---|
| ITEM 1 ——————— ACCOUNT NO. | |
| ITEM 2 ——————— NAME | |
| ITEM 3 ——————— TRANSACTION | |
| ITEM 4 ——————— AMOUNT OF MONEY | |

FIG. 69

IN UNITS OF DOT (X COORDINATE, Y COORDINATE)

| Q | TITLE 1 (ACCOUNT NO.) | TITLE 2 NAME | TITLE 3 (TRANSACTION) | TITLE 4 (AMOUNT OF MONEY) |
|---|---|---|---|---|
| EMPHASIS ATTRIBUTE | THICK FRAME | SCREENED | THICK FRAME | SCREENED |
| NO. 1 START | ( 20 , 60 ) | ( 100 , 60 ) | ( 240 , 60 ) | ( 320 , 60 ) |
| NO. 1 END | ( 100 , 80 ) | ( 240 , 80 ) | ( 320 , 80 ) | ( 420 , 80 ) |
| NO. 2 START | ( 20 , 80 ) | ( 100 , 80 ) | ( 240 , 80 ) | ( 320 , 80 ) |
| NO. 2 END | ( 100 , 100 ) | ( 240 , 100 ) | ( 320 , 100 ) | ( 420 , 100 ) |
| ~ | ~ | ~ | ~ | ~ |
| NO. 7 START | ( 20 , 180 ) | ( 100 , 180 ) | ( 240 , 180 ) | ( 320 , 180 ) |
| NO. 7 END | ( 100 , 200 ) | ( 240 , 200 ) | ( 320 , 200 ) | ( 420 , 200 ) |
| NO. 8 START | ( 20 , 200 ) | ( 100 , 200 ) | ( 240 , 200 ) | ( 320 , 200 ) |
| NO. 8 END | ( 100 , 220 ) | ( 240 , 220 ) | ( 320 , 220 ) | ( 420 , 220 ) |

FIG. 70

| ACCOUNT No. | NAME | TRANSACTION | AMOUNT OF MONEY |
|---|---|---|---|
| 0001 | TARO FUJI | 010 | ¥12,000 |
| 0010 | JIRO GUNMA | 010 | ¥2,000 |
| 0011 | HAJIME AKAGI | 001 | ¥777,777 |
| 1234 | TAMAKO MINAMI | 011 | ¥26 |
| 1278 | SHIZUMU HIGASHI | 001 | ¥1,234,567 |
| 2000 | GURASU HARUNA | 110 | ¥1,000 |
| 2010 | NISHIKI ASAMA | 011 | ¥1,765 |

ITEM 1     ITEM 2

ITEM 3     ITEM 4

FIG. 71

| ACCOUNT No. | NAME | TRANSACTION | AMOUNT OF MONEY |
|---|---|---|---|
| 0 0 0 1 | TARO FUJI | 0 1 0 | ¥12,000 |
| 0 0 1 0 | JIRO GUNMA | 0 1 0 | ¥2,000 |
| 0 0 1 1 | HAJIME AKAGI | 0 0 1 | ¥777,777 |
| 1 2 3 4 | TAMAKO MINAMI | 0 1 1 | ¥26 |
| 1 2 7 8 | SHIZUMU HIGASHI | 0 0 1 | ¥1,234,567 |
| 2 0 0 0 | GURASU HARUNA | 1 1 0 | ¥1,000 |
| 2 0 1 0 | NISHIKI ASAMA | 0 1 1 | ¥1,765 |

ITEM 1     ITEM 2
ITEM 3     ITEM 4

FIG. 72

| ACCOUNT No. | NAME | TRANSACTION | AMOUNT OF MONEY |
|---|---|---|---|
| 0001 | TARO FUJI | 010 | ¥12,000 |
| 0010 | JIRO GUNMA | 010 | ¥2,000 |
| 0011 | HAJIME AKAGI | 001 | ¥777,777 |
| 1234 | TAMAKO MINAMI | 011 | ¥26 |
| 1278 | SHIZUMU HIGASHI | 001 | ¥1,234,567 |
| 2000 | GURASU HARUNA | 110 | ¥1,000 |
| 2010 | NISHIKI ASAMA | 011 | ¥1,765 |

ITEM 1     ITEM 2
ITEM 3     ITEM 4

FIG. 73

| ACCOUNT No. | NAME | TRANSACTION | AMOUNT OF MONEY |
|---|---|---|---|
| 0001 | TARO FUJI | 010 | ¥2,000 |
| 0010 | JIRO GUNMA | 010 | ¥2,000 |
| 0011 | HAJIME AKAGI | 001 | ¥777,777 |
| 1234 | TAMAKO MINAMI | 011 | ¥26 |
| 1278 | SHIZUMU HIGASHI | 001 | ¥1,234,567 |
| 2000 | GURASU HARUNA | 110 | ¥1,000 |
| 2010 | NISHIKI ASAMA | 011 | ¥1,765 |

ITEM 1　　　　ITEM 2
ITEM 3　　　　ITEM 4

FIG. 74

| ACCOUNT No. | NAME | TRANSACTION | AMOUNT OF MONEY |
|---|---|---|---|
| 0 0 0 1 | TARO FUJI | 0 1 0 | ¥12,000 |
| 0 0 1 0 | JIRO GUNMA | 0 1 0 | ¥2,000 |
| 0 0 1 1 | HAJIME AKAGI | 0 0 1 | ¥777,777 |
| 1 2 3 4 | TAMAKO MINAMI | 0 1 1 | ¥26 |
| 1 2 7 8 | SHIZUMU HIGASHI | 0 0 1 | ¥1,234,567 |
| 2 0 0 0 | GURASU HARUNA | 1 1 0 | ¥1,000 |
| 2 0 1 0 | NISHIKI ASAMA | 0 1 1 | ¥1,765 |

ITEM 1　ITEM 2
ITEM 3　ITEM 4

FIG. 75

| ACCOUNT No. | NAME | TRANSACTION | AMOUNT OF MONEY |
|---|---|---|---|
| 0001 | TARO FUJI | 010 | ¥12,000 |
| 0010 | JIRO GUNMA | 010 | ¥2,000 |
| 0011 | HAJIME AKAGI | 001 | ¥777,777 |
| 1234 | TAMAKO MINAMI | 011 | ¥26 |
| 1278 | SHIZUMU HIGASHI | 001 | ¥1,234,567 |
| 2000 | GURASU HARUNA | 110 | ¥1,000 |
| 2010 | NISHIKI ASAMA | 011 | ¥1,785 |

ITEM 1     ITEM 2
ITEM 3     ITEM 4

FIG. 76

| ACCOUNT No. | NAME | TRANSACTION | AMOUNT OF MONEY |
|---|---|---|---|
| 0 0 1 0 | JIRO GUNMA | 0 1 0 | ¥2,000 |
| 0 0 1 1 | HAJIME AKAGI | 0 0 1 | ¥777,777 |
| 1 2 3 4 | TAMAKO MINAMI | 0 1 1 | ¥26 |
| 1 2 7 8 | SHIZUMU HIGASHI | 0 0 1 | ¥1,234,567 |
| 2 0 0 0 | GURASU HARUNA | 1 1 0 | ¥1,000 |
| 2 0 1 0 | NISHIKI ASAMA | 0 1 1 | ¥1,765 |
| 2 1 4 8 | POCHI INUYAMA | 0 1 0 | ¥4,321 |

ITEM 1      ITEM 2
ITEM 3      ITEM 4

FIG. 77

| ACCOUNT No. | NAME | TRANSACTION | AMOUNT OF MONEY |
|---|---|---|---|
| 0010 | JIRO GUNMA | 010 | ¥2,000 |
| 0011 | HAJIME AKAGI | 001 | ¥777,777 |
| 1234 | TAMAKO MINAMI | 011 | ¥26 |
| 1278 | SHIZUMU HIGASHI | 001 | ¥1,234,567 |
| 2000 | GURASU HARUNA | 110 | ¥1,000 |
| 2010 | NISHIKI ASAMA | 011 | ¥1,765 |
| 2148 | POCHI INUYAMA | 010 | ¥4,321 |

ITEM 1     ITEM 2
ITEM 3     ITEM 4

FIG. 78

| ACCOUNT No. | NAME | TRANSACTION | AMOUNT OF MONEY |
|---|---|---|---|
| 0 0 1 0 | JIRO GUNMA | 0 1 0 | ¥2,000 |
| 0 0 1 1 | HAJIME AKAGI | 0 0 1 | ¥777,777 |
| 1 2 3 4 | TAMAKO MINAMI | 0 1 1 | ¥26 |
| 1 2 7 8 | SHIZUMU HIGASHI | 0 0 1 | ¥1,234,567 |
| 2 0 0 0 | GURASU HARUNA | 1 1 0 | ¥1,000 |
| 2 0 1 0 | NISHIKI ASAMA | 0 1 1 | ¥1,765 |
| 2 1 4 8 | POCHI INUYAMA | 0 1 0 | ¥4,321 |

ITEM 1     ITEM 2
ITEM 3     ITEM 4

IN UNITS OF DOT (X COORDINATE, Y COORDINATE)

| | TITLE 1 (ACCOUNT NO.) | TITLE 2 NAME | TITLE 3 (TRANSACTION) | TITLE 4 (AMOUNT OF MONEY) |
|---|---|---|---|---|
| EMPHASIS ATTRIBUTE | THICK FRAME | SCREENED | THICK FRAME | SCREENED |
| NO. 1 START | (20, 60) | (100, 60) | (240, 60) | (320, 60) |
| NO. 1 END | (100, 80) | (240, 80) | (320, 80) | (420, 80) |
| NO. 2 START | (20, 80) | (100, 80) | (240, 80) | (320, 80) |
| NO. 2 END | (100, 100) | (240, 100) | (320, 100) | (420, 100) |
| ~ | ~ | ~ | ~ | ~ |
| NO. 7 START | (20, 180) | (100, 180) | (240, 180) | (320, 180) |
| NO. 7 END | (100, 200) | (240, 200) | (320, 200) | (420, 200) |
| NO. 8 START | (20, 200) | (100, 200) | (240, 200) | (320, 200) |
| NO. 8 END | (100, 220) | (240, 220) | (320, 220) | (420, 220) |

CHANGED TO (360, 180)

FIG. 80

| ACCOUNT NUMBER | TITLE | BANK NAME / BRANCH OFFICE NAME | RECIPIENT | AMOUNT OF MONEY |
|---|---|---|---|---|
| 1234567 | 1 | FUJITSU BANK / HEAD OFFICE BUSINESS DEPARTMENT | ICHIRO YAMADA | ¥10,000 |
| 2223333 | 2 | FUJITSU BANK / MINAMITAMA BRANCH OFFICE | JIRO TAMA | ¥21,000 |
| | | | | |

611
612
613
614
615
616
630

ACCOUNT NUMBR ___ AMOUNT MONEY ___
___ BRANCH OFFICE NAME ___

TITLE ___
BANK NAME ___ ■
RECIPIENT ___
CLIENT ___

FIG. 81

| ACCOUNT NUMBER | TITLE | BANK NAME | | RECIPIENT | AMOUNT OF MONEY |
|---|---|---|---|---|---|
| | | | BRANCH OFFICE NAME | | |
| 1234567 | 1 | FUJITSU BANK | HEAD OFFICE BUSINESS DEPARTMENT | ICHIRO YAMADA | ¥10,000 |
| 2223333 | 2 | FUJITSU BANK | MINAMITAMA BRANCH OFFICE | JIRO TAMA | ¥21,000 |
| | | | | | |

TITLE _____  ACCOUNT NUMBR _____  AMOUNT MONEY _____
BANK NAME _____  BRANCH OFFICE NAME ■
RECIPIENT _____
CLIENT _____

FIG. 82

| ACCOUNT NUMBER | TITLE | BANK NAME | | RECIPIENT | AMOUNT OF MONEY |
|---|---|---|---|---|---|
| | | | BRANCH OFFICE NAME | | |
| 1234567 | 1 | FUJITSU BANK | HEAD OFFICE BUSINESS DEPARTMENT | ICHIRO YAMADA | ¥10,000 |
| 2223333 | 2 | FUJITSU BANK | MINAMITAMA BRANCH OFFICE | JIRO TAMA | ¥21,000 |
| | | | | | |

TITLE _____ ACCOUNT NUMBR _____ AMOUNT MONEY _____
BANK NAME _____ BRANCH OFFICE NAME _____
RECIPIENT ■
CLIENT _____

FIG. 83

| ACCOUNT NUMBER | TITLE | BANK NAME | RECIPIENT | AMOUNT OF MONEY |
|---|---|---|---|---|
| | | BRANCH OFFICE NAME | | |
| 1234567 | 1 | FUJITSU BANK | ICHIRO YAMADA | ¥10,000 |
| | | HEAD OFFICE BUSINESS DEPARTMENT | | |
| 2223333 | 2 | FUJITSU BANK | JIRO TAMA | ¥21,000 |
| | | MINAMITAMA BRANCH OFFICE | | |

TITLE _____
BANK NAME _____ ACCOUNT NUMBR _____ AMOUNT MONEY _____
RECIPIENT ▪ _____ BRANCH OFFICE NAME _____
CLIENT _____

FIG. 85

EXCHANGE TRANSFER NOTICE

BANK NAME  FUJITSU  BANK OFFICE NAME  HEAD OFFICE
ACCOUNT NUMBER  1234567  TITLE  1  AMOUNT OF MONEY  ¥10,000
RECIPIENT  ICHIRO YAMADA
CLIENT  KOUICHI SUZUKI 611
612'
613

TITLE
BANK NAME
RECIPIENT
CLIENT

■ AMOUNT OF MONEY
  BRANCH OFFICE NAME 614
615
616
630

FIG. 98

```
                CHARGE TABLE (MAY TO AUGUST)
        CHARGE TABLE (JANUARY TO APRIL)
```

|  | JANUARY | FEBRUARY | MARCH | APRIL |
|---|---|---|---|---|
| WATER BILL | 1050 | 2034 | 1453 | 1175 |
| ELECTRICITY BILL | 12345 | 16634 | 11995 | 13366 |

FIG. 99

| ITEM NAME | ITEM COLUMN NUMBER | RECOGNITION RESULT | CORRECT ANSWER |
|---|---|---|---|
| SUI - 1 | 6 | 1050 | 1050 |
| SUI - 2 | 6 | 26?4 | 2034 |
| SUI - 3 | 6 | 1453 | 1453 |
| SUI - 4 | 6 | 1115 | 1175 |
| DEN - 1 | 6 | 12345 | 12345 |
| DEN - 2 | 6 | 16634 | 16534 |
| DEN - 3 | 6 | 11995 | 11995 |
| DEN - 4 | 6 | 13366 | 13366 |

FIG. 100

| | POSITION-SIZE ON FULL AREA IMAGE | CORRESPONDING CHARACTER ITEM NAME | CORRESPONDING ITEM IMAGE NAME | IN-ITEM COLUMN POSITION | RECOGNITION CHARACTER | OFFSET IN RECOGNITION CHARACTER INFORMATION | MODIFICATION COMPLETION FLAG |
|---|---|---|---|---|---|---|---|
| CHARACTER IMAGE 1 INFORMATION | REPRESENTED BY BIT | SUI-1 | ISUI-1 | 3 | 1 | 0 x 000D | OFF |
| CHARACTER IMAGE 2 INFORMATION | REPRESENTED BY BIT | | | 4 | 0 | 0 x 000E | OFF |
| CHARACTER IMAGE 3 INFORMATION | REPRESENTED BY BIT | | | 5 | 5 | 0 x 000F | OFF |
| CHARACTER IMAGE 4 INFORMATION | REPRESENTED BY BIT | | | 6 | 0 | 0 x 0010 | OFF |
| CHARACTER IMAGE 5 INFORMATION | REPRESENTED BY BIT | SUI-2 | ISUI-2 | 3 | 2 | 0 x 001D | OFF |
| CHARACTER IMAGE 6 INFORMATION | REPRESENTED BY BIT | | | 4 | 6 | 0 x 001E | OFF |
| CHARACTER IMAGE 7 INFORMATION | REPRESENTED BY BIT | | | 5 | ? | 0 x 001F | OFF |
| CHARACTER IMAGE 8 INFORMATION | REPRESENTED BY BIT | | | 6 | 4 | 0 x 0020 | OFF |
| CHARACTER IMAGE 9 INFORMATION | REPRESENTED BY BIT | SUI-3 | ISUI-3 | 3 | 1 | 0 x 002D | OFF |

R'

FIG. 102
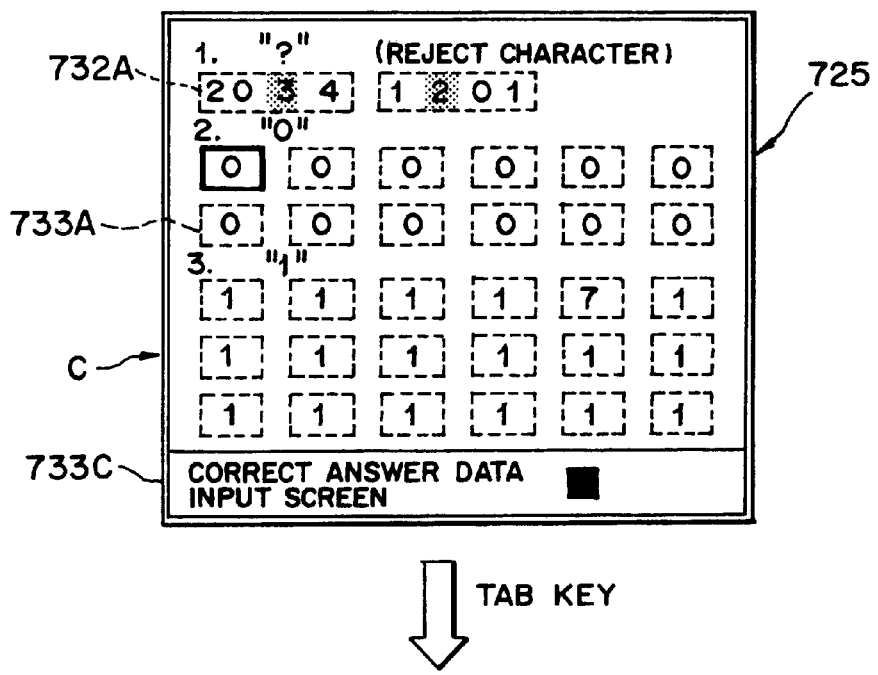
TAB KEY
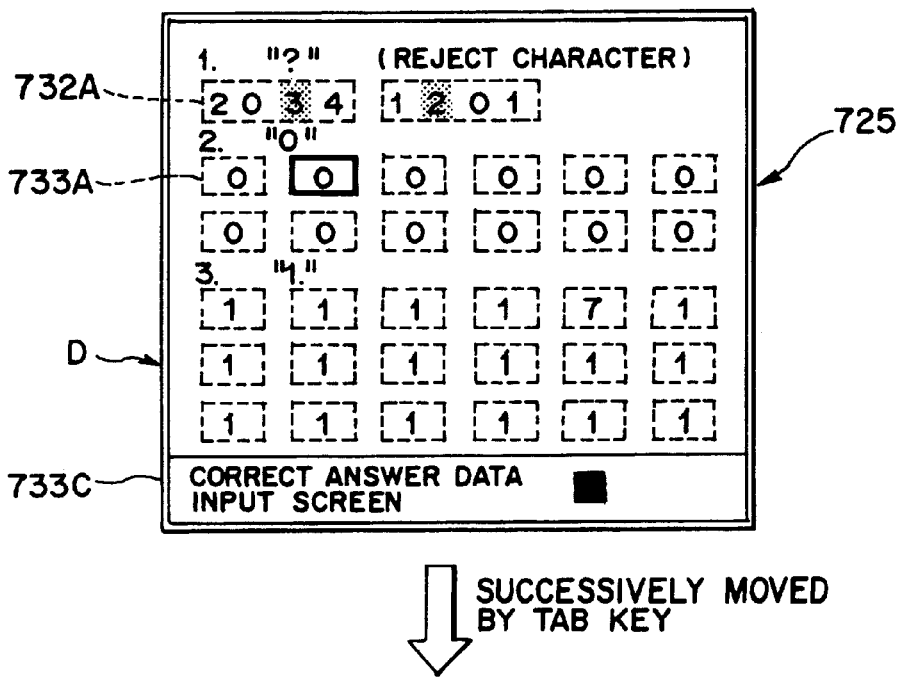
SUCCESSIVELY MOVED BY TAB KEY

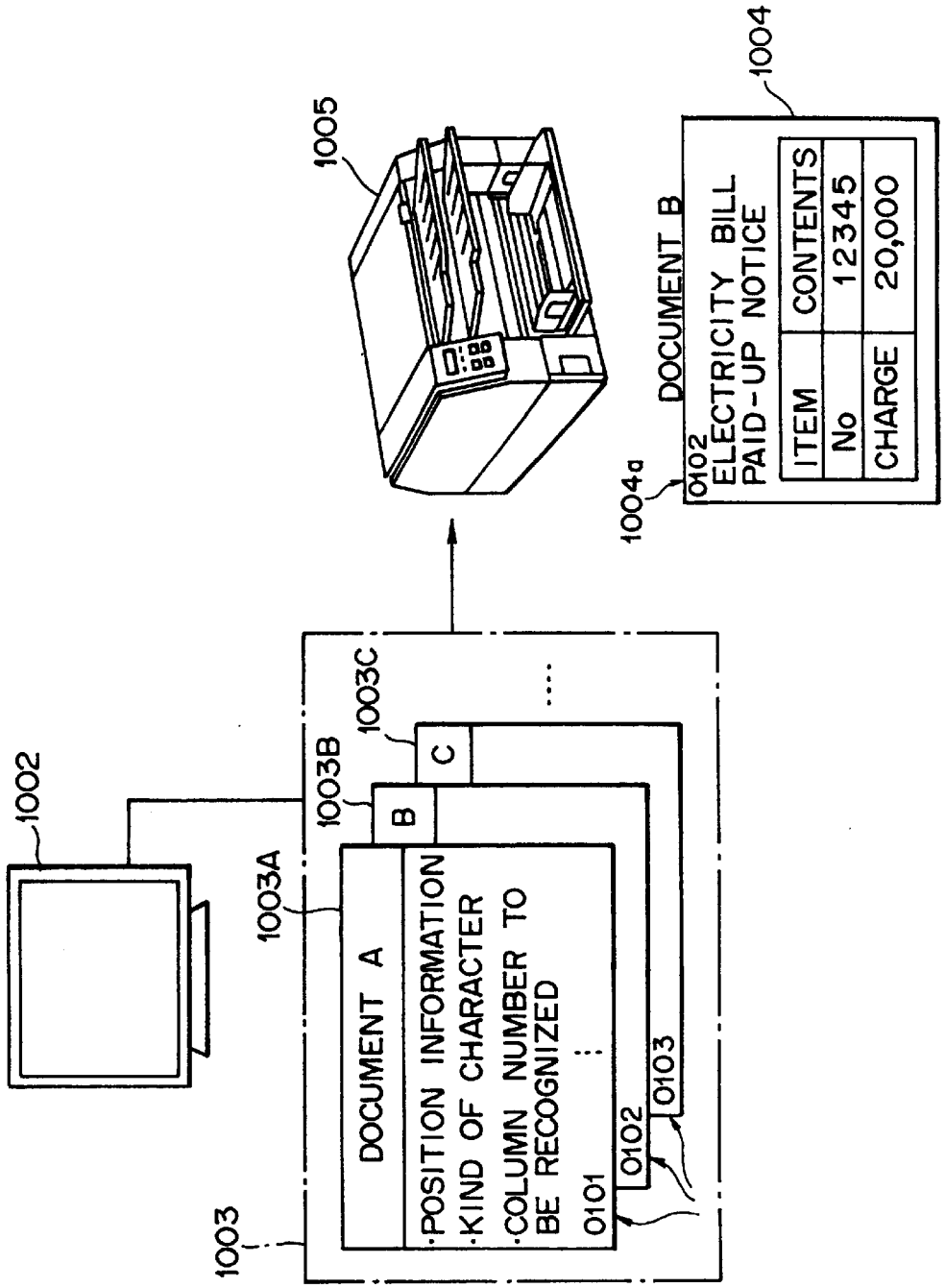

DATA MEDIUM HANDLING APPARATUS AND DATA MEDIUM HANDLING METHOD

FIELD OF THE INVENTION

This invention relates to a data medium handling apparatus and a data medium handling method suitable for use, for example, for document handling in a financial organ, and more particularly to a data medium handling apparatus and a data medium handling method for performing handling of documents having various formats such as private documents.

BACKGROUND OF THE INVENTION

In recent years, as apparatus which read character information as image data (an image) and then recognize characters, image data reading apparatus such as optical character reading apparatus (OCR apparatus) have been developed, and in various industries, the image data reading apparatus are used widely to achieve augmentation in efficiency in business and so forth.

For example, an operator who operates at the window of a financial organ or the like achieves augmentation in business by efficiently handling document media (documents) using an image data reading apparatus described above.

Particularly, in order to achieve augmentation in efficiency in business in which such document handling as described above is performed, it is required not only to handle document media of the same type (media for exclusive use for recognition processing) but also to automatically handle document media having various formats.

Thus, handling of a document medium using an image data reading apparatus can be performed for a plurality of kinds of document media by using, for example, such a document handling apparatus 1000 as shown in FIG. 115.

In particular, referring to FIG. 115, reference numeral 1001 denotes an image data reading apparatus for reading image data of a document. The image data reading apparatus 1001 is connected to a computer 1002 so that it can perform a reading operation of image data under the control of the computer 1002. It is to be noted that, for example, an image scanner or a facsimile is used as the image data reading apparatus 1001.

Meanwhile, the computer 1002 as a control apparatus for controlling the image data reading apparatus 1001 is composed of an inputting unit 1002-1 such as a keyboard or a mouse (only a keyboard is shown in FIG. 115) for inputting instructions, data and so forth from an operator, a computer mainframe 1002-2, and a display unit 1002-3 for displaying data, control information or the like. It is to be noted that character recognition processing of image data read by the image data reading apparatus 1001 is performed by the computer mainframe 1002-2.

Further, reference numeral hard disk 1003 denotes a hard disk. The hard disk 1003 is connected to the computer 1002 and stores in advance information (hereinafter referred to as "definition object information") 1003A to 1003C, ... which designates, for each kind of document, for example, as seen in FIG. 116, position information of character data to be recognized, and a type, a number and so forth of characters.

It is to be noted that such an image data reading and recognition apparatus 1005 as shown in FIG. 116 or 117 may be used in place of the image data reading apparatus 1001 described above. The image data reading and recognition apparatus 1005 can perform a reading operation of image data similar to that of the image data reading apparatus 1001 as well as character recognition.

In order to recognize character data appearing on an electricity bill paid-up notice 1004 as shown, for example, in FIG. 116 using the image data reading and recognition apparatus 1005, a document kind (in this instance, the definition object information 1003B corresponding to the electricity bill paid-up notice 1004 (document B)) is designated by operation of the keyboard 1002-1 by the operator.

Then, the computer 1002 accesses the hard disk 1003 to extract the definition object information 1003B of the designated document and reports the definition object information 1003B to the image data reading and recognition apparatus 1005.

Consequently, the image data reading and recognition apparatus 1005 can effect reading of image data and character recognition processing based on the definition object information 1003B as control information from the computer 1002.

However, in the procedure of handling such a document as described hereinabove with reference to FIG. 116, since definition object information is designated for each document to be read by designation of the operator, a burden is imposed on the operator, and besides, as definition objects increase in number, a designation error may occur. Where it is required to handle several thousands kinds of documents, it is actually difficult for the operator to designate a definition object.

Therefore, also another method has been proposed wherein, as shown in FIG. 117, an ID number (in this instance, '0102') for identification of a document from any other document is recorded at a prescribed position 1004a of the document 1004 so that reading processing of the document may be performed automatically without such necessity for designation of a document kind by the operator as described above.

With the method just described, when image data of a document are to be read by the image data reading and recognition apparatus 1005, character recognition can be effected by first recognizing the ID number recorded at the predetermined position 1004a and then using the definition object information (in this instance, 1003B) corresponding to the recognized ID number.

However, when image data are to be read, if the position at which a document or the like is set in an optical reading apparatus (for example, a document handling apparatus) such as the image data reading apparatus 1001 or the image data reading and recognition apparatus 1005 is displaced, then even if a document same as, for example, a document whose definition object information is stored in advance in the hard disk 1003 is read, since coordinates of an image of a region of character data, a region of a figure or the like from a reference point (physical origin) do not exhibit the same coordinates as those of the definition object information, it is determined in a document handling apparatus or the like that the layouts are not the same as each other.

In a document handling apparatus or the like, character recognition processing is not sometimes performed regularly unless character recognition of image data is performed after the layout of read image data and the layout of definition object information are adjusted to each other. Therefore, reference points of individual images are extracted and coordinates of the individual images from the reference points are compared with each other to effect discrimination of coincidence between the layouts.

Here, the following two methods are dominantly used for extraction of a reference point of image data. It is to be noted that, as a precondition, an object document for reading is a document printed in advance and the print position of the document on a form is managed with a high degree of accuracy.

According to the first method, when image data of a document are to be read by an image data reading apparatus by which, as shown in FIG. 118(a), a form end edge 1006 of the document to be read and a reading background 1007 can be identified from each other, the left upper corner position P of the form end edge 1006 is determined as a reference point.

According to the second method, when image data of a document are to be read by an image scanner or a facsimile, since a reading background 1009 and a form end edge 1008 read cannot be identified from each other as seen in FIG. 118(b), a reference mark R is printed on an object document form for reading in advance and this reference mark R is extracted from image data and determined as a reference point.

The second method is advantageous in that, since a reference point position is printed as the reference mark R in advance, even if the position in which the document is set in a reading apparatus is displaced, the reference point can be extracted stably.

However, in a document handling apparatus or the like, even if a reference point is extracted accurately by the method described above, if the reading direction of image data is not a correct direction, then the character describing direction of image data is not a correct direction, and consequently, character recognition processing cannot be performed.

If, for example, as shown in FIG. 119, a transfer slip (document C) 1010 on which information is described in a horizontal direction is read in a wrong direction (in a vertical direction in FIG. 119), image data of the transfer slip 1010 thus read are displayed in a wrong orientation as denoted by reference symbol 1010A on the display unit 1002-3.

Therefore, upon character recognition processing by a document handling apparatus or the like, the operator must visually observe the display unit 1002-3 to discriminate whether or not the reading direction of the document is correct and, when the reading direction of the document is not correct, input, from the keyboard 1002-1, an instruction to rotate read image data of the document by 90 degrees or 180 degrees so as to effect rotational correction processing of the image data so that the image data of the document may be displayed in a correct direction as denoted by reference symbol 1010B on the display unit 1002-3.

By the way, in a conventional remittance job to an account in a bank, an operator inputs information of an account number, a name, an amount of money and so forth described on a document which is a remittance request slip from the keyboard 1002-1 or the like of the document handling apparatus 1000. In this instance, the operator visually observes the document and the display unit 1002-3 alternately to perform an inputting operation.

However, where the document and the display unit 1002-3 are visually observed alternately to perform an inputting operation in this manner, since many movements of the operator's eye are involved, there is a subject in that the visual discernibility is deteriorated and there is the possibility that the matching between an item of the document and an item on the screen may be mistaken.

Thus, a further document handling apparatus has been proposed wherein a document is read by the image data reading apparatus 1001 or the like and read image data themselves are displayed on the display unit 1002-3 together with a result of character recognition of the image data.

With the document handling apparatus, since information described on a document can be visually observed directly on the display unit 1002-3, movements of the eye are reduced, and errors in matching between a result of character recognition and image data upon confirmation of and amendment to the result of character recognition can be reduced.

Meanwhile, in recent years, a method wherein data processing is performed in a concentrated manner at a high speed by a server using a client-server system is dominantly employed in financial organs or the like.

For example, it is proposed to interconnect a client installed for each branch (business office) of a financial organ and a server installed at a district center by a dedicated line or an exchange line to construct a client-server system and perform document handling collectively by the server to achieve augmentation in efficiency in business.

Where document handling is performed collectively by a server in this manner, since the amount of data concentrated upon the server becomes a very much amount, it is impossible for an operator to perform document handling by the server. Consequently, a system wherein a server automatically performs document handling without intervention of an operator must be designed.

Thus, if document identification processing in which such a document on which an ID number is described as described hereinabove with reference to FIG. 117 is applied to the client-server system just described, then the server can automatically identify the kind of a document and perform reading processing of the document.

Further, also with the client of the client-server system, where image data themselves read by the image data reading apparatus are displayed on the display unit together with a result of character recognition of the image data, information described on a document can be visually observed directly on the display unit to reduce errors in matching between the result of character recognition and the image data upon confirmation of and amendment to the result of character recognition.

However, in the technique which handles such a document as described hereinabove with reference FIG. 117, document media which can be read are only document media produced for exclusive use for the document handling apparatus, and since ordinary documents used conventionally cannot be used, there is a subject in this instance that documents for exclusive use must be produced newly.

Meanwhile, in such a first reference point extraction method as described hereinabove with reference to FIG. 118(a), while the print position of a document on a form must be managed with a high degree of accuracy, where a document printed, for example, by a word processor or the like is involved, if the form is set manually, then the print position varies in many cases every time printing is performed. Therefore, in such an instance, there is a subject that it is not suitable to set the left upper corner position P of the form end edge 1006 as a reference point.

Further, in such a second reference point extraction method as described hereinabove with reference to FIG. 118(b), object documents for reading are documents for exclusive use on which the reference mark R is printed, and there is a subject that, where ordinary documents on which the reference mark R is not printed are involved, the reference point cannot be extracted.

Further, also with the technique adopted in a recognition technique for a document reader or the like wherein a particular point of a table in a document is used as a reference point, there is a subject in that, where the layout of an object document for recognition cannot be specified to some degree, the technique does not function effectively.

It is to be noted that, even when the same document as the document whose image has been read formerly is read again, the image read may not be found same as the former one because of dust, blurring or the like upon image reading, and in such a case, the same reference point may not sometimes be extracted.

Further, in order for a server to automatically perform such rotational correction processing of image data as described hereinabove with reference to FIG. 119, it is necessary to perform character recognition of image data actually read and then perform discrimination whether the reading direction of the document is correct or wrong depending upon whether or not character recognition is possible, and there is a subject in that this disturbs augmentation in efficiency in job very much.

Meanwhile, in such a method as described hereinabove wherein a result of character recognition of image data and the image data themselves are displayed on a display unit to perform confirmation of and amendment to the result of character recognition, since matching between the image data and a confirmation item is performed by visual observation, there is a subject in that, where the image data include a large number of items to be confirmed, erroneous recognition cannot still be avoided.

Further, where the image data cannot be displayed at a time on the display unit, the display screen must be scrolled in order to refer to rearward data, and in this instance, a required key must be depressed to perform a scrolling operation. Accordingly, there is a subject in that the operation is complicated.

The present invention has been made in view of such subjects as described above, and it is an object of the present invention to provide a data medium handling apparatus and a data medium handling method by which handling of documents which are ordinary documents used conventionally and having various formats like private slips or the like can be performed.

It is another object of the present invention to provide a data medium handling method wherein, even for a document printed on plain paper by a word processor or the like, extraction processing of a reference point from image data of the printed document can normally be performed stably and automatically without using such a form end edge, a reference mark or the like as in the conventional techniques.

It is a further object of the present invention to provide a data medium handling method by which rotational correction processing of image data read by an image data reading apparatus can be performed automatically.

It is a still further object of the present invention to provide a data medium handling apparatus and a data medium handling method wherein part of image data is emphatically displayed based on information defined in advance to raise the recognizability and allow smooth confirmation and amendment processing.

It is a yet further object of the present invention to provide a data medium handling apparatus and a data medium handling method wherein a character image in units of a character is extracted from image data in units of a document or in units of an item and the character image is edited to reduce the movements of the type and the objects of comparison and besides allow confirmation with a high degree of accuracy so that the labor and the time required for a correct/wrong confirmation operation can be reduced remarkably.

DISCLOSURE OF THE INVENTION

According to the present invention, a data medium handling apparatus for recognizing, based on an image read from a data medium on which information is described in an arbitrary format, the information, is characterized in that it comprises means for extracting characteristics unique to the data medium including the format from the read image data and specifying, from the characteristics, a position at which information to be recognized is present, and image recognition means for recognizing the image data at the position specified by the means to discriminate the information.

In particular, according to the present invention, a data medium handling apparatus for recognizing, based on an image read from a data medium on which information is described in an arbitrary format, the information, is characterized in that it comprises a layout analysis processing section for extracting characteristics of a layout of the read image to analyze a structure of the layout and representing the layout logically based on the extracted characteristics, a candidate layout storage section in which candidate layouts are stored, and a layout collation processing section for retrieving the candidate layouts from the candidate layout storage section using the characteristics of the layout extracted by the layout analysis processing section as restrictive retrieval terms to collate whether or not a coincident candidate layout is present.

Here, the data medium handling apparatus may further comprise an analysis pre-processing section for performing required pre-processing for the image, which makes an object of recognition, prior to the layout analysis processing by the layout analysis processing section.

Or, the layout analysis processing section may at least include a layout characteristic extraction section for extracting characteristics of the layout of the image, and a layout analysis section for analyzing a structure of the layout based on the characteristics of the layout extracted by the layout characteristic extraction section.

Further, the layout analysis processing section is constructed such that it first extracts characteristics of the layout and then extracts a logical origin of the layout, and the layout collation processing section is constructed such that it collates whether or not there is a coincident candidate layout with reference to the logical origin extracted by the layout analysis processing section.

Here, where the layout has a table structure formed from ruled lines, the layout characteristic extraction section includes a ruled line extraction section for extracting the ruled lines of the layout while the layout analysis section includes a table structure analysis section for analyzing the table structure formed from the ruled lines based on the ruled lines of the layout extracted by the layout characteristic extraction section. In the meantime, where the layout has a no ruled line table structure which does not include ruled lines, the layout characteristic extraction section includes an item data extraction section for extracting item data of the layout while the layout analysis section includes a table structure analysis section for analyzing the no ruled line table structure based on the item data of the layout extracted by the layout characteristic extraction section.

Further, the layout analysis processing section may be constructed such that it determines a caption region in the image, recognizes caption item information in the caption region and determines corresponding item data.

Or, the data medium handling apparatus may be constructed such that the candidate layout storage section is constructed so as to store information of compressed candidate layouts, and the layout collation processing section compression processes the characteristics of the layout extracted by the layout analysis processing section and retrieves the compressed candidate layouts from the candidate layout storage section using the compressed characteristics of the layout as restrictive retrieval terms to collate whether or not a coincident candidate layout is present.

Or else, the candidate layout storage section may be constructed so as to update the candidate layout information by learning.

In the data medium handling apparatus of the present invention having the construction described above, in the information present position specification step, characteristics unique to a data medium including a format are extracted from read image data, and from the characteristics, a position at which information to be recognized is present is specified, and in the image recognition step, the image at the position specified in the preceding step is recognized to discriminate the information thereby to effect recognition of the information based on the image read from the data medium on which the information is described in an arbitrary format.

In particular, in the data medium handling apparatus of the present invention, in the layout analysis processing step, characteristics of a layout of a read image are extracted to analyze a structure of the layout and the layout is represented logically based on the extracted characteristics, and in the layout collation processing step, candidate layouts stored in the candidate layout storage section are retrieved using the characteristics of the layout extracted in the layout analysis processing step as restrictive retrieval terms to collate whether or not a coincident candidate layout is present thereby to effect recognition of the information based on the image read from the data medium on which the information is described in an arbitrary format.

In the layout analysis processing step, characteristics of the layout may be extracted first and then a logical origin of the layout may be extracted, and in the layout collation processing step, the information may be discriminated with reference to the logical origin extracted in the layout analysis processing step.

Further, in the layout analysis processing step, it may be discriminated whether or not the layout of the read image is in a predetermined direction, and the read image data may be converted based on a result of the discrimination so that the layout may be in the predetermined direction. The conversion processing of the read image data may be such processing as to rotate the layout.

Here, where the layout has a table structure formed from ruled lines, in the layout analysis processing step, the ruled lines of the layout are extracted, and the table structure formed from the ruled lines is analyzed based on the ruled lines of the layout extracted. In the meantime, where the layout has a no ruled line table structure which does not include ruled lines, in the layout analysis processing step, item data of the layout are extracted, and the no ruled line table structure is analyzed based on the item data of the layout extracted.

Further, in the layout analysis processing step, a caption region in the image may be determined, and caption item information in the caption region may be confirmed and corresponding item data may be determined.

Where information of compressed candidate layouts is stored into the candidate layout storage section, in the layout collation processing step, the characteristics of the layout extracted in the layout analysis processing step are compression processed, and the compressed candidate layouts are retrieved from the candidate layout storage section using the characteristics of the layout compressed in the preceding step as restrictive retrieval terms, and then, based on a result of the retrieval, it is collated whether or not a coincident candidate layout is present.

Further, in the candidate layout information is updated by the candidate layout storage section by learning.

Accordingly, the data medium handling apparatus of the present invention is advantageous in that, since various documents or document images which are produced daily are automatically analyzed electronically, the efficiency in entry jobs which make use of conventional entry systems (OCR entry systems, data entry systems and so forth) can be raised remarkably.

Further, since layout log information is produced based on a result of layout recognition of an arbitrary document of any kind and is registered by learning into the candidate layout storage section, discrimination of a document having the same layout can thereafter be performed automatically, and consequently, the labor and the cost required for production of documents for exclusive use can be reduced. Further, since entry is enabled immediately after such learning, reduction in period in which a system based on the present apparatus is installed can be achieved.

Furthermore, since image data of a document are normally analysis processed, automatic recognition processing for documents other than expensive OCR documents for exclusive use with which the cutting error or the print error is little.

According to the present invention, a data medium handling method for recognizing, based on an image read from a data medium on which information is described in an arbitrary format, the information, is characterized in that it comprises the logical origin extraction step of extracting a logical origin of the format, the information present position specification step of extracting characteristics unique to the data medium including the format with reference to the logical origin extracted in the preceding step and specifying, from the characteristics, a position at which information to be recognized is present, and the image recognition step of discriminating, when the image at the position specified in the preceding step is to be recognized, the information with reference to the logical origin extracted in the logical origin extraction step.

In the logical origin extraction step, not only the logical origin of the format may be extracted, but also logical origin auxiliary coordinate information which provides auxiliary information to the logical origin may be extracted, and in the image recognition step, the information may be discriminated with reference to the logical original and the logical origin auxiliary coordinate information.

Where the layout has a table structure formed from ruled lines, coordinate information regarding one of corners which define the table structure is extracted as the logical origin of the format.

In this instance, coordinate information regarding the remaining corners may be extracted as the logical origin auxiliary coordinate information.

Particularly, where the layout has a table structure formed from ruled lines, coordinate information of one of corners defining the table structure which has a minimum X coordinate and a minimum Y coordinate is extracted as the logical origin of the format.

In this instance, coordinate information of another one of the corners which has a maximum X coordinate and the minimum Y coordinate, a further one of the corners which has the minimum X coordinate and a maximum Y coordinate and a still further one of the corners which has the maximum X coordinate and the maximum Y coordinate may be extracted as the logical origin auxiliary coordinate information.

On the other hand, where the layout has a no ruled line table structure which does not include ruled lines, coordinate information regarding one of corners of a circumscribed rectangle of item data in the layout is extracted as the logical origin of the format.

In this instance, coordinate information regarding the remaining angles of the circumscribed rectangle may be extracted as the logical origin auxiliary coordinate information.

More particularly, where the layout has a no ruled line table structure which does not include ruled lines, coordinate information of one of corners of the circumscribed rectangle which has a minimum X coordinate and a minimum Y coordinate is extracted as the logical origin of the format.

In this instance, coordinate information of another one of the corners of the circumscribed rectangle which has a maximum X coordinate and the minimum Y coordinate, a further one of the corners which has the minimum X coordinate and a maximum Y coordinate and a still further one of the corners which has the maximum X coordinate and the maximum Y coordinate may be extracted as the logical origin auxiliary coordinate information.

Accordingly, the data medium handling method of the present invention is advantageous in that, since a layout analysis of a document of an object of processing is performed based on ruled line items or item data extracted from image data and predetermined coordinates from among coordinates of corners of a region obtained by the layout analysis are determined as logical origin coordinates and correction coordinates, logical origin coordinates and correction coordinates can be extracted even from image data of ordinary documents other than documents for exclusive use on which a reference mark or the like is printed.

Further, since correction coordinates are extracted, upon extraction of a logical origin, simultaneously as additional information to the logical origin, coincidence can be detected with certainty upon collation of logical origins in the layout collation processing.

In particular, since collation of logical origins is performed through collation of relative coordinates of correction coordinates with logical origin coordinates taken into consideration, even if positional displacement occurs upon image reading, collation processing in layout can be performed with certainty.

Further, according to the present invention, a data medium handling method for recognizing, based on an image read from a data medium on which information is described in an arbitrary format, the information, is characterized in that characteristics unique to the data medium including the format are extracted from the read image data and then compression processed, and reference compression information stored in a storage section is retrieved using the compression processed characteristics as restrictive retrieval terms to collate whether or not there is coincident reference compression information, whereafter the image at a specified position is recognized based on a result of the collation to discriminate the information.

Here, prior to the compression processing for the characteristics, obliqueness correction and distortion correction processing may be performed for the read image data.

Further, upon the compression processing for the characteristics, horizontal ruled lines which construct ruled line items of the read image data are referred to to perform Y coordinate unification processing for those of the ruled line items whose upper side ruled lines commonly have a same ruled line, and vertical ruled lines which construct the ruled line items of the read image data are referred to to perform X coordinate unification processing for those of the ruled line items whose left side ruled lines commonly have a same ruled line.

Or, upon the compression processing for the characteristics, the characteristics are converted into a corresponding bit stream, and the bit stream is compression processed and set as a matrix table.

Accordingly, the data medium processing method of the present invention is advantageous in that, since a layout of a ruled line item which is one of components of a layout is compression processed and represented as a matrix table and, upon collation of layouts, such matrix tables are collated with each other, the layout collation processing speed increases merely linearly in proportion to the number of layouts of an object of collation without relying upon the number of ruled line items, and collation processing of layouts of a large number of documents can be performed at a high speed.

Further, since, prior to compression processing of a bit table on which a layout of ruled line items is reflected, obliqueness correction and distortion correction processing is performed for the read image data and Y coordinate unification processing and X coordinate unification processing are performed for the ruled line items, a variation in layout which occurs upon reading of image data can be absorbed.

Further, according to the present invention, a data medium handling method for recognizing, based on an image read from a data medium on which information is described in an arbitrary format, the information, is characterized in that it comprises the registration step of extracting characteristics of a layout of the read image, analyzing a structure of the layout, displaying the analyzed layout structure on a display unit, setting a predetermined characteristic data recognition region for the displayed layout structure, inputting code data corresponding to emblem information in the region through an external inputting apparatus, producing region characteristic data from the characteristic data recognition region and the code data, and registering the region characteristic data in a linked relationship with the analyzed layout structure, and the collation step of extracting characteristics of an image read separately, analyzing a structure of the layout, retrieving the region characteristic data registered in the registration step and the layout structure as reference data and collating whether or not there is a coincident region characteristic data.

Here, when code data corresponding to the emblem information in the region are inputted in the registration step, code data having significance corresponding to the emblem information are inputted.

Accordingly, with the data medium processing method of the present invention, since functions of a region image characteristic extraction mechanism and a characteristic collation mechanism similar to those of a character recognition apparatus are expanded and combined with a layout recognition system, recognition processing of an arbitrary graphic image in a designated region can be performed in an interlocking relationship with layout recognition processing.

Further, since region characteristic data of an object of collation are recorded in an linked relationship with layout information, the object of collation can be restricted in units of a layout, and consequently, such collation processing of a large amount as required by ordinary character recognition processing need not be performed and a high recognition rate can be achieved.

Furthermore, if an item of a rubber seal, a signature or the like is designated as a characteristic data recognition item, then such an item as a rubber seal, a signature or the like which cannot be recognized by ordinary character recognition can be recognized, and corresponding code data can be acquired as a result of recognition of a characteristic region of an item of a rubber seal, a signature or the like.

Further, according to the present invention, a data medium handling method for recognizing, based on an image read from a data medium on which information is described in an arbitrary format, the information, is characterized in that it comprises the layout analysis processing step of extracting characteristics of a layout of the read image, analyzing a structure of the layout, determining a caption region in the image based on the extracted characteristics, recognizing caption item information in the caption region, determining corresponding item data and logically representing the layout, and the layout collation processing step of retrieving candidate layouts stored in a candidate layout storage section using the characteristics of the layout extracted in the layout analysis processing step as restrictive retrieval terms to collate whether or not there is a coincident candidate layout.

The data medium handling method is further characterized in that the layout analysis processing step includes the caption position candidate determination step of determining caption position candidates based on a result of the analysis of the structure of the layout, and the caption item collation step of collating the caption item information in the caption region with the caption position candidates determined in the preceding step.

Upon the collation of the caption item in the caption item collation step, the collation processing of the caption item is performed after normalization processing is performed for the image data to be collated.

Accordingly, the data medium handling method of the present invention is advantageous in that, since a caption item and item data corresponding to the caption item can be identified by the layout recognition processing by performing the caption analysis processing of retrieving and collating a caption position from a ruled line item structure of a document image of an object of analysis to automatically analyze item information corresponding to a caption described on a document, character recognition of item data can be performed immediately without performing character recognition processing of a caption item.

Meanwhile, a data medium handling apparatus according to the present invention is characterized in that it comprises an image data reading apparatus for reading image data of a document as a data medium having required information described in a format thereof, an image data storage memory for storing the image data of the document read by the image data reading apparatus, document identification information extraction means for extracting required document identification information described on the document from the image data of the document stored in the image data storage memory, a document identification dictionary for registering the document identification information extracted by the document identification information extraction means as document identification information for a particular document, reference means for referring to image data of an arbitrary document read by the image data reading apparatus and stored in the image data storage memory to detect whether or not the image data of the arbitrary document include the document identification information registered in the document identification dictionary, and document identification means for identifying, based on a result of the reference by the reference means, whether or not the arbitrary document is the particular document.

Further, a data medium handling apparatus according to the present invention is characterized in that it comprises an image data reading apparatus for reading image data of a document as a data medium having required information described in a format thereof, an image data storage memory and a file memory for storing the image data of the document read by the image data reading apparatus, document identification information extraction means for extracting required document identification information described on the document from the image data of the document stored in the image data storage memory, a document identification dictionary for registering the document identification information extracted by the document identification information extraction means as document identification information for a particular document, verification means for reading out the image data of the particular document stored in the file memory and verifying whether or not the image data of the particular document include the document identification information registered in the document identification dictionary, discrimination means for discriminating, based on a result of the verification by the verification means, whether or not recognition of the particular document is possible, reference means for referring to image data of an arbitrary document read by the image data reading apparatus and stored in the image data storage memory to detect whether or not the image data of the arbitrary document include the document identification information registered in the document identification dictionary, and document identification means for identifying, based on a result of the reference by the reference means, whether or not the arbitrary document is the particular document.

Here, the reference means may serve also as the verification means, and the document identification means may serve also as the discrimination means.

In data medium handling apparatus of the present invention having the construction described above, from image data of a particular document as a data medium read by the image data reading apparatus and having required information described in a format thereon, document identification information described on the particular document is extracted and the document identification information is registered into the document identification dictionary, and then, image data of an arbitrary document are read by means of the image data reading apparatus, whereafter the image data of the arbitrary document are referred to to detect whether or not the image data of the arbitrary document include the document identification information registered in the document identification dictionary to identify whether or not the arbitrary document is the particular document.

Further, in the data medium handling apparatus of the present invention, from image data of a particular document as a data medium read by the image data reading apparatus and having required information described in a format thereon, document identification information described on the particular document is extracted and the document identification information is registered into the document identification dictionary, and then, image data of the particular document are inputted again and it is verified whether or not the inputted image data of the particular document include the document identification information registered in the document identification dictionary to discriminate whether or not recognition of the particular document is possible, whereafter, when recognition of the particular document is possible, image data of an arbitrary document are read by means of the image data reading apparatus and the image data of the arbitrary document are referred to to detect whether or not the image data of the arbitrary document include the document identification information registered in the document identification dictionary to identify whether or not the arbitrary document is the particular document.

Here, when the document identification information is to be registered into the document identification dictionary, the image data of the particular document read by the image data reading apparatus may be displayed on the display unit and a region which includes an image of the document identification information described on the particular document may be designated from within the image data of the displayed particular document to extract the document identification information.

Or, when the document identification information is to be registered into the document identification dictionary, particular document identification information described on the particular document may be automatically extracted from the image data of the particular document read by the image data reading apparatus.

Or else, when the document identification information is to be registered into the document identification dictionary, upon registration of the document identification information into the document identification dictionary, the image data of the particular document read upon registration may be stored, and, when the document identification information is to be registered into the document identification dictionary, the stored image data of the particular document may be inputted as image data of the particular document again, and it may be verified whether or not the inputted image data of the particular document include the document identification information registered in the document identification dictionary to discriminate whether or not recognition of the particular document is possible.

Accordingly, the data medium handling apparatus of the present invention is advantageous in that, since a kind of a document whose image data have been read by the image data reading apparatus can be automatically identified, even if a plurality of kinds of documents to be read by the image reading apparatus are present in a mixed condition, an operator can handle the document without being aware of definition of each document and improvement in efficiency in job can be anticipated. The data medium handling apparatus is advantageous also in that an ID number or the like for identification of a document itself need not be described on the document and ordinary documents can be used, and consequently, the data medium handling apparatus can be applied readily to an existing system.

Further, since it can be verified whether or not document identification information designated by the operator is correct, the data medium handling apparatus is advantageous in that erroneous discrimination of a document is eliminated at all and the reliability of the apparatus is improved.

Furthermore, since the reference means serves also as the verification means and the document identification means serves also as the discrimination means, the data medium handling apparatus is advantageous in that the apparatus construction can be simplified.

Further, a data medium handling apparatus according to the present invention is characterized in that it comprises an image reading section for reading an image of a data medium having emblem information, an emblem recognition section for recognizing the emblem image information in the image read by the image reading section and converting the emblem image information into corresponding code information, a display unit for displaying the emblem image information in a condition of a read image, and a read emblem image display control section for causing, when the emblem image information has not successfully been converted into corresponding code information, the unrecognizable emblem image information, whose conversion has not been performed successfully, to be displayed in a condition of a read image on the display unit together with emblem image information associated with the unrecognizable emblem image information, the read emblem image display control section including emphasis display means for emphatically displaying the unrecognizable emblem image information.

Here, the data medium handling apparatus further comprises a data inputting apparatus for inputting correct answer data corresponding to the unrecognizable emblem image information, and correct answer data display means for causing, when the correct answer data are inputted by an operation of the data inputting apparatus, the correct answer data to be displayed in a correct answer data display area different from an unrecognizable emblem image information display area on the display unit.

The data medium handling apparatus may further comprise emphasis display changing means for causing, when correct answer data are inputted by the operation of the data inputting apparatus, the unrecognizable emblem image information which has been displayed in emphasis to be displayed in a different manner of emphasis which signifies that the unrecognizable emblem image information has been modified.

Or, the data medium handling apparatus may further comprise emphasis display changing means for causing, when the correct answer data are displayed in the correct answer data display area different from the unrecognizable emblem image information display area on the display unit by the correct answer data display means, the unrecognizable emblem image information, which has been displayed in emphasis, to be displayed in a different manner of emphasis which signifies that the unrecognizable emblem image information has been modified.

In particular, the data medium handling apparatus according to the present invention wherein an image of a data medium having emblem information is read and emblem image information in the read image is recognized and converted into corresponding code information, is characterized in that, when the emblem image information has not been successfully converted into corresponding code information, the unrecognizable emblem image information which has not been successfully converted is displayed in a condition of a read image on the display unit together with emblem image information associated with the unrecognizable emblem image information, and the unrecognizable emblem image information is displayed in emphasis, and thereafter, when correct answer data corresponding to the unrecognizable emblem image information are inputted by an operation of the data inputting apparatus, the unrecognizable emblem image information which has been displayed in emphasis is displayed in a different manner of emphasis which signifies that the unrecognizable emblem image information has been modified.

In short, a data medium handling apparatus of the present invention is characterized in that it comprises an image reading section for reading an image of a data medium having emblem information, an emblem recognition section for recognizing the emblem image information in the image read by the image reading section and converting the emblem image information into corresponding code information, a display unit for displaying the emblem image information in a condition of a read image, and a read emblem image display control section for causing, when the emblem image information has not successfully been converted into corresponding code information, the unrecognizable emblem image information, whose conversion has not been performed successfully, to be displayed in a condition of a read image on the display unit together with emblem image information associated with the unrecognizable emblem image information, emphasis display means for causing the unrecognizable emblem image information to be displayed in emphasis, a data inputting apparatus for inputting correct answer data corresponding to the unrecognizable emblem image information, emphasis display changing means for causing, when the correct answer data are inputted by an operation of the data inputting apparatus, the unrecognizable emblem image information, which has been displayed emphatically till then, to be displayed in a different manner of emphasis which signifies completion of modification, and recognition information modification means for modifying, when the correct answer data are inputted by the operation of the data inputting apparatus, the unrecognizable emblem information based on the correct answer data.

In the data medium handling apparatus of the present invention having the construction described above, when an image of a data medium having emblem information is read and emblem image information in the read image is recognized and converted into corresponding code information, if the emblem image information has not been successfully converted into corresponding code information, then the unrecognizable emblem image information which has not been successfully converted is displayed in a condition of a read image on the display unit together with emblem image information associated with the unrecognizable emblem image information, and the unrecognizable emblem image information is displayed in emphasis.

Further, when correct answer data corresponding to the unrecognizable emblem image information are inputted by an operation of the data inputting apparatus, the correct answer data are displayed in the correct answer data display area different from the unrecognizable emblem image information display area on the display unit.

Or, when correct answer data corresponding to the unrecognizable emblem image information are inputted by an operation of the data inputting apparatus, the unrecognizable emblem image information which has been displayed in emphasis is displayed in a different manner of emphasis which signifies that the unrecognizable emblem image information has been modified.

Or else, when correct answer data corresponding to the unrecognizable emblem image information are inputted by an operation of the data inputting apparatus, the correct answer data are displayed in the correct answer data display area different from the unrecognizable emblem image information display area on the display unit while the unrecognizable emblem image information which has been displayed in emphasis is displayed in a different manner of emphasis which signifies that the unrecognizable emblem image information has been modified.

Accordingly, with the data medium handling apparatus of the present invention, when the emblem image information has not been successfully converted into corresponding code information, the unrecognizable emblem image information which has not been successfully converted is displayed in a condition of a read image on the display unit together with emblem image information associated with the unrecognizable emblem image information, and the unrecognizable emblem image information is displayed in emphasis. Consequently, the data medium handling apparatus is advantageous in that, even if the emblem image information is unrecognizable because it is, for example, a much deformed character, a confirmation operation with a high degree of accuracy can be performed by referring to image information of preceding and following characters in a train of characters or the like and the labor and the time required for a confirmation operation between correct and wrong can be reduced.

Further, when correct answer data corresponding to the unrecognizable emblem image information are inputted by an operation of the data inputting apparatus, the correct answer data are displayed in the correct answer data display area different from the unrecognizable emblem image information display area on the display unit, and consequently, the emblem image information and the inputted correct answer data can be re-confirmed by visual observation. Consequently, the data medium handling apparatus is advantageous in that the labor and the time required for a confirmation operation between correct and wrong can be reduced and a confirmation operation with a high degree of accuracy can be performed.

Furthermore, when correct answer data corresponding to the unrecognizable emblem image information are inputted by an operation of the data inputting apparatus, the correct answer data are displayed in the correct answer data display area different from the unrecognizable emblem image information display area on the display unit while the unrecognizable emblem image information which has been displayed in emphasis is displayed in a different manner of emphasis which signifies that the unrecognizable emblem image information has been modified. Consequently, the emblem image information and the inputted correct answer data can be re-confirmed by visual observation. Consequently, the data medium handling apparatus is advantageous in that a confirmation operation with a high degree of accuracy can be performed, and identification of whether or not inputting for an unrecognizable emblem or modification to an erroneously recognized emblem has been performed can be made readily, resulting in improvement in visual discernibility to prevent double modifications of the operator and so forth, and besides the labor and the time required for a confirmation operation between correct and wrong can be reduced.

Further, a data medium handling apparatus of the present invention is characterized in that it comprises an image reading section for reading an image of a data medium having emblem information, an emblem recognition section for recognizing the emblem image information in the image read by the image reading section and converting the emblem image information into corresponding code information, a display unit for displaying the emblem image information in a condition of a read image, and a minimum composition unit emblem image information extraction section for extracting emblem image information of a minimum composition unit to be converted into code information in the image for each piece of the emblem image information of the minimum composition unit, and a minimum composition unit emblem image display control section for causing the emblem image information of the minimum composition unit extracted by the minimum composition unit emblem image information extraction section to be displayed in a corresponding relationship to emblem information signified by code information obtained by conversion of the emblem image information.

Here, the minimum composition unit emblem image display control section may have a function of causing a plurality of pieces of the emblem image information of the minimum composition unit of a same kind to be displayed in a corresponding relationship to emblem information signified by code information obtained by conversion of the emblem image information, and include emphasis display means for causing only a desired one of the pieces of emblem image information to be displayed in emphasis.

Or, the data medium handling apparatus may further comprise associated emblem image display means for displaying the one piece of emblem image information to be displayed in a condition of a read image on the display unit together with emblem image information associated with the one piece of emblem image information, and the associated emblem image display means may include emphasis display means for causing the one piece of emblem image information to be displayed in emphasis.

Or else, the data medium handling apparatus may further comprise a data inputting apparatus for inputting correct answer data corresponding to the one piece of emblem image information, and correct answer data display means for causing, when the correct answer data are inputted by an operation of the data inputting apparatus, the correct answer data to be displayed in a correct answer data display area different from an area in which the one piece of emblem image information and emblem image information associated with the one piece of emblem image information are displayed.

Otherwise, the data medium handling apparatus may further comprise a data inputting apparatus for inputting correct answer data corresponding to the one piece of emblem image information, and emphasis display changing means for causing, when correct answer data are inputted by an operation of the data inputting apparatus, the one piece of emblem image information which has been displayed in emphasis to be displayed in a different manner of emphasis which signifies that the one piece of emblem image information has been modified.

Or otherwise, the data medium handling apparatus may further comprise a data inputting apparatus for inputting correct answer data corresponding to the one piece of emblem image information, correct answer data display means for causing, when the correct answer data are inputted by an operation of the data inputting apparatus, the correct answer data to be displayed in a correct answer data display area different from an area in which the one piece of emblem image information and emblem image information associated with the one piece of emblem image information are displayed, and emphasis display changing means for causing, when correct answer data are inputted by the operation of the data inputting apparatus, the one piece of emblem image information which has been displayed in emphasis to be displayed in a different manner of emphasis which signifies that the one piece of emblem image information has been modified.

In particular, according to the present invention, a data medium handling method wherein an image of a data medium having emblem information is read and emblem image information in the read image is recognized and converted into corresponding code information, is characterized in that a plurality of pieces of emblem image information of a minimum composition unit of a same kind to be converted into code information in the image are displayed in a corresponding relationship to emblem information signified by code information obtained by conversion of the emblem image information while only a desired one of the pieces of emblem image information is displayed in emphasis, and then, when correct answer data corresponding to the one piece of emblem image information are inputted by an operation of the data inputting apparatus, the one piece of emblem image information which has been displayed in emphasis is displayed in a different manner of emphasis which signifies that the one piece of emblem image information has been modified, and erroneously recognized information corresponding to the one piece of emblem information is modified based on the correct answer data.

In short, a data medium handling apparatus of the present invention is characterized in that it comprises an image reading section for reading an image of a data medium having emblem information, an emblem recognition section for recognizing the emblem image information in the image read by the image reading section and converting the emblem image information into corresponding code information, a display unit for displaying the emblem image information in a condition of a read image, and a minimum composition unit emblem image information extraction section for extracting emblem image information of a minimum composition unit to be converted into code information in the image for each piece of the emblem image information of the minimum composition unit, a minimum composition unit emblem image display control section for causing a plurality of pieces of the emblem image information of the minimum composition unit extracted by the minimum composition unit emblem image information extraction section to be displayed in a corresponding relationship to emblem information signified by code information obtained by conversion of the emblem image information, emphasis display means for causing only a desired one of pieces of emblem image information to be displayed in emphasis, a data inputting apparatus for inputting correct answer data corresponding to the one piece of emblem image information, emphasis display changing means for causing, when the correct answer data are inputted by an operation of the data inputting apparatus, the one piece of emblem image information, which has been displayed emphatically till then, to be displayed in a different manner of emphasis which signifies completion of modification, and recognition information modification means for modifying, when the correct answer data are inputted by the operation of the data inputting apparatus, erroneously recognized information corresponding to the one piece of emblem image information based on the correct answer data.

In the data medium handling apparatus of the present invention having the construction described above, when an image of a data medium having emblem information is read and emblem image information in the read image is recognized and converted into corresponding code information, emblem image information of a minimum composition unit to be converted into code information in the image is displayed on the display unit in a corresponding relationship to emblem information signified by code information obtained by conversion of the emblem image information.

Where a plurality of pieces of emblem image information of minimum composition units of a same kind are displayed in a corresponding relationship to emblem information signified by code information obtained by conversion of the emblem image information, only a desired one of the pieces of emblem image information is displayed in emphasis.

Or, a desired one piece of emblem image information is displayed in a condition of a read image on the display unit together with emblem image information associated with the piece of emblem image information, and the one piece of emblem image information is displayed in emphasis.

Further, when correct answer data corresponding to the one piece of emblem image information are inputted by an operation of the data inputting apparatus, the correct answer data are displayed in the correct answer data display area different from the area in which the one piece of emblem image information and emblem image information associated with the one piece of emblem image information are displayed.

Or, when correct answer data corresponding to the one piece of emblem image information are inputted by an operation of the data inputting apparatus, the one piece of emblem image information which has been displayed in emphasis is displayed in a different manner of emphasis which signifies that the one piece of emblem image information has been modified.

Or else, when correct answer data corresponding to the one piece of emblem image information are inputted by an operation of the data inputting apparatus, the correct answer data are displayed in the correct answer data display area different from the area in which the one piece of emblem image information and emblem image information associated with the one piece of emblem image information are displayed, and the one piece of emblem image information which has been displayed in emphasis is displayed in a different manner of emphasis which signifies that the one piece of emblem image information has been modified.

Accordingly, with the data medium handling apparatus of the present invention, since emblems are displayed in a unit which allows them to be visually observed readily in such a manner that only same emblems are displayed in a same area of the display unit and only a desired one of pieces of emblem image information is displayed in emphasis, an operator can confirm whether a result of recognition is correct or wrong only by referring to image information without referring to associated image information, thereby decreasing movements of the eye of the operator. Further, only emblem image information being processed is displayed in emphasis to decrease the number of objects of comparison. Consequently, the data medium handling apparatus is advantageous in that the labor and the time required for a confirmation operation between correct and wrong can be reduced remarkably.

Further, since a desired one piece of emblem image information is displayed in a condition of a read image on the display unit together with emblem image information associated with the piece of emblem image information and the one piece of emblem image information is displayed in emphasis, the data medium handling apparatus is advantageous in that, even if the emblem image information is unrecognizable because it is, for example, a much deformed character, a confirmation operation with a high degree of accuracy can be performed by referring to image information of preceding and following characters in a train of characters or the like and the labor and the time required for a confirmation operation between correct and wrong can be reduced.

Further, when correct answer data corresponding to the one piece of emblem image information are inputted by an operation of the data inputting apparatus, the correct answer data are displayed in the correct answer data display area different from the area in which the one piece of emblem image information and emblem image information associated with the one piece of emblem image information are displayed, and the one piece of emblem image information which has been displayed in emphasis is displayed in a different manner of emphasis which signifies that the one piece of emblem image information has been modified. Consequently, the emblem image information and the inputted correct answer data can be re-confirmed by visual observation. Consequently, the data medium handling apparatus is advantageous in that a confirmation operation with a high degree of accuracy can be performed, and identification of whether or not inputting for an unrecognizable emblem or modification to an erroneously recognized emblem has been performed can be made readily, resulting in improvement in visual discernibility to prevent double modifications of the operator and so forth, and besides the labor and the time required for a confirmation operation between correct and wrong can be reduced.

Further, a data medium handling apparatus of the present invention is characterized in that it comprises an image data inputting apparatus for inputting image data of a data medium including information of a plurality of items, a display unit having an image data display area and an item display area which has a plurality of item data inputting display area portions, a display control apparatus for causing the image data obtained by the image data inputting apparatus to be displayed in the image data display area and for causing, when data corresponding to an image data portion of a desired one of the items are to be inputted by a data inputting means, a cursor indication to be displayed at a desired one of the item data inputting display area portions in the item display area, and image data partial emphasis display means for causing, when the cursor indication is displayed at the desired one of the item data inputting display area portions in the item display area by the display control apparatus in a condition wherein the image data including the information of the plurality of items are displayed in the image data display area of the display unit, only the corresponding image data portion of the desired item to be displayed in emphasis.

Here, the display control apparatus may include, in addition to the image data partial emphasis display means, image data emphasis display cancellation means for canceling, when the cursor indication is moved to another one of the item data inputting display area portions different from the desired item data inputting display area portion by cursor movement operation means, the emphasis display of the image data portion corresponding to the item, and emphasis display transition control means for controlling the image data partial emphasis display means so that only the image data portion of the different item corresponding to the different item data inputting display area portion may be displayed in emphasis in response to the image data emphasis display cancellation means.

Or, the display control apparatus may include, in addition to the image data partial emphasis display means, image data emphasis display cancellation means and emphasis display transition control means, display screen scrolling means for causing a portion of the image data, which is not displayed on the display unit, to be displayed on the display unit.

Further, the image data partial emphasis display means may include changing means capable of changing the emphatically displayed portion in response to an instruction from the outside.

In the data medium handing apparatus of the present invention having the construction described above, when image data of a data medium which includes information of a plurality of items are displayed on the display unit, only a portion of the image data corresponding to a certain one of the items is displayed in emphasis.

When data corresponding to an image data portion of a desired one of items are to be inputted in a condition wherein image data of a data medium including information of a plurality of items are displayed in the image data display area on the display unit, if the cursor indication is displayed at a desired one of the item data inputting display area portions of the item display area set separately from the image data display area on the display unit, then only the image data portion of the corresponding desired item is displayed in emphasis, and, when data corresponding to an image data portion of another one of the items are to be thereafter inputted, if the cursor indication is moved from the desired item data inputting display area portion to a different one of the item data inputting display area portions, then the emphasis display of the corresponding image data portion of the desired item is canceled and the corresponding image data portion of the different item is displayed in emphasis.

Or, when data corresponding to an image data portion of a desired one of items displayed on the display unit are to be inputted in a condition wherein part of image data of a data medium including information of a plurality of items are displayed in the image data display area on the display unit, if the cursor indication is displayed at a desired one of item data inputting display area portions of the item display area set separately from the image data display area on the display unit, then only the image data portion of the corresponding desired item is displayed in emphasis, and, when data corresponding to an image data portion of a different one of the items which is not displayed on the display unit are to be thereafter inputted, if the cursor indication is moved from the desired item data inputting display area portion to a different one of the item data inputting display area portions, then the emphasis display of the corresponding image data portion of the desired item is canceled while scrolling is performed so that the image data portion of the different item may be be displayed in the image data display area of the display unit to display the image data portion of the different item in the image data display area of the display unit and the corresponding image data portion of the different item is displayed in emphasis.

Accordingly, with the data medium handling apparatus of the present invention, if the cursor indication is displayed at one of the item data inputting display area portions to which data are to be inputted, then the image data portion of an item to be referred to simultaneously is displayed in emphasis. Consequently, even if an operator first removes the eye thereof from the display unit and then watches the display unit again, the operator is prevented from observing a wrong item. Consequently, the data medium handling apparatus is advantageous in that erroneous recognition in matching when image data are referred to is prevented thereby to raise the visual observability and the labor and the time required for an inputting operation can be prevented while erroneous inputting is prevented.

Further, when image data of an item to be referred to are not displayed on the display unit, automatic scrolling can be performed in response to movement of the emphasis display portion. Consequently, the data medium handling apparatus is advantageous in that a wasteful operation such as, for example, depression of a key can be reduced.

Furthermore, it is possible also for the operator to change the kind or the region of the emphasis display portion. Consequently, the data medium handling apparatus is advantageous in that it can be used in accordance with an application.

BRIEF DESCRIPTION OF THE DRAWINGS

FIGS. 10 and 11 are views showing examples of a document to be handled by the data medium handling apparatus according to the embodiment of the present invention;

FIG. 14 is a diagrammatic view of processing illustrating an application of origin extraction and collation processing of the data medium handling apparatus according to the embodiment of the present invention;

FIGS. 15(a) and 15(b), 16 and 17 are views showing examples of a document to be handled by the data medium handling apparatus according to the embodiment of the present invention;

FIG. 19 is a view illustrating coincidence discrimination of logical origin correction coordinates by the data medium handling apparatus according to the embodiment of the present invention;

FIGS. 35 and 36 are views illustrating an exchange general transfer document handled by the data medium handling apparatus according to the embodiment of the present invention;

FIG. 38 is a view illustrating ruled line item structure information used in the caption analysis processing by the data medium handling apparatus according to the embodiment of the present invention;

FIG. 39 is a view illustrating a ruled line attribute of the ruled line item structure information used in the caption analysis processing by the data medium handling apparatus according to the embodiment of the present invention;

FIGS. 40 and 41(a) to 41(d) are views illustrating a ruled line item structure information table used in the caption analysis processing by the data medium handling apparatus according to the embodiment of the present invention;

FIGS. 42, 43(a) and 43(b) are views illustrating caption position search rules to be used by the caption analysis processing by the data medium handling apparatus according to the embodiment of the present invention;

FIGS. 51(a) and 51(b) are views illustrating an example of a result of collation of caption item data upon the caption analysis processing by the data medium handling apparatus according to the embodiment of the present invention;

FIGS. 52(a) to 52(c) are views illustrating correction of a result of collation based on caption correction rules upon the caption analysis processing by the data medium handling apparatus according to the embodiment of the present invention;

FIGS. 54(a) to 54(h) and 55(a) to 55(f) are views illustrating connection rules between caption part ruled line items and data part ruled line items to be used in the caption analysis processing by the data medium handling apparatus according to the embodiment of the present invention;

FIG. 56 is a view illustrating an analysis of a result of determination of an item data position corresponding to a caption item upon the caption analysis processing by the data medium handling apparatus according to the embodiment of the present invention;

FIGS. 57 and 58 are views illustrating linked relationships of different information upon the caption analysis processing by the data medium handling apparatus according to the embodiment of the present invention;

FIGS. 59(a) and 59(b) are views illustrating item data to be linked to a function item upon the caption analysis processing by the data medium handling apparatus according to the embodiment of the present invention;

FIGS. 60(a) to 60(f) are views illustrating money amount item linking processing upon the caption analysis processing by the data medium handling apparatus according to the embodiment of the present invention;

FIG. 67 is a view illustrating an example of a display of a display unit of the image data display apparatus according to the embodiment of the present invention;

FIG. 68 is a view illustrating relation information produced by the image data display apparatus according to the embodiment of the present invention;

FIG. 69 is a view illustrating emphasis information produced by the image data display apparatus according to the embodiment of the present invention;

FIGS. 70 to 78 are views illustrating examples of a display of the display unit of the image data display apparatus according to the embodiment of the present invention;

FIG. 79 is a view illustrating emphasis information produced by the image data display apparatus according to the embodiment of the present invention;

FIGS. 80 to 85 are views illustrating examples of a display of the display unit of the image data display apparatus according to the embodiment of the present invention;

FIG. 98 is a view illustrating an entire face image produced by the read emblem display-recognition information modification apparatus according to the embodiment of the present invention;

FIG. 99 is a view illustrating recognition character information produced by the read emblem display-recognition information modification apparatus according to the embodiment of the present invention;

FIG. 100 is a view illustrating relation information produced by the read emblem display-recognition information modification apparatus according to the embodiment of the present invention;

FIGS. 101 to 104 are views illustrating examples of a display of the read emblem display-recognition information modification apparatus according to the embodiment of the present invention;

FIG. 117 is a view illustrating a modification to the operation of the document identification apparatus;

BEST FORMS IN EMBODYING THE INVENTION (a) Description of an Embodiment of the Invention (a1) Description of a Data Medium Handling Apparatus

Figure 1:
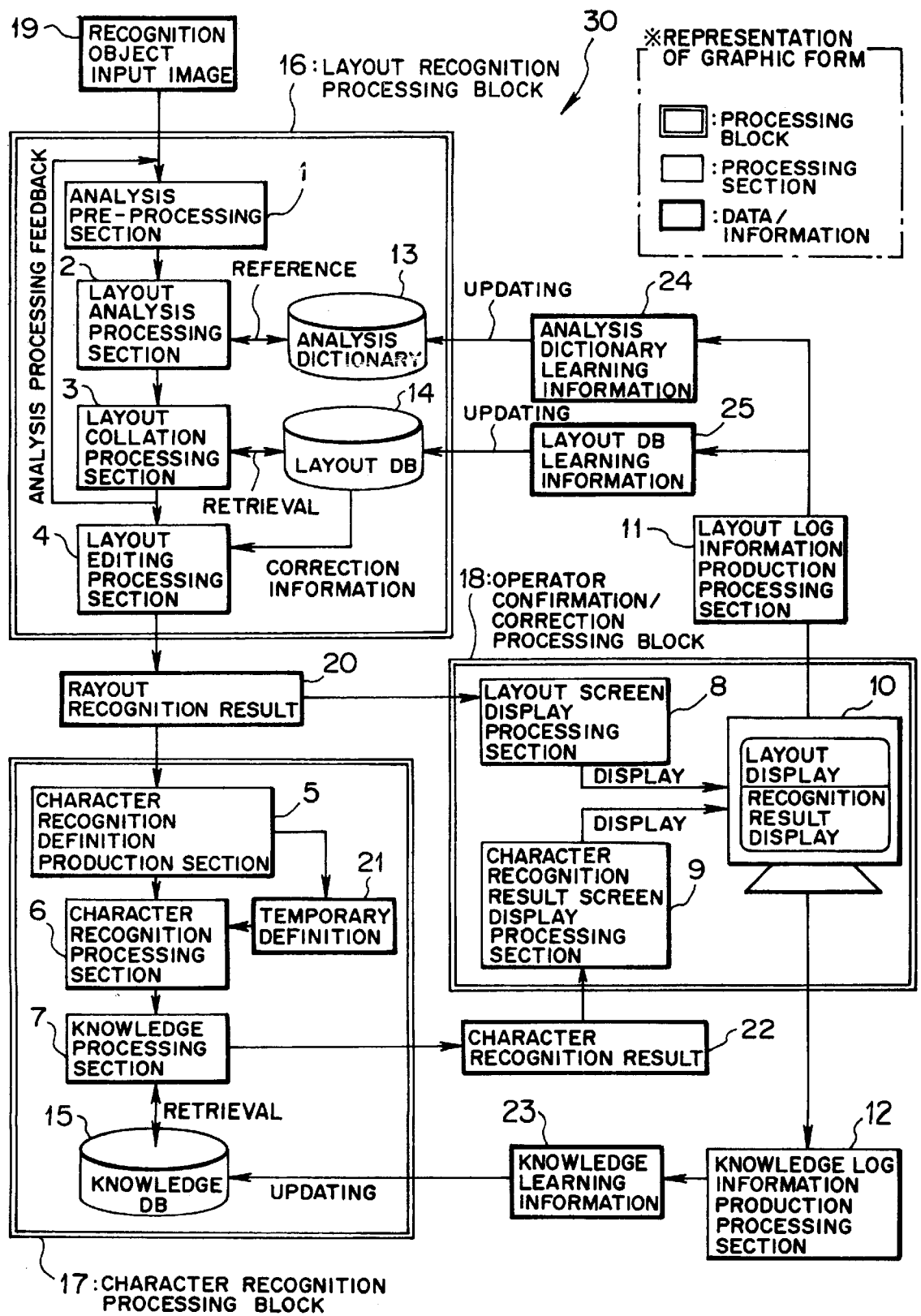
FIG. 1 is a functional block diagram showing a general construction of a data medium handling apparatus according to an embodiment of the present invention.

Here, the data medium handling apparatus 30 shown in FIG. 1 effects recognition of information based on image data (images) read from document media (documents) having various formats such as private slips or the like.

Figure 6:
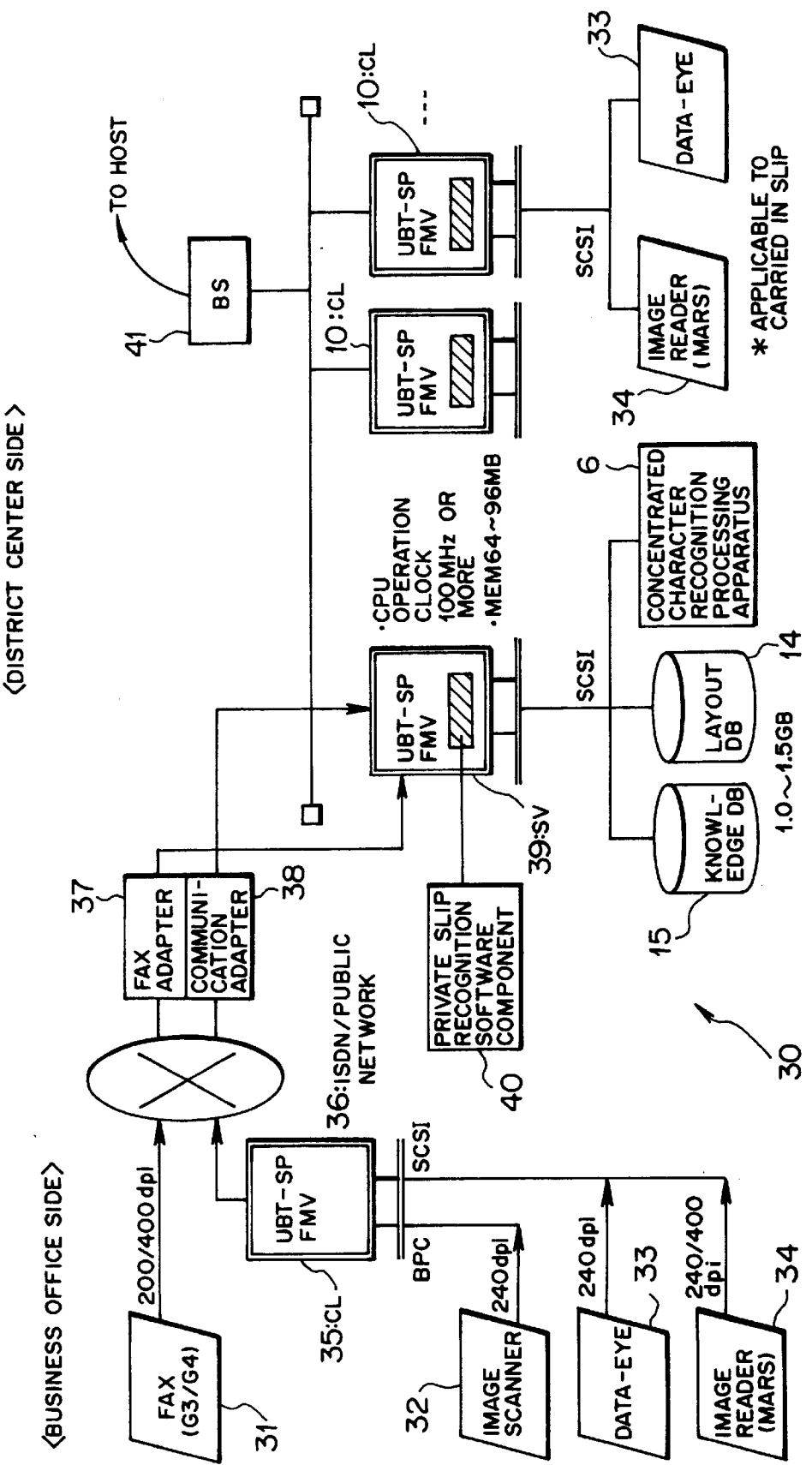
FIG. 6 is a view illustrating document processing of the data medium handling apparatus according to the embodiment of the present invention.

The data medium handling apparatus 30 is, as shown in FIG. 6, particularly composed of a client (CL) 35 installed, for example, in each branch office (business office) of a financial organ and a server (SV) 39 installed in a district center and connected to the client 35 via an exchange line 36 or the like, and document handling of the individual business offices is performed collectively by the server 39 of the district center.

In particular, the data medium handling apparatus 30 can perform recognition processing not only of documents produced for exclusive use for the document handling apparatus but also of documents on which information is entered in arbitrary formats by analyzing a layout of image data of a document to recognize the format of the object document for processing and effecting character recognition of the document based on a result of the recognition of the format of the document.

The data medium handling apparatus 30 functionally includes, as shown in FIG. 1, a layout recognition processing block 16, a character recognition processing block 17 and an operator confirmation/correction processing block 18.

The layout recognition processing block 16 effects layout recognition processing of image data 19 read by an image data reading apparatus and includes an analysis pre-processing section 1, a layout analysis processing section 2, a layout collation processing section 3 and a layout editing processing section 4.

The analysis pre-processing section 1 produces a low density image for analysis processing after format conversion of the image data 19 of an object of recognition in order to reduce variation factors of a layout to raise the accuracy in analysis and removes dust and so forth on the image data which make factors of deterioration in accuracy upon analysis processing.

The layout analysis processing section 2 refers to an analysis dictionary 13 to extract ruled line items and item data, which are characteristics of a layout, from read image data, analyzes the structure of the layout and logically represents the layout based on the thus extracted ruled line items and item data.

In short, the layout analysis processing section 2 functions as means for extracting characteristics peculiar to a document medium from read image data and specifying, based on the characteristics, a position at which information to be recognized is present.

More particularly, the layout analysis processing section 2 analyzes the layout of a recognition object image to extract various components (ruled line items and item data) which construct the layout as layout characteristics and produces key information for the layout which is rough restrictive terms to the layout from the thus extracted layout characteristics in order to retrieve registered layout information upon layout collation processing by the layout collation processing section 3 in the following stage.

Figure 5:
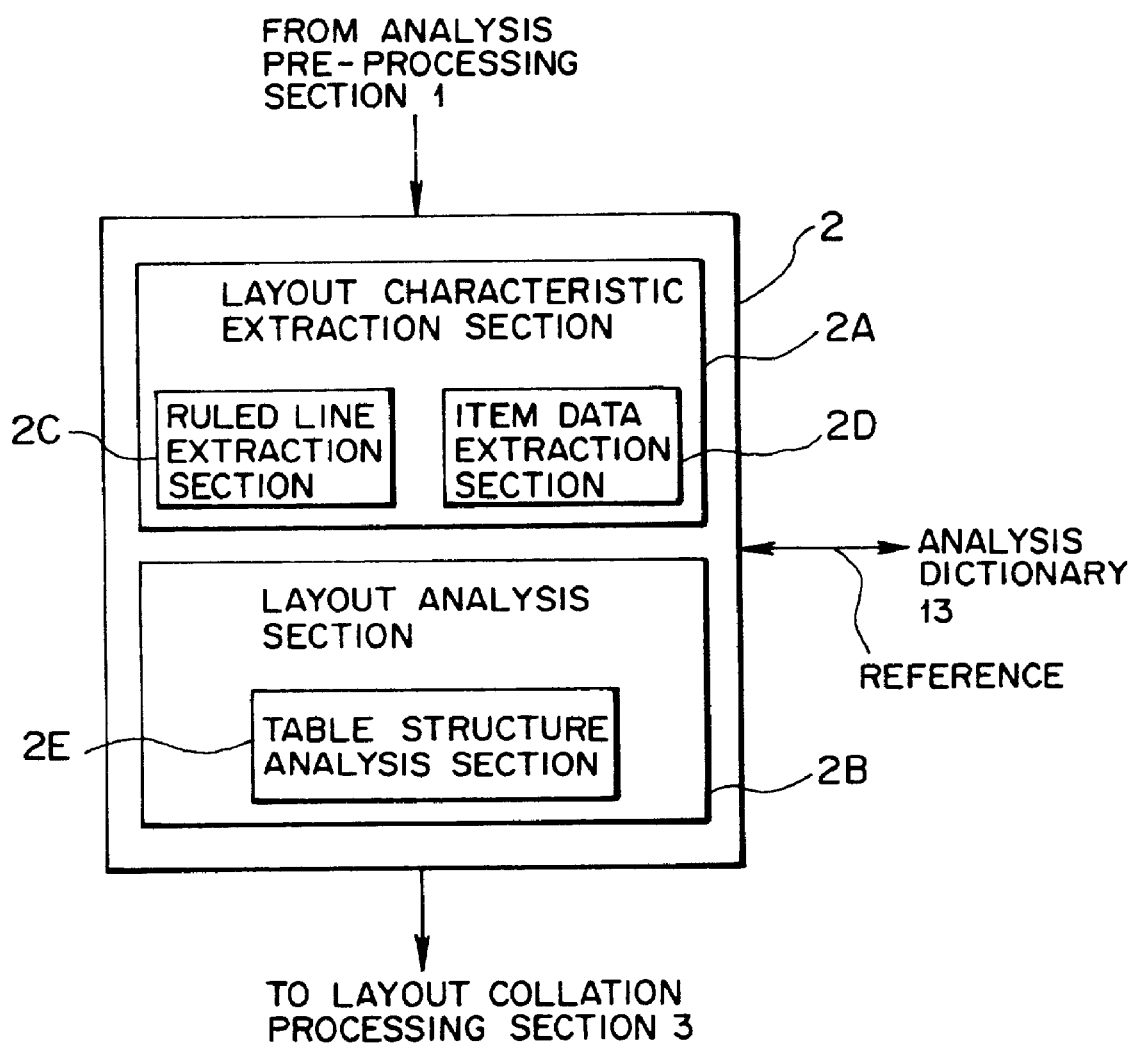
FIG. 5 is a functional block diagram showing a construction of a layout analysis processing section of the data medium handling apparatus of the embodiment of the present invention.

The layout analysis processing section 2 at least includes, as shown in FIG. 5, a layout characteristic extraction section 2A for extracting characteristics of the layout of an image, and a layout analysis section 2B for analyzing the structure of the layout based on the characteristics of the layout extracted by the layout characteristic extraction section 2A.

The layout characteristic extraction section 2A includes a ruled line extraction section 2C and an item data extraction section 2D, and the layout analysis section 2B includes a table structure analysis section 2E.

Where the layout has a table structure formed from ruled lines, a ruled line item which is a minimum rectangle formed from ruled lines of the layout is extracted by the ruled line extraction section 2C, and the table structure formed from the ruled line items is analyzed by the table structure analysis section 2E based on the extracted ruled line item.

On the other hand, where the layout has a no ruled line table structure which has no ruled line, item data of the layout are extracted by the item data extraction section 2D, and the no ruled line table structure is analyzed by the table structure analysis section 2E based on the thus extracted item data of the layout.

Further, the layout analysis processing section 2 extracts a logical origin (logic origin) of the layout after a ruled line item and item data are extracted.

In particular, the layout analysis processing section 2 effects (2-1) production of a label image by labeling processing, (2-2) extraction of the logical origin and obliqueness degree information of a document image for layout collation, (2-3) extraction of a ruled line item and analysis of a table structure formed from the ruled line item (described hereinabove), (2-4) extraction of item data and analysis of an item table structure where no ruled line is present (described hereinabove), and (2-5) determination of a caption region and recognition of a caption item as well as determination of corresponding item data (caption analysis processing).

It is to be noted that the production processing of a label image by labeling processing in (2-1) is processing of calculating connection components (components of a binary image which connect to each other) from inputted image data (binary image data) to produce a label image having labels applied to the individual connection components. This labeling processing is known, for example, by "Connection Region Extraction Apparatus and Method" (Japanese Patent Laid-Open Application No. Heisei 08-55219).

Meanwhile, the extraction processing of a ruled line item in (2-3) is processing of extracting a ruled line part from data of a character, a graphic form or the like surrounded by ruled lines and separating the ruled line part and the data part from each other. The extraction processing of a ruled line item is known, for example, by "Image Extraction System" (Japanese Patent Laid-Open Application No. Heisei 06-309498).

Further, the caption analysis processing in (2-5) determines a caption region (caption item) in an image, recognizes caption item information in the caption region and determines corresponding item data.

In particular, in the present embodiment, the layout analysis processing section 2 identifies a caption item and item data corresponding to the caption item so that character recognition of the item data may be performed immediately without performing character recognition processing of the caption item by the character recognition processing block 17.

The processing (2-2) described above will be described in detail in the (a2) Description of Origin Extraction and Collation Processing, and the processing (2-5) will be described in detail in the (a6) Description of Caption Analysis Processing.

By the way, the layout collation processing section 3 functions as image recognition means for retrieving, using characters of a layout (ruled line items and item data) extracted by the layout analysis processing section 2 as restrictive retrieval terms, candidate layouts from a layout data base (layout DB) 14 and collate them whether or not there is a coincident candidate layout to recognize an image at a position specified by the layout analysis processing section 2 to discriminate information at the specified position.

The layout DB 14 is a candidate layout storage section in which candidate layout information is stored, and stores, in the present embodiment, compressed candidate layout information as the candidate layout information. It is to be noted that compression processing of layout information in this instance will be hereinafter described in detail.

The layout DB 14 further has layout correction information for correction of a result of a layout analysis by the layout analysis processing section 2 stored therein, and in the present embodiment, a result of a layout analysis is corrected using the layout correction information by the layout editing processing section 4 which will be hereinafter described so that following processing may be performed with a high degree of accuracy.

Further, contents of the layout DB 14 are updated by learning the candidate layout information based on a result of processing by the layout recognition processing block 16 or the operator confirmation/correction processing block 18, thereby to eliminate the necessity for a registration operation of candidate layout information by an operator or the like into the layout DB 14 to achieve simplification in operation.

The layout collation processing section 3 effects collation with reference to a logical origin extracted by the layout analysis processing section 2 to detect whether or not there is a coincident candidate layout.

In particular, the layout collation processing section 3 retrieves and collates layout information stored in the layout DB 14 using layout key information produced by the layout analysis processing section 2 to acquire coincident layout information.

Further, when the layout collation processing section 3 described above effects retrieval and collation of a layout, it first retrieves the layout DB 14 using layout key information which is a rough restrictive term and then performs detailed collation for a plurality of candidate layouts obtained as a result of the retrieval to determine a coincident layout.

More particularly, the layout collation processing section 3 performs, upon detailed collation processing with candidate layouts, in an ascending order in degree of detail of restrictive terms, (3-1) collation of a ruled line item bit matrix, (3-2) detailed collation of a ruled line item position and a ruled line item attribute, (3-3) collation of an item data position, (3-4) collation of a caption position and contents of the caption and (3-5) collation of characteristic data of a region image (unique image).

The (3-1) collation processing of a ruled line item bit matrix here is collation of whether or not there is a coincident candidate layout by compression processing characteristics of a layout extracted by the layout analysis processing section 2 and retrieving the compressed candidate layouts from the layout DB 14 using the compressed characteristics of the layout as restrictive retrieval terms.

In particular, in the present embodiment, the layout DB 14 has compressed candidate layout information stored therein, and the layout collation processing section 3 produces compression processed layout information and collates the compressed layout information with each other to achieve high speed layout collation processing.

It is to be noted that the processing (3-1) will be described in detail in (a4) Description of Matrix Collation Processing, the processing (3-2) to (3-4) will be described in detail in (a6) Description of Caption Analysis Processing, and the processing (3-5) will be described in detail in (b) Description of a Modification to the Embodiment of the Invention.

Further, the layout editing processing section 4 corrects, where there is a coincident layout in the layout DB 14 as a result of retrieval and collation of the layout DB 14 by the layout collation processing section 3, a result of a layout analysis based on layout correction information acquired from the layout DB 14 as described above and then outputs the corrected layout information as a layout recognition result 20.

It is to be noted that contents of correction in which layout correction information is used are correction of a caption position and contents of the caption and correction of an item data position and an item data attribute which are linked to the caption.

On the other hand, where there is no coincident layout in the layout DB 14 as a result of retrieval and collation of the layout DB 14 by the layout collation processing section 3, the layout editing processing section 4 determines the result of the layout analysis as a new layout and outputs it as it is as layout information (layout recognition result 20).

By the way, the character recognition processing block 17 performs character recognition processing of the layout recognition result 20 from the layout recognition processing block 16 and includes a character recognition definition production section 5, a character recognition processing section 6 and a knowledge processing section 7.

The character recognition definition production section 5 produces, based on layout information outputted as the layout recognition result 20, a character recognition definition (temporary definition) 21 which defines an item data position and an item data attribute of an object of character recognition to be used by the character recognition processing section 6.

While the item data information of the layout recognition result 20 is outputted in the form of absolute coordinates from the left upper corner of an analysis object image, the left upper corner of the analysis object image does not necessarily coincide with a fixed position because of a variation of the position of a form upon image reading.

Therefore, the character recognition definition production section 5 dynamically produces the character recognition definition 21 every time in conformity with the analysis object image.

The character recognition processing section 6 performs character recognition processing for image data of a character recognition object using the character recognition definition 21 produced from layout information by the character recognition definition production section 5 and acquires code data of a result of the recognition.

The knowledge processing section 7 corrects the recognition result code data of the character recognition processing section 6 referring to a knowledge data base (knowledge DB) 15 in which correction information for a recognition result is recorded and outputs the corrected code data as a character recognition result 22.

The operator confirmation/correction processing block 18 is a block in which the layout recognition result 20 and the character recognition result 22 are displayed on a terminal unit (for example, a client 10 in FIG. 1) and confirmation and amendment processing of and to a result of processing of image data are performed by an operator, and includes a layout screen display processing section 8 and a character recognition result screen display processing section 9.

The layout screen display processing section 8 displays a recognition object image and a result of an analysis such as a caption position and caption contents, a corresponding item position and so forth based on the layout information of the layout recognition result 20 in order to allow amendment to and confirmation of the layout recognition result 20 and the character recognition result 22 by an operator.

In the present embodiment, as hereinafter described in detail in the (a7) Description of Confirmation and Modification Processing of and to Recognition Characters, conventional modification and confirmation processing is expanded such that code data of a result of recognition and caption contents and/or item data on a corresponding document image are displayed in a liked form on a display unit of the client 10 so that modification and confirmation processing to and of layout information can be performed.

The character recognition result screen display processing section 9 displays code data of a result of character recognition corresponding to a recognition item of a character recognition object image in conformity with a display of the layout screen display processing section 8 on the screen.

Further, in the client 10, the layout recognition result 20 and/or the character recognition result 22 corresponding to the recognition object image displayed on the display unit are confirmed by an operator, and modification to the layout recognition result 20 and the character recognition result 22 is performed in accordance with the necessity.

It is to be noted that the data medium handling apparatus 30 shown in FIG. 1 includes, in addition to the layout recognition processing block 16, character recognition processing block 17 and operator confirmation/correction processing block 18 described hereinabove, a layout log information production processing section 11 and a knowledge log information production processing section 12.

The layout log information production processing section 11 adds modification contents by an operator as correction data to layout information of the layout recognition result 20 to produce layout DB learning information 25 (this is denoted by learning layout information 28 in FIG. 4 which will be hereinafter described) to produce layout correction information to be stored into the layout DB 14. It is to be noted that the layout correction information thus produced is learned by and registered into the layout DB 14 after correction contents thereof are discriminated.

Further, the layout log information production processing section 11 adds modification contents by an operator as correction data to layout information of the layout recognition result 20 to produce analysis dictionary learning information 24 (this is denoted by registration layout information 29 in FIG. 4 which will be hereinafter described). The analysis dictionary learning information 24 thus produced is learned by and registered into the analysis dictionary 13 after correction contents thereof are discriminated.

The knowledge log information production processing section 12 adds modification contents by an operator as correction data to code data of the character recognition result 22 to produce knowledge learning information 23 for the knowledge DB 15, and the learning data thus produced are learned by and registered into the knowledge DB 15.

In the data medium handling apparatus 30 according to the embodiment of the present invention having the construction described above, when image data 19 of a document having an arbitrary format are read, the layout of the image data 19 is analyzed to recognize the format of the object document for processing, and character recognition of the document is performed based on a result of the recognition of the format of the document.

Then, the layout recognition result 20 and character recognition result 22 are confirmed by an operator and modified in accordance with the necessity.

The processing of the data medium handling apparatus 30 then will be described with reference to FIGS. 2 to 4.

First, the processing when the layout of the object document for processing is a layout which appears newly will be described with reference to FIG. 2.

First, in the analysis pre-processing section 1 of the layout recognition processing block 16, analysis pre-processing of the image data 19 of the object document for processing is performed (step Al).

Then, the layout analysis processing section 2 extracts ruled line items and item data which are components of the layout from an object image for recognition and refers to the analysis dictionary 13 so that a caption item position in the layout and an item data position corresponding to contents of the same are outputted as an analysis result (step A2).

Here, the layout analysis processing step of step A2 is an information present position specifying step in which characteristics peculiar to the document medium are extracted from the read image data and a position in which information to be recognized is specified based on the characteristics, and extracts characteristics of the layout of the read image, analyzes the structure of the layout and logically represents the layout with the extracted characteristics.

Further, the layout analysis processing step A2 includes the step of extracting the logical origin of the layout after ruled line items and item data of the layout are extracted and further includes the step of discriminating whether or not the layout of the read image has a predetermined direction and the step of converting the read image data based on a result of the discrimination in the step so that the layout may have the predetermined direction. It is to be noted that the conversion processing for the read image data is such processing as to rotate the layout, and this process will be hereinafter described in detail in (a3) Description of Rotating Correction Processing for Image Data, which appears hereinbelow.

Here, where the layout has a table structure formed from ruled lines, the layout analysis processing step A2 includes the step of extracting ruled line items from the image data and the step of analyzing the table structure formed from ruled lines based on the ruled line items extracted in the step.

On the other hand, where the layout has a no ruled line table structure which does not have a ruled line, the layout analysis processing step A2 includes the step of extracting item data from the image data and the step of analyzing the no ruled line table structure based on the item data extracted in the step.

Further, the layout analysis processing step A2 includes the step of determining a caption region in the image, recognizing caption item information in the caption region and determining corresponding item data.

Then, the layout collation processing section 3 retrieves the layout DB 14 using the extracted layout components (ruled line items and item data) as retrieval terms. However, since the object document for processing is a novel document, the corresponding layout is not present in the layout DB 14, and candidate layout information and layout correction information are not acquired (step A3).

Here, the layout collation processing step in step A3 is an image recognition step in which image data at the position specified in step A2 are recognized to discriminate information at the specified position, and retrieves the candidate layouts stored in the layout DB 14 using the characteristics of the layout extracted in step A2 as restrictive retrieval terms to effect collation of whether or not there is a coincident candidate layout.

The layout collation processing step A3 includes the step of discriminating information with reference to the logical origin extracted in step A2 and further includes the compression processing step of compression processing the characteristics of the layout extracted in step A2, the step of retrieving compressed candidate layouts from the layout DB 14 using the characteristics of the layout compressed in the step as restrictive retrieval terms and the step of collating based on a result of the retrieval in the step to detect whether or not there is a coincident candidate layout.

Further, the layout editing processing section 4 produces a layout recognition result 20 in a correction information absent state (step A4) since candidate layout information and layout correction information are not acquired in step A3 as a result of the layout collation.

Figure 4:
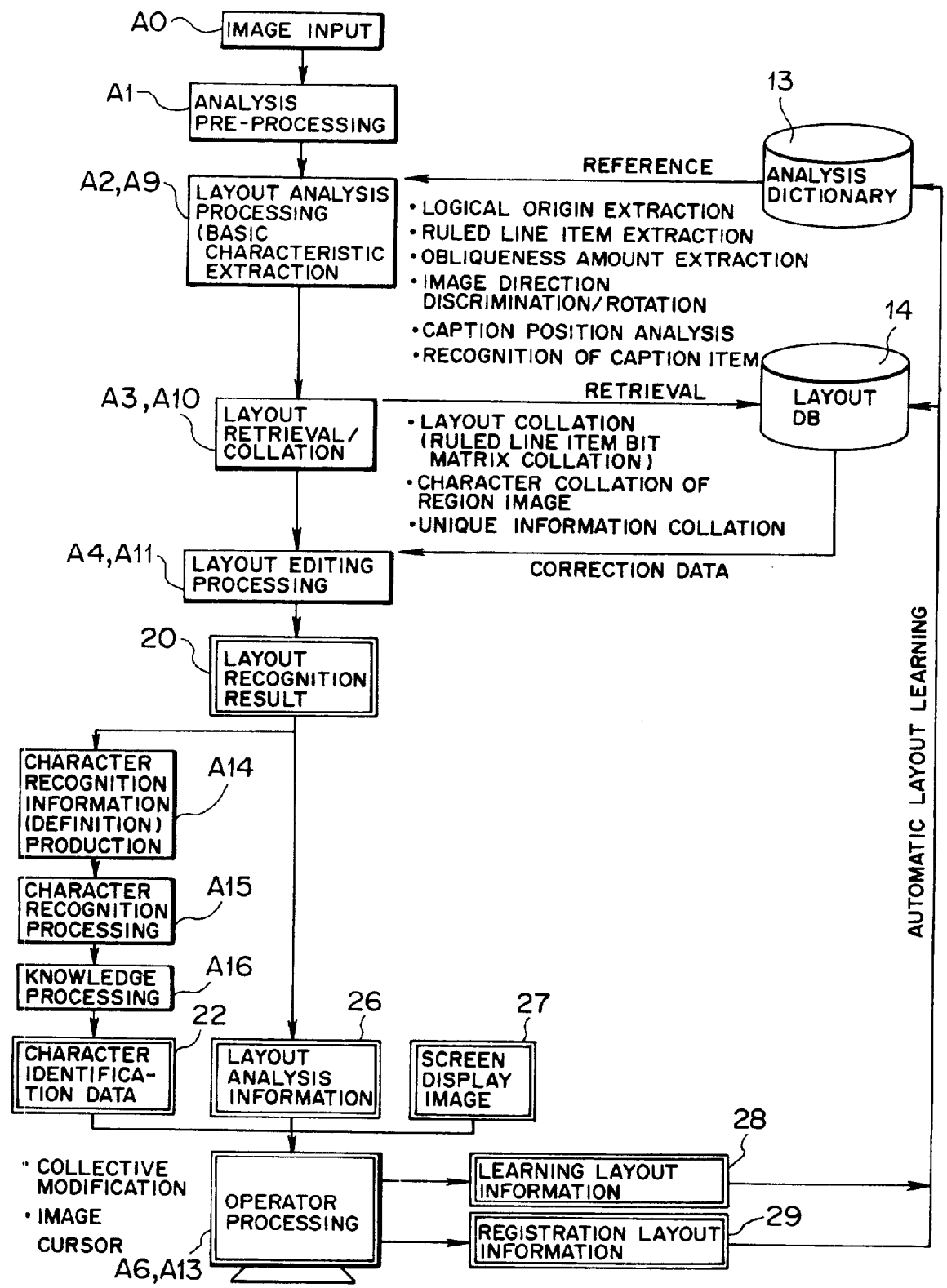

The character recognition definition production section 5 of the character recognition processing block 17 produces a character recognition definition 21 based on the layout information of the layout recognition result 20 produced in step A4 (step A14 of FIG. 4).

Thereafter, the character recognition processing section 6 performs character recognition of the item data of the character recognition object using the character recognition definition 21 produced in step A14 to acquire code data of a result of the recognition (step A15 of FIG. 4).

Further, the knowledge processing section 7 corrects the recognition result code data acquired in step A15 referring to the knowledge DB 15 in which the correction information for the recognition result is recorded to produce a character recognition result 22 (step A16 of FIG. 4).

Here, the layout screen display processing section 8 of the operator confirmation/correction processing block 18 refers to the layout recognition result 20 produced in step A4 and outputs the caption item contents and the item data position corresponding to the position of the same (layout analysis information 26 illustrated in FIG. 4) to the display unit of the client 10. Further, the layout screen display processing section 8 outputs the read image data (screen display image 27 shown in FIG. 4) to the display unit of the client 10 (step A5).

Further, the character recognition result screen display processing section 9 outputs the code data of the character recognition result 22 (this character recognition result 22 is produced in step A16) corresponding to the recognition item of the character recognition object image in conformity with the display by the layout screen display processing section 8 to the display unit of the client 10.

Here, confirmation and modification operations of and to the layout recognition result 20 and the character recognition result 22 displayed on the display unit of the client 10 are performed by the operator (step A6).

Further, the layout log information production processing section 11 produces correction information for the layout (layout log information) from a result of the confirmation and modification operations of and to the layout by the operator (step A7).

It is to be noted that the layout log information produced in step A7 is reflected as correction information for the layout [layout DB learning information 25 (learning layout information 28) and analysis dictionary learning information 24 (registration layout information 29)] on the layout DB 14 and the analysis dictionary 13 thereby to effect layout learning processing (step A8).

In particular, in step A8, the candidate layout information is updated by learning in the layout DB 14.

Subsequently, the processing when the layout of the object document for processing is a layout which appears again will be described with reference to FIG. 2.

First, the analysis pre-processing section 1 of the layout recognition processing block 16 performs analysis pre-processing of the image data 19 of the object document for processing as described hereinabove (step A1).

Then, the layout analysis processing section 2 analyzes the layout in a similar manner as in step A2 described above and outputs a result of the analysis of the layout (step A9).

Further, the layout collation processing section 3 retrieves the layout DB 14 using the extracted layout components (ruled line items and item data) as retrieval terms to acquire detailed information and layout correction information of a coincident layout (step A10).

In this instance, since the object document for processing appears again, the corresponding candidate layout information is reported as a result of the retrieval of the layout DB 14, and detailed information of the layout is collated with the thus reported candidate layout to discriminate coincidence between the layouts.

It is to be noted that, where it is discriminated that the layouts coincide with each other, the layout editing processing section 4 effects the processing in step A11 to A13 determining the layout as an existing layout. On the other hand, where incoincidence is determined as a result of the collation, the layout editing processing section 4 effects the processing in steps A4 to A8 determining the layout as a novel layout.

Here, the layout editing processing section 4 corrects the caption item contents of the result of the layout analysis and the data position corresponding to the position of the same based on the layout correction information acquired as a result of the retrieval of the layout DB 14 to produce a layout recognition result 20 (step A11).

The processing of the character recognition processing block 17 is similar to that described hereinabove in connection with steps A14 to A15 of FIG. 4.

Here, the layout screen display processing section 8 of the operator confirmation/correction processing block 18 refers to the layout recognition result 20 produced in step A11 and outputs the caption item contents and the item data position (layout analysis information 26 illustrated in FIG. 4) corresponding to the position of the same to the display of the client 10. Further, the layout screen display processing section 8 outputs the read image data (screen display image 27 shown in FIG. 4) to the display unit of the client 10 (step A12).

Meanwhile, the character recognition result screen display processing section 9 outputs code data of the character recognition result 22 (this character recognition result 22 is produced in step A16) corresponding to the recognition item of the character recognition object image in conformity with the display by the layout screen display processing section 8 to the display unit of the client 10.

Here, a confirmation operation of the layout recognition result 20 displayed on the display unit of the client 10 and/or confirmation and modification operations of and to the character recognition result 22 are performed by the operator (step A13).

It is to be noted that, where the layout of the object document for processing is an existing layout, since the processing for the analysis object image is completed at a point of time when the confirmation operation of the layout in step A13 is completed, production of layout log information by the layout log information production processing section 11 is not performed.

Finally, document handling by the data medium handling apparatus 30 shown in FIG. 6 will be described.

Figure 7:
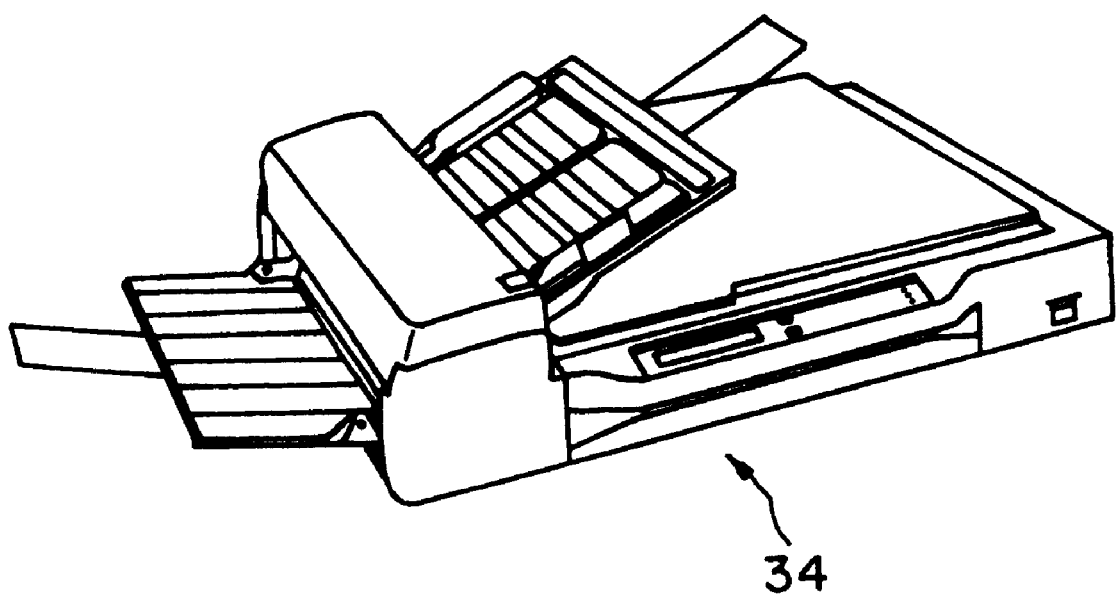
FIG. 7 is a schematic perspective view showing an image reader of the data medium handling apparatus according to the embodiment of the present invention.

Here, in each business office, image data of a document are read by an image data reading apparatus (for example, a facsimile 31, an image scanner 32 or a DATA-EYE 33 shown in FIG. 6 or an image reader 34 shown in FIGS. 6 and 7).

Here, the image data read by the image scanner 32, DATA-EYE 33 or image reader 34 are transmitted to the client 35.

Then, the image data from the facsimile 31 are transmitted to the server 39 of the district center via the exchange line (ISDN/public network) 36 and a facsimile adapter 37 while the image data from the client 36 are transmitted to the server server 39 of the district center via the exchange line (ISDN/public network) 36 and a communication adapter 38.

The server 39 automatically and collectively performs analysis processing of image data of documents transmitted from the individual business offices and stores a private slip recognition software component 40, includes the knowledge data base (knowledge dB) 15, the layout data base (layout DB) 14 and the concentrated character recognition apparatus 6.

The server 39 has functions corresponding to the layout recognition processing block 16 and the character recognition processing block 17 shown in FIG. 1 described hereinabove, and the private slip recognition software component 40 which is software which provides those functions is installed on a hard disk or some other memory not shown so that corresponding processing is performed.

Further, the district center also includes the client (CL) 10 in order to confirm and modify a result of analysis processing of the image data by the server 39.

In particular, the client 10 has a function corresponding to the operator confirmation/correction processing block 18 shown in FIG. 1 described hereinabove. In the client 10, suitable software which provides such a function as described above is installed on the hard disk or some other memory not shown so that the corresponding processing is performed.

Then, the layout of image data and a result character recognition are displayed on the display unit of the client 10, and the operator can refer to the display unit to effect confirmation of and modification to the analysis processing result of the image data.

It is to be noted that, in order to allow processing of documents such as slips brought into the district center, the image reader 34 and the DATA-EYE 33 as image data reading apparatus are connected to the client 10 so that image data of documents read by those image data reading apparatus may be transmitted to the server 39.

Further, a result of an analysis of documents analyzed by the server 39 is transmitted to a host computer (not shown) which is a host apparatus via a branch server (BS) 41.

In this manner, with the data medium handling apparatus 30 according to the embodiment of the present invention, an entry job which makes use of a conventional entry system (OCR entry system, data entry system or the like) can be augmented very much in efficiency by automatically and electronically analyzing various documents or document images which appear every day.

In particular, with the data medium handling apparatus 30 according to the present embodiment, an entry system which not only handles documents for exclusive use for conventional entry systems but also handles existing various arbitrary documents as they are can be constructed.

More particularly, by automatically analyzing the layout of a private general transfer document (general transfer slip produced by an end user) which makes an object in entry job of a financial organ or the like, character recognition processing and entry processing can be performed directly, and fully automatic recognition processing of a private general transfer slip can be performed.

Further, by producing layout log information based on the layout recognition result 20 of any of various types of arbitrary slips and learning and registering it into the layout DB 14, discrimination of a document having the same layout can thereafter be performed automatically, and consequently, the labor and the cost required for production of a document for exclusive use can be reduced and entry after learning is allowed immediately. Accordingly, reduction of the period of introduction of a system which includes the present apparatus 30 can be achieved.

Further, since image data of a document are always analyzed, automatic recognition processing of documents other than expensive OCR documents for exclusive use by which the cutting error or the printing error is reduced can be achieved.

(a2) Description of Origin Extraction and Collation Processing

FIG. 14 is a diagrammatic view of processing illustrating an application of the origin extraction and collation processing by the data medium handling apparatus according to the embodiment of the present invention.

Generally, even if images having the same layout are read using an optical reading apparatus (scanner, facsimile or the like), coordinates of components (ruled line items and item data) of the individual layouts from the physical origins of the images do not exhibit equal values because of displacement in position upon reading.

Accordingly, when components of layouts are compared to discriminate coincidence of the layouts, it is necessary to match the positions of the logical origins extracted from the individual layouts, calculate relative coordinates of the components of the layouts from the logical origins and collate the layouts using the relative coordinates.

Since this logical origin must be extracted stably against any variation factor of an image such as dust or blurring upon image reading, a coordinate position which can be extracted stably with a sufficiently high degree of accuracy must be selected as a logical origin.

Therefore, in the present embodiment, a plurality of extraction methods are used parallelly to extract a logical origin so that a normally stabilized logical origin is extracted even when a document having an arbitrary layout is handled.

Here, in the data medium handling apparatus 30 according to the embodiment of the present invention, the layout analysis processing step A2 (and A9) by the layout analysis processing section 2 includes, as seen in FIG. 14, the logical origin extraction step M1 of extracting the logical origin of a format, and the information present position specifying step of extracting characteristics peculiar to a medium including the format with reference to the logical origin extracted in this step M1 and specifying, from the extracted characteristics, a position at which information to be recognized is present.

Meanwhile, the layout collation processing step A3 (and A10) by the layout collation processing section 3 includes the image recognizing step of performing, upon recognition of an image at the position specified in the information present position specifying step, layout collation processing with reference to the logical origin extracted in the logical origin extracting step M1 (step M2) to discriminate information of the extracted characters.

Further, in the logical origin extracting step M1 by the layout analysis processing section 2, in addition to extraction of the logical origin of a format, logical original auxiliary coordinate information which provides auxiliary information to the logical origin is extracted, and in the image recognizing step by the layout collation processing section 3, layout collation processing is performed with reference to the logical origin and the logical origin auxiliary coordinate information (step M2) to discriminate information of the extracted characteristics.

Figure 17:
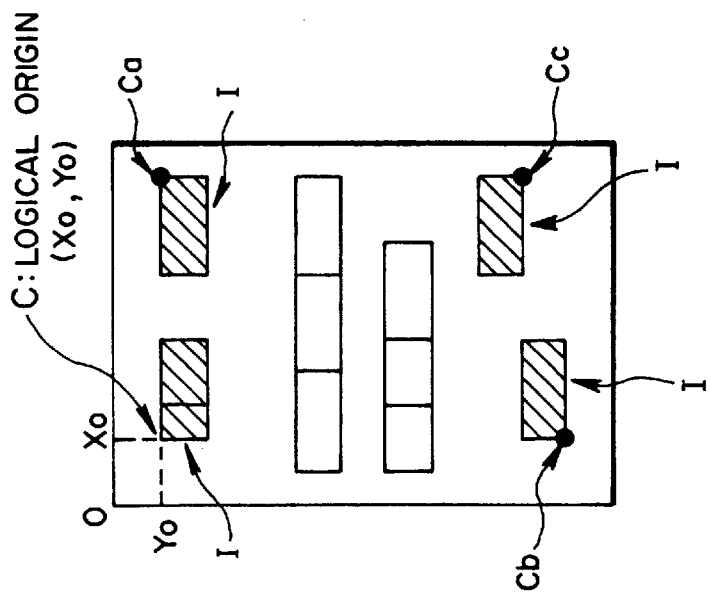

Here, in the present embodiment, where the layout has a table structure wherein it is formed from ruled lines, coordinate information [(coordinates A shown in FIG. 15(*a*)] of a corner having a minimum X coordinate and a minimum Y coordinate from among corners which define the table structure is extracted as a logical origin of the format, and as logical origin auxiliary coordinate information, another corner having a maximum X coordinate and the minimum Y coordinate, a further corner having the minimum X coordinate and the maximum Y coordinate and a still further corner having the maximum X coordinate and the maximum Y coordinate [coordinates Aa, Ab and Ac shown in FIG. 15(*a*), respectively] are extracted.

Where the layout has a no ruled line table structure which does not have a ruled line, for example, as shown in FIG. 17, coordinate information (coordinates D shown in FIG. 17) of a corner having a minimum X coordinate and a minimum Y coordinate from among corners of a circumscribed rectangle is extracted as the logical origin of the format, and as logical origin auxiliary coordinate information, coordinate information of another corner having a maximum X coordinate and the minimum Y coordinate of the circumscribed rectangle, a further corner having the minimum X coordinate and the maximum Y coordinate and a still further corner having the maximum X coordinate and the maximum Y coordinate (coordinates Da, Db and Dc shown in FIG. 17, respectively) are extracted.

Here, the logical origin extraction processing will first be described.

The logical origin extraction processing is performed particularly by the table structure analysis section 2E of the layout analysis section 2B shown in FIG. 5.

The table structure analysis section 2E particularly analyzes a circumscribed rectangle of ruled line items, a maximum circumscribed rectangle of a table structure formed from the ruled line items and a circumscribed rectangle of item data based on ruled items extracted by the ruled line extraction section 2C of the layout characteristic extraction section 2A and item data extracted by the item data extraction section 2D of the layout characteristic extraction section 2A, extracts coordinates of corners from those rectangles and sets predetermined coordinates as logical origin coordinates and correction coordinates.

Figure 18:
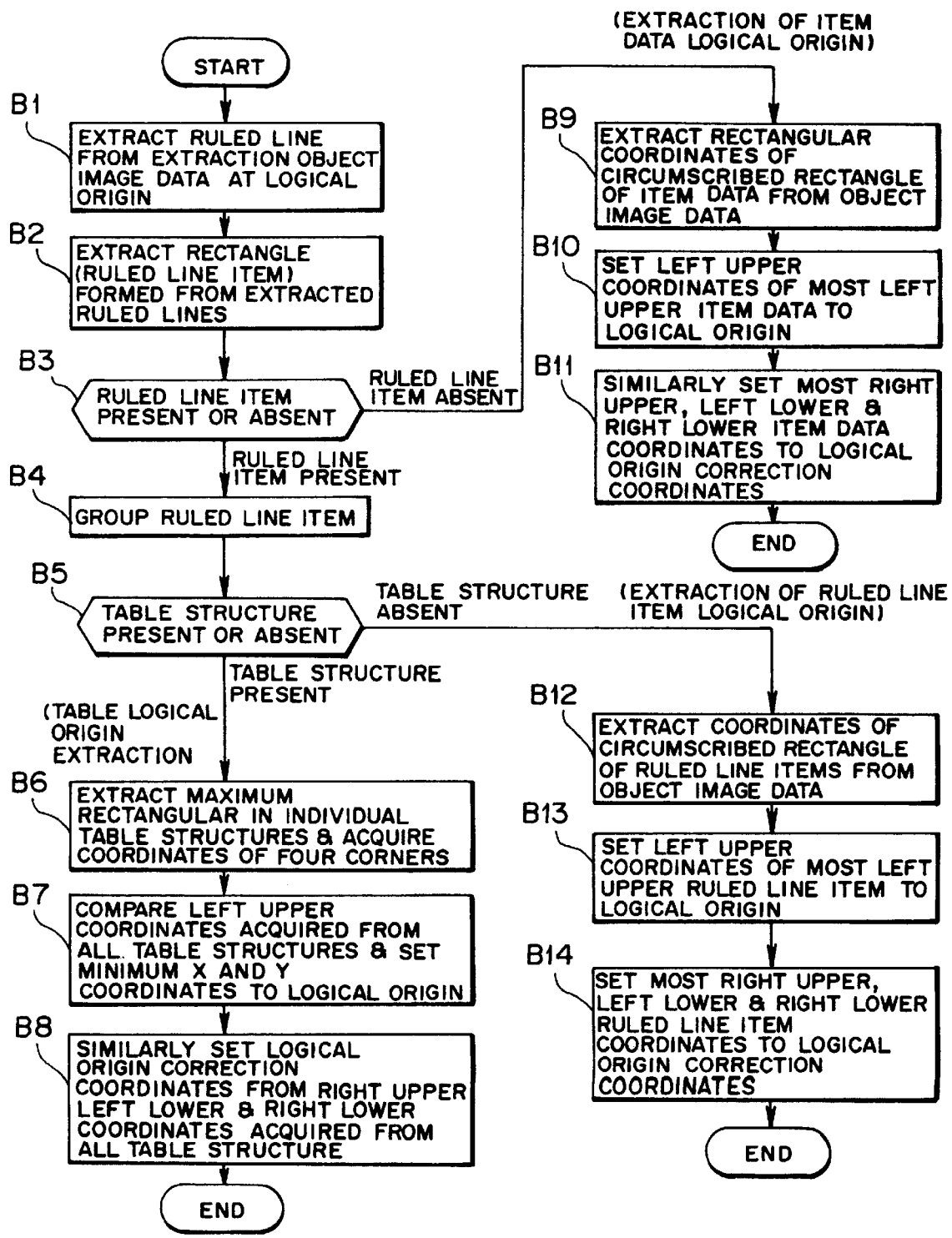
FIG. 18 is a flow chart illustrating logical origin extraction processing by the data medium handling apparatus according to the embodiment of the present invention.

Operation of the layout analysis processing section 2 in this instance will be described with reference to the flow chart shown in FIG. 18.

First, where the processing object layout has ruled lines, as pre-processing of the logical origin extraction processing, the ruled line extraction section 2C of the layout characteristic extraction section 2A extracts ruled lines from image data as an object of extraction (step B1), and then a minimum rectangle formed from the extracted ruled lines is extracted as a ruled line item (step B2).

Then, the table structure analysis section 2E of the layout analysis section 2B discriminates whether or not ruled line items have been extracted (step B3), and where ruled line items have been extracted and the thus extracted ruled line items are positioned with an equal width or height in the proximity of each other, those ruled line items are regarded as and grouped into a ruled line item group having a logical relationship (step B4).

Further, the table structure analysis section 2E discriminates whether or not a table structure (here the table structure signifies a region formed from a ruled line group of 2 rows×2 columns or more) is present in the group (step B5).

Here, where a table structure is present, the table structure analysis section 2E extracts such a maximum rectangular region in the table structure as indicated as a slanting line portion I in FIG. 15(*a*) and acquires coordinates of the four corners of the rectangular region (step B6).

Then, the left upper corner coordinates A (Xo, Yo) of the rectangle are set as the logical origin, and the three locations of the remaining right upper corner coordinates Aa, left lower corner coordinates Ab and right lower corner coordinates Ac are set as correction coordinates for the logical origin (steps B7 and B8).

On the other hand, where a plurality of table structures are present in the layout as seen in FIG. 15(*b*), the table structure analysis section 2E extracts the individual table structures (refer to slanting line portions I) and acquires coordinates of the four corners of each of the rectangular regions (step B6).

Then, the coordinates B (minimum X coordinate, minimum Y coordinate) [that is, (Xo, Yo)] when the logical origin of each of the table structures is projected in the horizontal direction and the vertical direction are set as a logical origin, and the three locations of the coordinates Ba (maximum X coordinate, minimum Y coordinate), coordinates Bb (minimum X coordinate, maximum Y coordinate) and coordinates Bc (maximum X coordinate, maximum Y coordinate) are set as correction coordinates for the logical origin (steps B7 and B8).

Figure 16:
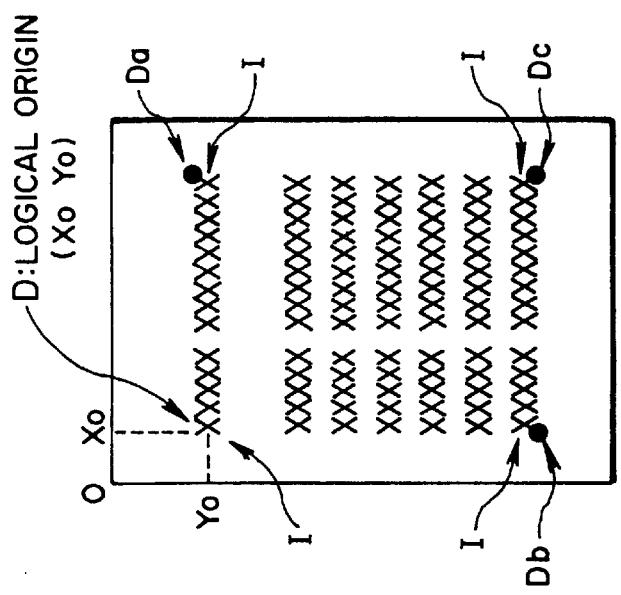

Further, where a table structure is not present in any group of ruled line items, the table structure analysis section 2E extracts that one of rectangular regions of ruled line items positioned outermost as indicated as a slanting line portion I in FIG. 16, and acquires coordinates of the four corners of each rectangular region (step B12).

Then, coordinates C [(minimum X coordinate, minimum Y coordinate), that is, (Xo, Yo)] when the logical origin of each rectangle is projected in the horizontal direction and the vertical direction are set as a logical origin, and the three locations of coordinates Ca (maximum X coordinate, minimum Y coordinate), coordinates Cb (minimum X coordinate, maximum Y coordinate) and coordinates Cc (maximum X coordinate, maximum Y coordinate) are set as correction coordinates for the logical origin (steps B13 and B14).

By the way, where the layout does not include ruled line items at all, the item data extraction section 2D of the layout characteristic extraction section 2A extracts item data in the layout, and the table structure analysis section 2E extracts rectangular regions of those item data which are positioned outermost as indicated by slanting lines I in FIG. 17 and acquires coordinates of the four corners of each of the rectangular regions (step B9).

Then, coordinates D [(minimum X coordinate, minimum Y coordinate), that is, (Xo, Yo)] when the logical origin of each of the rectangles are projected in the horizontal direction and the vertical direction are set as a logical origin, and the three locations of coordinates Da (maximum X coordinate, minimum Y coordinate), coordinates Db (minimum X coordinate, maximum Y coordinate) and coordinates Dc (maximum X coordinate, maximum Y coordinate) are set as correction coordinates for the logical origin (steps B10 and B11).

Further, the table structure analysis section 2E acquires not only logical origin coordinates and correction coordinates for the logical origins extracted in such a manner as described above but also a logical origin extraction method which is recorded information of the method adopted upon extraction of the logical origins (that is, information representing from which one of a table structure, a ruled line item and item data each logical origin has been extracted).

It is to be noted that, in the following description, a logical origin indicating such a logical origin extraction method as described above may be called table logical origin, ruled line item logical origin or item data logical origin.

Then, the layout analysis processing section 2 sends out the logical origin extraction method, the logical origin coordinates and the logical origin correction coordinates as logical origin information to the layout collation processing section 3.

Subsequently, the logical origin collation processing will be described.

This logical origin collation processing is performed by the layout collation processing section 3 shown in FIG. 1 as described hereinabove.

Upon collation between layouts, coordinates of layout components of the layouts are converted into relative coordinates from the logical origins, and the relative coordinates are compared with each other to effect comparison of the logical origins extracted from the layouts.

Actually, however, even where the layouts are same, coincidence of the logical origins cannot sometimes be detected because of variation factors upon reading such as blurring or soiling to an image.

In this instance, based on the information of one of the logical origins, the other logical origin is dynamically detected again, and then coincidence between the logical origins is discriminated.

Figure 21:
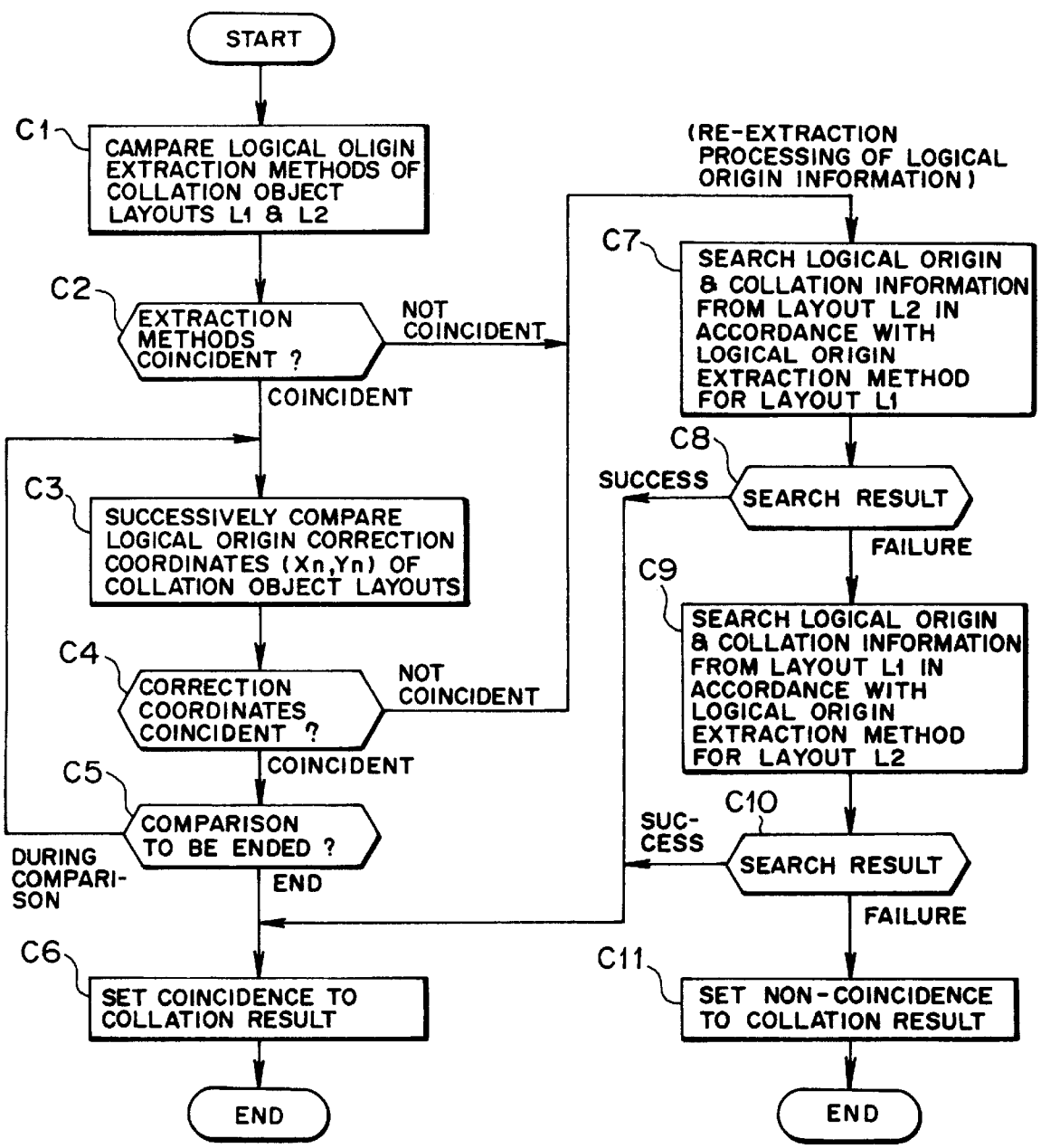
FIG. 21 is a flow chart illustrating logical origin collation processing by the data medium handling apparatus according to the embodiment of the present invention.

Operation of the layout collation processing section 3 in this instance will be described with reference to the flow chart shown in FIG. 21.

First, in the present embodiment, since a plurality of methods are used for extraction of a logical origin by the layout analysis processing section 2 as described above, discrimination of coincidence between extraction methods for a logical origin is performed prior to collation between logical origins (steps C1 and C2).

If the extraction methods for a logical origin are coincident with each other, then logical origin correction coordinates of a layout L1 and another layout L2 are compared with each other as seen in FIG. 19 to discriminate coincidence between the logical origin correction coordinates (steps C3 to C5).

Here, where the discrimination is coincidence between the correction coordinates, relative coordinates (Ea' to Ec' and Fa' to Fc') of the correction coordinates Ea to Ec of the layout L1 and the correction coordinates Fa to Fc of the layout L2 are calculated based on the logical origin coordinates E (minimum X coordinate, minimum Y coordinate) of the layout L1 and the logical origin coordinates F (minimum X coordinate, minimum Y coordinate) of the layout L2, and coincidence discrimination between the correction coordinates is performed by coincidence discrimination between those relative coordinates.

In particular, coincidence between the logical coordinates is discriminated to collate the layouts by making coincidence discrimination between the correction coordinates in which the logical origin coordinate information is incorporated (step C6).

Expressions for calculation of the relative coordinates are given below as expressions (1) to (6):

(relative coordinates $Ea'$)=(correction coordinates $Ea$)−(logical origin coordinates $E$)   (1)

(relative coordinates $Eb'$)=(correction coordinates $Eb$)−(logical origin coordinates $E$)   (2)

(relative coordinates $Ec'$)=(correction coordinates $Ec$)−(logical origin coordinates $E$)   (3)

(relative coordinates $Fa'$)=(correction coordinates $Fa$)−(logical origin coordinates $F$)   (4)

(relative coordinates $Fb'$)=(correction coordinates $Fb$)−(logical origin coordinates $F$)   (5)

(relative coordinates $Fc'$)=(correction coordinates $Fc$)−(logical origin coordinates $F$)   (6)

Further, requirements for coincidence between the relative coordinates are given below as expressions (7) to (9):

$|$(relative coordinates $Ea'$)−(relative coordinates $Fa'$)$|\leq\epsilon$($\epsilon$: coincidence range)   (7)

$|$(relative coordinates $Eb'$)−(relative coordinates $Fb'$)$|\leq\epsilon$($\epsilon$: coincidence range)   (8)

$|$(relative coordinates $Ec'$)−(relative coordinates $Fc'$)$|\leq\epsilon$($\epsilon$: coincidence range)   (9)

On the other hand, where the extraction methods for a logical origin are incoincident with each other (refer to step C2) or where the correction coordinates are incoincident with each other (refer to step C4), re-extraction of the logical coordinate of one of the layouts is performed based on the logical origin information of the other layout.

Figure 20B:
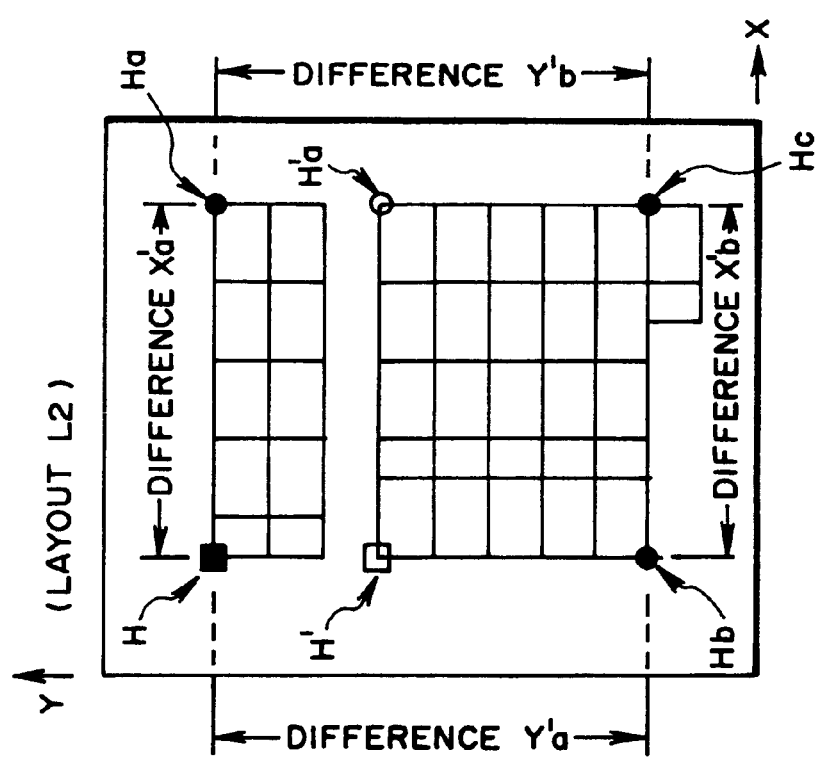
FIGS. 20(a) and 20(b) are views showing examples of a document to be processed by the data medium handling apparatus according to the embodiment of the present invention.
Figure 20A:
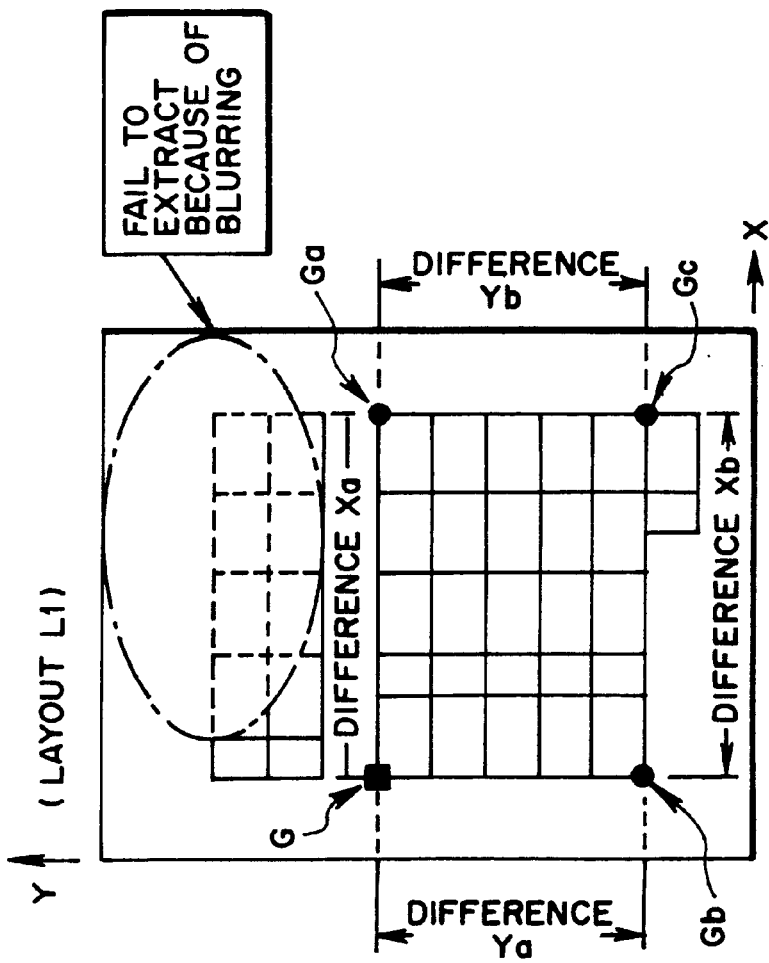

Here, if the layout L1 cannot be detected partially because of blurring to ruled lines as seen in FIG. 20(a), new logical origin coordinates H' and new correction coordinates H'a, Hb and Hc of the layout L2 are extracted as seen in FIG. 20(b) using the logical origin information of the layout L1 (logical origin extraction method, logical origin coordinates C and correction coordinates Ga to Gc) (steps C7 and C8).

Upon re-extraction of logical origin information in this instance, differences Xa, Xb, X'a and X'b between the X coordinates and differences Ya, Yb, Y'a and Y'b between the Y coordinates are first calculated as seen in FIGS. 20(a) and 20(b), respectively, from the logical origin coordinates and the correction coordinates of the layout L1 and the layout L2.

Expressions for calculation of the differences are given below as expressions (10) to (17):
(Layout L1)

Difference $Xa=|(X$ coordinate of correction coordinates $Ga)-(X$ coordinate of logical origin coordinates $G)|$   (10)

Difference $Xb=|(X$ coordinate of correction coordinates $Gc)-(X$ coordinate of correction coordinates $Gb)|$   (11)

Difference $Ya=|(Y$ coordinate of correction coordinates $Gb)-(Y$ coordinate of logical origin coordinates $G)|$   (12)

Difference $Yb=|(Y$ coordinate of correction coordinates $Gc)-(Y$ coordinate of correction coordinates $Ga)|$   (13)

(Layout L2)

Difference $X'a=|(X$ coordinate of correction coordinates $Ha)-(X$ coordinate of logical origin coordinates $H)|$   (14)

Difference $X'b=|(X$ coordinate of correction coordinates $Hc)-(X$ coordinate of correction coordinates $Hb)|$   (15)

Difference $Y'a=|(Y$ coordinate of correction coordinates $Hb)-(Y$ coordinate of logical origin coordinates $H)|$   (16)

Difference $Y'b=|(Y$ coordinate of correction coordinates $Hc)-(Y$ coordinate of correction coordinates $Ha)|$   (17)

Thereafter, the differences calculated are compared with each other to discriminate whether or not some differences are incoincident.

Here, since, with the layout L1 and the layout L2, the differences Ya and Y'a are not coincident and the difference Yb and the difference Y'b are not coincident, differences which coincide with the differences Ya and Yb of the layout L1 are searched from among coordinates of the layout L2.

In other words, the logical origin and correction coordinates are searched from within the layout L2 in accordance with the logical origin extraction method for the layout L1 (refer to steps C7 and C8).

If coincident coordinates are detected successfully as a result of the search, the coordinates are used as the logical origin H' and correction coordinates H'a as seen in FIG. 20(a).

On the other hand, if coincident coordinates are not detected successfully as a result of the search, then the logical origin and correction coordinates are searched from within the layout L1 in a similar manner as described above in accordance with the logical origin extraction method for the layout L2 (steps C9 and C10).

It is to be noted that, if no coincident coordinates are detected successfully also by this method, collation between layouts is not performed (step C11).

In this manner, with the origin extraction and collation processing of the data medium handling apparatus according to the embodiment of the present invention, since a layout analysis of an object document for processing is performed based on ruled line items and item data extracted from image data and predetermined coordinates from among coordinates of the corners of a region obtained by the layout analysis are determined as logical origin coordinates and correction coordinates, logical origin coordinates and correction coordinates can be extracted also from image data of an ordinary document other than a document for exclusive use on which a reference mark or the like is printed.

Further, since an optimum method is dynamically selected from among a plurality of logical origin extraction methods, logical origin extraction suitable for the layout of an object document for processing can be performed.

Furthermore, since, upon logical origin extraction, correction coordinates are extracted simultaneously as additional information for the logical origin, coincidence can be detected with certainty upon collation between logical origins in the layout collation processing.

In particular, since collation between logical origins is performed through collation between relative coordinates of correction coordinates in which logical origin coordinates are incorporated, even if positional displacement occurs upon image reading, collation processing between layouts can be performed with certainty.

Further, even where a logical origin cannot be extracted correctly because of presence of dust, blurring or the like, since re-extraction of a logical origin is performed using correction coordinates in accordance with a logical origin extraction method for the other layout, another point which can be extracted with certainty can be determined as a logical origin.

It is to be noted that, while, in the present embodiment, the point at the left upper corner of a layout is determined as a logical origin, the logical origin is not limited to this, and the point at the right upper corner, the left lower corner or the right lower corner can be determined as a logical origin.

(a3) Description of Rotating Correction Processing of Image Data

Generally, in a document handling apparatus or like apparatus, if the reading direction of an object document for reading is not a correct direction, then character recognition processing cannot be performed because the character describing direction of the image data (image) is not a correct direction.

Therefore, in the data medium handling apparatus 30 according to the embodiment of the present invention, for example, upon origin extraction processing described above, the direction of a read image is discriminated, and if the direction of the image is wrong, then rotating correction processing for the image is performed so that the direction of the image may become a correct direction. Consequently, even if the reading direction of an object document for reading is wrong, layout analysis processing and/or character recognition processing of an image which will be hereinafter described can be performed.

Here, the rotating correction processing of image data is performed by the layout analysis processing section 2 shown in FIGS. 1 and 5 as described hereinabove. The layout analysis processing section 2 includes, in order to realize the rotating correction processing of image data, the step of discriminating whether or not the layout of a read image is directed in a predetermined direction and the step of rotating the layout of the read image data based on a result of the discrimination in the former step so that the layout may be directed in the predetermined direction.

Figure 8:
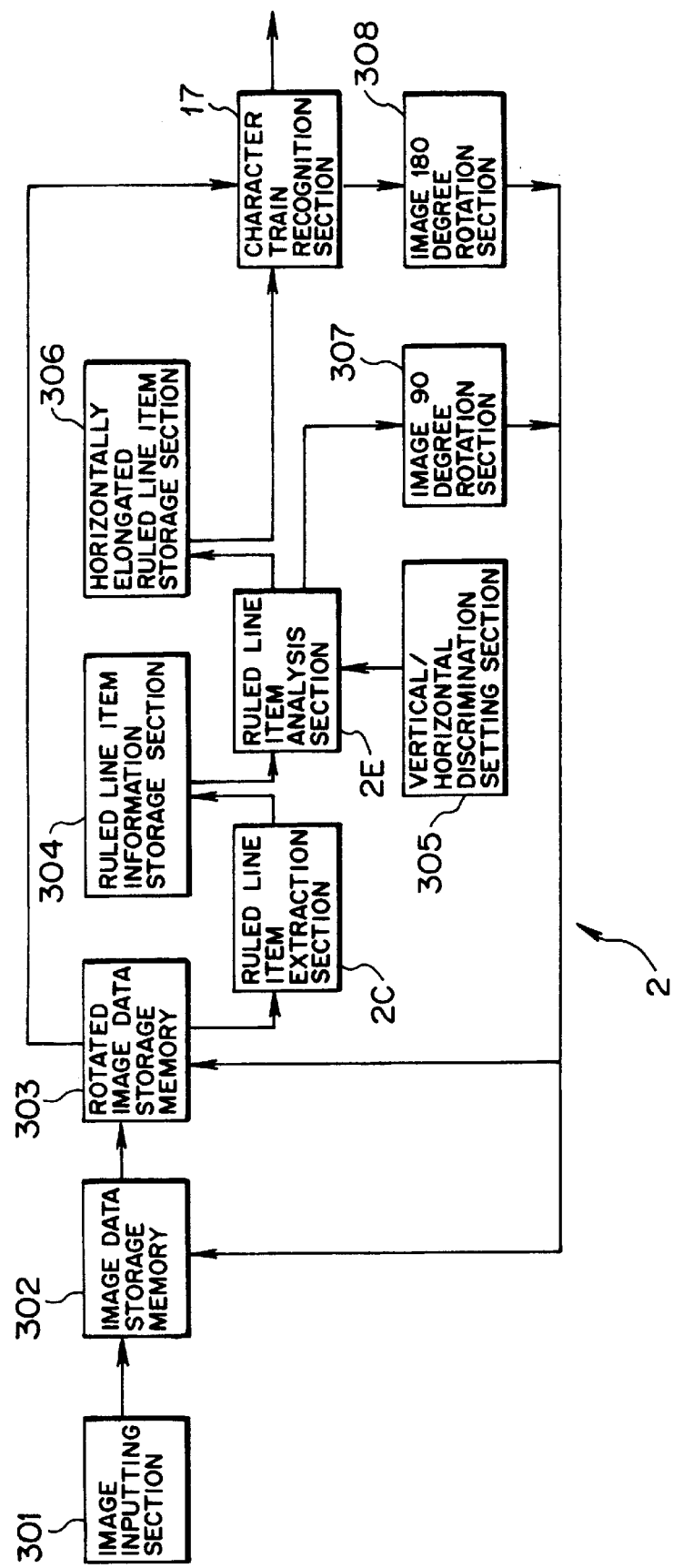
FIGS. 8 and 9 are functional block diagrams wherein notice is taken of rotational correction processing of image data by the data medium handling apparatus according to the embodiment of the present invention.
Figure 9:
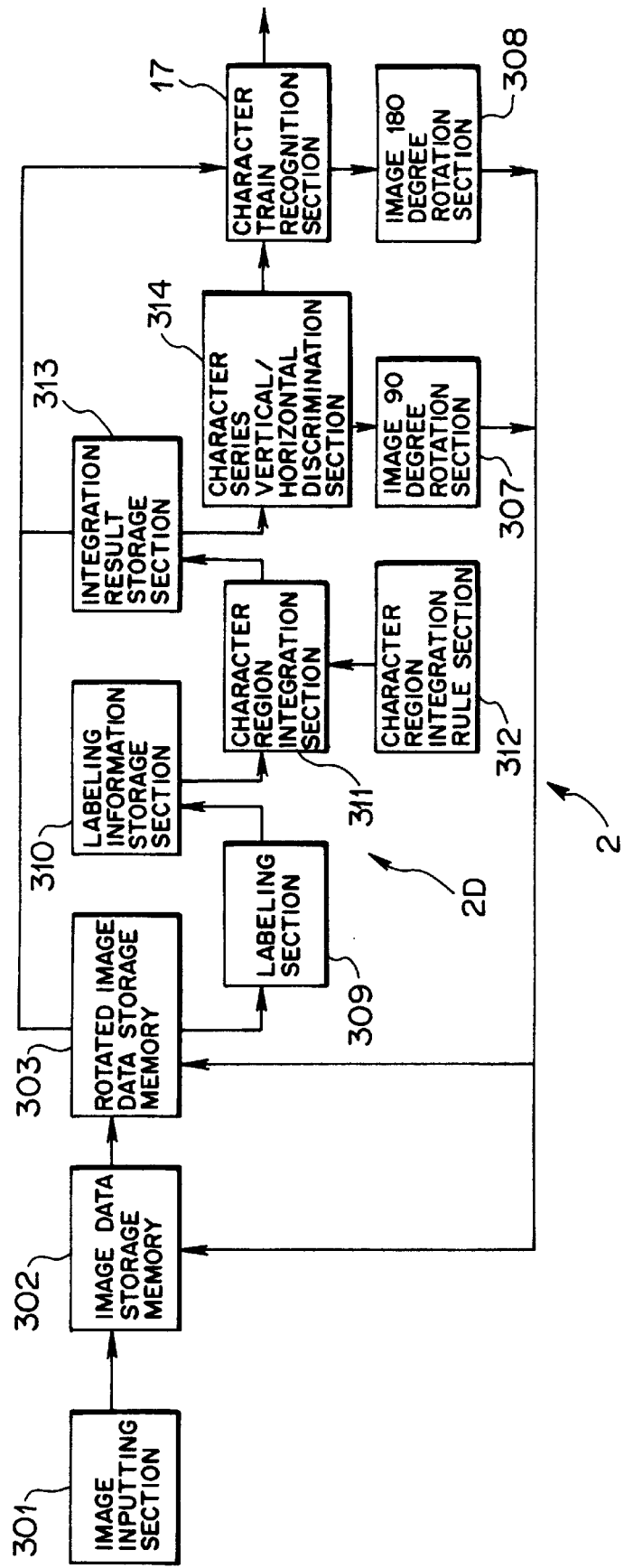

Here, functional block diagrams in which notice is taken of the rotating correction processing of image data by the data medium handling apparatus 30 in the present embodiment are shown in FIGS. 8 and 9. FIG. 8 is a functional block diagram where a document having ruled line items is to be processed while FIG. 9 is a functional block diagram where another document having no ruled line items is to be processed.

When a document having ruled line items is to be processed, in the data medium handling apparatus 30, as shown in FIG. 8, an image inputting section 301, an image data storage memory 302, a rotated image data storage memory 303, the ruled line extraction section (ruled line extraction section) 2C, a ruled line item information storage section 304, the ruled line item analysis section (table structure analysis section) 2E, a vertical/horizontal discrimination setting section 305, a horizontally elongated ruled line item storage section 306, an image 90 degree rotation section 307, an image 180 degree rotation section 308 and the character string recognition block (character recognition processing block) 17 function.

The image inputting section 301 reads image data of a document or the like. The image data storage memory 302 is a memory for temporarily storing the read image data.

The rotated image data storage memory 303 is a memory for storing image data to which rotating correction processing has been performed. Later layout recognition processing, character recognition processing and so forth are performed using the image data stored in the rotated image data storage memory 303.

The ruled line item extraction section (ruled line extraction section) 2C searches read image data to automatically extract ruled line items which make a minimum rectangle formed from ruled lines. The ruled line item information storage section 304 is a memory for storing the ruled line item information extracted by the ruled line extraction section 2C.

The ruled line item analysis section (table structure analysis section) 2E analyzes whether the shape of ruled line items stored in the ruled line item information storage section 304 is a vertically elongated shape or a horizontally elongated shape to discriminate whether the reading direction of image data is a vertical reading direction or a horizontal reading direction.

Most of slips, documents and so forth handled in banks, enterprises and so forth are described usually in a horizontal direction. Consequently, also ruled line items are in most cases elongated horizontally, and the condition that horizontally elongated ruled line items are more than vertically elongated ruled line items is set as a criterion to the vertical/horizontal discrimination setting section 305, and based on the criterion thus set, the reading direction of image data is discriminated.

The horizontally elongated ruled line item storage section 306 stores ruled line items which have been determined to be horizontally elongated ruled line items by the table structure analysis section 2E.

The image 90 degree rotation section 307 rotates, when ruled line items are determined to be vertically elongated ruled line items by the table structure analysis section 2E, the image data by 90 degrees to effect rotating correction for the image data.

The character string recognition section 17 recognizes characters in ruled line items, and when character recognition cannot be performed successfully by the character string recognition section 17, the image 180 degree rotation section 308 rotates the image data by 180 degrees to effect rotating correction for the image data.

It is to be noted that rotationally corrected image data are stored into the image data storage memory 302 and the rotated image data storage memory 303 and processed by the ruled line item extraction section 2C, ruled line item analysis section 2E and character string recognition section 17 similarly to that described hereinabove.

On the other hand, when another document having no ruled line items is to be processed, in the data medium handling apparatus 30, as seen in FIG. 9, the image inputting section 301, the image data storage memory 302, the rotated image data storage memory 303, a labeling section 309, a labeling information storage section 310, a character region integration section 311, a character region integration rule section 312, an integration result storage section 313, a character string vertical/horizontal discrimination section 314, the image 90 degree rotation section 307, the image 180 degree rotation section 308 and the character string recognition section (character recognition processing block) 17 function.

The image inputting section 301, the image data storage memory 302 and the rotated image data storage memory 303 have similar functions and constructions to those described hereinabove.

The labeling section 309 performs labeling processing for extracting successive dot information from pixel information. The labeling information storage section 310 is a memory for storing the successive dot information extracted by the labeling section 309.

The character region integration section 311 integrates successive characters based on dot information extracted by the labeling section 309 into a character string in accordance with an integration rule set by the character region integration rule section 312 to extract item data. The integration result storage section 313 stores the item data extracted by the character region integration section 311.

In particular, the labeling section 309, labeling information storage section 310, character region integration section 311, character region integration rule section 312 and integration result storage section 313 cooperatively construct the item data extraction section 2D.

The character string vertical/horizontal discrimination section 314 analyzes whether the shape of item data extracted by the character region integration section 311 is a vertically elongated shape or horizontally elongated shape to discriminate whether the reading direction of image data is a vertical reading direction or a horizontal reading direction.

Further, the image 90 degree rotation section 307 rotates, when the character string of item data is determined to be a vertically elongated character string by the character string vertical/horizontal discrimination section 314, the image data by 90 degrees to effect rotating correction of the image data.

The character string recognition section 17 recognizes characters in item data. The image 180 degree rotation section 308 rotates, when character recognition cannot be performed successfully by the character string recognition section 17, the image data by 180 degrees to effect rotating correction of the image data.

It is to be noted that rotationally corrected image data are stored into the image data storage memory 302 and the rotated image data storage memory 303 and processed by the labeling section 309, character region integration section 311, character string vertical/horizontal discrimination section 314 and character string recognition section 17 in a similar manner as described hereinabove.

In the data medium handling apparatus 30 according to the embodiment of the present invention having the construction described above, if image data are inputted from the image inputting section 301, then ruled line items or item data are extracted from the image data.

Here, where the image data include ruled line items, the ruled line items are extracted by the ruled line extraction section 2C, and it is analyzed by the table structure analysis section 2E which one of a vertically elongated shape and a horizontal elongated shape the shape of the ruled line items extracted by the table structure analysis section 2E is.

Then, where it is analyzed that the shape of ruled line items is a vertically elongated shape, the image data are rotationally corrected by 90 degrees by the image 90 degree rotation section 307.

On the other hand, where it is analyzed that the shape of ruled line items is a horizontally elongated shape, character recognition of the ruled line items is performed by the character string recognition section 17, but when character recognition cannot be performed successfully, the image data are rotationally corrected by 180 degrees by the image 180 degree rotation section 308.

Furthermore, where the image data include no ruled line items, item data are extracted by the character region integration section 311, and it is analyzed by the character region integration section 311 which one of a vertically elongated shape and a horizontally elongated shape the shape of the item data extracted by the character region integration section 311 is.

Here, where it is analyzed that the shape of the item data is a horizontally elongated shape, character recognition of the ruled line items is performed by the character string recognition section 17, but when character recognition cannot be performed successfully, the image data are rotationally corrected by 180 degrees by the image 180 degree rotation section 308.

Figure 12:
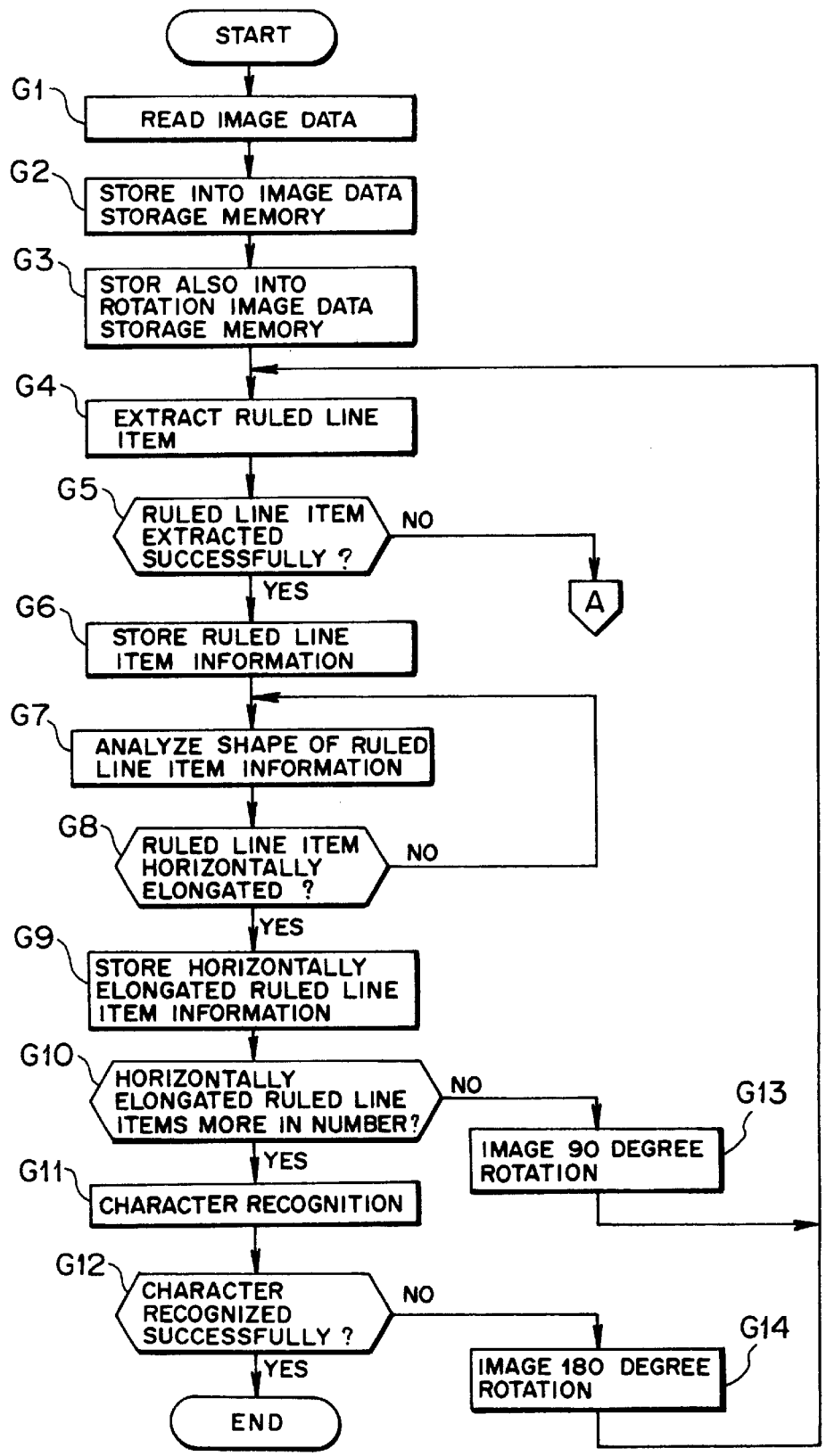
FIGS. 12 and 13 are flow charts illustrating the image data rotational correction processing of the data medium handling apparatus according to the embodiment of the present invention.

The image data rotating correction processing of the data medium handling apparatus 30 then will be further described with reference to the flow charts shown in FIGS. 12 and 13.

First, reading of image data of a slip, a document or the like to be processed for image recognition is performed (step G1). It is to be noted that the form of a slip, a document or the like may be read from any direction.

Figure 10:

For example, when a document 320 having such ruled line items as shown in FIG. 10 is read, the read image data are stored once into the image data storage memory 302 (step G2). It is to be noted that, only upon first reading, the same image data are stored also into the rotated image data storage memory 303 (step G3).

Then, ruled line items in the image data (for example, in FIG. 10, a ruled line item M is shown) are extracted (step G4).

Here, if ruled line items are extracted successfully, the ruled line item information is stored into the ruled line item information storage section 304 (steps G5 and G6).

The table structure analysis section 2E analyzes the shape of each of the ruled line items based on the ruled line item information stored in the ruled line item information storage section 304 and discriminates and classifies whether or not the ruled line item is a vertically elongated ruled line item or a horizontally elongated ruled line item (steps G7 and G8). Then, where the ruled line item of the ruled line information is a horizontally elongated ruled line item, it is stored into the horizontally elongated ruled line item storage section 306 (step G9).

Further, the table structure analysis section 2E discriminates, based on a criterion set by the vertical/horizontal discrimination setting section 305, whether or not the number of horizontally elongated ruled line items is larger than the number of vertically elongated ruled line items to discriminate whether the reading direction of the image data is correct or wrong (step G10).

Here, if the table structure analysis section 2E discriminates the number of horizontally elongated ruled line items is larger, then character recognition is performed by the character string recognition section 17 (from the YES route of step G10 to step G11).

If character recognition by the character string recognition section 17 is performed successfully, then it is discriminated that the reading direction of the image data is normal (YES route of step G12).

On the contrary, if character recognition by the character string recognition section 17 is not performed successfully, since there is the possibility that the image has been rotated by 180 degrees (that is, the image is inverted vertically), the image 180 degree rotation section 308 rotationally corrects the image data of the rotated image data storage memory 303 by 180 degrees after the image data are stored once into the image data storage memory 302 (step G14). Consequently, the image data after rotated by 180 degrees are thereafter stored into the rotated image data storage memory 303 and undergo processing similar to the processing described hereinabove (steps G4 to G12).

On the other hand, if it is discriminated by the table structure analysis section 2E that the number of vertically elongated ruled line items is larger, then the image data to be stored into the image data storage memory 302 are rotationally corrected by 90 degrees by the image 90 degree rotation section 308 (step G13). Consequently, the image data after rotated are thereafter stored into the rotated image data storage memory 303 and undergo processing similar to the processing described hereinabove (steps G4 to G12).

Then, if character recognition by the character string recognition section 17 is not performed successfully also with the image data after the 90 degree rotational correction processing has been performed, then since there is the possibility that the image may be in a rotated state by 180 degrees, the image data of the rotated image data storage memory 303 are rotationally corrected by 180 degrees by the image 180 degree rotation section 308 after they are stored once into the image data storage memory 302 (step G14). Consequently, the image data after rotated by 180 degrees are thereafter stored into the rotated image data storage memory 303 and undergo processing similar to that described hereinabove (steps G4 to G12).

On the other hand, if no ruled line item is extracted successfully in step GS described above, then since this is the case wherein, for example, such a document 321 which has no ruled line item as shown in FIG. 11 is read, the following processing is performed in order to extract item data.

Figure 13:
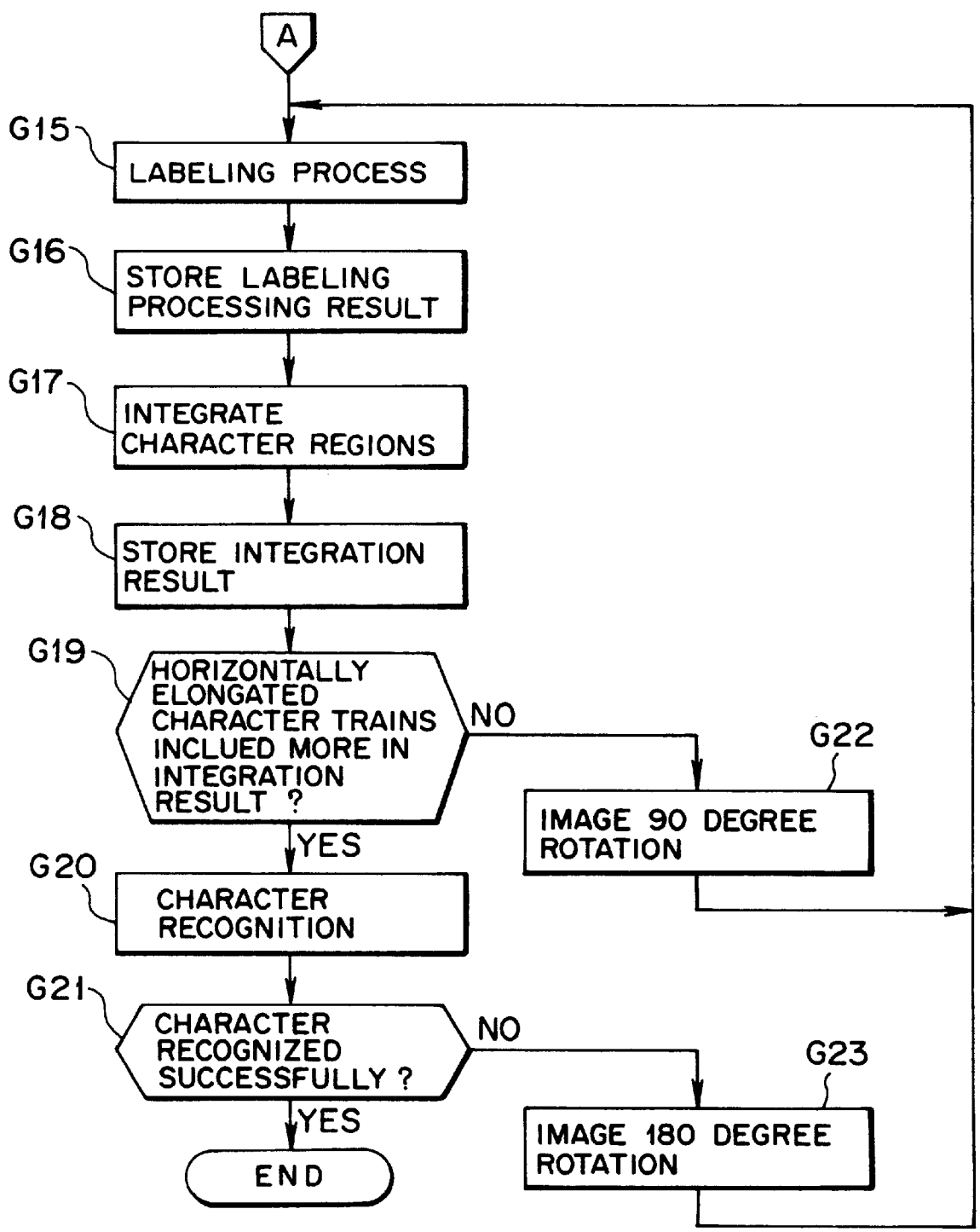

First, the labeling section 309 extracts labeling information (for example, in FIG. 11, labeling information N is illustrated) from the image data stored in the rotated image data storage memory 303 (from the NO route of step G5 to step G15 of FIG. 13). The extracted labeling information is stored into the labeling information storage section 310 (step G16).

Then, the character region integration section 311 integrates individual pieces of the labeling information stored in the labeling information storage section 310 into a character string based on the rule of the character region integration rule section 312. Consequently, item data (for example, in FIG. 11, a character region integration result ("出張旅費精算書"; O) wherein seven pieces of labeling information of "出", "張", "旅", "費", "精", "算" and "書" are integrated into a character string is illustrated as item data) are extracted (step G17), and the integration result is stored into the integration result storage section 313 (step G18).

Further, the character string vertical/horizontal discrimination section 314 discriminates whether or not the number of horizontally elongated item data is larger than the number of vertically elongated item data to discriminate whether the reading direction of the image data is correct or wrong (step G19).

Here, if it is discriminated by the character string vertical/horizontal discrimination section 314 that the number of horizontally elongated item data is larger, then character recognition is performed by the character string recognition section 17 (step G20).

If character recognition is performed successfully by the character string recognition section 17, it is determined that the reading direction of the image data is normal (step G21).

On the contrary if character recognition is not performed successfully by the character string recognition section 17, then since there is the possibility that the image is in a rotated state by 180 degrees, the image data of the rotated image data storage memory 303 are rotationally corrected by 180 degrees after they are stored once into the image data storage memory 302 (step G23). Consequently, the image data after rotated by 180 degrees are thereafter stored into the rotated image data storage memory 303 and undergo processing similar to the processing described hereinabove (steps G15 to G21).

On the other hand, if it is discriminated by the character string vertical/horizontal discrimination section 314 that the number of vertically elongated item data is larger, then the image data stored in the image data storage memory 302 are rotationally corrected by 90 degrees by the image 90 degree rotation section 308 (step G22). Consequently, the image data after rotated are thereafter stored into the rotated image data storage memory 303 and undergo processing similar to the processing described hereinabove (steps G15 to G21).

Then, if character recognition by the character string recognition section 17 is impossible also with the image data after the 90 degree rotational correction processing has been performed, then since there is the possibility that the image is in a rotated state by 180 degrees, the image data of the rotated image data storage memory 303 are rotationally corrected by 180 degrees by the image 180 degree rotation section 308 after they are stored once into the image data storage memory 302 (step G23). Consequently, the image data after rotated by 180 degrees are thereafter stored into the rotated image data storage memory 303 and undergo processing similar to the processing described hereinabove (steps G15 to G21).

In this manner, with the data medium handling apparatus 30 according to the embodiment of the present invention, a ruled line item or item data are extracted from read image data, and it is discriminated whether the shape of the extracted ruled line item or item data is a horizontally elongated shape or a vertically elongated shape. If the shape of the ruled line item or item data is a vertically elongated shape, rotational correction of the image data by 90 degree is performed. Then, if character recognition cannot be performed successfully even where the shape of the ruled line item or item data is a horizontally elongated shape, rotational correction of the image data by 180 degrees is performed. Consequently, from whichever direction the image data are read, the reading direction of the image data can be discriminated automatically, and when the reading direction of the image data is wrong, the image data is rotationally corrected automatically. As a result, the data medium handling apparatus 30 is advantageous in that confirmation and rotating correction operations by an operator can be eliminated, and automatic processing of documents by a client-server system can be performed efficiently.

(a4) Description of Matrix Collation Processing

Generally, in a document handling apparatus or a like apparatus, since, upon collation processing between the layout of an object document for processing and layouts stored in a layout DB or the like, components of the individual layouts (ruled line items, item data and so forth) are successively collated to effect comparison between coordinates, sizes or the like, as the component number (N) of the layouts increases, the number of collation operations increases very much, and collation processing in layout of a large number of documents cannot be performed at a high speed.

Therefore, in the data medium handling apparatus 30 according to the embodiment of the present invention, layouts of ruled line items which are one of components of a layout are compression processed and represented as matrix tables, and upon collation between layouts, the matrix tables of them are collated with each other so that collation processing of the layouts of a large number of documents can be performed at a high speed.

Here, the data medium handling apparatus 30 according to the embodiment of the present invention is constructed such that the layout collation processing section 3 compression processes a layout of a ruled line item extracted by the layout analysis processing section 2 to represent it as a matrix table, and retrieves reference matrix tables stored in the layout DB 14 using the matrix table as a restrictive retrieval term to collate whether or not there is present a coincident matrix table. Based on a result of the collation, the character recognition processing block 17 discriminates information of the image at a specified position.

Figure 22:
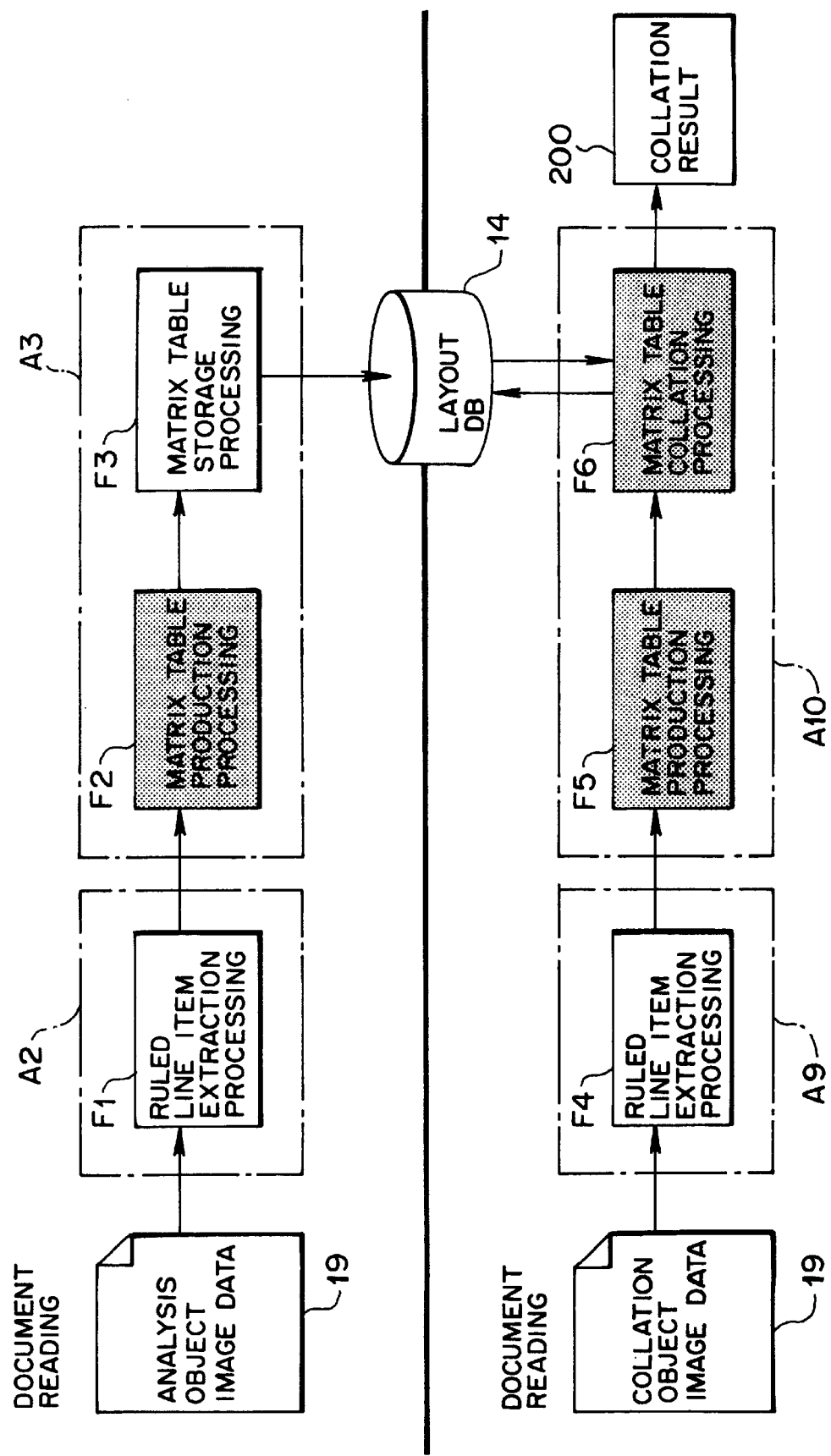
FIG. 22 is a diagrammatic view of processing wherein notice is taken of matrix collation processing by the data medium handling apparatus according to the embodiment of the present invention.

Here, a processing diagrammatic view in which notice is taken of the matrix collation processing of the data medium handling apparatus 30 according to the present embodiment is shown in FIG. 22.

In the data medium handling apparatus 30, as seen in FIG. 22, if an object document for processing is read and image data 19 of an analysis object are inputted first, then the layout analysis processing section 2 analyzes the inputted image data to extract ruled line segments and extracts rectangles formed from the ruled line segments as ruled line items.

In this instance, an obliqueness degree of the image is calculated from the ruled line segments and so forth, and obliqueness correction for coordinate positions of the extracted individual ruled line items is performed. Further, the logical origins and correction coordinates of the layout are extracted, and the coordinate positions, the logical origins and the correction coordinates of the corrected ruled line items are set as layout information (step F1).

Then, the layout collation processing section 3 produces a bit table for 10 DPI (Dots Per Inch) corresponding to the inputted image data, and plots the left upper coordinates of the individual ruled line items and the right lower coordinates of the ruled line item in the lowest row of the layout information at corresponding positions on the bit table.

Further, the bit table produced is compression processed depending upon presence or absence of data in a row and are compression processed in a direction of a row depending upon the regularity of the constructions of rows to produce a matrix table (step F2).

The matrix table compressed in this manner is stored into the layout DB 14 together with the other layout information (step F3).

Figure 2:
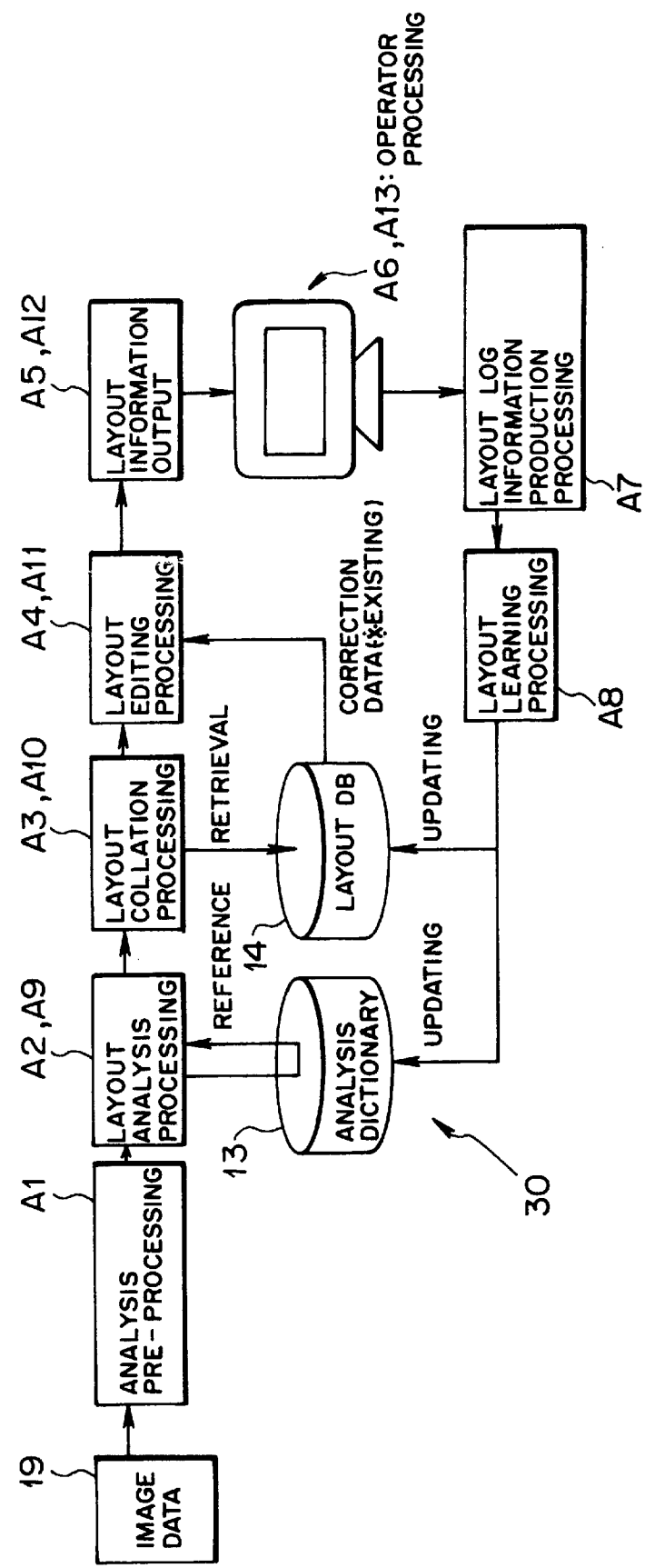
FIGS. 2 to 4 are views illustrating processing of the data medium handling apparatus according to the embodiment of the present invention.

It is to be noted that the step F1 described above corresponds to the step A2 illustrated in FIG. 2 and the steps F2 and F3 described above correspond to the step A3 illustrated in FIG. 2.

Further, in the data medium handling apparatus 30, if an object document for collation is read and image data 19 of an analysis object are inputted, then the layout analysis processing section 2 performs processing similar to that in the step F1 described above for the inputted image data and sets coordinate positions, logical origins and correction coordinates of ruled line items as layout information (step F4).

Then, the layout collation processing section 3 performs processing similar to that in the step F2 described above for the inputted image data to produce a matrix table (step F5).

Here, the layout collation processing section 3 reads out the matrix table of a collation object from the layout DB 14 and collates bit positions with reference to the individual logical origins of the layout in units of a row to effect collation between the matrix table of the collation object read out and the matrix table produced in step F5 described above.

Further, the number of coincident bits with respect to the number of all collation bits is calculated from a result of the collation of the bit positions of the matrix table is calculated, and a collation result 200 is outputted as a coincidence ratio of the matrix table (step F6).

It is to be noted that the step F4 described above corresponds to the step A9 illustrated in FIG. 2, and the steps F5 and F6 described above correspond to the step A10 illustrated in FIG. 2.

Figure 23:
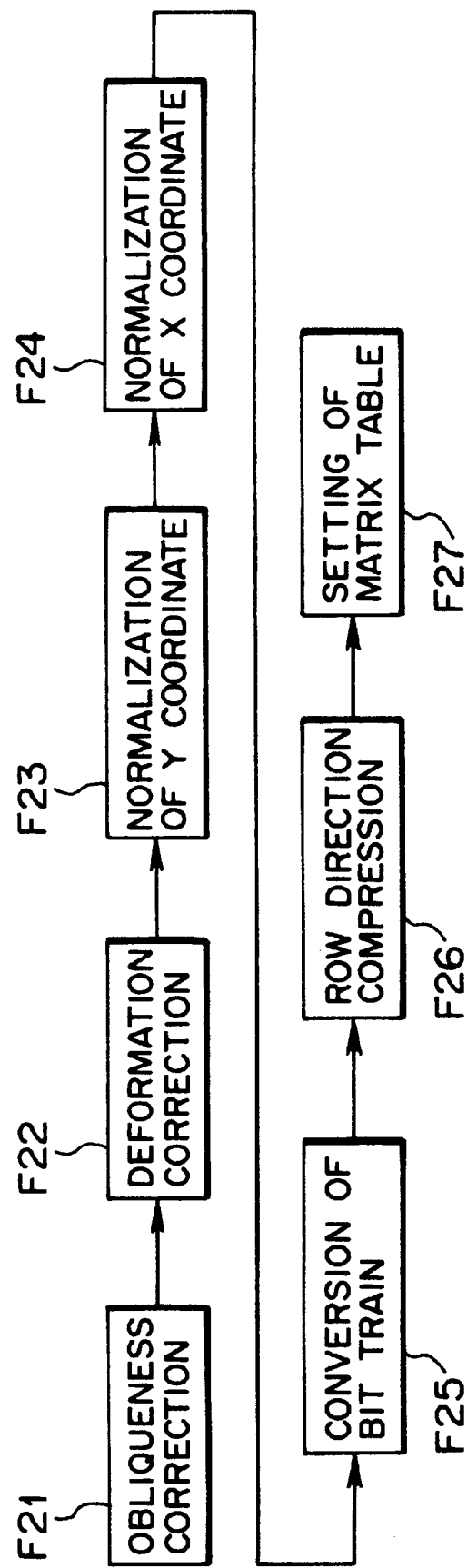
FIG. 23 is a view illustrating matrix table production processing by the data medium handling apparatus according to the embodiment of the present invention.

Here, the matrix table production processing in steps F2 and F5 described above will be described with reference to FIG. 23.

First, ruled lines are extracted from an image which is an object of production of a matrix table, and ruled line items (minimum rectangular regions formed from ruled lines) are extracted from the extracted ruled lines. In this instance, obliqueness correction for the individual coordinates of the extracted ruled line items is performed based on obliqueness degree information of the layout (step F21).

Then, the linearity of each ruled line on the layout is checked to acquire a deformation rate of the ruled line, and deformation correction for the coordinates of the ruled line items obliqueness corrected in step F21 is performed (step F22).

Figure 24B:
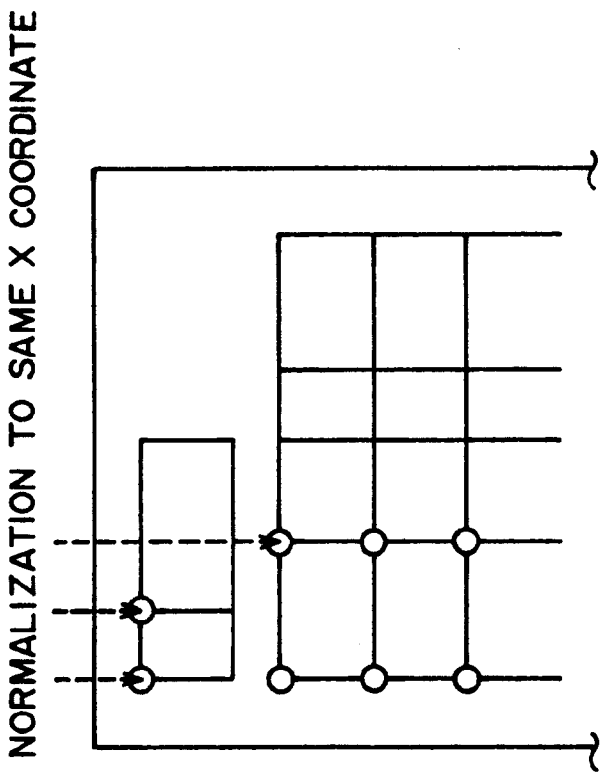
FIGS. 24(a) and 24(b) are views illustrating normalization processing for coordinates of image data upon the matrix table production processing by the data medium handling apparatus according to the embodiment of the present invention.
Figure 24A:
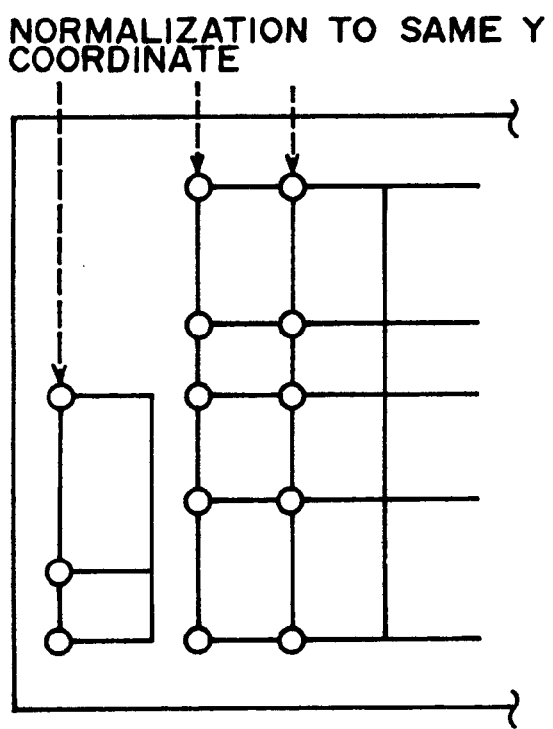

Further, horizontal ruled lines which form the ruled line items are referred to to set the values of the left upper corner Y coordinates of those ruled line items whose upper side ruled lines commonly have same ruled lines so that all of them have same values to effect normalization of the Y coordinates as seen in FIG. 24(a) (step F23), and vertical ruled lines which form the ruled line items are referred to to set the values of the left upper corner X coordinates of those ruled line items whose left side ruled lines commonly have same ruled lines so that all of them have same values to effect normalization of the X coordinates as shown in FIG. 24(b) (step F24).

In particular, in the present embodiment, prior to compression processing of a bit table on which the layout of ruled line items is reflected, obliqueness correction and deformation correction processing is performed for the read image data (refer to steps F21 and F22), and then horizontal ruled lines which form the ruled line items are referred to to perform Y coordinate unification processing for those ruled line items whose upper side ruled lines commonly have same ruled lines (refer to step F23), whereafter vertical ruled lines which form the ruled line items are referred to to perform X coordinate unification processing for those ruled line items whose left side ruled lines commonly have same ruled lines (refer to step F24) to absorb a variation in layout which is produced in reading of image data.

Figure 25:
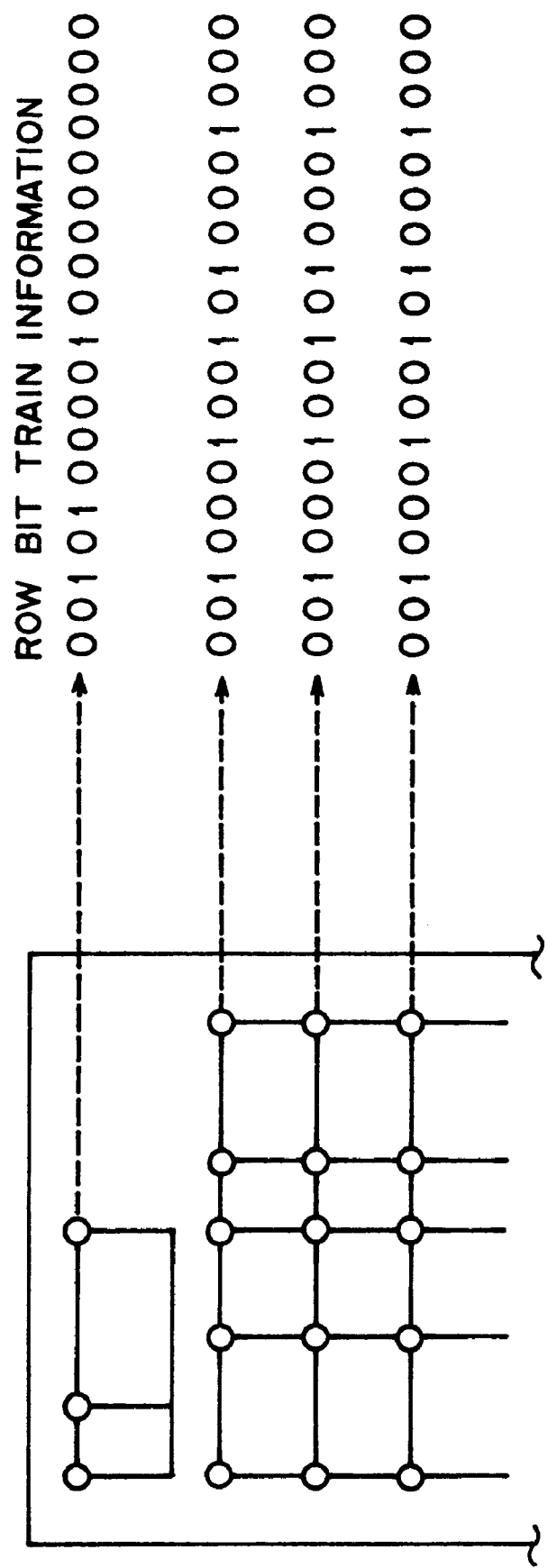
FIGS. 25 to 27 are views illustrating bit table production processing upon the matrix table production processing by the data medium handling apparatus according to the embodiment of the present invention.

Further, for all of the ruled line items on the layout, the left upper corner coordinates of the ruled line items are coordinate converted (bit train converted) in accordance with a designated resolution of the bit table in units of ruled line items having the same Y coordinate, and bits are set at corresponding positions of the table as seen in FIG. 25.

Figure 26:
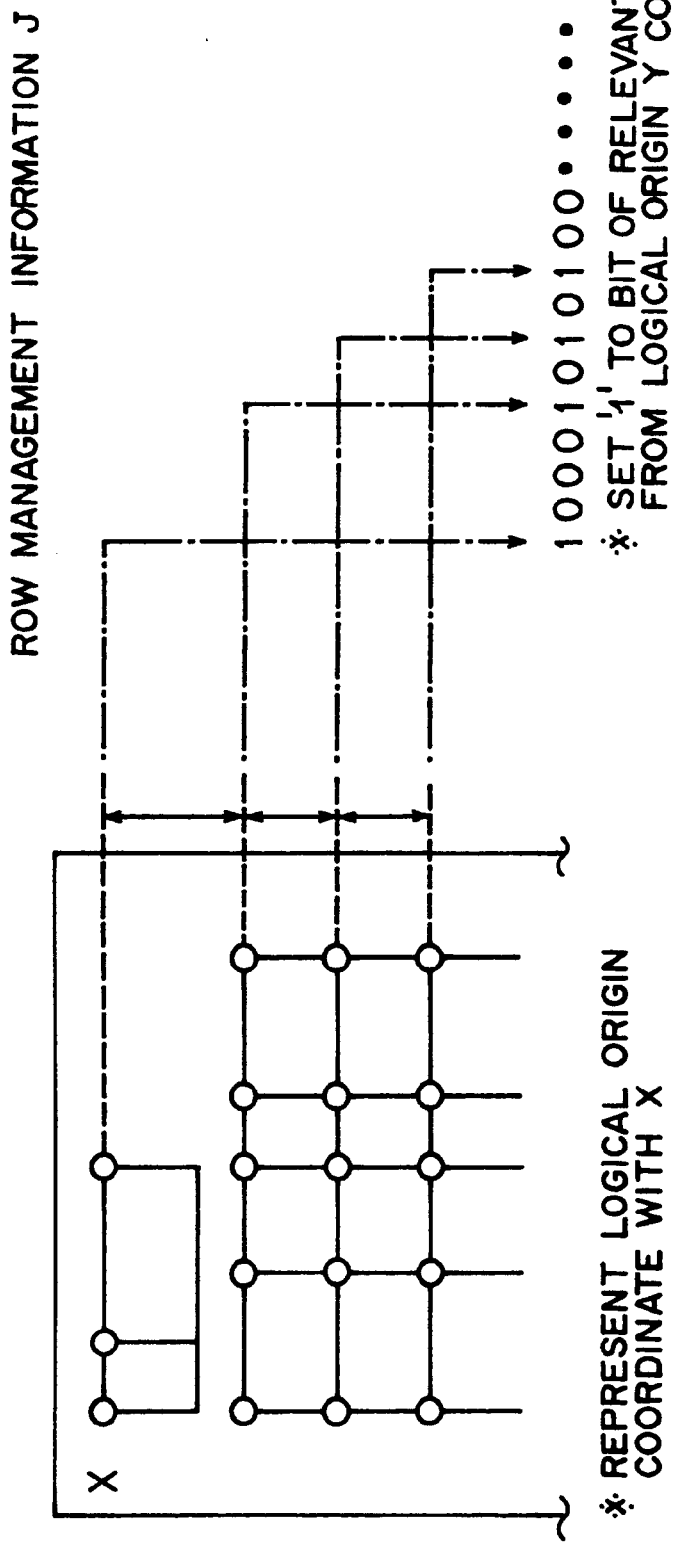

In this instance, distances between the Y coordinates of the converted ruled line items are set to row management information J as seen in FIG. 26 (step F25).

Figure 27:
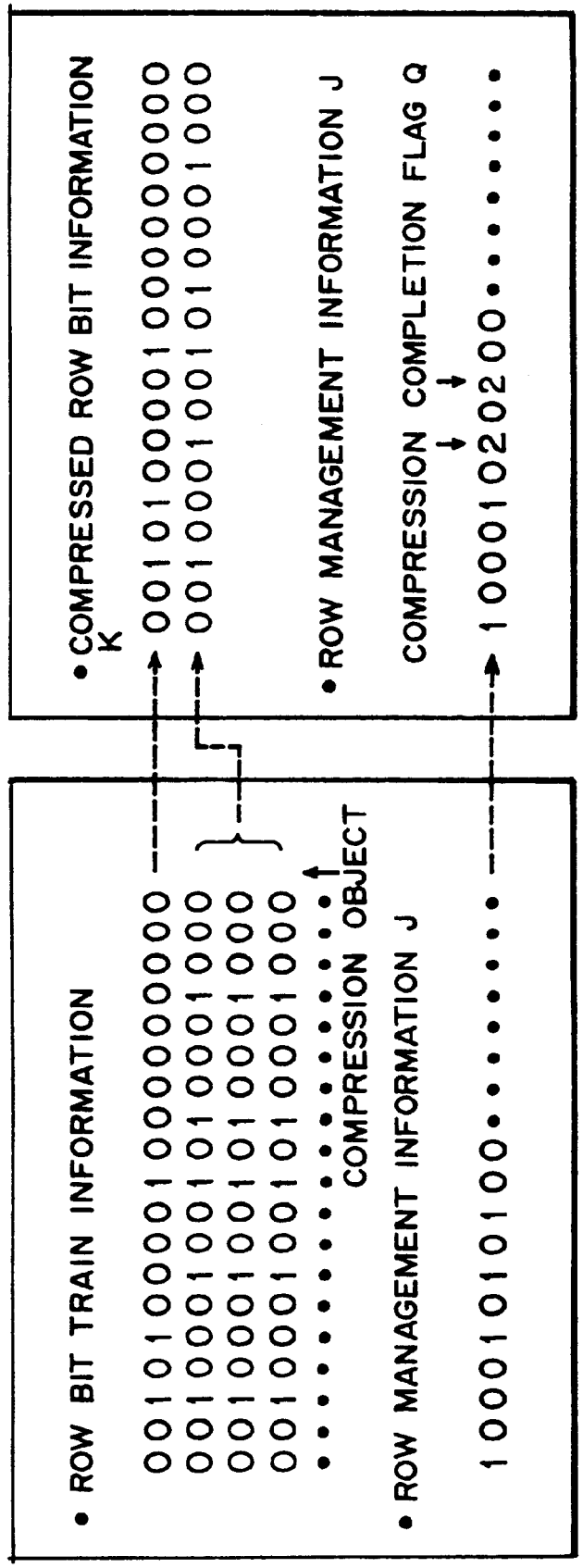

Here, the bit table produced by the conversion in step F25 is processed for successive comparison of rows beginning with the t op row as seen in FIG. 27, and successive rows having the same bit construction are compressed in a direction of rows into a row to produce compressed row bit information K, and a compression completion flag Q is set as row compression information to the row management information J (step F26).

Figure 28:
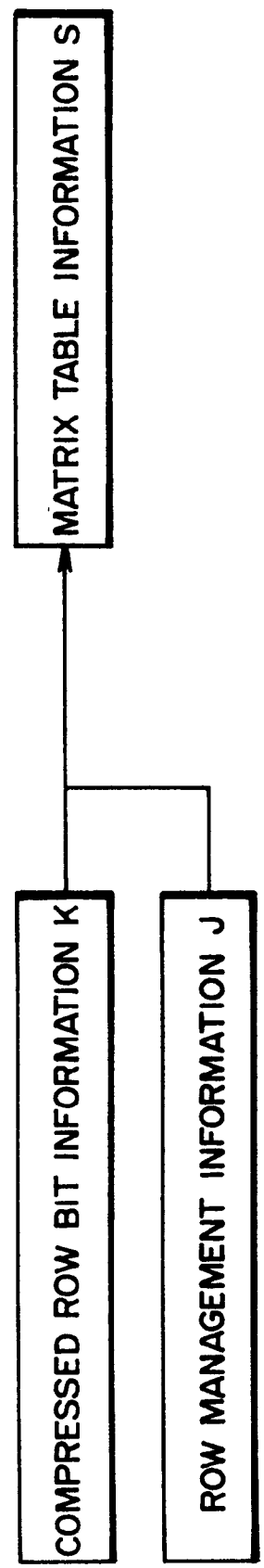
FIG. 28 is a view illustrating a matrix table produced by the data medium handling apparatus according to the embodiment of the present invention.

Then, matrix table information S including the is compressed row bit information K and the row management information J thus produced is set as a matrix table as seen in FIG. 28 (step F27).

In particular, in the present embodiment, upon compression processing of the layouts of ruled line items, the layouts of the ruled line items are converted into corresponding bit trains, and the bit trains are compression processed. Then, the thus compression processed bit table is set as a matrix table. Consequently, the number of collation operations upon layout collation merely increases linearly in proportion to the number of layouts of an object of collation without relying upon the component number (N) of the layout, and collation processing of the layouts of a large number of documents can be performed at a high speed.

Figure 29:
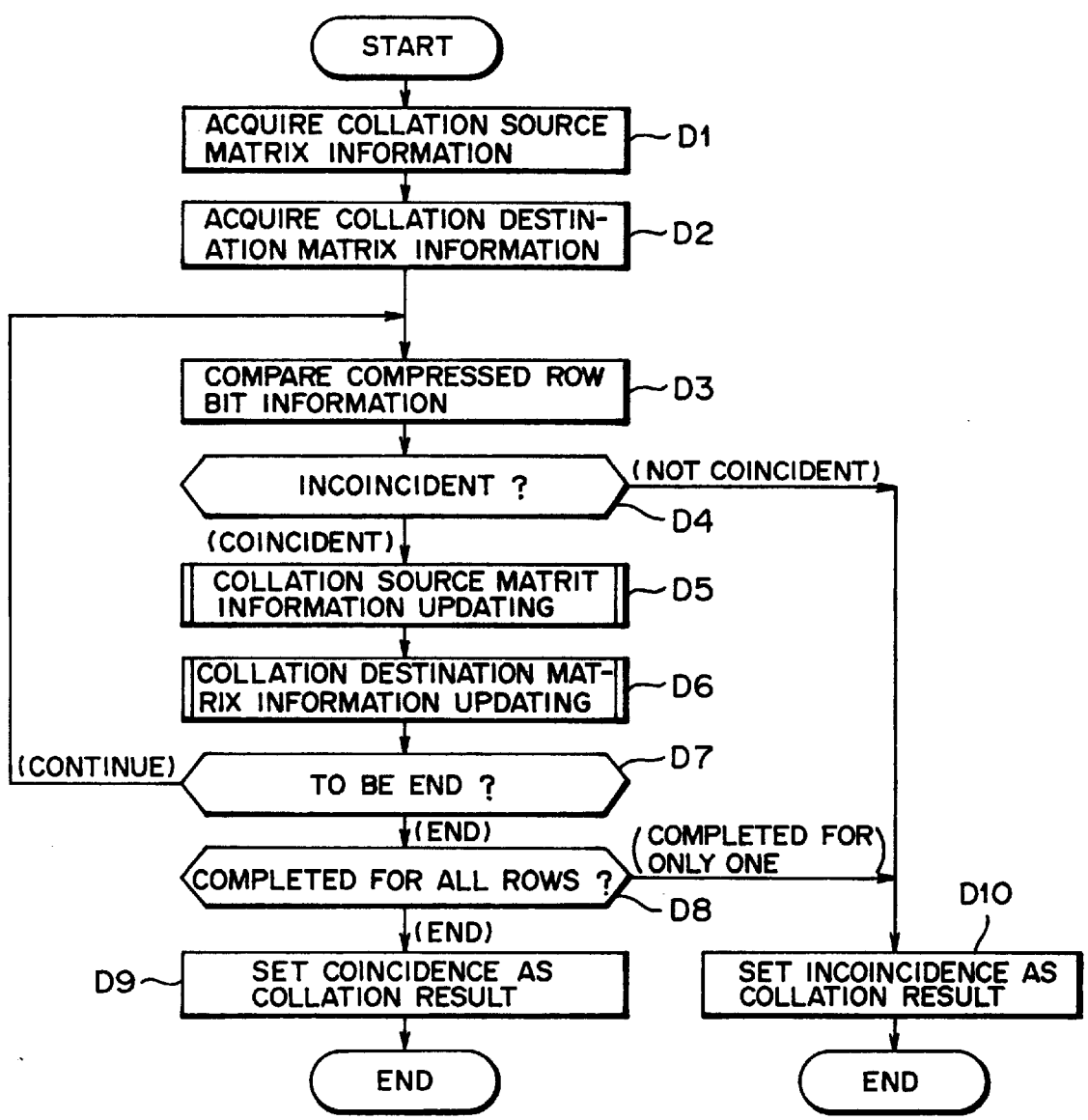
FIGS. 29 and 30 are flow charts illustrating matrix table collation processing by the data medium handling apparatus according to the embodiment of the present invention.
Figure 30:
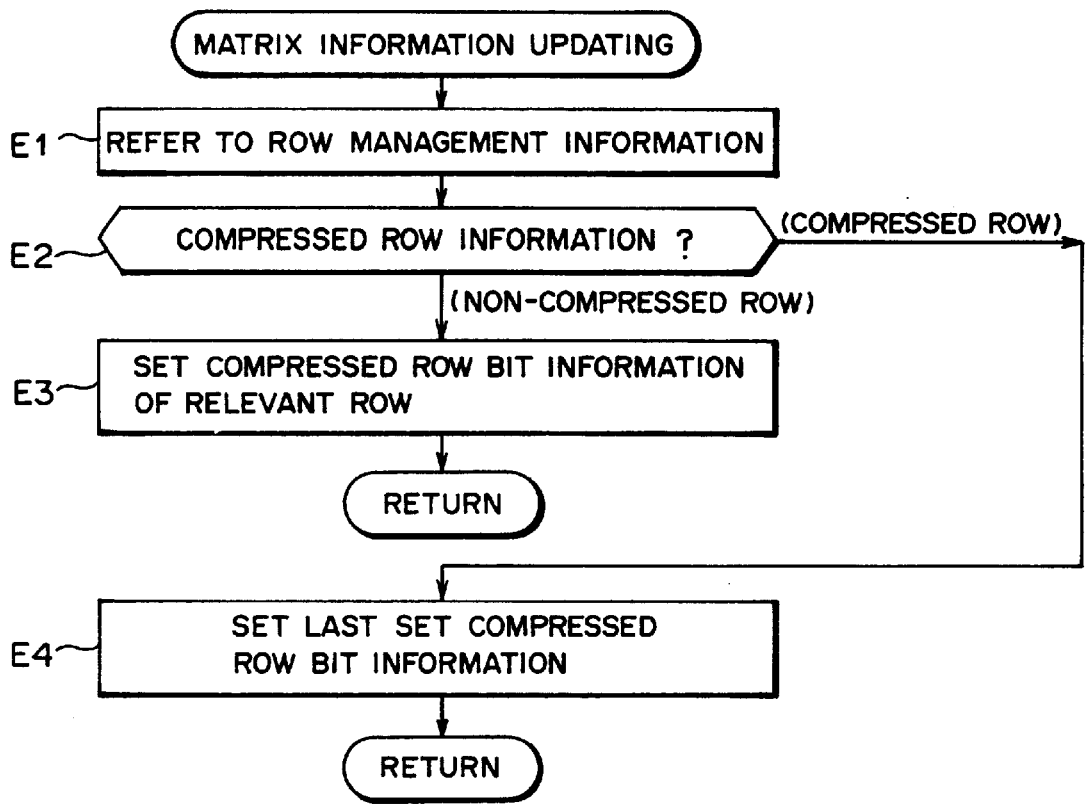

Further, the matrix table collation processing in step F6 described above will be described with reference to the flow charts shown in FIGS. 29 and 30.

Figure 31A:
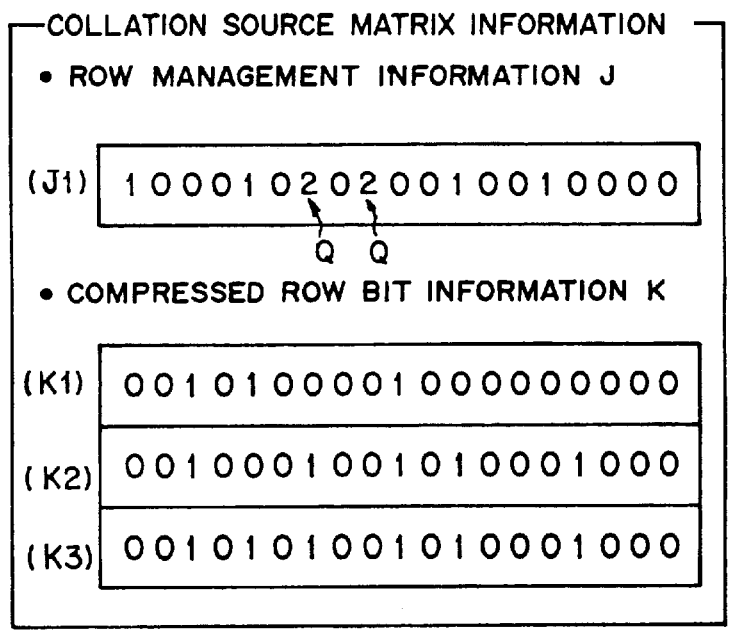
FIGS. 31(a) and 31(b) are views illustrating matrix information upon the matrix table collation processing by the data medium handling apparatus according to the embodiment of the present invention.

First, the layout collation processing section 3 produces and acquires such collation source matrix information as seen, for example, in FIG. 31(a), and sets compressed row bit information (K1) of the collation source matrix information to a collation source work region (step D1).

Figure 31B:
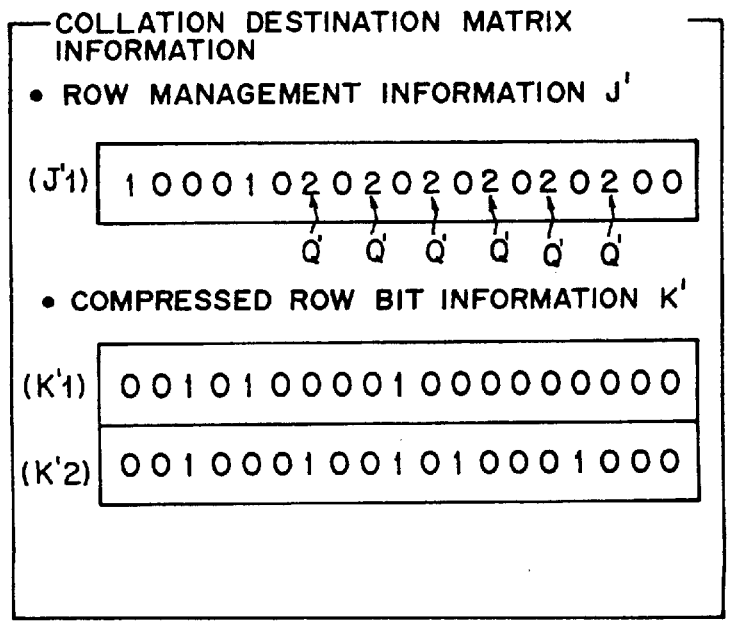

Further, for example, such collation destination matrix information as illustrated in FIG. 31(b) is acquired from the layout DB 14, and compressed row bit information (K'1) of the collation destination matrix information is set to a collation destination work region (step D2).

Then, the layout collation processing section 3 successively compares and collates the compressed row bit information (K1) and (K'1) beginning with the top bits to effect collation for one row (step D3).

Here, if the compressed row bit information (K1) and (K'1) does not exhibit coincidence, then incoincidence is set as the collation result 200 (refer to FIG. 22) (steps D4 and D10). However, since the compressed row bit information (K1) and (K'1) here is coincident, the collation source compressed row bit information K is set to the collation source work region based on the row management information J (steps D4 and D5).

In this step D5, the row management information J is referred to (step E1), and if the compression completion flag Q is set for the corresponding row of the row management information J, then it is discriminated that the row is a compressed row and the compressed row bit information K of the row collated last is set to the collation source work region (steps E2 and E4). However, if the compression completion flag Q is not set for the corresponding row of the row management information J, it is discriminated that the row is a non-compressed row, and compressed row bit information K of the newly corresponding row is set to the collation source work region (steps E2 and E3).

Further, also the collation destination compressed row bit information K' is set to the collation destination work region based on the row management information J' (step D6).

Also in this step D6, similarly as in step D5 described above, the row management information J' is referred to (step E1), and if the compression completion flag Q' is set for the corresponding row of the row management information J', it is discriminated that the row is a compressed row and the compressed row bit information K' of the row collated last is set to the collation source work region (steps E2 and E4). However, if the compression completion flag Q' is not set for the corresponding row of the row management information J', it is discriminated that the row is a non-compressed row, and compressed row bit information K' of the newly corresponding row is set to the collation source work region (steps E2 and E3).

If a result of comparison of the compressed row bit information K and K' for all rows reveals that all rows coincide with each other within a fixed range, then coincidence is set as the collation result 200 (steps D7 to D9).

On the contrary, if incoincidence is found in the comparison processing or row bit information of one of the comparison objects comes to an end before the comparison is completed, then incoincidence is set as the collation result 200 (steps D7, D8 and D10).

In this manner, with the matrix collation processing of the medium handling apparatus according to the embodiment of the present invention, since layouts of ruled line items which is one of components of a layout are compression processed so as to be represented as matrix tables and, upon layout comparison, the matrix tables are collated with each other, the layout collation processing speed merely increases linearly in proportion to the number of collation object layouts without relying upon the number of ruled line items. Consequently, collation processing of layouts of a large number of documents can be performed at a high speed.

In this instance, since the collation object layouts are represented in ruled line items which construct the layouts, the layouts can be represented stably.

Further, since, prior to compression processing of a bit table on which the layout of ruled line items is reflected, obliqueness correction and deformation correction processing is performed for read image data and Y coordinate unification processing and X coordinate unification processing are performed for the individual ruled line items to produce a subsampled bit table, a variation in layout which is produced upon reading of the image data can be absorbed.

Furthermore, since a bit table is compressed in accordance with a characteristic of a first order document, the number of layout components in the document can be compression represented efficiently.

(a5) Description of Characteristic Data Recognition Processing

Generally, in a character recognition apparatus, since ordinary characters make an object of recognition, a dictionary produced for an object of recognition taking a recognition ratio into consideration must be used, and an arbitrary graphic form designated dynamically cannot be recognized.

Further, since the object of recognition is presupposed to be characters, there are restrictions such as restrictions in region of an object of recognition and restrictions in setting of definition objects for recognition, and an arbitrary region cannot be set as an object of recognition.

Therefore, the data medium handling apparatus 30 according to the embodiment of the present invention is constructed such that a region image (layout) including characters, graphic forms and so forth which cannot be recognized in character recognition processing is recorded as characteristic data while code data corresponding to the characteristic data are recorded as additional information to the layout, and upon layout collation processing, collation between the characteristic data of the layouts is performed and, when coincident characteristic data are found, code data corresponding to the characteristic data are acquired and displayed as a result of recognition on the display unit so that characters, graphic forms and so forth which cannot be recognized in character recognition processing.

Figure 32:
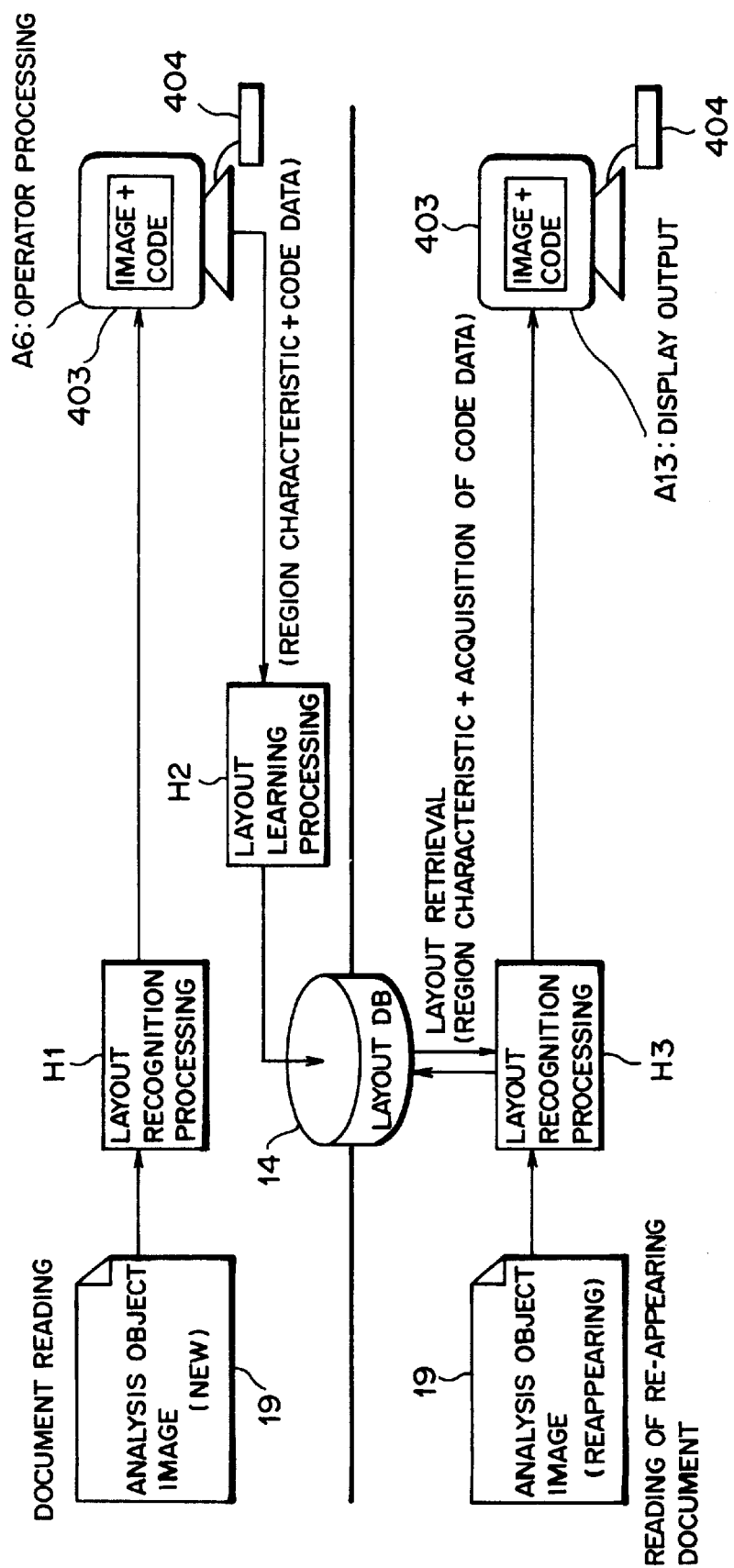
FIG. 32 is a diagrammatic view of processing wherein notice is taken of characteristic data recognition processing by the data medium handling apparatus according to the embodiment of the present invention.

A processing diagrammatic view in which notice is taken of the characteristic data recognition processing of the data medium handling apparatus 30 according to the embodiment of the present invention is shown in FIG. 32.

In the data medium handling apparatus 30 according to the present embodiment, the characteristic data recognition processing is performed, as seen in FIG. 32, by the registration step (steps H1, A6 and H2) of registering characteristic data into the layout DB 14 by learning processing, and the collation step (step H3) of collating whether or not registered characteristic data include characteristic data coincident with an image read separately.

Figure 33:
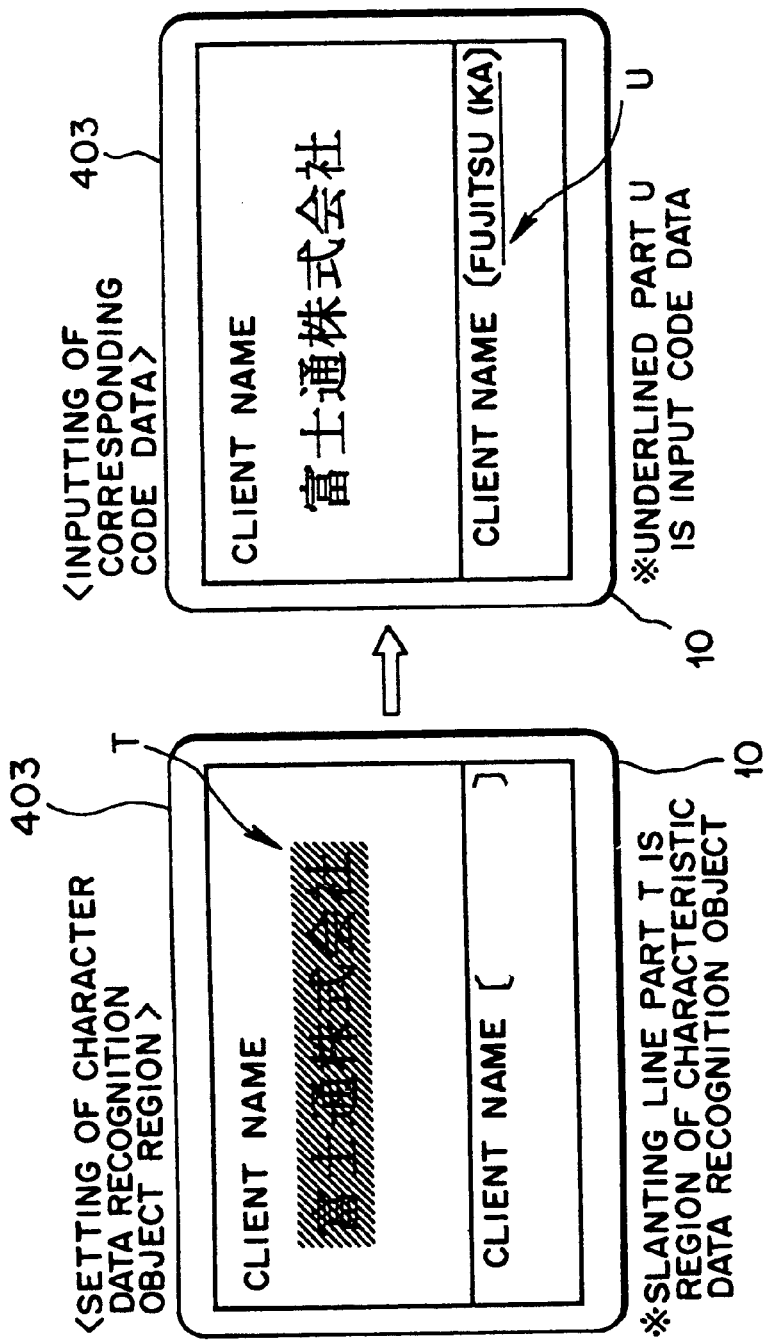
FIGS. 33 and 34 are views illustrating the character data recognition processing by the data medium handling apparatus according to the embodiment of the present invention.

In the registration step, characteristics in layout of a read image are extracted to analyze the structure of the layout (step H1), and the analyzed layout structure is displayed on a display unit 403 (step A6). Then, as seen in FIG. 33, layout learning processing (step H2) is performed such that a predetermined characteristic data recognition region T (indicated by slanting lines in FIG. 33) is set for the displayed layout structure, and code data U [in FIG. 33, "Fujitsu (Ltd)"] corresponding to emblem information (in FIG. 33, "富士通株式会") in the region T is inputted by means of an external inputting apparatus 404, whereafter region characteristic data are produced from the characteristic data recognition region T and the code data U and registered in a linked condition with the layout structure analyzed as described above.

In the data medium handling apparatus 30 according to the present embodiment, by performing, upon registration of region characteristic data, normalization processing for the characteristic data recognition region T, collation of the region characteristic data can be performed with certainty in the collation step which will be hereinafter described.

In this registration step, since code data having significance corresponding to emblem information are inputted upon inputting of code data U corresponding to emblem information into the region T mentioned above, the data medium handling apparatus 30 can display, if it recognizes the characteristic data recognition region T, corresponding code data as a result of recognition on the screen.

On the other hand, in the collation step, after the registration step described above, characteristics of an image read separately are extracted and the structure in layout is analyzed, and then the layout DB 14 is retrieved using the region characteristic data and the layout structure registered in the registration step as reference data to collate whether or not there is a coincident layout.

When the data medium handling apparatus 30 according to the embodiment of the present invention having the construction described above effects characteristic data recognition processing, characteristic data are registered into the layout DB 14 by learning processing, and it is collated whether or not some of registered characteristic data coincides with an image read separately. Then, if coincident characteristic data are found, then code data corresponding to the characteristic data are acquired and displayed as a result of recognition on the display unit 403.

Operation of the data medium handling apparatus 30 in this instance will be described in more detail with reference to FIGS. 32 to 34.

In particular, as seen in FIG. 32, if a document image 19 of an object of layout analysis is read newly, then the layout analysis processing section 2 analyzes the layout of the object document to produce layout information (step H1).

Here, in the operator confirmation/correction processing block 18 (refer to FIG. 1), an image of the document and the analyzed layout information are displayed on the display unit 403, and as seen in FIG. 33, a characteristic data recognition region T ("富士通株式会") is set by an operator and corresponding code data U ["Fujitsu (Ltd)"] are inputted from the external inputting apparatus 404 (step H6).

Further, the layout log information production processing section 11 produces region characteristic data from the region T designated by the operator and the inputted code data U and learns and registers the region characteristic data as layout correction information into the layout DB 14 together with the layout information acquired by the layout recognition processing block 16 (step H2).

Accordingly, the operations in the registration step are performed by the operator confirmation/correction processing block 18 and the layout log information production processing section 11 described above.

After the region characteristic data are registered into the layout DB 14 in this manner, if the document image 19 same as that processed as described above is read again, then the layout analysis processing section 2 analyses the object document and produces layout information.

Further, the layout collation processing section 3 retrieves the layout DB 14 using the analyzed layout information as a retrieval term so that the layout correction information for the document learned and registered in step H2 is acquired.

Here, it is collated whether or not the region characteristic data of the acquired layout correction information include region characteristic data corresponding to the image of the document being analyzed. If a result of the collation reveals that some region characteristic data satisfies the coincidence term with the image of the document being analyzed, code data U corresponding to the region characteristic data are set as a layout recognition result 20 (step H3).

Figure 34:
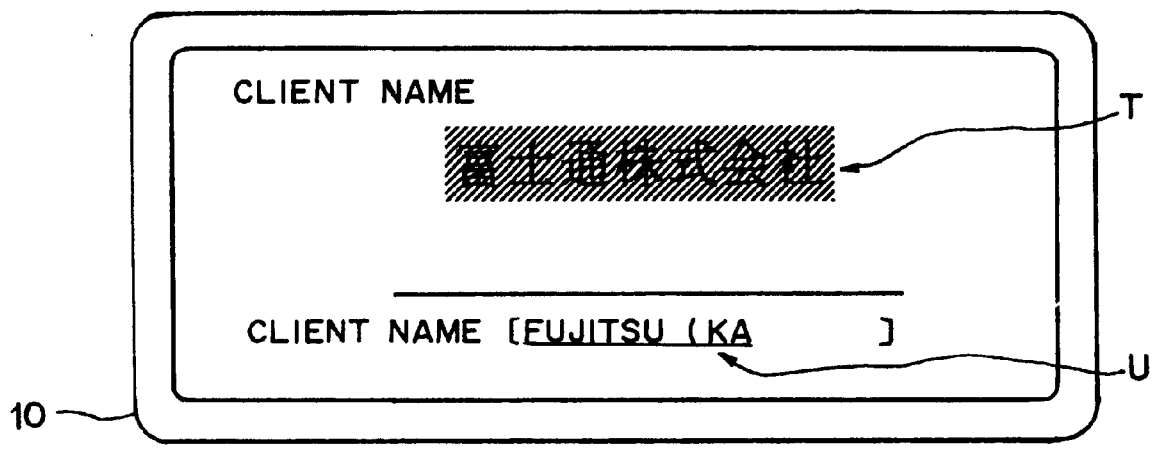

Then, in the operator confirmation/correction processing block 18, the document image read and the layout recognition result 20 are displayed on the display unit 403, and the characteristic data recognition region T and the corresponding code data U are displayed as a result of recognition of the characteristic data on the display unit 403 in a similar manner to that of an ordinary character recognition result 22 as seen in FIG. 34 (step A13).

In this manner, with the characteristic data recognition processing of the medium handling apparatus according to the embodiment of the present invention, a region image characteristic extraction mechanism and a characteristic collation mechanism similar to those of a character recognition apparatus are expanded in function and combined with a layout recognition system such that a characteristic data recognition region T designated by an operator in the registration step and corresponding code data U (recognition result code) are dynamically learned and registered into the layout DB 14 together with a result of a layout analysis, and when recognition of a document having the same layout as a layout learned already is to be performed, region characteristic data are acquired from the layout DB 14 together with the layout information in the collation step and collation of the region characteristic data with the region of a document image of an object of recognition is performed, whereafter corresponding code data U are acquired as a result of the collation and set and outputted as a result of recognition, thereby to allow recognition processing of an image of a graphic form in the designated region to be performed in an interlocking relationship with the layout recognition processing.

In particular, by registering an arbitrary designated region image as a recognition object region, the arbitrary region can be recognized to acquire corresponding code data without being limited to characters, and by dynamically learning the recognition object region into the layout DB 14 together with layout information, when the layout appears again, recognition processing of the recognition object region can be performed in an interlocking relationship with the layout recognition processing.

Further, in the present embodiment, since region characteristic data of an object of collation are recorded in a linked relationship with layout information, the object of collation can be limited in units of a layout, and consequently, a large amount of collation processing as is required with an ordinary character recognition apparatus need not be performed and a high recognition rate can be achieved.

Furthermore, since a plurality of recognition object regions can be set in a same document such that data thereof have a linked relationship, position information of a recognition object region in the layout and a data structure can be registered in a matching relationship to each other.

It is to be noted that such characteristic data recognition processing as described above can be applied also to 'kana' recognition processing of 'kanji' items or recognition processing of a client/recipient of an exchange general transfer document.

In particular, when a 'kanji' item on a document is to be recognized as characteristic data, a region of the item entered in 'kanji' is designated as a characteristic region, and corresponding code data are inputted in 'kana' and the characteristic data and the code data are learned and registered together with layout information of the document.

Where this countermeasure is employed, if layout recognition of a document having a layout same as the layout of another learned and registered document is performed, then code data of 'kana' can be acquired as a result of the recognition of the characteristic region of the 'kanji' item.

Further, similarly as in the case of the characteristic data recognition processing of the 'kanji' item, if an item of a rubber stamp, a signature of the like is designated as a characteristic data recognition item, then an item of a rubber stamp, a signature or the like which cannot be recognized by ordinary character recognition can be recognized, and corresponding code data can be acquired as a result of recognition of the characteristic region of the rubber stamp, signature or the like.

Figure 36:
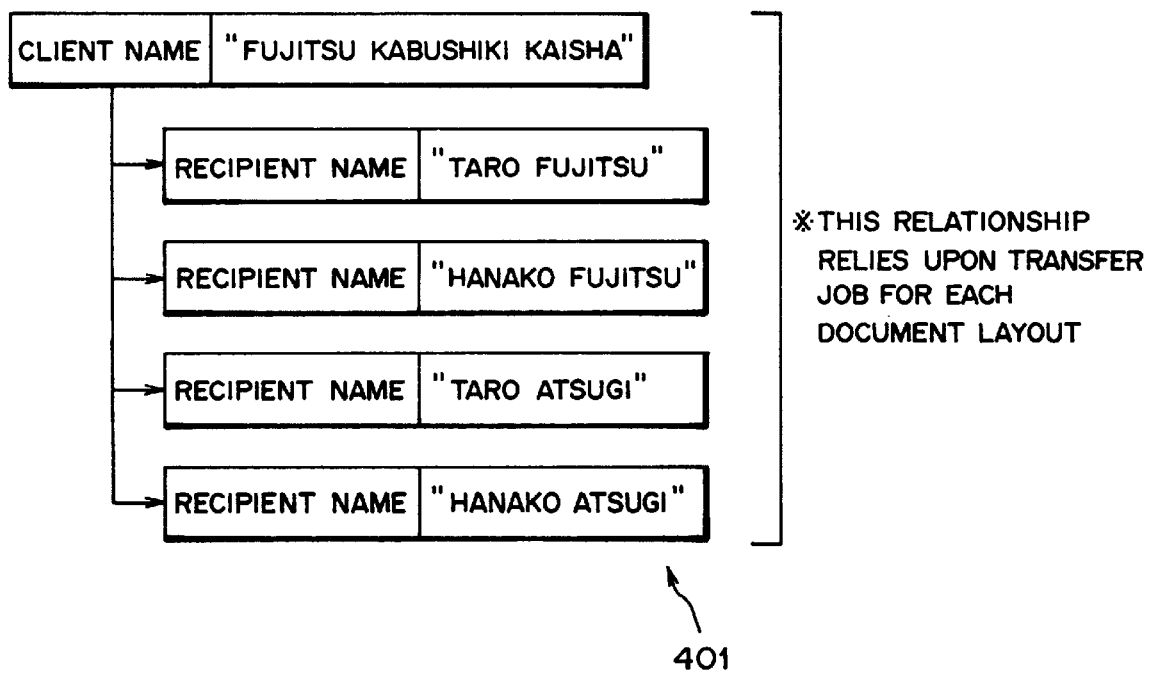

Furthermore, in an exchange general transfer document, the item of the full name of a client or the full name of a recipient to be entered does not have an arbitrary combination, but has a relationship which depends upon the document (refer to FIGS. 35 and 36).

Accordingly, by learning and registering, when the full names of a client and a recipient are to be learned and registered as characteristic data recognition items, relationships of them in a linked relationship, recognition with a higher degree of accuracy can be performed upon characteristic data collation.

(a6) Description of Caption Analysis Processing

In the data medium handling apparatus 30 according to the embodiment of the present invention, caption analysis processing wherein a caption position is searched and collated from a ruled line item structure of a document image of an object of analysis and item information corresponding to a caption entered on a document is automatically analyzed.

Here, the data medium handling apparatus 30 according to the present embodiment includes the layout analysis processing step A2 (or A9) of logically representing a layout of a read image, and the layout collation processing step A3 (or A10) of collating whether or not a layout coincident with the layout of the read image is present in the layout DB 14.

The layout analysis processing step A2 (or A9) extracts ruled line items of the layout of the read image, analyzes the structure of the layout, determines a caption region in the image from the extracted ruled line items, recognizes caption item information in the caption region to determine corresponding item data and logically represents the layout, and is effected by the layout analysis section 2B of the layout analysis processing section 2.

This layout analysis processing step A2 (or A9) includes the caption position candidate determination step of determining caption position candidates based on a structure analysis result of a layout, and the caption item collation step of collating caption item information in the caption region with the caption position candidates determined in the caption position candidate determination step.

It is to be noted that the collation processing of caption items in the caption item collation step is effected after normalization processing is performed, in the caption item collation step, for the image data to be collated in such a manner as described hereinabove with reference to FIG. 49.

On the other hand, the layout collation processing step A3 (or A10) retrieves the candidate layouts stored in the layout DB 14 using the ruled line items of the layout extracted in the layout analysis processing step as a restrictive retrieval term to collate whether or not there is a coincident candidate layout, and is effected by the layout collation processing section 3.

Figure 37:
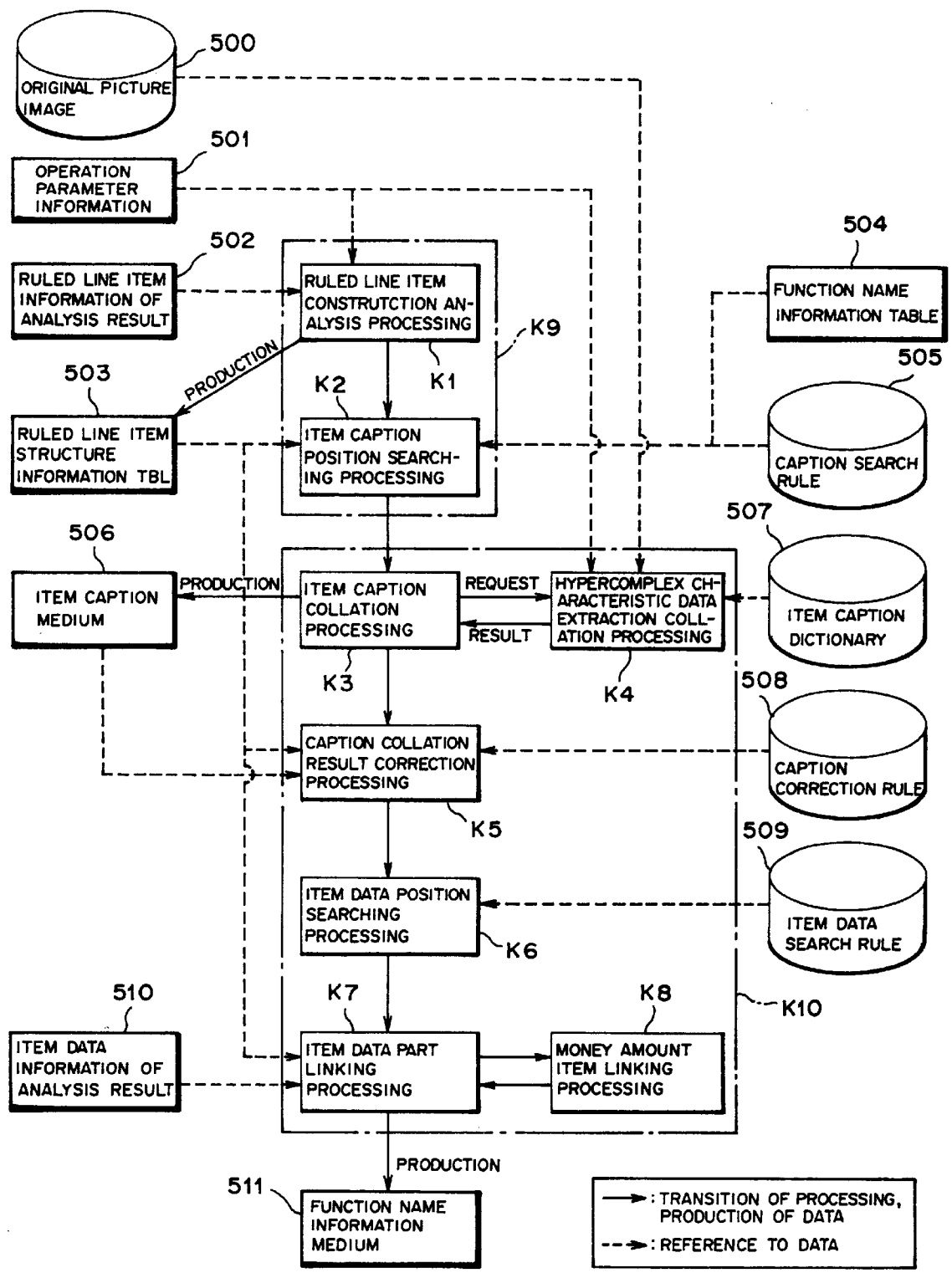
FIG. 37 is a diagrammatic view of processing wherein notice is taken of caption analysis processing by the data medium handling apparatus according to the embodiment of the present invention.

Here, a processing diagrammatic view in which notice is taken of the caption analysis processing of the layout analysis section 2B of the layout analysis processing section 2 of the data medium handling apparatus 30 according to the present embodiment is shown in FIG. 37.

As seen in FIG. 37, the layout analysis section 2B performs processing as the caption position candidate determination step K9 including ruled line item structure analysis processing (step K1) and item caption position searching processing (step K2) and then performs processing as the caption item collation step K10 including item caption collation processing (K3), hypercomplex characteristic data extraction collation processing (step K4), caption collation result correction processing (step K5), item data position searching processing (step K6), item data part linking processing (step K7) and money amount item linking processing (step K8).

The analysis dictionary 13 stores caption search rules 505, an item caption dictionary 507, a caption correction rule 508 and data search rules 509.

In the ruled line item structure analysis processing (step K1), ruled line item information 502 and table structure information (not shown) obtained by an analysis of a layout are referred to to produce a ruled line item structure information table (ruled line item structure information TBL) 503 as rule key information to be evaluated with caption position search rules which will be hereinafter described.

As a result of the table structure analysis by the table structure analysis section 2E of the layout analysis section 2B, such structure information as illustrated in FIG. 38 is added to individual ruled line items.

The ruled line item information 502 will be described with reference to FIG. 38. The ruled line item ID is ID information for identification of an individual ruled line item and is numbered uniquely upon ruled line item extraction. The group ID is an identification ID which is added to a same group when ruled line items are grouped. The block ID is an ID for identification between individual units into which a same group is divided so as to have a same ruled line item structure.

The table structure indicates whether or not ruled line items identified by a group ID have a table structure, and in order to prevent the discrimination between presence and absence of a table structure from being fixed, the discrimination between presence and absence of a table structure is performed with an item row number/item column number. It is to be noted that the item row number indicates a row structure of a ruled line item table present in a table rectangle in a group, and the item column number indicates a column structure of a ruled line item table present in a table rectangle in a group.

Further, the ruled line attribute is attribute information of individual ruled line items as components of a layout, and a corresponding relationship of it with a layout of a document is illustrated in FIG. 39.

As seen in FIG. 39, the following items are available as ruled line items other than those of the table structure.
(a) 1 ruled line item [1]
(b) 2 ruled line item [2]
(c) Block ruled line item [B]
(d) Nesting ruled line item [I]

Meanwhile, as seen in FIG. 39, the following items are available as ruled line items of the table structure.
(e) Ruled line item belonging to a caption row [H]
(f) Ruled line item belonging to a footer row [F]
(g) Ruled line item belonging to a body row [D]
(h) Ruled line item belonging to an upward convex [U]
(i) Ruled line item belonging to a downward convex [L]

It is to be noted that, since the document layout shown in FIG. 39 does not include a footer row, also the (f) ruled line item belonging to a footer line is not present.

Meanwhile, 1, 2, B, I, H, F, D, U and L appearing in [ ] of (a) to (i) are codes of individual ruled line attributes.

By the way, the row information indicates a row number of a ruled line item in a ruled line item table, and column information indicates a column number of a ruled line item in the ruled line item table.

Meanwhile, as shown by (d) of FIG. 39, the hierarchy information indicates a hierarchical relationship of ruled line items which have a nesting structure as a ruled line item attribute.

Further, the top/last indicates position information of a ruled line item in the same group.

Then, such ruled line item information 502 and table structure information obtained by the analysis of the layout as described above are referred to to produce a ruled line item structure information table (TBL) 503 [refer to FIGS. 40 and 41(a) to 41(d)].

On the other hand, in the item caption position searching processing (step K2), the ruled line items of the ruled line item structure information table (TBL) 503 produced in step K1 are evaluated with caption position search rules [refer to FIGS. 42, 43(a) and 43(b)] to determine caption position candidates.

The caption search rules 505 are designated beginning with a higher order one of them in conformity with an object document for analysis, and an example of the caption search rules 505 where the object document is an exchange general transfer document (first order table) is given below.

First, the caption position search rules other than those for a table structure will be described.

The ruled line items other than those of a table structure may include an upwardly convex ruled line item, a downwardly convex ruled line item and a ruled line item including a footer which belong to the same group as the table structure and ruled line items which belong to a group other than a group of the table structure and do not form a table, and caption position search rules for those ruled line items will be described below.
(a) Where a single ruled line item is involved, a caption part is present in the ruled line item (*data part is coexistent).
(b) Where ruled line items of one nest are involved, a caption part is present at the left side ruled line item of the nest.
(c) Where ruled line items of one nest are involved, a caption part is present at the upper side ruled line item of the nest.
(d) Where two or more ruled line items are involved, a caption part is present at the top ruled line item.
(e) Where two or more ruled line items are involved, a caption part is present at the top ruled line item and the following ruled line item.

Further, the caption search rules 505 for a table structure part will be described.

The ruled line items of a table structure are present at a maximum rectangular part including a table rectangle or 2 rows×2 columns or more in ruled line items in a same group, and a header part is present at the top row of the maximum rectangular part while a body part is present at the following row parts.

The caption position searching rules for such ruled line items as described above will be described below.
(f) A caption item having a plurality of data parts is present in a header line of a table constructing part.
(g) Where nesting ruled line items are present in the header line of the table constructing part, a complex caption is present on the upper side of the ruled line items.
(h) Where nesting ruled line items are present in the header line of the table constructing part, a child caption is present on the lower side of the rule line items.

Figure 44:
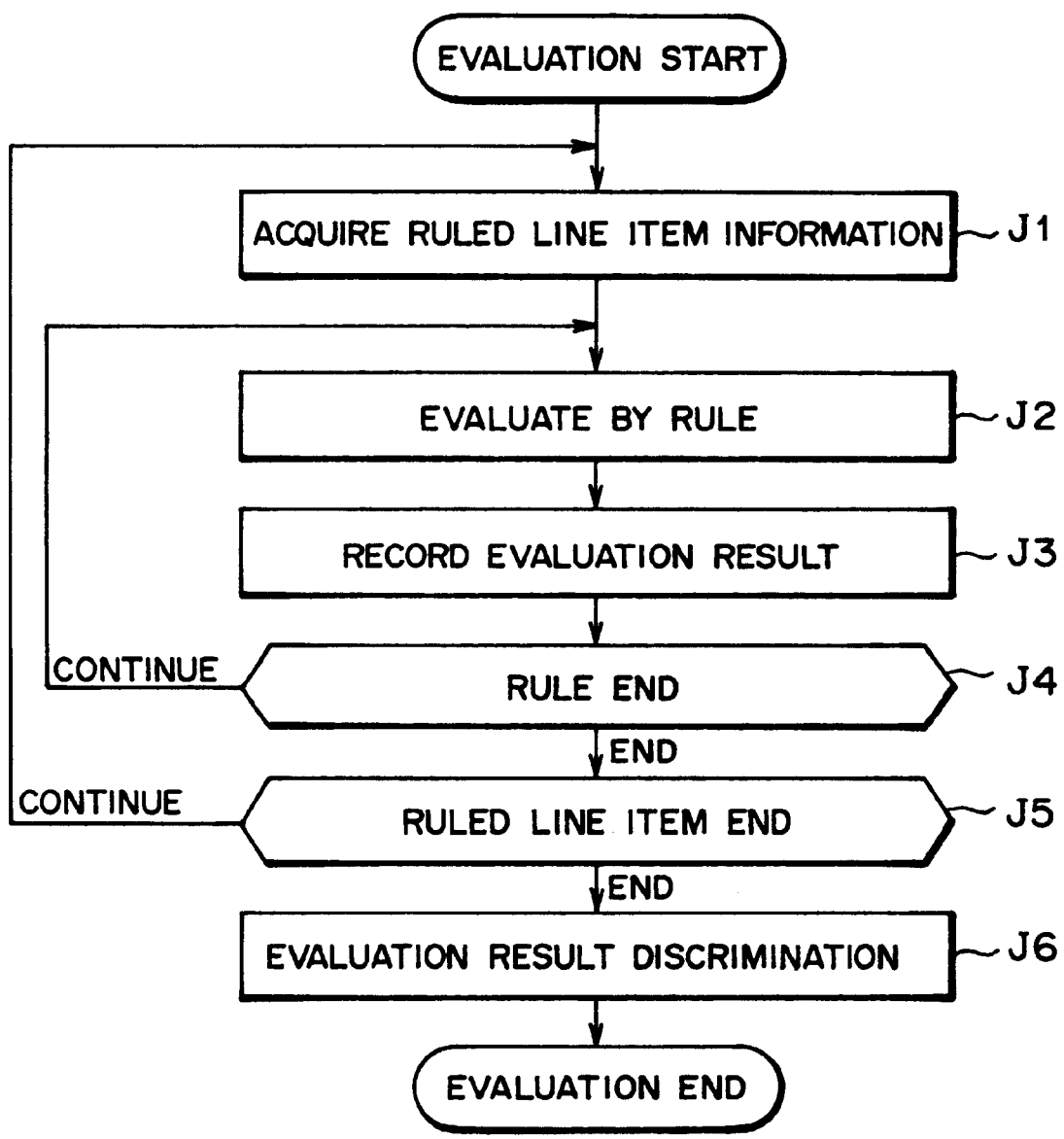
FIG. 44 is a flow chart illustrating the caption analysis processing by the data medium handling apparatus according to the embodiment of the present invention.

When the layout analysis section 2B effects the item caption position searching processing in step K2, determination of caption position candidates which make an object of caption collation is performed based on, for example, such caption search rules 505 as described above, and the processing in this instance will be described with reference to the flow chart of FIG. 44.

First, ruled line item information is extracted from the ruled line item structure information table (TBL) 503 produced in step K1 (step J1).

Then, evaluation of a caption position is performed based on the caption search rules 505 (step J2), and a result of the evaluation is recorded into the ruled line item structure information table (TBL) 503 (step J3).

Here, it is discriminated whether or not evaluation of a caption position has been performed based on all of the caption search rules 505, and if there remains some rule which has not been used for the evaluation of a caption position, then evaluation of a caption position is performed based on that rule (step J4 to steps J2 and J3).

Further, it is discriminated whether or not evaluation of a caption position has been performed for all of the ruled line item information, and if there remains some ruled line item information which has not been used for evaluation as yet, then evaluation is performed for the remaining ruled line item information (step J5 to steps J1 to J4).

Then, after evaluation of a caption position for all of the ruled line item information has been completed, an evaluation reference value in the operation parameter information 501 is referred to to determine caption position candidates (step J6).

Figure 45:
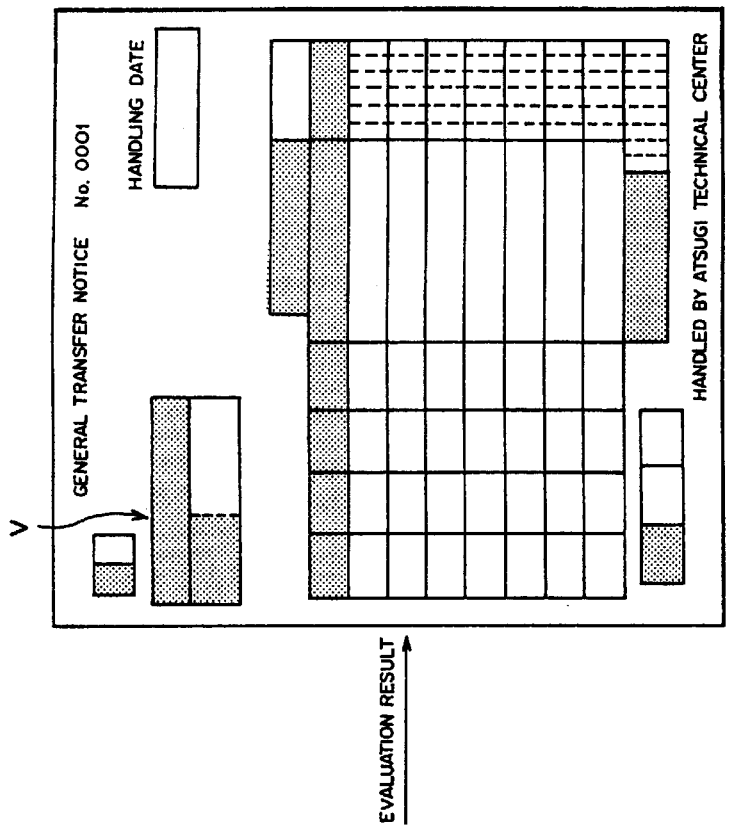
FIG. 45 is a view illustrating an example of a result of the caption analysis processing by the data medium handling apparatus according to the embodiment of the present invention.

For example, for the document shown in FIG. 39, ruled line items indicated with nets in FIG. 45 (netted portions V) are determined as caption position candidates.

Further, in the item caption collation processing (step K3), extraction collation processing for hypercomplex characteristic data is performed for the caption position candidates determined based on the caption search rules 505 to collate item data present in the ruled line items with the item caption dictionary 507 (step K4). Then, the positions of the ruled line items of the caption position candidates and function items corresponding to the captions are determined based on a result of the collation.

Here, caption item data (item data in a caption ruled line item) which makes an object of collation will be described.

A ruled line item of a caption position candidate may possibly include a plurality of caption item data.

In this instance, caption item data to make an object of collation are determined by the following method.

Figure 46A:
FIGS. 46(a) to 46(c), 47(a) to 47(c) and 48(a) to 48(c) are views illustrating examples of a caption upon the caption analysis processing by the data medium handling apparatus according to the embodiment of the present invention.

First, it is assumed that the caption item data to make an object of collation are maximum item data in a ruled line item of a caption position candidate, for example, as seen in FIG. 46(a).

Figure 46B:
Figure 46C:
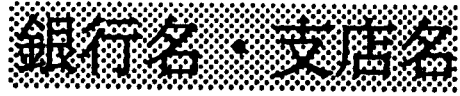

Here, if the caption is a single function caption, then since only one caption item data must be effective upon collation, it is assumed that the remaining item data are dust or some historiated initial such as a unit, for example, as seen in FIG. 46(b). But even where the caption is a complex function caption, it is assumed that caption item data are normally present continuously, for example, as seen in FIG. 46(c).

Figure 47A:
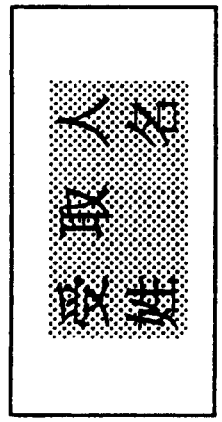
Figure 47B:
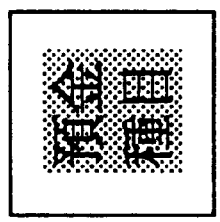
Figure 47C:

Meanwhile, in the case of such a vertically written caption as seen in FIG. 47(a) or such a caption which is composed of a plurality of rows as seen in FIG. 47(b) or 47(c), it is assumed that caption item data of an object of collation are present in a region in which successive item data are included.

In particular, assuming that vertically written item data begin with a location in the proximity of an X coordinate same as that of item data of the top row, the vertical written item data are present in a region of the item data of the top row integrated with following item data.

Figure 48A:
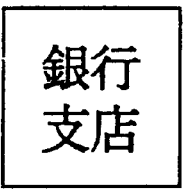
Figure 48B:
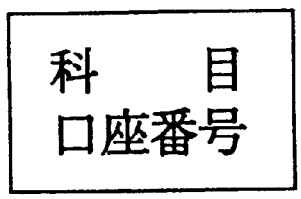
Figure 48C:
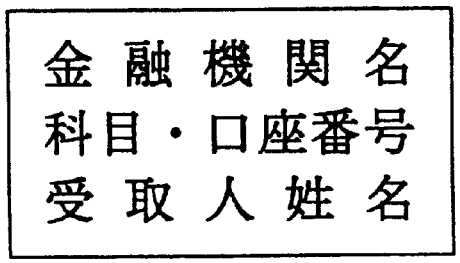

However, in the case of such a complex caption as shown in FIG. 48(a) or 48(b) or in the case of such a plural row caption as shown in FIG. 48(c), caption item data cannot be determined correctly.

Accordingly, in the present processing, only a region integrated under the conditions described above is processed regarding it as item data.

By the way, in the hypercomplex characteristic data extraction collation processing (step K4) in caption item collation step K10, normalization processing is performed for the caption item. Consequently, even if there is a difference in inscription or in print font/print pitch between different documents, all images of caption item data to be matched upon caption collation can be stored into the item caption dictionary 507.

Against the difference in print font, a countermeasure is taken to effect collation of caption items by collation based on hypercomplex characters after normalization processing by weight center division into four sections (hand written character recognition technique).

Figure 49:
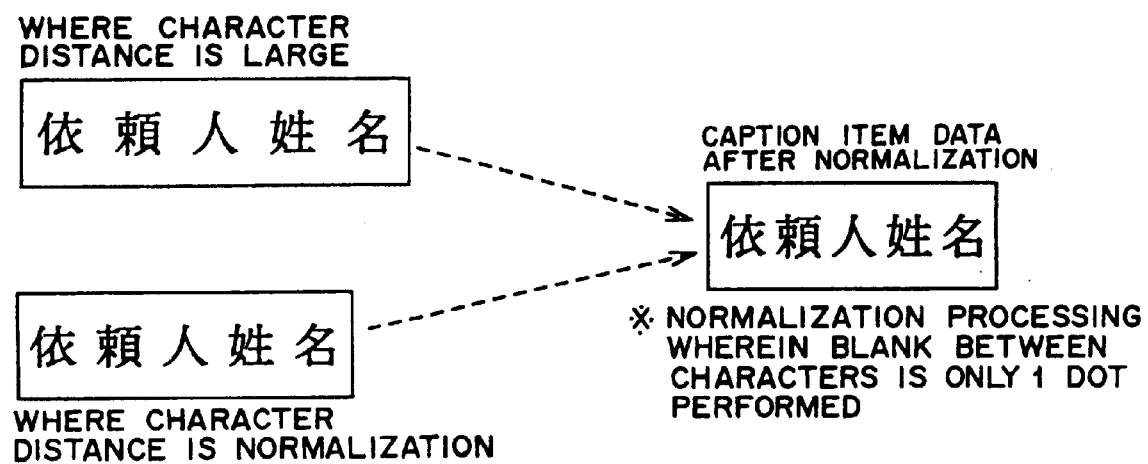
FIG. 49 is a view illustrating an example of normalization processing upon the caption analysis processing by the data medium handling apparatus according to the embodiment of the present invention.

Meanwhile, against the difference in print pitch, a countermeasure is taken to normalize blanks between characters of caption item data to be collated so that they may be have a fixed amount (for example, one dot) as seen in FIG. 49.

Further, against the difference in inscription of an item caption, a countermeasure is taken to have a plurality of kinds of inscriptions of representative caption expressions in advance in the item caption dictionary 507.

Figure 50:
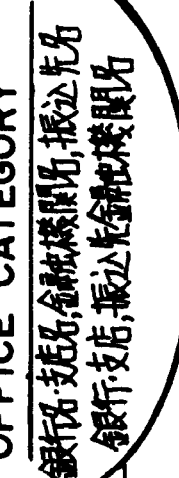
FIG. 50 is a view illustrating an item caption dictionary to be used in the caption analysis processing by the data medium handling apparatus according to the embodiment of the present invention.

The item caption dictionary 507 stores images of caption item data acquired from sample documents in advance as hypercomplex characteristic information after they are normalization processed. Further, in order to absorb a difference in inscription between captions, item captions indicating a same function are classified into and stored in a same category as seen in FIG. 50.

Then, when caption item data are collated by the character collation extraction processing in step K4, category IDs, caption image IDs and difference degrees of the individual candidate captions are reported in order of the candidates as a result of the collation as seen in FIGS. 51(a) and 51(b).

Further, caption contents at the caption item position are determined referring to caption collation parameters (Th1 and Th2) of the operation parameter information 501.

In particular, those contents which satisfy a difference degree requirement that the difference degree of the first candidate caption of the result of collation is equal to or lower than the collation parameter (Th1) and a difference degree difference requirement that the difference degree difference between the first candidate of the result of collation and another candidate having a different category ID (different in function item) is equal to or higher than the collation parameter (Th2) are determined as caption contents at the caption item position.

For example, in an example shown in FIG. 51, if evaluation is performed under the consumption that Th1=1,000 and Th2=2,000, then the following results are obtained, and consequently, it can be seen that the result of the collation satisfies the two requirements (difference degree requirement and difference degree difference requirement) described above.

Difference degree requirement: $(350) \leq (Th1=1,000) \rightarrow OK$

Difference degree difference requirement: $|(2,700-350)| \geq (Th2=2,000) \rightarrow OK$ When collation of caption item data is performed in this manner, possible resultant cases are a case (case 1) wherein all collation results are OK and the analysis of the caption item has been performed fully successfully, another case (case 2) wherein the analysis has failed with some caption items and a further case (case 3) wherein the analysis has failed with almost all caption items.

Here, in the case of the case 1, the results of collation are reported as they are as a caption analysis result, but in the case of the case 3, it is determined that the caption analysis has resulted in failure, and the result of recognition of the document is reported as rejection to the origin of the request.

On the other hand, in the case of the case 2, the caption collation result correction processing (step K5) is performed. Consequently, in a particular case, a caption item which has not been analyzed can be analyzed.

For an essential caption item which is defined by a caption row of a table structure part as a result of the collation of the caption item, in the following case, correction is performed in accordance with the caption correction rules 508 (caption collation result collection processing with the caption correction rules 508, step K5). It is to be noted that the caption correction rules 508 are applied only when a result of collation is undefined, but cannot be used in such a manner as to deny the result of collation.

Here, if correction is performed with the caption correction rules 508 where one of composite caption items having a nesting structure is undefined as seen in FIG. 52(a), then the remaining function items can be determined uniquely from function item contents of the composite caption items (this is because, in the case of "NAME OF FINANCIAL ORGAN" of the composite caption items, the captions of "NAME OF BANK" and "NAME OF BRANCH OFFICE" correspond without fail to the caption items of the nest), the caption item (netted portion W) which has not been analyzed successfully can be analyzed.

Further, if correction is performed with the caption correction rules 508 where, for example, only one of captions of essential items in a caption row of a general transfer document is undefined as seen in FIG. 52(b), then since function items to be included in the caption row are determined uniquely from the function name information table, the caption item (netted portion W) which has not been analyzed successfully can be analyzed.

Furthermore, if correction is performed with the caption correction rules 508 where only one of essential caption items to be included other than the caption row is undefined as seen in FIG. 52(c) and only one undefined caption candidate position is present, then where the numbers of caption position candidates and essential caption items coincide with each other, the caption item (netted portion W) which has not been analyzed successfully can be analyzed since it can be determined by a method of elimination of any defined caption.

It is to be noted that, in FIGS. 52(a) to 52(c), any caption item which has not been analyzed successfully is indicated by the netted portion W, and any other caption item which has been analyzed by the caption collation correction processing is indicated by another netted portion W'.

In the meantime, in the item data position searching processing (step K6), the ruled line item positions of item data corresponding to caption items defined finally as a result of the caption item collation are searched.

First, searching for the ruled line item positions of item data corresponding to caption parts is performed, similarly to the searching for caption item (caption ruled line item) positions, by evaluation of individual ruled line items of the ruled line item structure information table (TBL) 503 with the data search rules 509.

Here, the item data position search and the caption item position search are different in that, in the case of the item data position search, since caption items are determined already, the captions are first evaluated to select a search rule and then the rule is applied to the individual ruled line items and that, while, in the case of the caption item position search, caption position candidates are first determined because collation processing of caption items is involved, in the case of the item data position search, item data positions must be determined as a result of the searching processing.

Then, in the search for item data positions, item data positions (ruled line item positions of item data) corresponding to the determined caption items are determined based on the ruled line item structure information table (TBL) 503 and the data search rules 509.

Figure 53:
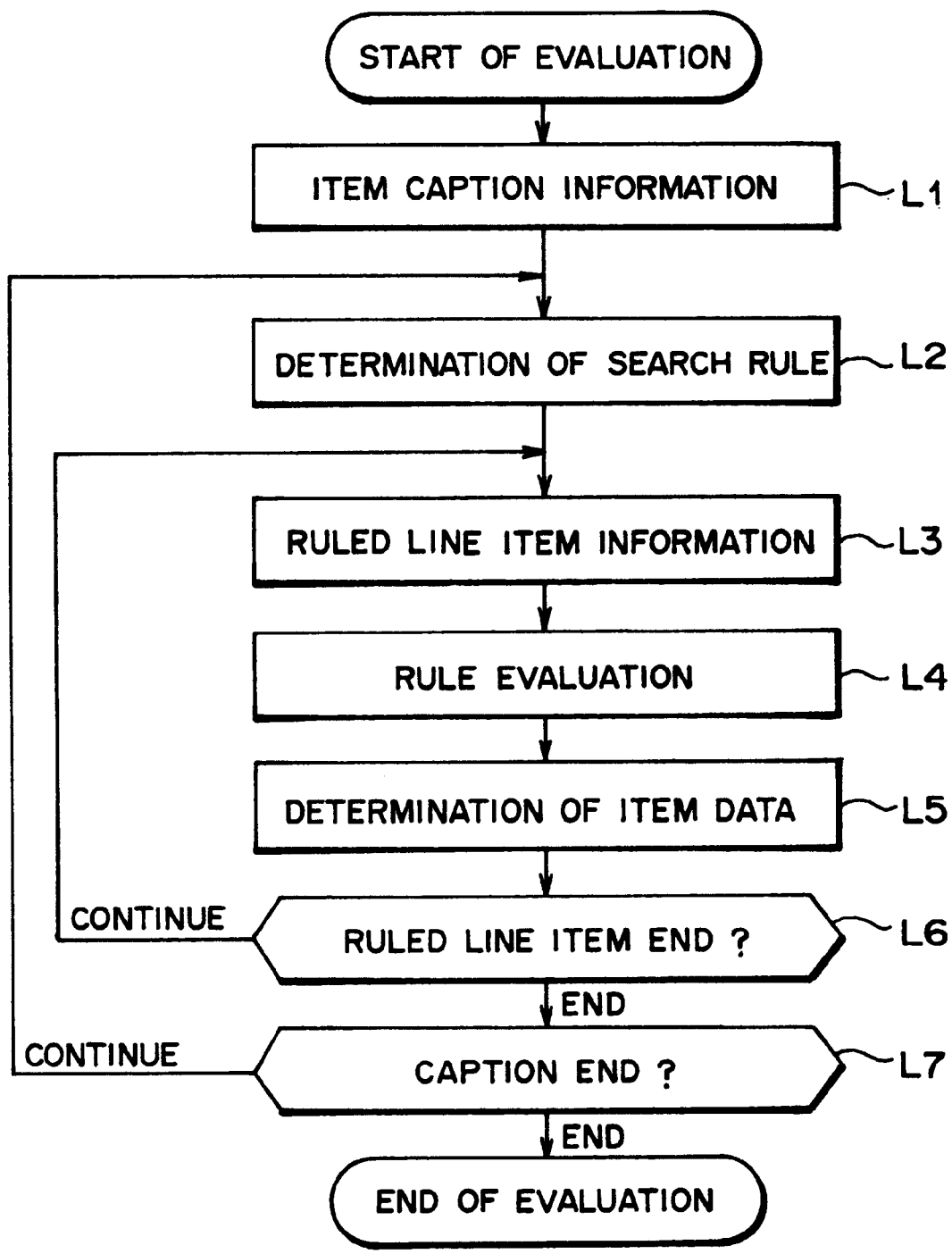
FIG. 53 is a flow chart illustrating the caption analysis processing by the data medium handling apparatus according to the embodiment of the present invention.

The operation then will be described with reference to the flow chart of FIG. 53. First, caption item information determined by the caption analysis is extracted (step L1), and the data search rules 509 corresponding to the thus extracted caption items are determined (step L2).

Thereafter, ruled line item information is extracted from the ruled line item structure information table (TBL) 503 (step L3), and evaluation with the data search rules 509 is performed (step L4).

Then, item data positions are determined by a result of the evaluation, and ruled line IDs of the determined item data positions are set as function name information (step L5).

Further, it is discriminated whether or not the evaluation has been completed for all of the ruled line item information, and if the evaluation has not been completed, then evaluation for next ruled line item information is performed subsequently (steps L6 and L3 to L5).

Furthermore, it is discriminated whether or not item data positions corresponding to all of the caption item information have been determined, and if there remains a caption item whose item data position has not been determined, then processing is performed for next caption item information (steps L7 and L2 to L6).

Here, connection rules between caption part ruled line items and data part ruled line items are defined in the following manner unless a table structure is concerned.
(a) Ruled line items of the data part are ruled line items following the caption part [refer to FIGS. 54(a) and 54(b)].
(b) Where there is no ruled line item following the caption part, the data part is present in the same ruled line item as that of the caption part [refer to FIG. 54(c)].
(c) Where a plurality of ruled line items follow the caption part, the data part is present in ruled line items up to a position at which another independent caption appears [refer to FIGS. 54(d) and 54(e)].
(d) Where the caption part is present in the parent of nesting ruled line items, the data part is present in a child ruled line item [refer to FIGS. 54(f) and 54(g)].
(e) Where two ruled line times are present, there is the possibility that the caption and the data part may be present in the same ruled line item [refer to FIG. 54(h)].

Meanwhile, connection rules between caption part ruled line items and data part ruled line items are defined in the following manner where a table structure is involved.
(f) Where the table is a vertical one dimensional table, the data part follows a ruled line item of a column direction of a caption ruled line item [refer to FIG. 55(a)].
(g) Where the table is a vertical one dimensional table and the caption includes two rows, the data part follows a ruled line item of a column direction of a caption ruled line item [refer to FIG. 55(b)].
(h) Where the table is a vertical one dimensional table and the caption includes nesting items, the data part follows a ruled line item of a direction of a parent caption ruled line item [refer to FIG. 55(c)].
(i) Where the table is a vertical one dimensional table and the caption is a composite caption, the data part follows a ruled line item of a column direction of a composite caption ruled line item [refer to FIG. 55(d)].
(j) Where the table is a horizontal one dimensional table, the data part follows a ruled line item of a row direction of a caption ruled line item [refer to FIG. 55(e)].
(k) Where the table is a two dimensional table, the data part follows a ruled line item of a column/row direction of a caption ruled line item [refer to FIG. 55(f)].

Here, an example of determination of item data positions corresponding to caption items is shown in FIG. 56. It is to be noted that, in FIG. 56, each caption item determination position is indicated by a netted portion X while an item data position is denoted by X', and a linked relationship between a caption item determination position and item data positions is indicated by an arrow mark.

Further, in the item data part linking processing (step K7), data part ruled line item positions corresponding to caption ruled line items are referred to to determine item data positions in data part ruled line items and set linked relationships between them.

Figure 57:
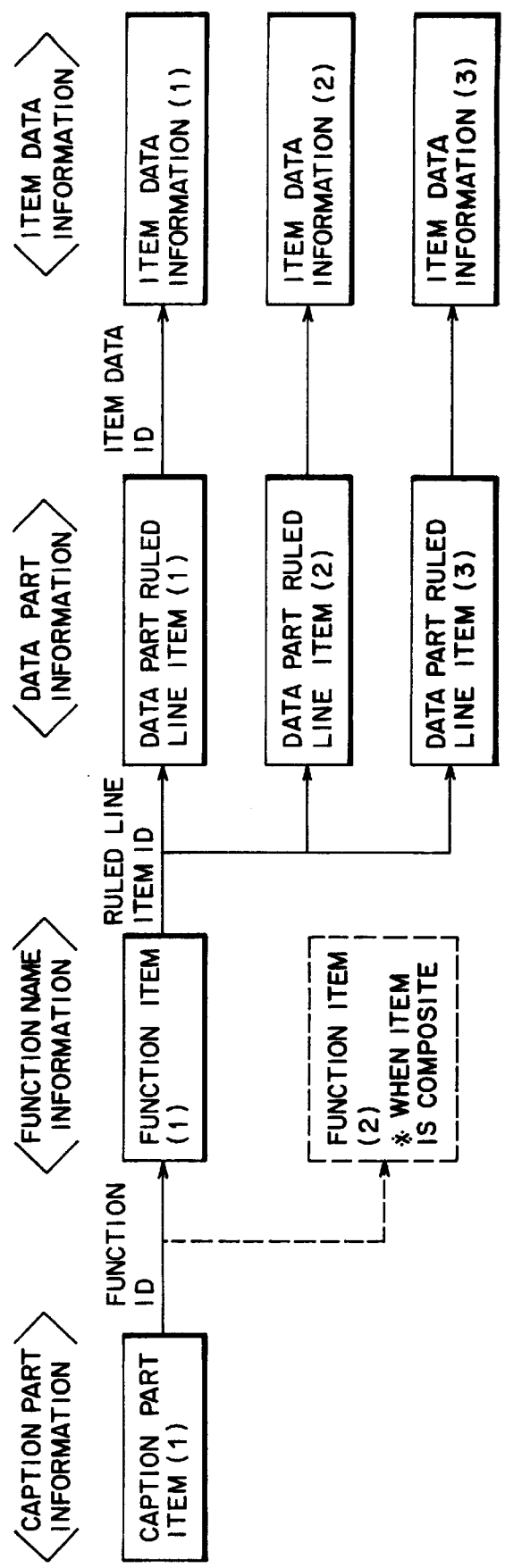

Linked relationships from the caption part to the corresponding item data part is illustrated in FIGS. 57 and 58.

Here, where more than one item data are present in a ruled line item or a rectangular region in which the item data part is present, item data to be linked with function items are determined in accordance with the operation parameter information 501.

Where to be linked from a single function item, item data of a designated row number and a designated column number are linked from designated row and column positions in accordance with the operation parameter information 501 [refer to FIG. 59(a)].

Here, where to be linked from a single function item, the operation parameter information 501 of an item data link include the following information.
(a) A designated number of rows beginning with a designated row are linked (*default: designated row first row, designated row number=one row). However, where the number of item data rows is smaller than the designated row number, all item data rows in the region are linked.

(b) A designated number of columns beginning with a designated column are linked (*default: designated column=first column, designated column number=total number of columns). However, where the number of item data columns is smaller than the designated column number, all item data columns in the region are linked.

On the other hand, where to be linked from composite function items, item data of a designated row number and a designated column number from designated row and column positions are linked in order of definition of function items in accordance with the operation parameter information 501, and following item data are linked similarly for following function items [refer to FIG. 59(*b*)].

Here, where to be linked from composite function items, the operation parameter information 501 of an item data link includes the following information.

(c) Where $N \geq K$ and $M > K$, item data rows are allocated in order of function item links.

(d) Where $N > K$ and $M \geq K$, item data columns are allocated in order of function item links.

(e) Where $N \geq K$ and $M \geq K$, item data rows are allocated in order of function item links.

(f) Where $N \geq K$ and $M \geq K$, item data columns are allocated in order of function item links.

(g) Where $N < K$ and $M < K$, allocation is impossible, and item data are not linked.

It is to be noted that, in the description above, N is an item row number, M is an item column number, and K is a function item number.

Then, in the money amount linking processing (step K8), where the function item of an analyzed caption item is an amount of money, a service fee or the like, a ruled line item structure to which corresponding item data belong is checked, and if the structure is a one column delimited ruled line item, then the individual one column ruled line items are connected to each other to form information of data of a single item, and the item data are linked to the function item.

Here, where the item data part corresponding to the caption part is divided in three or more (according to an operation parameter designation value) ruled line items and the sizes of the individual rule line items are lower than an operation parameter setting value and besides the caption function is determined to be an amount of money, it is discriminated that the ruled line item is a one column delimited ruled line item [refer to FIGS. 60(*a*) and 60(*b*)].

Then, if it is discriminated that the ruled line item of the item data part is formed from one column delimited ruled line items, then relationships between links of the individual ruled line items are successively set beginning with a ruled line item for the top column and the ruled line items are handled as successive ruled line items to connect the ruled line items [refer to FIG. 60(*c*)].

Further, where ruled line items of the item data part are formed from ruled line items for one column delimitation, since also item data in the individual ruled line items are in a divided state, the individual item data are integration processed to set them as single item data to connect those item data to each other [refer to FIG. 60(*d*)].

It is to be noted that, while, in the foregoing, description is given of a case wherein ruled line items are one column delimited ruled line items, also three column delimited ruled line items are processed in a similar manner.

Also for a three column delimited money amount section, connection of ruled line items and item data is performed in a similar manner as in the case of a one column delimited money amount section. However, since a three column delimited money amount section has a smaller column width and a smaller ruled line item number, different requirements from those for a one column delimited money amount section are set [refer to FIGS. 60(*e*) and 60(*f*)].

When the data medium handling apparatus 30 according to the embodiment of the present invention having the construction described above performs caption analysis processing, in the layout analysis processing step A2 (or A9), characteristics of a layout of a read image are extracted to analyze the structure of the layout, and a caption region in the image is determined based on the extracted characteristics. Then, caption item information in the caption region is recognized and corresponding item data are determined, and the layout is represented logically.

Then, in the layout collation processing step A3 (or A10), the candidate layouts stored in the layout DB 14 are retrieved using the characteristics of the layout extracted in the layout analysis processing step A2 (or A9) as a restrictive retrieval term to collate whether or not there is a coincident candidate layout.

In this manner, with the data medium handling apparatus 30 according to the embodiment of the present invention, since a caption item described on an object document for analysis and item data corresponding to the caption item can be identified by layout recognition processing after caption analysis processing wherein a caption position is searched and collated from a ruled line item structure of an image of the document and item information corresponding to a caption described on the document is automatically analyzed is performed, character recognition of item data can be performed immediately without performing character recognition processing of the caption item.

Figure 61:
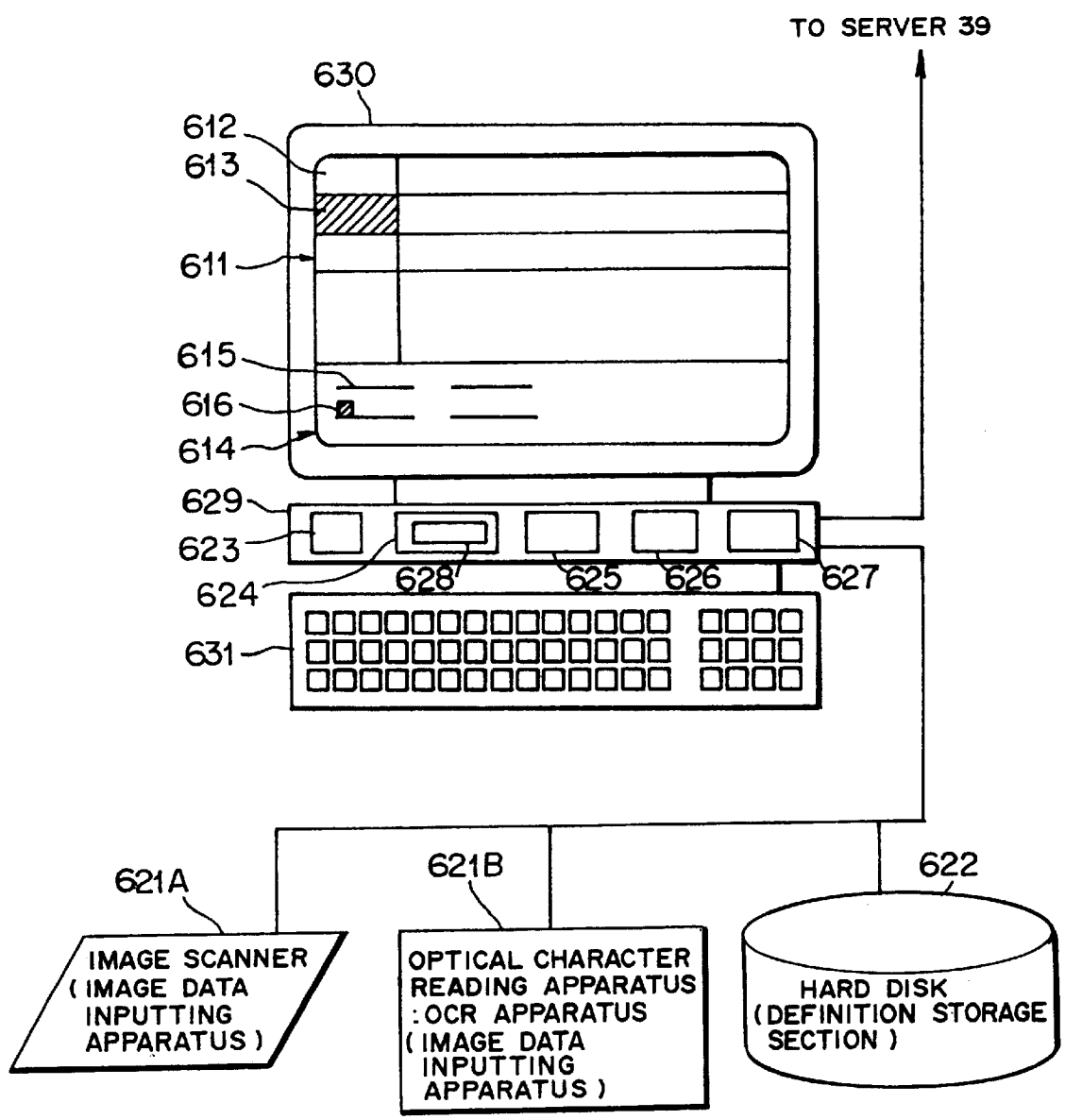
FIG. 61 is a schematic view showing a construction of an image data display apparatus according to the embodiment of the present invention.

(a7) Description of Confirmation and Modification Processing of and to a Result of Recognition (1) Description of the Image Data Display Apparatus FIG. 61 is a schematic view showing a construction of an image data display apparatus 640 in the embodiment of the present invention. The image data display apparatus 640 performs remittance requesting processing by displaying, as image data, a document on which a person to remit money (this person is specified by its name), an account number (account No.), an amount of remittance and so forth are described and inputting remittance data such as the account number, the name, and the amount of remittance by an operator operating a keyboard or a like apparatus or performs remittance requesting processing by performing confirmation of whether a result of character recognition of image data (remittance data) by some other apparatus or the like is correct or wrong by visual observation of an operator and performing amendment to the result of character recognition when necessary. The image data display apparatus 640 corresponds to the client 10 of the data medium handling apparatus 30 shown in FIG. 6.

In particular, the image data display apparatus 640 is constructed such that, although an operator can visually observe image data displayed on a display unit and perform an inputting operation, character recognition may be performed automatically when, for example, a document is read by an image data inputting apparatus such as an OCR apparatus and the operator can perform an inputting operation only with regard to a character which has been recognized in error or has not been recognized successfully.

The image data display apparatus 640 shown in FIG. 61 includes an image scanner 621A and an optical character reading apparatus (OCR apparatus) 621B which serve as image data inputting apparatus, a keyboard 631 serving as data inputting means, a computer main frame 629 serving as a display control apparatus, a display unit 630 and a hard disk 622.

It is to be noted that the image data display apparatus 640 is connected to the server 39 shown in FIG. 6 and functions as a work station which outputs image data (remittance data) from the image scanner 621A to the server 39, receives a result of character recognition of the image data character recognized by the server 39, and displays the received result of character recognition on the display unit 630, and outputs the remittance data confirmed and modified by an operator to the server 39.

The image scanner 621A reads image data of a document such as a remittance requesting slip of a bank or the like including information of a plurality of items and inputs the image data to the image data display apparatus 640.

The OCR apparatus 621B reads image data and performs character recognition of the read image data similarly to the image scanner 621A.

In the present embodiment, both of the image scanner 621A and the OCR apparatus 621B are provided for the image data display apparatus 640 so that image data of various formats can be handled.

It is to be noted that, where image data are read by the OCR apparatus 621B, a result of character recognition of the image data is displayed on the display unit 630 of the image data display apparatus 640.

The display unit 630 has an image data display area 611 and an item data display area 614 and displays inputted image data of a document in such a manner as seen, for example, in FIG. 70.

Here, the image data display area 611 is an area portion in which image data of a document inputted form the image scanner 621A or the OCR apparatus 621B are to be displayed.

The image data display area 611 displays image data including information of a plurality of items and displays, in FIG. 70, image data including information of four items 612 of an "account number (account No.)", a "name", a "correspondent (transaction)" and an "amount of money".

The item data display area 614 is provided in order to input remittance data corresponding to an image data portion of a desired one of the items 612 of the image data display area 611 using the keyboard 631.

The item data display area 614 has a plurality of data input display area portions 615. In FIG. 70, the item data display area 614 has four data input display area portions 615 of "item 1 to item 4", wherein the "item 1" corresponds to the "account number"; the "item 2" corresponds to the "name"; the "item 3" corresponds to the "transaction"; and the "item 4" corresponds to the "amount of money".

A desired one of the data input display area portions 615 is indicated by a cursor indicator 616, and remittance data displayed at an image data portion of a desired one of the items 612 corresponding to it can be inputted. It is to be noted that inputting of data can be performed using the keyboard 631 serving as data inputting means.

Further, the image data display apparatus 640 shown in FIG. 61 includes the hard disk 622 as described hereinabove. The hard disk 622 serves as a definition storage section for storing image data division information as definition information. It is to be noted that the image data division information signifies information for dividing image data of a document inputted from the image scanner 621A or the OCR apparatus 621B into image data portions of the plurality of items 612.

The computer main frame 629 shown in FIG. 61 functions as a display control apparatus (the computer main frame 629 may hereinafter referred to as display control apparatus 629), and displays, in the image data display area 611, image data obtained by inputting them from the image scanner 621A or the OCR apparatus 621B. The computer main frame 629 further indicates, when data corresponding to an image data portion of a desired one of the items 612 is to be inputted from the keyboard 631, the cursor indicator 616 in the data input display area portion 615 for the desired item 612 in the item data display area 614.

The computer main frame 629 recognizes ruled lines of image data of a document inputted form the image scanner 621A or the OCR apparatus 621B using the image data division information stored in the hard disk 622, converts the ruled lines into a table which includes image data portions of a plurality of items 612, and displays the image data obtained by the conversion in the image data display area 611.

Figure 62:
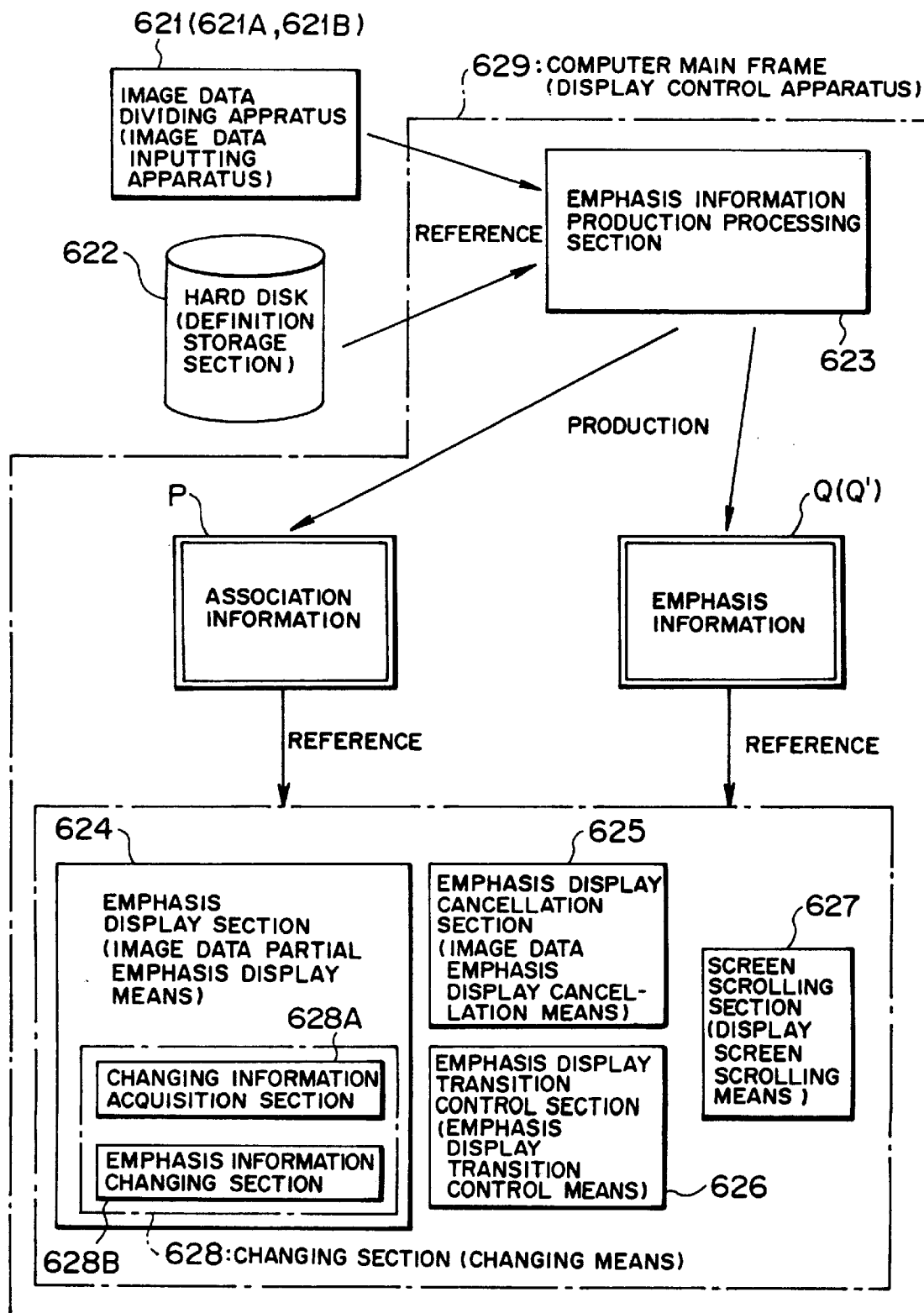
FIGS. 62 and 63 are functional block diagrams of the image data display apparatus according to the embodiment of the present invention.

Further, the computer main frame 629 shown in FIGS. 61 and 62 and serving as a display control apparatus includes an emphasis information production processing section 623, an emphasis display section 624 serving as image data partial emphasis display means, an emphasis display cancellation section 625 serving as image data emphasis display cancellation means, an emphasis display transition control section 626 serving as emphasis display transition control means and a screen scrolling section 627 serving as display screen scrolling means.

The emphasis information production processing section 623 refers to image data inputted from an image data dividing apparatus 621 serving as an image data inputting apparatus or image data division information (definition information) stored on the hard disk 622 to produce association information P and emphasis information Q.

The association information P is information for associating the "item 1 to item 4" in a corresponding relationship with the "account number", "name", "transaction" and "amount of money", respectively, as seen in FIG. 68.

The emphasis information Q is information for performing emphasis display in the image data display area 611, and has emphasis display attribute information including emphasis display kinds corresponding to "title 1 to title 4" indicating titles of the items 612 and an emphasis display region. It is to be noted that the "title 1 to title 4" correspond "account number", "name", "transaction" and "amount of money", respectively.

Further, the emphasis display kinds include a net, an ornamental ruled line and so forth, and in the present embodiment, as emphasis displays, a thick frame display is set to those of the items 612 corresponding to the "title 1" and "title 3" and a net display is set to those of the items 612 corresponding to the "title 2" and "title 4" so that, as the "title 1 to title 4" are successively displayed in emphasis, different emphasis displays may be provided to achieve higher visual observability.

Meanwhile, the emphasis display region indicates start and end positions of an emphasis display portion 613 of any item 612 using coordinates (in units of a dot) including an X coordinate and a Y coordinate, and the size of the emphasis display portion 613 can be set arbitrarily for each of the items 612.

Figure 64:
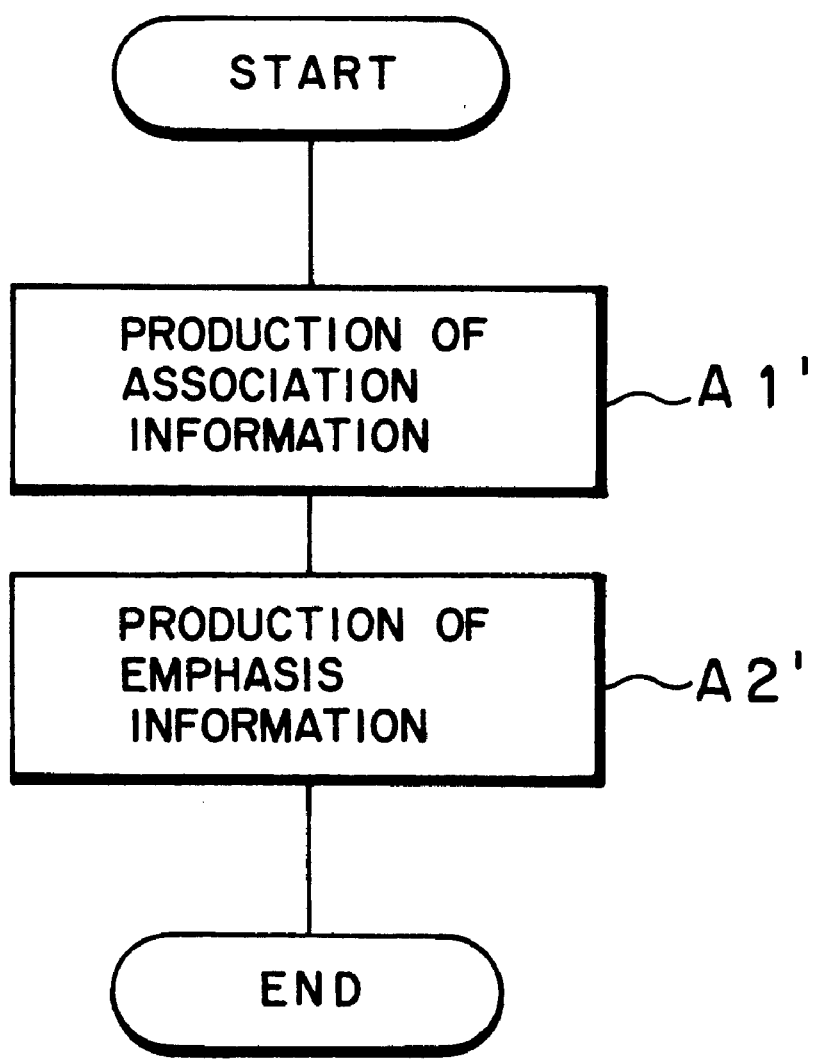
FIGS. 64 to 66 are flow charts illustrating operation of the image data display apparatus according to the embodiment of the present invention.

The association information P and the emphasis information Q are produced in steps A1' and A2' of the flow chart shown in FIG. 64.

The emphasis display section 624 emphatically displays, if the cursor indicator 616 is indicated, under the control of the computer main frame 629, at one of the data input display area portions 615 for a desired one of the items 612 within the data input display area portions 615 for the items 612 in the item data display area 614 in a condition wherein image data including information of a plurality of items are displayed in the image data display area 611, only the image data portion of the desired one of the items 612 corresponding to the data input display area portion 615 as denoted by reference numeral 613.

In particular, when the cursor indicator 616 is indicated in one of the data input display area portions 615 for a desired one of the items 612, the emphasis display section 624 emphatically displays only the image data portion of the desired item 612 corresponding to the data input display area portion 615 for the item 612 with a net, an ornamental ruled line or the like to raise the visual observability when the matching between image data and an input item is to be performed by visual observation to allow a smooth inputting operation.

Further, the emphasis display cancellation section 625 cancels the emphasis display portion 613 of an image data portion of a desired one of the items 612 emphasized by the emphasis display section 624 to return the display of the item 612 to a condition prior to that of the emphasis display. In particular, if the cursor indicator 616 is moved to a data input display area portion 615 for another one of the items 612 different from the data input display area portion 615 for the desired one of the items 612 by a cursor moving operation, then the emphasis display cancellation section 625 cancels the emphasis display portion 613 of the image data portion corresponding to the item.

The emphasis display transition control section 626 functions in an interlocking relationship with the emphasis display cancellation section 625 and controls so that, after the emphasis display cancellation section 625 cancels the emphasis display portion 613 of an image data portion of a corresponding certain one of the items 612, it moves the cursor indicator 616 to the data input display area portions 615 for another one of the items 612, and only the image data portion of the item 612 corresponding to the data input display area portion 615 for the item 612 indicated by the cursor indicator 616 is emphatically displayed by the emphasis display section 624.

Further, the screen scrolling section 627 displays, from a condition wherein part of image data are displayed on the display unit 630, those image data which are not displayed on the display unit 630.

The emphasis display section 624 has a changing section 628 serving as changing means. The changing section 628 changes an emphasis display kind or region in response to an instruction from the outside, for example, using a keyboard, and includes a changing information acquisition section 628A and an emphasis information changing section 628B.

The changing information acquisition section 628A acquires change information R which will be hereinafter described. The emphasis information changing section 628B updates emphasis information Q, which will be hereinafter described, using the change information R to produce emphasis information Q'.

Actually, suitable software that may provide the functions as the emphasis display section 624, emphasis display cancellation section 625, emphasis display transition control section 626 and screen scrolling section 627 described above to the computer main frame 629 is installed into the hard disk 622 or some other memory to construct the image data display apparatus 640.

The image data display apparatus 640 according to the present embodiment having the construction described above operates in the following manner.

An initial screen when image data of a document are inputted from the image data dividing apparatus 621 (image scanner 621A or OCR apparatus 621B) shown in FIG. 62 and displayed on the display unit (not shown in FIG. 62) is such as shown in FIG. 67.

In this instance, as seen in FIG. 67, image data including information of a plurality of items, that is, image data including information of the four items of "account number", "name", "transaction" and "amount of money", are displayed in the image data display area 611 of the display unit 630.

On the other hand, when input remittance data are to be inputted, the cursor indicator 616 is moved to a desired one of the data input display area portions 615 to input remittance data corresponding to an image data portion of a desired one of the items 612. In this instance, as seen in FIG. 70, the image data portion of the desired item 612 is emphatically displayed with the emphasis display portion 613 by the emphasis display section 624, and as seen from FIGS. 71 to 76, also the emphasis display portion 613 is moved in the image data display area 611 as the cursor indicator 616 moves.

It is to be noted that, although a result of character recognition of image data is not displayed in the data input display area portions 615 shown in FIGS. 67 and 70 to 76, naturally it may be displayed alternatively.

Here, in FIG. 70, the display unit 630 when the item 612 of "account number (0001)" is emphatically displayed is shown.

If an operator inputs, in such a condition as seen in FIG. 70, "0001" by means of the keyboard 631 and then manually operates the keyboard 631 to move the cursor indicator 616 from the "item 1" to the "item 2" in the item data display area 614, then the emphasis display portion 613 is moved from the "account number (0001)" to the "name (Taro Fuji)" in the image data display area 611 as seen in FIG. 71 in response to the operation by the emphasis display transition control section 626. In this condition, the operator will input "Taro Fuji" using the keyboard 631.

If the operator inputs "Taro Fuji" by means of the keyboard 631 and manually operates the keyboard 631 to move the cursor indicator 616 from the "item 2" to the "item 3" similarly, then the emphasis display portion 613 is moved from the "name (Taro Fuji)" to the "transaction (010)" as seen in FIG. 72 by the emphasis display transition control section 626. Then, if the operator further inputs "010" and moves the cursor indicator 616 from the "item 3" to the "item 4", then the emphasis display portion 613 moves from the "transaction (010)" to the "amount of money (¥12,000)" as seen in FIG. 73 by the emphasis display transition control section 626. Also in this instance, naturally the operator will input "010" and "¥12,000" using the keyboard.

If, for example, a return key of the keyboard 631 is depressed after the money amount data "¥12,000" which are remittance data corresponding to the "item 4" are inputted in this manner, then the remittance data (data of the account number, name, transaction and amount of money) corresponding to the "item 1 to item 4" are sent out to the server 39 shown in FIG. 6.

Then, in response to the depression of the return key, the cursor indicator 616 moves from the "item 4" to the "item 1" again, and the emphasis display portion 613 moves from the "amount of money (¥12,000)" to the "account number (0010)" in the second row as seen in FIG. 74 by the emphasis display transition control section 626. Thereafter, each time the operation described above is repeated, the items 612 in the image data display area 611 can be emphatically displayed one after another.

In other words, one of the items 612 corresponding to one of the data input display area portions 615 at which the cursor indicator 616 is present is emphatically displayed, and as the cursor indicator 616 moves, also the emphasis display portion 613 moves between different ones of the items 612.

Meanwhile, inputting of remittance data is performed at one of the data input display area portions 615 which has the cursor indicator 616, and if the cursor indication is moved to one of the data input display area portions 615 to which data are to be inputted, then an image data portion of the item 612 to be referred to simultaneously is emphatically displayed. Consequently, erroneous recognition in matching when data are referred to can be prevented to augment the visual discernibility, by which labor required for inputting operations can be reduced and erroneous inputting of remittance data can be prevented.

If it is assumed that the remittance data inputting processing described above is further proceeded to a condition wherein the "amount of money (¥1,765)" in the lowest row of the image data display area 611 of the display unit 630 is emphatically displayed as seen in FIG. 75, then where some of the items 612 which are not displayed on the display unit 630 remain below the "amount of money (¥1,765)", if the cursor indicator 616 is moved from the "item 4" to the "item 1" in the item data display area 614, then the display screen is scrolled automatically by the screen scrolling section 627 and the emphasis display portion 613 is moved in a corresponding relationship from the "amount of money (¥1,765)" to the "account number (2148)" in the image data display area 611 as shown in FIG. 76 by the emphasis display transition control section 626.

In other words, where one of the items 612 which is at the lowest location of the image data display area 611 is emphatically displayed and some of the items 612 which are not displayed on the display unit 630 remain below the item 612, the display screen can be scrolled automatically by moving the cursor indicator 616 between the data input display area portions 615.

It is to be noted that, while scrolling of the display screen is performed one by one item and the item of "account number (2148)" is displayed in FIG. 76, the manner of the display scrolling is not limited to this, and the display screen may alternatively be scrolled for all of items for one screen (for seven items) by moving the item of "account number (2148)" to the uppermost row so that other items for one screen below them may be displayed.

Figure 65:
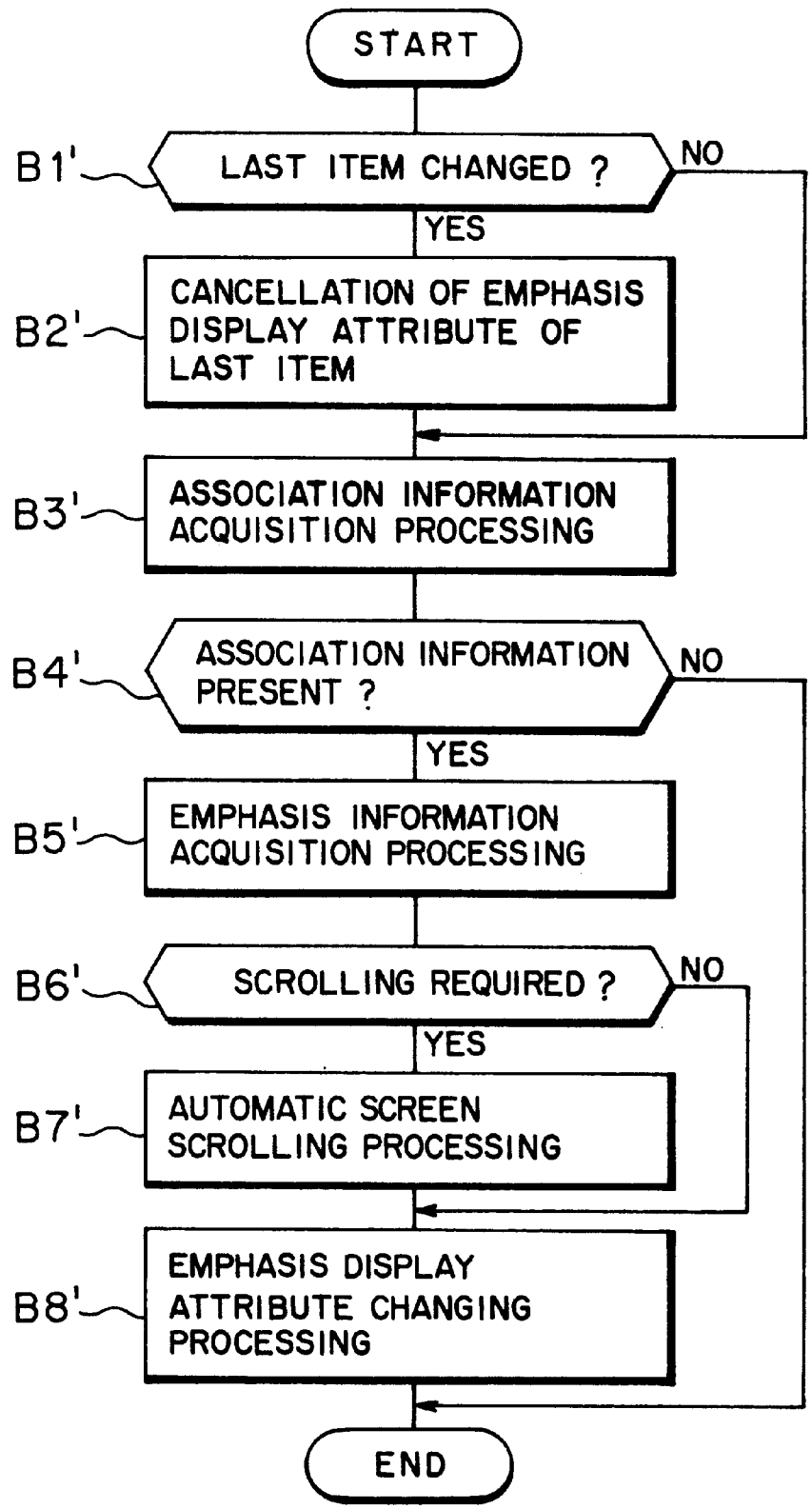

Here, such control of movement of an emphasis display as shown in FIGS. 70 to 76 is performed by the emphasis display section 624, emphasis display cancellation section 625, emphasis display transition control section 626 and screen scrolling section 627, and an operation flow in this instance will be described in more detail with reference to FIG. 65.

For example, if the cursor indicator 616 is moved from the "item 1" to the "item 2" in the item data display area 614 as seen in FIGS. 70 and 71, that is, if one of the items 612 which makes an object of inputting in the image data display area 611 becomes different from that one of the items 612 which has been the last object of inputting, then it is discriminated whether or not a change in emphasis display attribute (emphasis display kind or emphasis display region) has been performed upon the last inputting (step B1').

Then, if a change in emphasis display attribute has been performed, then the emphasis display cancellation section 625 returns the emphasis display attribute of the image data portion of the item 612 in the preceding display to an ordinary display attribute (attribute prior to the change) to cancel the emphasis display (step B2') and acquires association information P for a next one of the items 612 (step B3').

Thereafter, the emphasis display section 624 refers to the association information P to discriminate whether or not association information P regarding that item 612 which makes an object of inputting is present (step B4'), and if association information P regarding the item 612 which makes an object of inputting is present, the the emphasis display section 624 acquires emphasis information Q and the changing information acquisition section 628A refers to the emphasis information Q to acquire change information in emphasis display attribute (step B5').

Further, it is discriminated whether or not the image data portion corresponding to the item 612 which makes an object of inputting is displayed on the display unit 630 to discriminate whether or not automatic screen scrolling is required (step B6'). If automatic screen scrolling is not required, the emphasis information changing section 628B changes the emphasis display attribute of the image data portion with the change information acquired in step B5', and the emphasis display portion 613 is moved from the "account number (0001)" to the "name (Taro Fuji)" as seen in FIGS. 70 and 71.

On the other hand, if it is discriminated in step B6' that automatic screen scrolling is required, the screen scrolling section 627 performs automatic screen scrolling processing in response to the movement of the emphasis display portion 613 as seen in FIGS. 75 and 76 (step B7'), and the emphasis information changing section 628B changes the emphasis display attribute of the image data portion with the change information acquired in step B5' (step B8').

In this manner, the control of movement of the emphasis display is performed such that it is discriminated whether or not a change in emphasis display attribute has been performed, and if a change in emphasis display attribute has been performed, then the last emphasis display of any of the items 612 is canceled and it is discriminated whether or not association information P regarding one of the items 612 which makes an object of inputting is present, and then if association information P regarding the item 612 which makes an object of inputting is present, then change information in emphasis display attribute is acquired.

Further, it is discriminated whether or not automatic screen scrolling is required, and if automatic screen scrolling is not required, then the emphasis display attribute is changed, but if automatic screen scrolling is required, then automatic screen scrolling processing is performed and then the emphasis display attribute is changed.

By the way, the display kind and the display region of the emphasis display portion 613 can be changed arbitrarily by changing the emphasis information Q.

This will be described by way of an example wherein, for example, on the display unit 30 shown in FIG. 77, the "amount of money (¥4,321)" which is the item 612 at the lowest stage of the image data display area 611 is emphatically displayed.

In this instance, the emphasis display portion 613 of the item 612 of "amount of money (¥4,321)" can be determined uniquely by defining start position coordinates (320, 180) and end position coordinates (420, 200) as seen from the emphasis information Q of FIGS. 69 and 79. It is to be noted that the start position coordinates (320, 180) are coordinates indicated at the "No. 7 Start" corresponding to the "title 4 (amount of money)", and the end position coordinates (420, 200) are coordinates indicated at the "No. 7 End" corresponding to the "title 4 (amount of money)".

Then, if the start position coordinates (320, 180) of the emphasis display portion 613 are changed to (360, 180) as seen in FIG. 78, then the region of the emphasis display portion 613 of the "amount of money (¥4,321)" which is an item 612 shown in FIG. 77 becomes narrow as seen in FIG. 78.

By changing the start position coordinates or the end position coordinates of the emphasis information Q, the magnitude of the region of the emphasis display portion 613 can be set arbitrarily.

Figure 63:
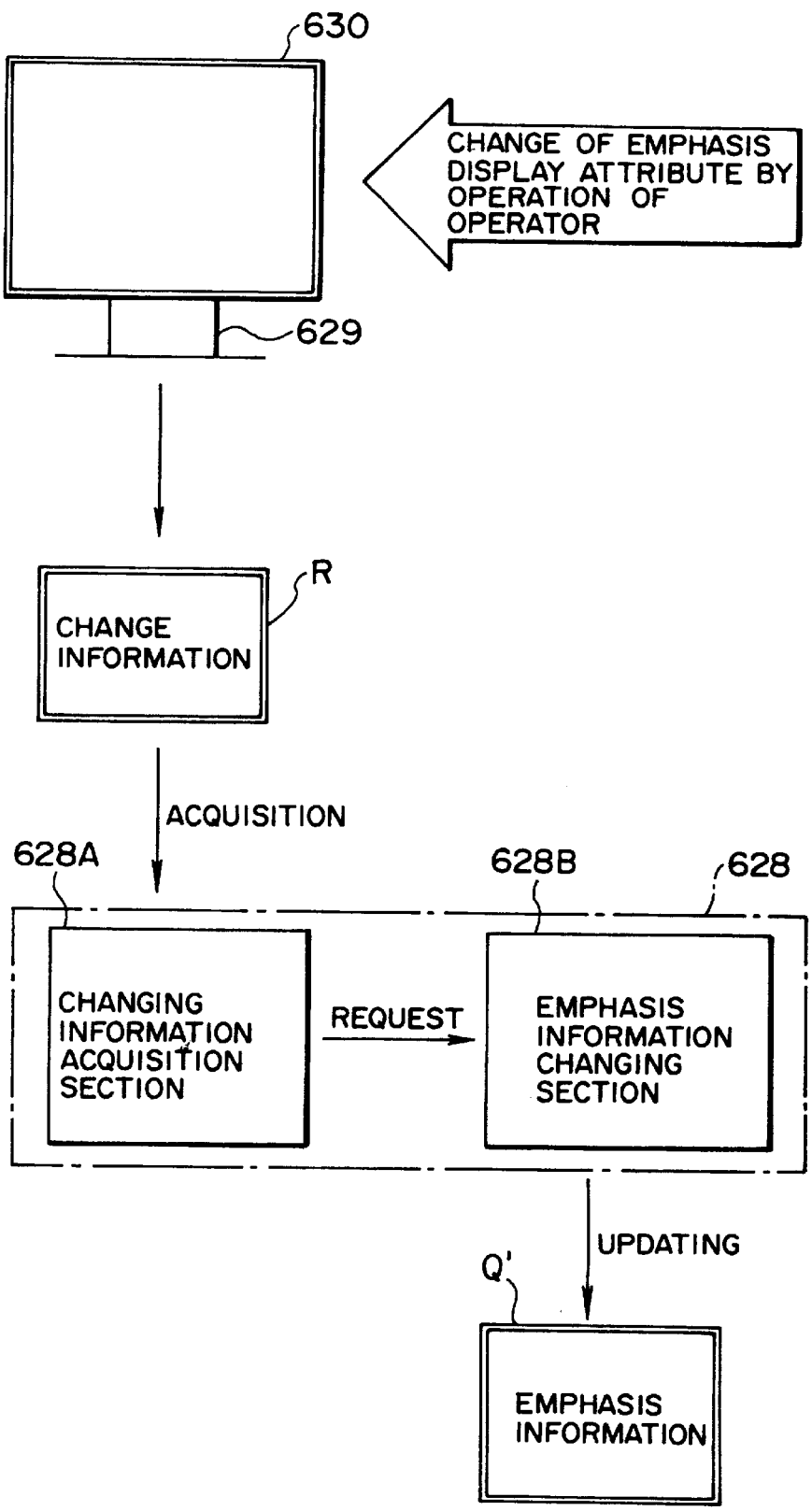

Such change of the emphasis information Q can be performed by the changing section 628 shown in FIGS. 62 and 63 by inputting an instruction to change the emphasis display attribute to the image data display apparatus 640 using a keyboard or some other apparatus serving as data inputting means.

Figure 66:
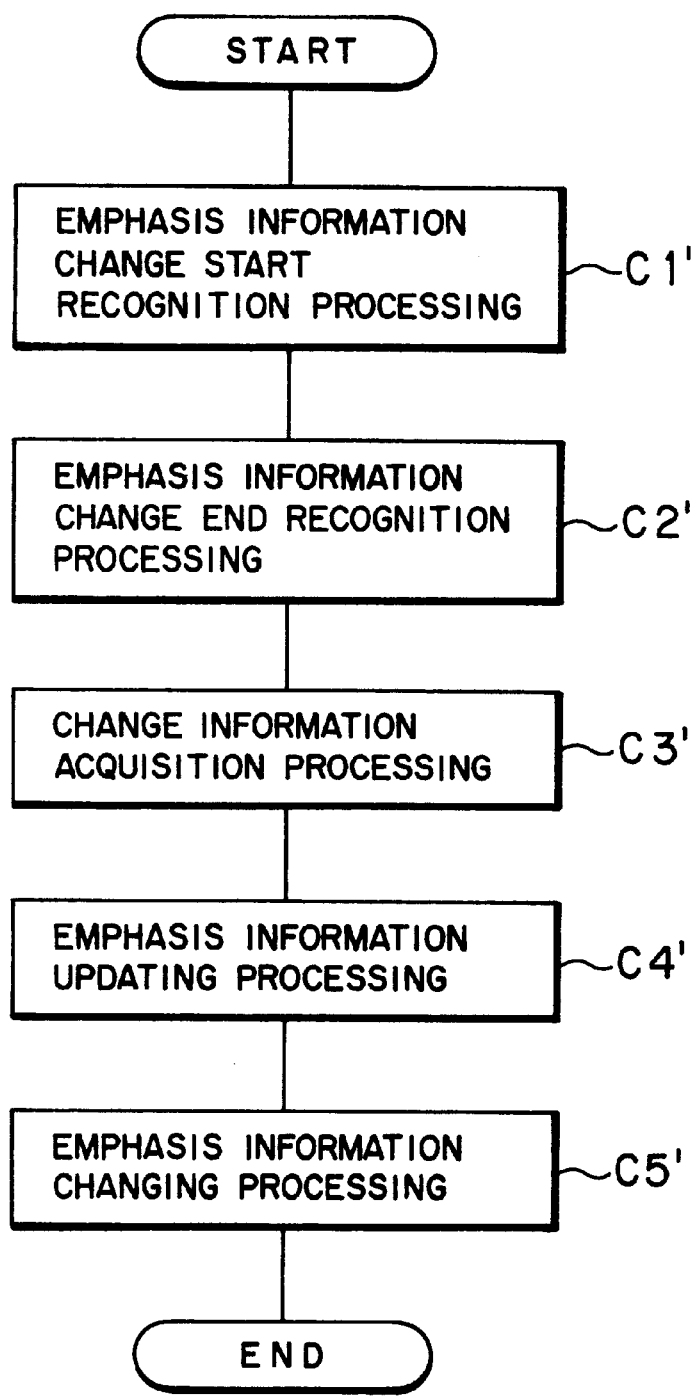

In particular, in the changing section 628, if the changing information acquisition section 628A acquires change information R, then the emphasis information changing section 628B updates the emphasis information Q to produce emphasis information Q', and an operation flow in this instance will be described with reference to FIG. 66.

If change information R is inputted, then the changing information acquisition section 628A first performs emphasis information change start recognition processing (step C1') and emphasis information change end recognition processing (step C2') and then performs change information acquisition processing (step C3') to recognize in what manner the emphasis information Q has been changed.

Then, in accordance with a result of the recognition, the emphasis information changing section 628B performs emphasis information updating processing (step C4') and emphasis information changing processing (step C5') to update the emphasis information Q to produce emphasis information Q', for example, as seen in FIG. 79.

Since the display kind and the display region of the emphasis display portion 613 can be changed arbitrarily in this manner, an emphasis display can be performed freely in accordance with an application.

It is to be noted that, while a result of character recognition of image data is not displayed in the data input display area portions 615 shown in FIG. 77 or 78, naturally it may be displayed alternatively.

Accordingly, with the image data display apparatus 640 according to the present embodiment, if the cursor indication is moved to a data input display area portions 615 to which data are to be inputted, then an image data portion of an item 612 to be referred to simultaneously is emphatically displayed. Consequently, even if an operator takes its eyes off the display unit 630 once and then looks at the display unit 630 again, it can be prevented that the operator watches a wrong item 612. Consequently, the image data display apparatus 640 is advantageous in that erroneous recognition in matching when image data are referred to is prevented and the visual observability is improved, and besides the labor for inputting operations is reduced and erroneous inputting can be prevented.

Further, when image data of an item 612 to be referred to are not displayed on the display unit 630, since the screen can be scrolled automatically in response to movement of the emphasis display portion 613, the image data display apparatus 640 is advantageous also in that such a wasteful operation as, for example, to depress a key can be reduced.

Furthermore, the image data display apparatus 640 is advantageous in that the kind or the region of the emphasis display portion 613 can be changed by an operator and can be used in accordance with an application.

It is to be noted that, while, in the present embodiment, when an emphasis display is performed for image data of a document displayed on a display unit, a predetermined item 612 is emphatically displayed entirely as seen, for example, in FIG. 70, the manner of the emphasis display is not limited to this, and for example, part of a predetermined item 612 may otherwise be displayed emphatically as seen in FIG. 80.

Here, in the image data display area 611 of the display unit 630 shown in FIG. 80, image data including information of five items of "account number", "title", "bank name/branch office name", "recipient" and "amount of money" are displayed.

When remittance data are to be inputted, the cursor indicator 616 is moved to a desired one of the data input display area portions 615, and corresponding remittance data are inputted to an image data portion of a desired one of the items 612. In this instance, the image data portion of the desired item 612 is emphatically displayed with the emphasis display portion 613 (at the location of "bank name/branch office name (Fujitsu Bank)") as seen in FIG. 80, and as the cursor indicator 616 moves, also the emphasis display portion 613 moves in the image data display area 611 as seen in FIGS. 81 and 82.

It is to be noted that, while, in FIG. 82, the characters of the "recipient (Ichiro Yamada)" of the item 612 are emphatically displayed, the entire item 612 may otherwise be displayed emphatically as seen in FIG. 83.

Figure 84:
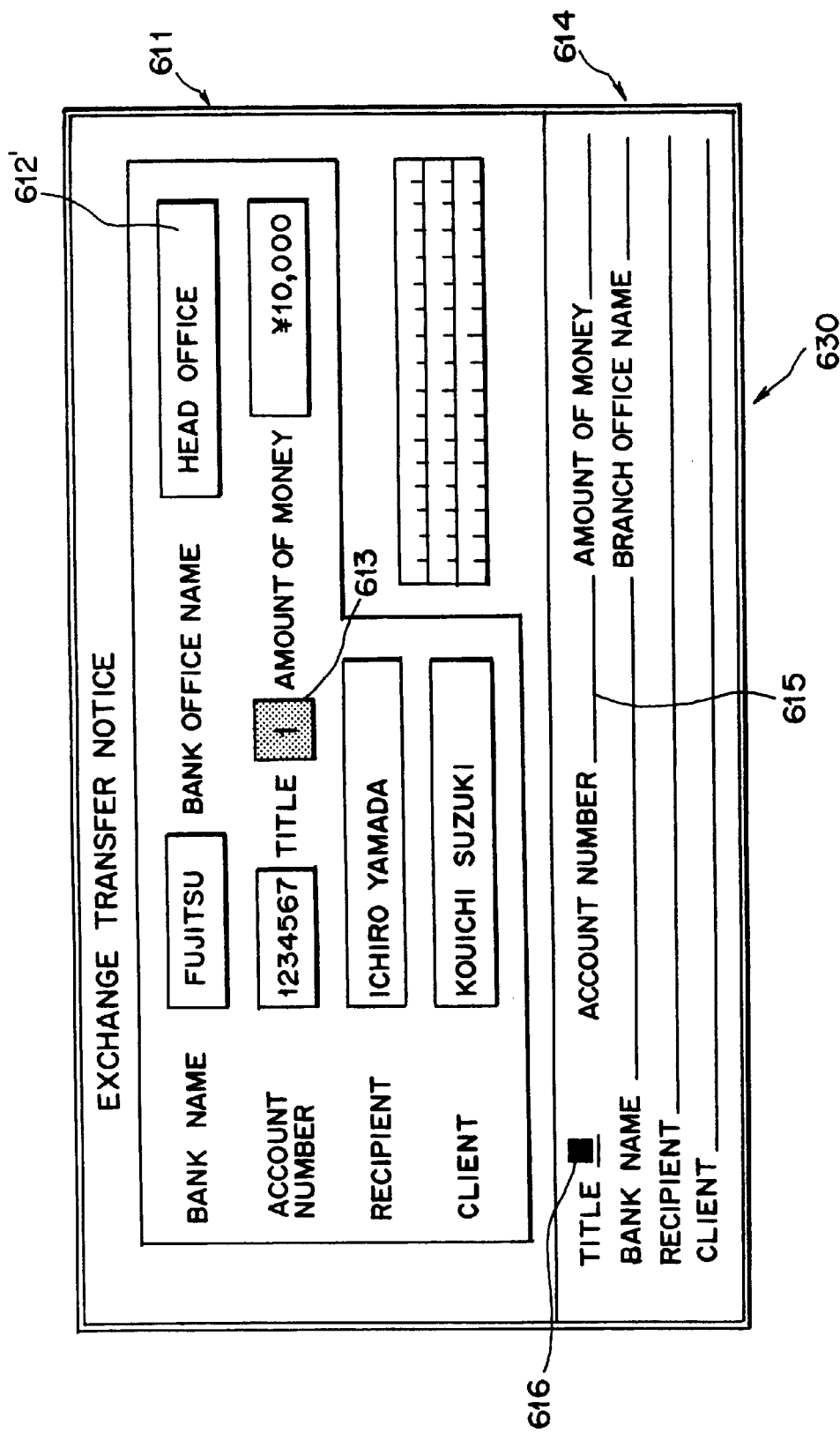

Further, image data of a document may otherwise be displayed for individual information on the display unit 630, for example, as seen in FIG. 84.

Here, in the image data display area 611 of the display unit 630 shown in FIG. 84, image data including information of seven items of "bank name", "branch office name", "account number", "title", "amount of money", "recipient" and "client" are displayed.

Similarly, when remittance data are to be inputted, the cursor indicator 616 is moved to a desired data input display area portion 615 and corresponding remittance data are inputted to an image data portion of a desired item 612'. In this instance, the image data portion of the desired item 612' is emphatically displayed with the emphasis display portion 613 (the location of "title (1)") as seen in FIG. 84, and as the cursor indicator 616 moves, also the emphasis display portion 613 moves in the image data display area 611 as seen in FIG. 85.

Also where image data of a document are displayed in this manner, similar advantages to those of the present embodiment can be achieved.

It is to be noted that, although a result of character recognition of image data is not displayed in the data input display area portions 615 shown in FIGS. 80 to 85, naturally it may otherwise be displayed there.

Further, while, in the present embodiment, a document used in a bank or the like is read by an image data inputting apparatus and displayed as image data on a screen of a display unit or the like, the data medium is not limited to this, and some other kind of data (for example, a list of names) may be read by an image data inputting apparatus and displayed as image data on a screen of a display unit or the like. Also in this instance, similar advantages to those of the present embodiment can be achieved.

Furthermore, while, in the present embodiment, an operator visually observes read image data and performs an inputting operation, for example, when a document is read by an image data inputting apparatus, character recognition may otherwise be performed automatically while the operator performs an inputting operation only for an item which includes a character which has been recognized in error or cannot be recognized successfully.

Where the construction just mentioned is employed, similar advantages to those of the present embodiment can be achieved, and besides, the labor and the time required for inputting operation can be reduced remarkably.

(2) Description of a Read Emblem Display-Recognition Information Modification Apparatus In the image data display apparatus 640 described in detail in paragraph (1) above, since editing and displaying of image data are performed in units of an item including a plurality of characters, when confirmation of whether or not a result of automatic character recognition is correct or wrong is to be performed, selection of characters corresponding to recognized characters of an object of confirmation is performed by visual observation from among different characters which successively appear in the image data. Therefore, many movements of the eye and many objects of comparison are involved, and much labor and time may be required for a confirmation operation between correct and wrong.

Figure 86:
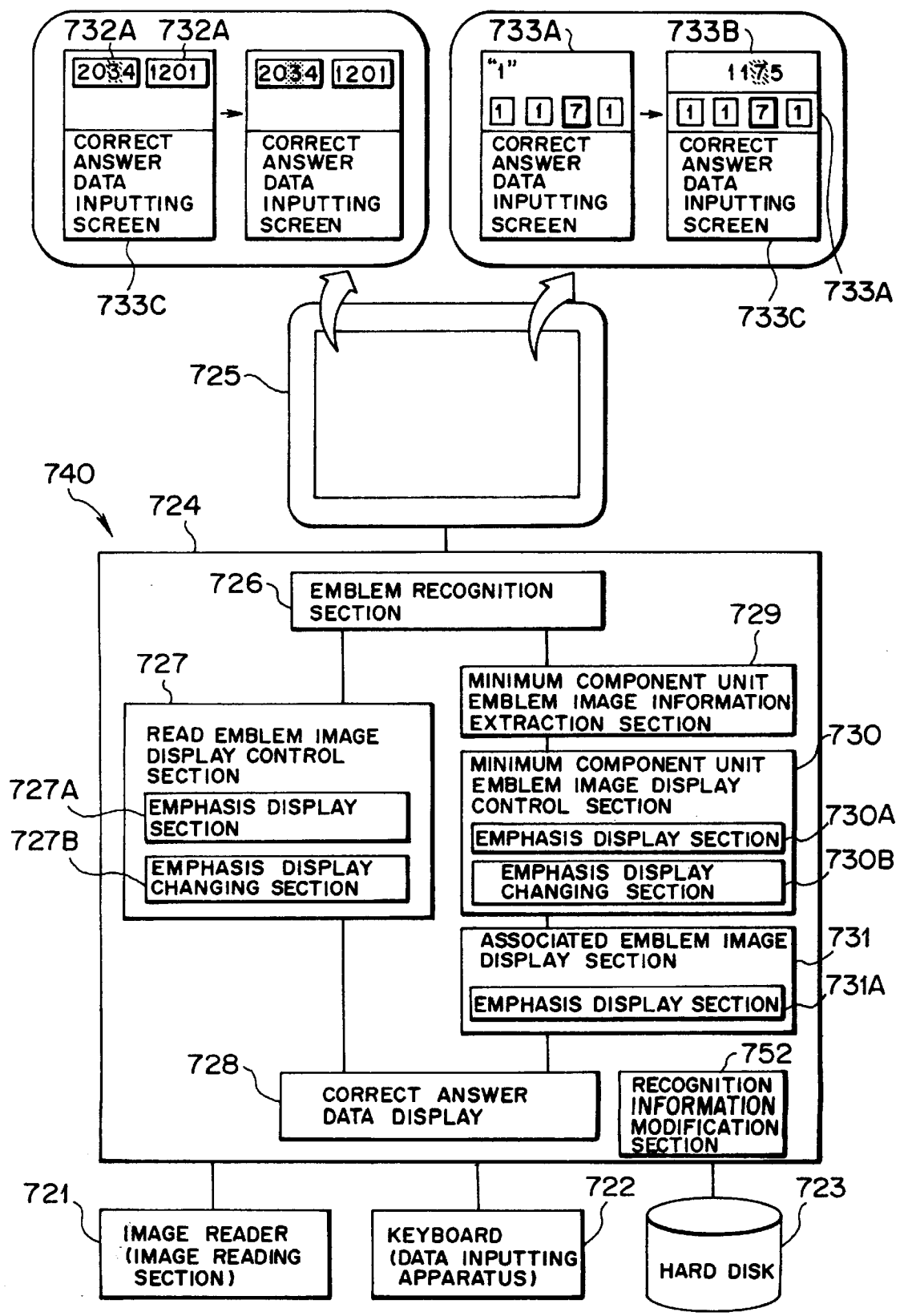
FIG. 86 is a schematic view showing a construction of a read emblem display-recognition information modification apparatus according to the embodiment of the present invention.

Therefore, in such a case, paying-in requesting processing can be performed using such a read emblem display-recognition information modification apparatus 740 as shown in FIG. 86.

The read emblem display-recognition information modification apparatus 740 fetches a document, on which paying-in data such as, for example, a kind of charge and an amount of money to be paid in are described, as an image and converts the image of the paying-in data into code information by automatic character recognition to perform paying-in requesting processing. However, modification to a character which cannot be recognized or which is recognized in error (the character includes a numeral. This similarly applies to the following description) upon conversion is performed by an operator using a keyboard or the like.

Here, the read emblem display-recognition information modification apparatus 740 corresponds to the client 10 of the data medium handling apparatus 30 shown in FIG. 6, and where it is connected to the server 39 shown in FIG. 6, it functions as a work station which performs modification processing to an unrecognizable character or an erroneously recognized character similarly also for a result of character recognition of an image by the concentrated character recognition processing section 6 connected to the server 39 and outputs a result of the modification to the server 39.

To this end, the read emblem display-recognition information modification apparatus 740 includes, as shown in FIG. 86, an image reader 721 serving as an image reading section, a keyboard 722 serving as a data inputting apparatus, a hard disk 723, a computer main frame 724 serving as an emblem recognition apparatus, and a display unit 725.

The image reader 721 reads a full area image P which is an image having emblem information such as numerals or characters on a document on which, for example, paying-in data shown in FIG. 98 are described, and inputs the full area image P as emblem image information, which is image information of the numerals, characters and so forth, to the computer main frame 724.

It is to be noted that, while the emblem image information is composed in units of a numeral or a character which is a minimum composing unit, it is not limited to this and an aggregate of numerals and/or characters may be used as a composing unit. Further, a plurality of such full area image P may be held collectively.

The keyboard 722 is manually operated by an operator to input appropriate code data as correct answer data in order to modify code data which correspond to emblem image information which has not automatically been recognized successfully or which has been recognized in error.

Further, the display unit 725 displays emblem image information inputted from the image reader 721 in a state of a read image, and includes an unrecognizable emblem image information display area 732A, an emblem image information display area 733A, an associated emblem image information display area 733B and a correct answer data display area 733C.

The unrecognizable emblem image information display area 732A displays emblem image information, which has not automatically been recognized successfully, together with emblem image information therearound, and applies an emphasis display to such unrecognizable emblem image information so that it can be identified from the emblem image information therearound. For example, in a screen A of FIG. 101, "3" of "2034" shown in "1. '?' (reject character)" is the unrecognizable emblem image information, and "2", "0"and "4" correspond to the emblem image information therearound.

The emblem image information display area 733A displays emblem image information of a minimum composing unit in an image to be converted into code information in a corresponding relationship to emblem information signified by code information obtained by conversion of the emblem image information.

Figure 101:
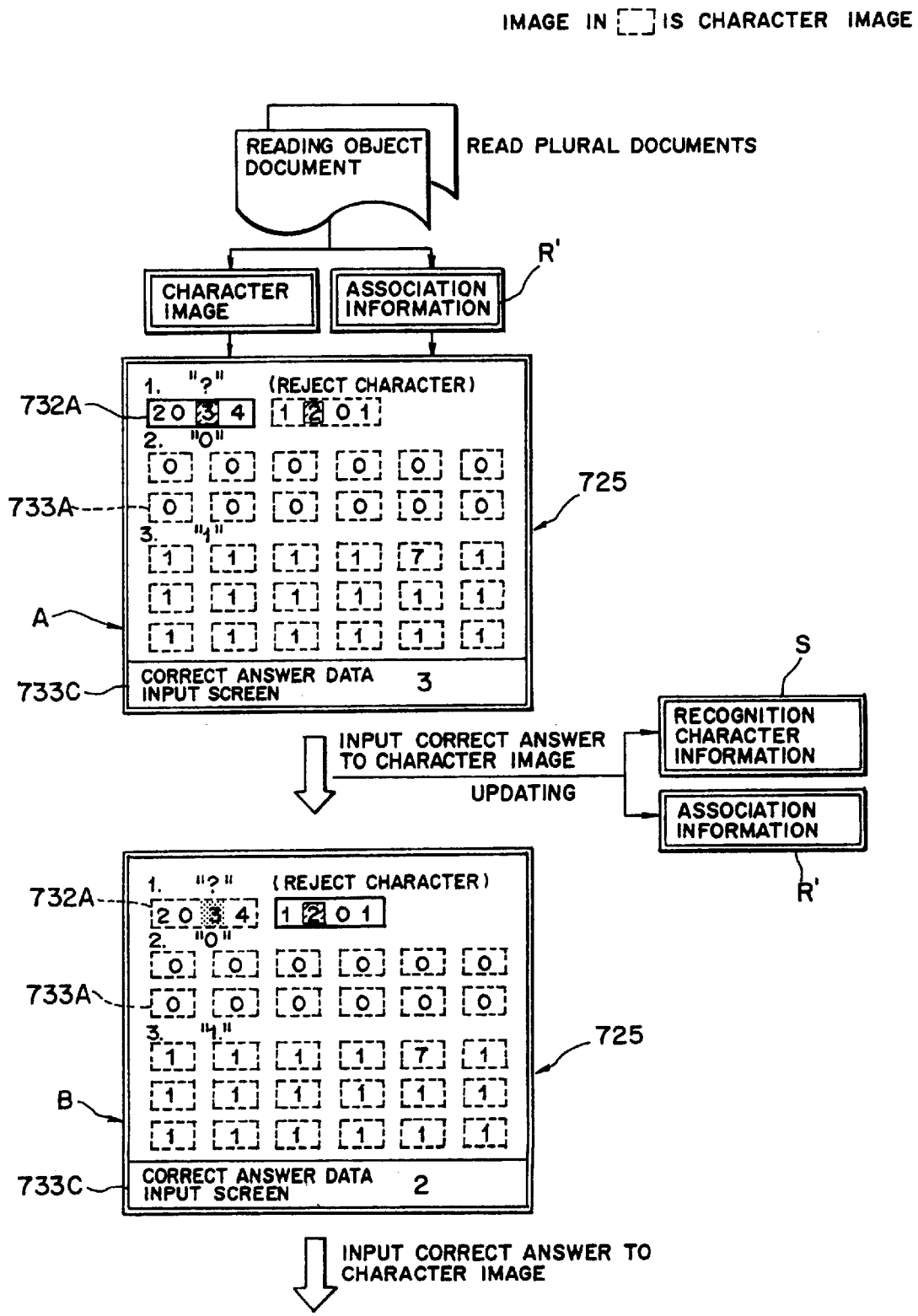

In particular, as emblem image information of a minimum composing unit obtained by dividing an image, for example, for numerals, areas corresponding to "0" to "9" are provided as seen from the screen A of FIG. 101, and same emblems are displayed in the same areas in such a manner that emblem image information representing "1" is all displayed in areas corresponding to "1" so that movements of the eye may be reduced.

The associated emblem image information display area 733B is constructed such that, for example, when confirmation between correct and wrong of and modification to a result of automatic character recognition can be performed readily by referring to preceding and following characters in a row of characters, image information around emblem image information displayed in emphasis is displayed for reference in response to depression of, for example, a reference key of the keyboard 722. For example, in a screen F of FIG. 103, "7" of "1175" is emblem image information displayed in emphasis, and "1", "1" and "5" are image information around it.

The correct answer data display area 733C displays appropriate code data inputted from the keyboard 722 as correct answer data. For example, in the screen F of FIG. 103, it is shown that "7" is inputted.

Further, the read emblem display-recognition information modification apparatus 740 shown in FIG. 86 includes the hard disk 723 as described hereinabove. The hard disk 723 serves as a definition information storage section for storing read designation information as definition information. It is to be noted that read designation information signifies information regarding division of a full area image P and recognition as code data.

The computer main frame 724 shown in FIG. 86 functions as an emblem recognition apparatus (the computer main frame 724 may be hereinafter referred to as emblem recognition apparatus 724), and recognizes image information of an emblem of an image inputted from the image reader 721, converts the image information of the emblem into code data, performs predetermined processing to the image of the emblem and displays it on the display unit 725.

Figure 87:
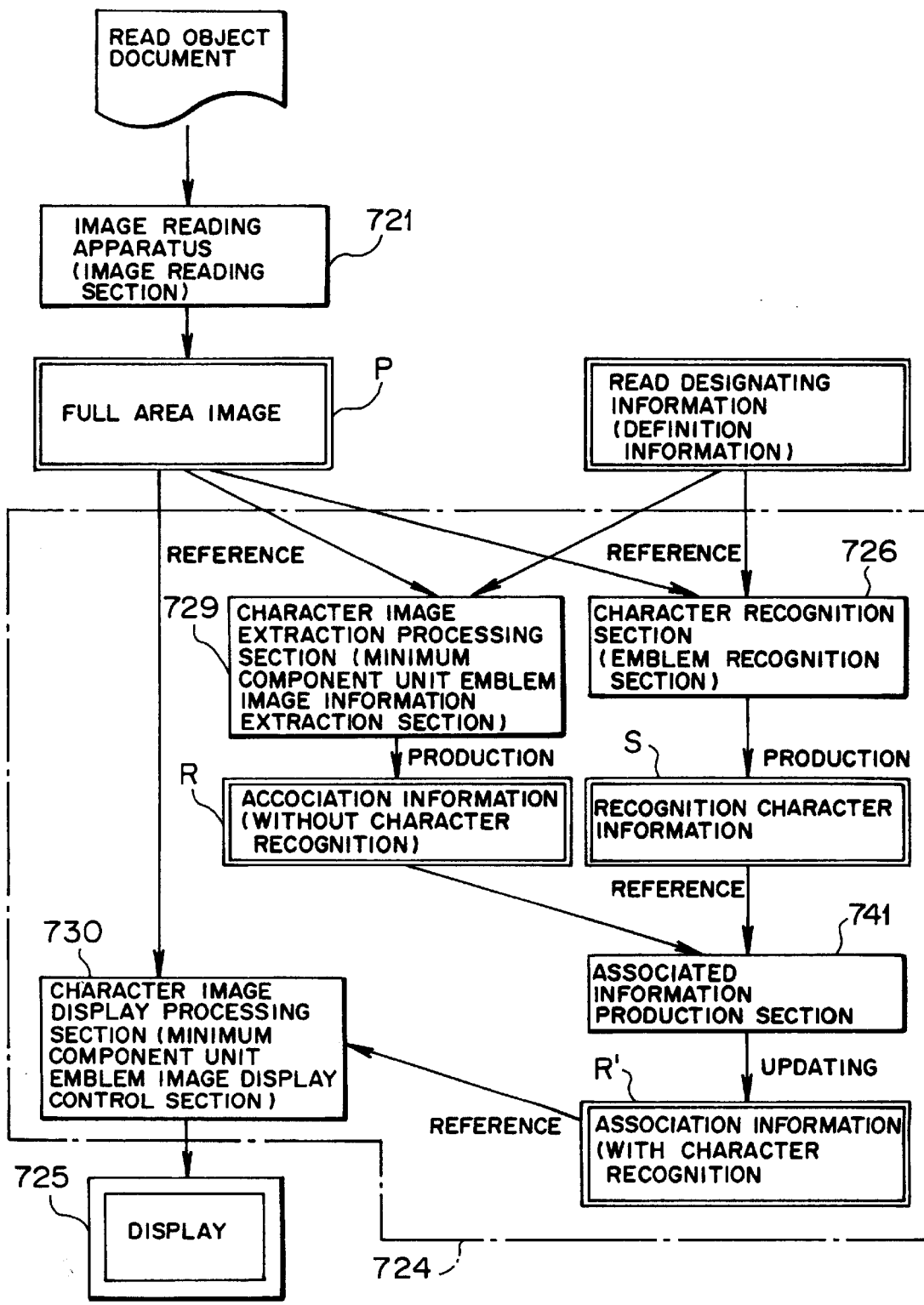
FIGS. 87 to 89 are functional block diagrams of the read emblem display-recognition information modification apparatus according to the embodiment of the present invention.

The computer main frame 724 shown in FIGS. 86 and 87 and serving as an emblem recognition apparatus includes a character recognition section 726 serving as an emblem recognition section, a read emblem image display control section 727, a correct answer data display section 728 serving as correct answer data display means, a character image extraction processing section 729 serving as a minimum composing unit emblem image information extraction section, a character image display processing section 730 serving as a minimum composing unit emblem image display control section, an associated emblem image display section 731 serving as associated emblem image display means, a recognition information modification section 752 serving as recognition information modification means, and an associated information production section 741.

The character recognition section 726 recognizes emblem image information in an image read by the image reader 721 and converts it into corresponding code information. The character recognition section 726 has similar functions to those of, for example, a character recognition apparatus or the like.

The character recognition section 726 refers to a full area image P read by the image reading apparatus 721 or read designation information (definition information) stored on the hard disk 723 to produce recognition character information S.

The recognition character information S represents code data of characters recognized by the character recognition section 726 and is represented by an "item name", an "item column number" and a "recognition result" as seen in FIG. 99.

The "item name" corresponds to a "water rate" and an "electricity bill" in the full area image P of FIG. 98 and has items of "SUI-1 to SUI-4" and "DEN-1 to DEN-4".

The "item column number" is a number of columns of an item and is set, in this instance, so that six characters and/or numerals can be inputted. The "recognition result" represents code information as code data recognized as characters. It is to be noted that, as can be seen from comparison with correct answer data additionally shown, the results of recognition of "SUI2" and "SUI-4" are that recognition is impossible and that recognition is in error, respectively.

The read emblem image display control section 727 displays, when emblem image information has not been converted into corresponding code information successfully, this unrecognizable emblem image information, which has not been converted successfully, together with emblem image information associated with the unrecognizable emblem image information in a condition of a read image on the display unit 725.

In particular, the read emblem image display control section 727 displays emblem image information, which has not been recognized nor converted into corresponding code information successfully by the character recognition section 726, as unrecognizable emblem image information together with associated emblem image information positioned around the unrecognizable emblem image information in a condition of a read image in the unrecognizable emblem image information display area 732A on the display unit 725.

Further, the read emblem image display control section 727 includes an emphasis display section 727A serving as emphasis display means for applying an emphasis display to unrecognizable emblem image information in order to facilitate recognition of the unrecognizable emblem image information by an operator.

The read emblem image display control section 727 also includes an emphasis display changing section 727B serving as emphasis display changing means for changing, if correct answer data are displayed in the correct answer data display area 733C different from the unrecognizable emblem image information display area 732A on the display unit 725 by the correct answer data display section 728, a display of unrecognizable emblem image information which has been displayed in emphasis to another emphasis display which signifies completion of modification.

The character image extraction processing section 729 extracts emblem image information of a minimum composing unit in an image to be converted into code information for each piece of emblem image information of the minimum composing unit.

In particular, the character image extraction processing section 729 divides and extracts emblem image information, whose minimum composing unit is, for example, a numeral or a character, into and as image information in units of a numeral or a character, and refers to a full area image P or read designation information (definition information) stored on the hard disk 723 to produce association information R.

Figure 91:
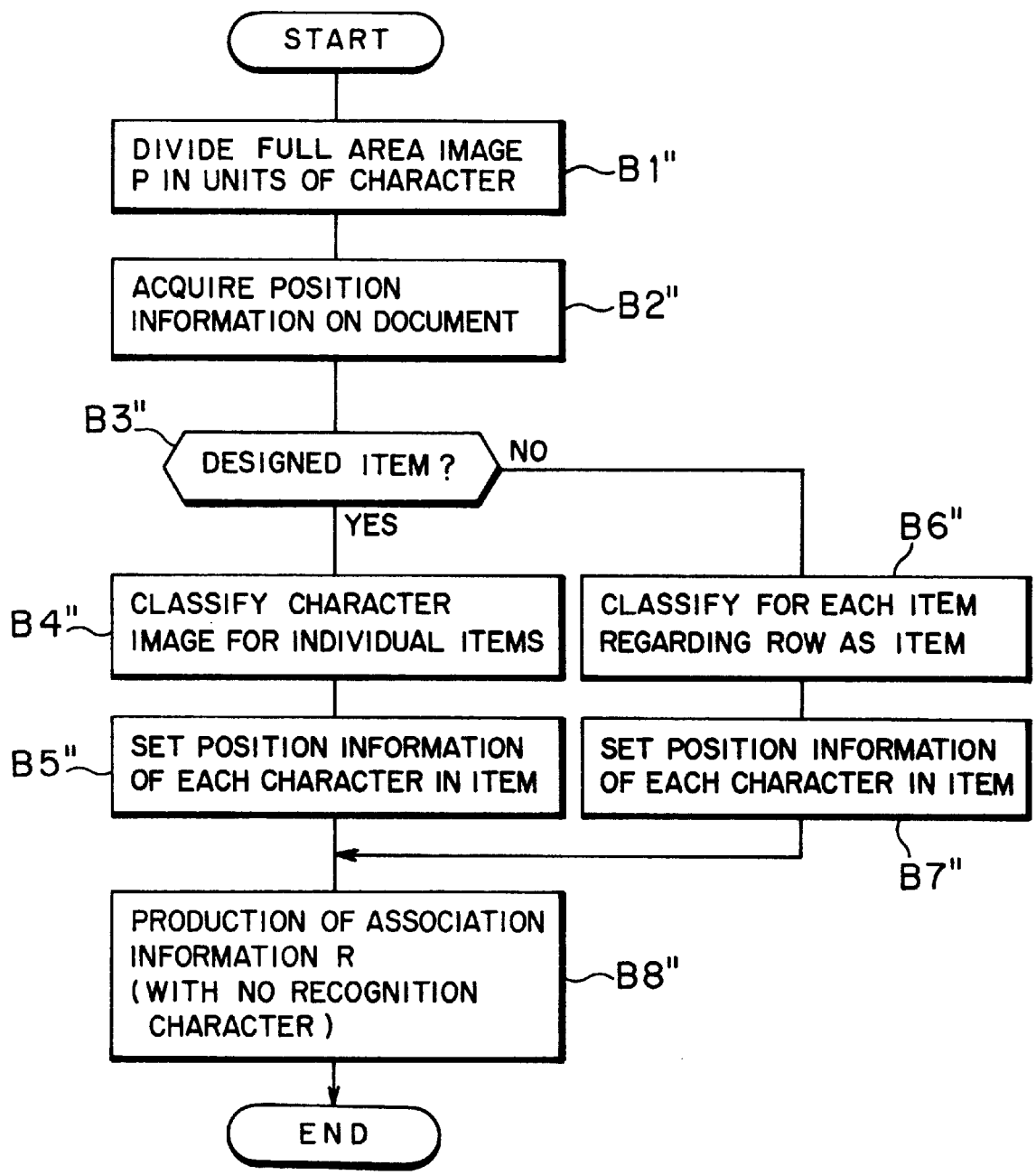

The character image information and the association information R are produced by performing processing in steps B1" to B8" of the flow chart shown in FIG. 91.

In particular, the full area image P is divided in units of a character to produce character image information (step B1"), and position (positions on a document) information of the character image information on the full area image P is acquired (step B2").

Then, it is discriminated whether or not the character image information is designated to a predetermined item (water rate, electricity bill or the like) (step B3"), and if the character image information is designated to a predetermined item, then the character image information is classified for the individual items (step B4") and position information of the individual image information in the individual items is set (step B5").

Where the character image information is not designated to a predetermined item, it is classified for individual items regarding rows as items (step B6"), and position information of the character image information in the individual items is set (step B7").

Association information R is produced using the position information of the character image information in the individual items set in this manner (step B8"). It is to be noted that the association information R has recognition character information regarding recognized characters.

The character image display processing section 730 has functions of causing the emblem image information of a minimum composing unit (image information in units of, for example, a numeral or a character) extracted by the character image extraction processing section 729 to be displayed in a corresponding relationship to emblem information signified by code information obtained by conversion of the emblem image information and of causing a plurality of pieces of emblem image information of minimum composing units of same types to be displayed in a corresponding relationship to emblem information signified by code information obtained by conversion of the emblem image information.

In particular, the character image display processing section 730 causes code information obtained, for example, by conversion of image information of "1" extracted by the character image extraction processing section 729 to be displayed at a portion in which an emblem of "1" is to be displayed from within a portion of the emblem image information display area 733A on the display unit 725 in which a plurality of emblems of "0" to "9" and so forth are to be displayed.

The character image display processing section 730 includes an emphasis display section 730A serving as emphasis display means for performing an emphasis display only for information of a desired one emblem image so as to facilitate identification of image information being processed at present.

Further, an emphasis display changing section 730B serving as emphasis display changing means performs, if correct answer data are inputted by an operation of the keyboard 722 serving as a data inputting apparatus, another emphasis display which signified completion of modification for the information of one emblem which has been emphasized in emphasis to facilitate identification between the emblem image information prior to the modification and the emblem image information after the modification.

The associated emblem image display section 731 displays information of an emblem image together with emblem information associated with the emblem image information in a condition of a read image on the display unit 725.

In particular, the associated emblem image display section 731 displays information of an emblem image together with associated emblem image information positioned around the emblem image information in a condition of a read image in the associated emblem image information display area 733B on the display unit 725, and displays, when confirmation between correct and wrong of and modification to a result of automatic character recognition can be performed readily by referring, for example, to preceding and following characters in a row of characters, image information around the image information displayed in emphasis for reference.

Further, the associated emblem image display section 731 includes an emphasis display section 731A serving as emphasis display means for performing an emphasis display for information of an emblem image and facilitates identification from associated emblem image information.

If correct answer data are inputted by an operation of the keyboard 722, then the correct answer data display section 728 causes the correct answer data to be displayed in the correct answer data display area 733C on the display unit 725 which is a different area from the emblem image information display area 733A and the associated emblem image information display area 733B.

Figure 88:
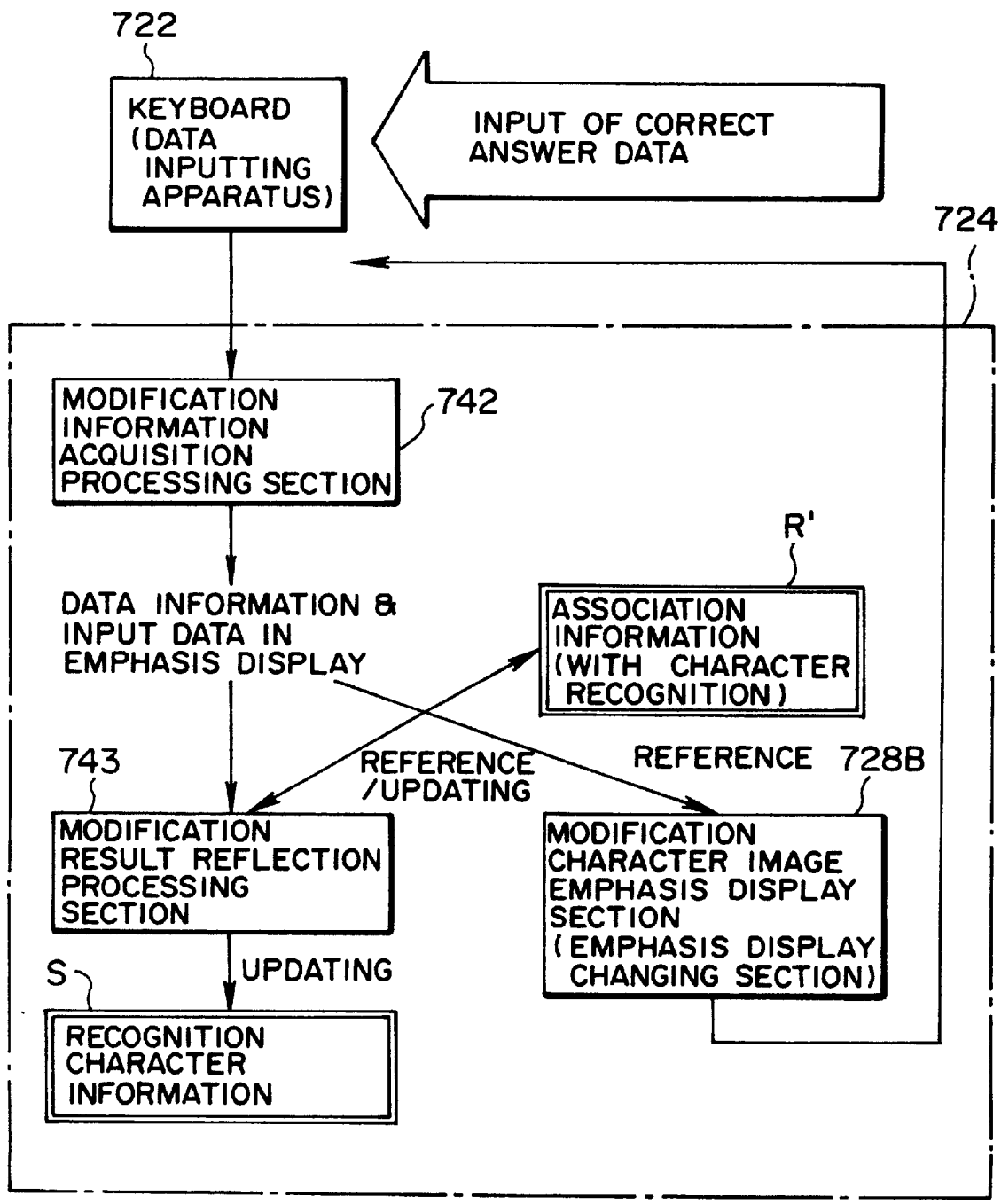

Further, if correct answer data for unrecognizable emblem image information or erroneous recognition emblem image information are inputted from the keyboard 722, then the recognition information modification section 752 registers the correct answer data as correct answer code data to effect modification to the unrecognizable emblem image information or the erroneous recognition emblem image information, and includes a modification information acquisition processing section 742 and a modification result reflection processing section 743 as seen in FIG. 88.

The associated information production section 741 refers to the association information R and the recognition character information S to produce association information R' having recognition character information.

The association information R' represents, as seen in FIG. 100, a "position and size on the full area image", a "corresponding character item name", a "corresponding item image name", an "in-item column position", a "recognition character", an "in-recognition character information offset" and a "modification completion flag" of information of a plurality of characters.

Here, the "position and size on the full area image" represents position information of character image information on the full area image P and is represented in units of a bit.

The "corresponding character item name" represents an item (such as "SUI-1 to SUI-4") to which character image information belongs. The "corresponding item image name" represents an image to which character image information belongs, and corresponds to the "corresponding character item name" (such as "ISUI-1 to ISUI-4").

For example, while the item "SUI-1" shown in FIG. 99 corresponds to recognition character information "1050", it includes information of character images 1 to 4 as seen in FIG. 100 and has an image name of "ISUI-1".

Furthermore, the "in-time column position" represents a position of character image information in an item. The "recognition character" represents recognition character information S, and represents that the recognition position "1" is at the third column position in the item, "0" is at the fourth column position, "5" is at the fifth column position, and "0" is at the sixth column position.

Further, although the "modification completion flags" are all "OFF" in FIG. 100, when modification to an unrecognizable character or a character recognized in error is performed, the "modification completion flag" corresponding to the information of the character image is changed to "ON" so that it is indicated that modification has been performed therefor.

It is to be noted that character image information is defined also by the "in-recognition character information offset" information.

Figure 92:
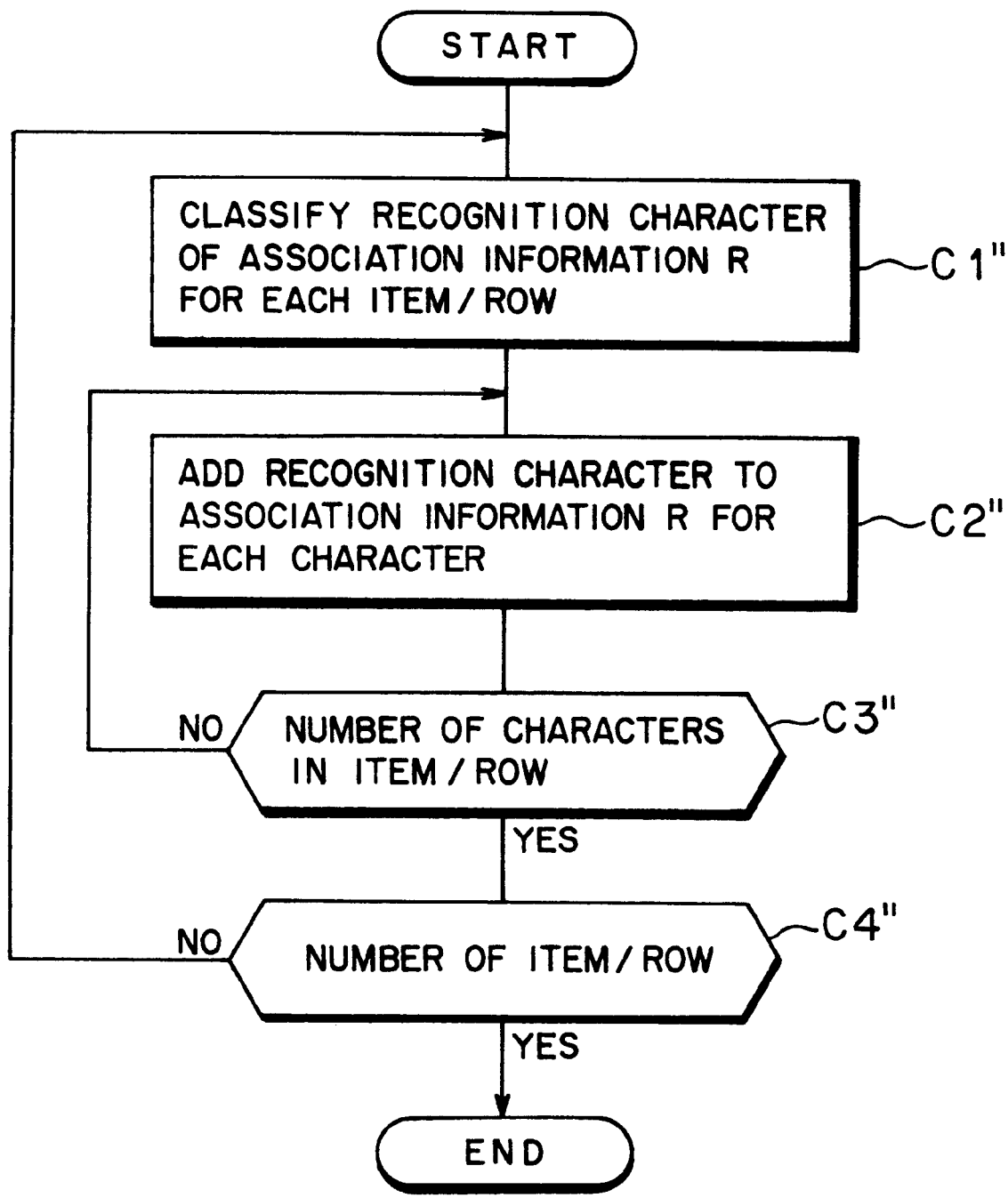

The association information R' is produced by such processing as illustrated in FIG. 92.

First, the recognition character information S is classified for individual position information represented by an item and/or a row (step C1"), and the thus classified recognition character information S is added to corresponding association information R (step C2"). Then, it is discriminated whether or not the numbers of items and/or in-row characters of the recognition character information S are within the number of items or in-row characters of the association information R (step C3"). Further, it is discriminated whether or not the number of items and/or rows of the recognition character information S is within the number of items or rows of the association information R (step C4"). Then, based on the discrimination, the association information R is updated to produce association information R'.

Actually, the read emblem display-recognition information modification apparatus 740 is constructed by installing suitable hardware, which may provide the functions as the character recognition section 726, read emblem image display control section 727, character image extraction processing section 729, character image display processing section 730, associated emblem image display section 731, correct answer data display section 728 and associated information production section 741 described above to the computer main frame 724 into the hard disk 723 or some other memory.

The read emblem display-recognition information modification apparatus 740 according to the present embodiment having the construction described above operates in the following manner.

A full area image P of an object document for reading is produced by the image reading apparatus 721 shown in FIG. 87, and the full area image P is converted into character image information and association information R' is produced using read designation information (definition information) by the emblem recognition apparatus 724.

An initial screen on the display unit 725 when the character image information is displayed on the display unit (not shown in FIG. 87) using the association information R' is such as the screen A of FIG. 101.

In this instance, "2034" and "1201" which are a reject character and characters positioned around the reject character are displayed in the unrecognizable emblem image information display area 732A, and character images representing "0" to "9" are displayed in the areas of "0" to "9" in the emblem image information display area 733A.

It is to be noted that "2034" displayed in the unrecognizable emblem image information display area 732A is emphatically displayed with a thick frame in order to indicate that the characters are an object of modification, and the reject character "3" which is an unrecognizable character is emphatically displayed with slanting lines. Similarly, in "1201" displayed in the unrecognizable emblem image information display area 732A, the reject character "2" which is an unrecognizable character is emphatically displayed with slanting lines.

Figure 93:
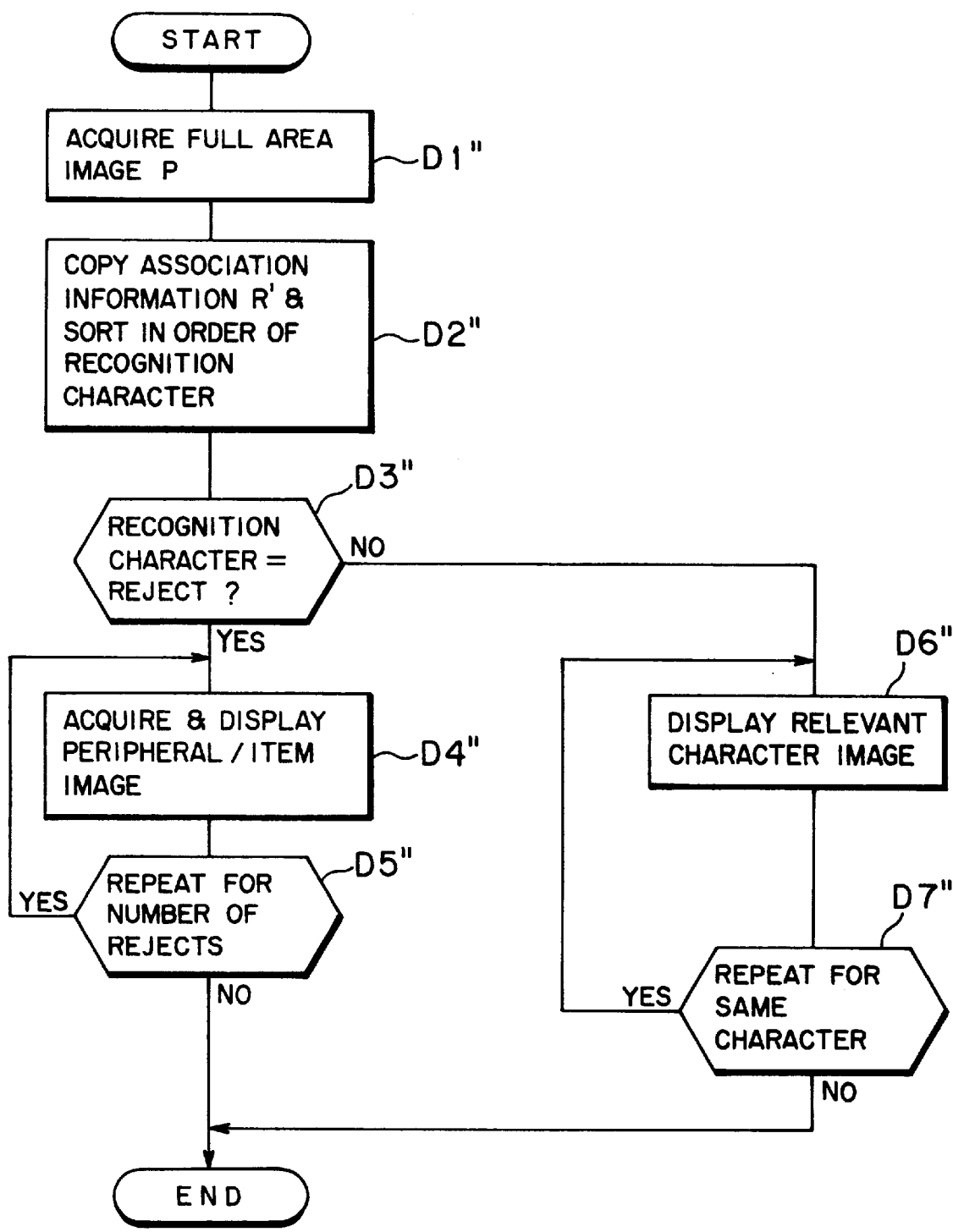

Here, such displays of character image information as shown in FIGS. 101 to 104 are performed by the emblem recognition apparatus 724 shown in FIG. 87, and an operation flow in this instance will be described with reference to FIG. 93.

First, the emblem recognition apparatus 724 acquires a full area image P (step D1"), and copies association information R' and classifies it in order of recognition character information S (step D2").

It is discriminated whether or not the recognition character is a reject character which cannot be recognized (step D3"), and if it is a reject character, then the emblem recognition apparatus 724 acquires character image information around it and/or of an item and displays it in the unrecognizable emblem image information display area 732A (step D4"). It is to be noted that the operations in steps D1" to D4" are repeated by the number of such reject characters (step D5").

On the other hand, when the recognition character is not a reject character, the emblem recognition apparatus 724 displays the character image information in a corresponding area of the emblem image information display area 733A (step D6"), and the operation in step D6" is repeated by the number of recognition characters (step D7").

If an operator inputs "3" as correct answer data using the keyboard 722 in such a condition of the initial screen A shown in FIG. 101, then "3" is displayed in the correct answer data display area 733C, and then if, for example, a settlement key is depressed, then the emphasis display at the location of "3" which is a reject character of "2034" displayed in the unrecognizable emblem image information display area 732A as shown on the screen B is changed from the slanting line display to a net emphasis display which indicates that the reject character has been modified. Together with this, the recognition character information S is modified and the association information R' is updated.

Further, on the screen B, in response to the change to the net emphasis display indicating that the reject character "3" in "2034" has been modified, an emphasis display of a thick frame is automatically applied to "1201" which is a next object of modification.

Further, if, in such a condition of the screen B as described above, the operator inputs "2" as correct answer data using the keyboard 722, then "2" is displayed in the correct answer data display area 733C. Then, if the settlement key is thereafter depressed, then the emphasis display at the location of "2" which is a reject character of "1201" displayed on the unrecognizable emblem image information display area 732A is changed from the slanting line display to the net emphasis display indicating that the reject character has been modified as seen from the screen C of FIG. 102. In response to this, the recognition character information S is modified and the association information R' is updated.

By the way, where any of character images representing "0" to "9" displayed in the areas of "0" to "9" of the emblem image information display area 733A is different, that is, where character image information is recognized in error, if the operator depresses, for example, a tab key of the keyboard 722, then the emphasis display of the thick frame moves from the area of "1. '?' (reject character)" to the area of "2. '0'" of the display unit 725 as seen in FIG. 102.

Further, if depression of the tab key is repeated, then the emphasis display of the thick frame moves to the area of "3. '1'" as seen in the screen E of FIG. 103. By repeating this, the emphasis display of the thick frame indicating an object of modification is successively moved in the display unit 725.

Figure 103:
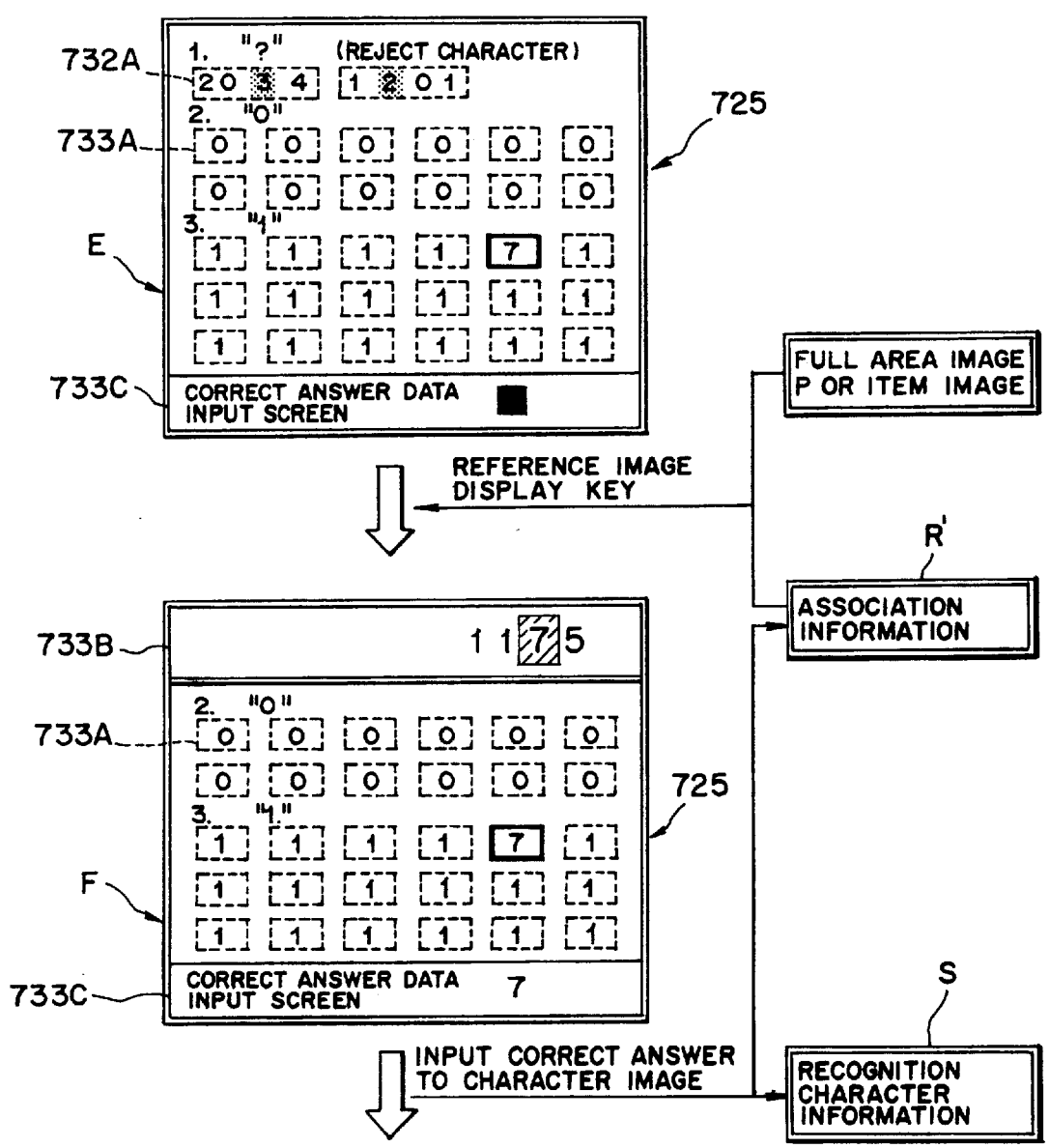

In particular, when the emphasis display of the thick frame is to be moved between the areas of "0" to "9", the tab key is depressed to select information of a desired character image, and on the screen E of FIG. 103, character image information "7" displayed as a result of erroneous recognition (that is, the image of "7" has been converted into code information of "1") is emphatically displayed with a thick frame.

Figure 89:
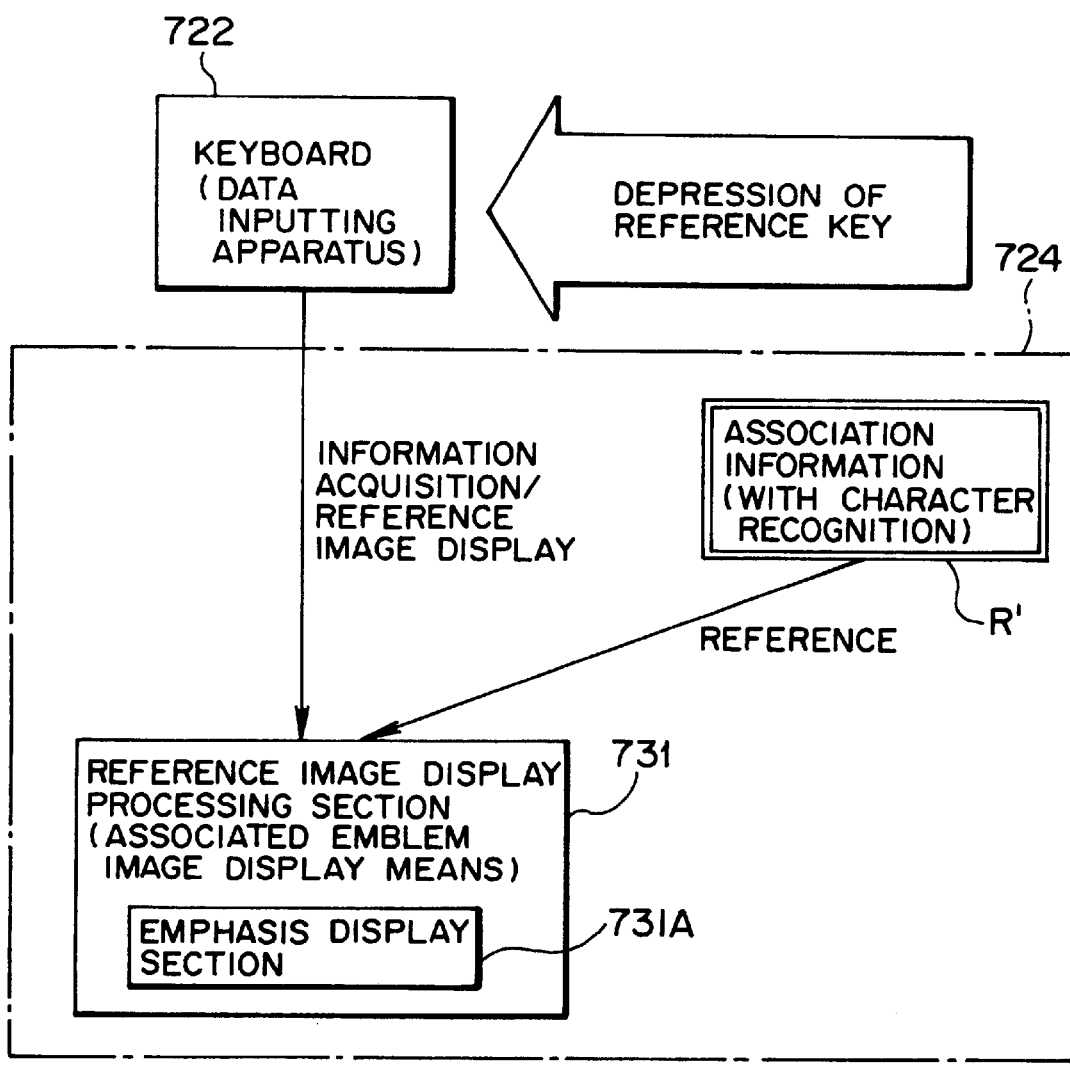

Here, where whether the character image information of "7" is correct or wrong cannot be identified readily by itself, if the operator depresses the reference key of the keyboard 722 as seen in FIG. 89, then the associated emblem image display section 731 serving as associated emblem image display means refers to the association information R' to display a reference image in the associated emblem image information display area 733B as seen from the screen F of FIG. 103.

Figure 104:
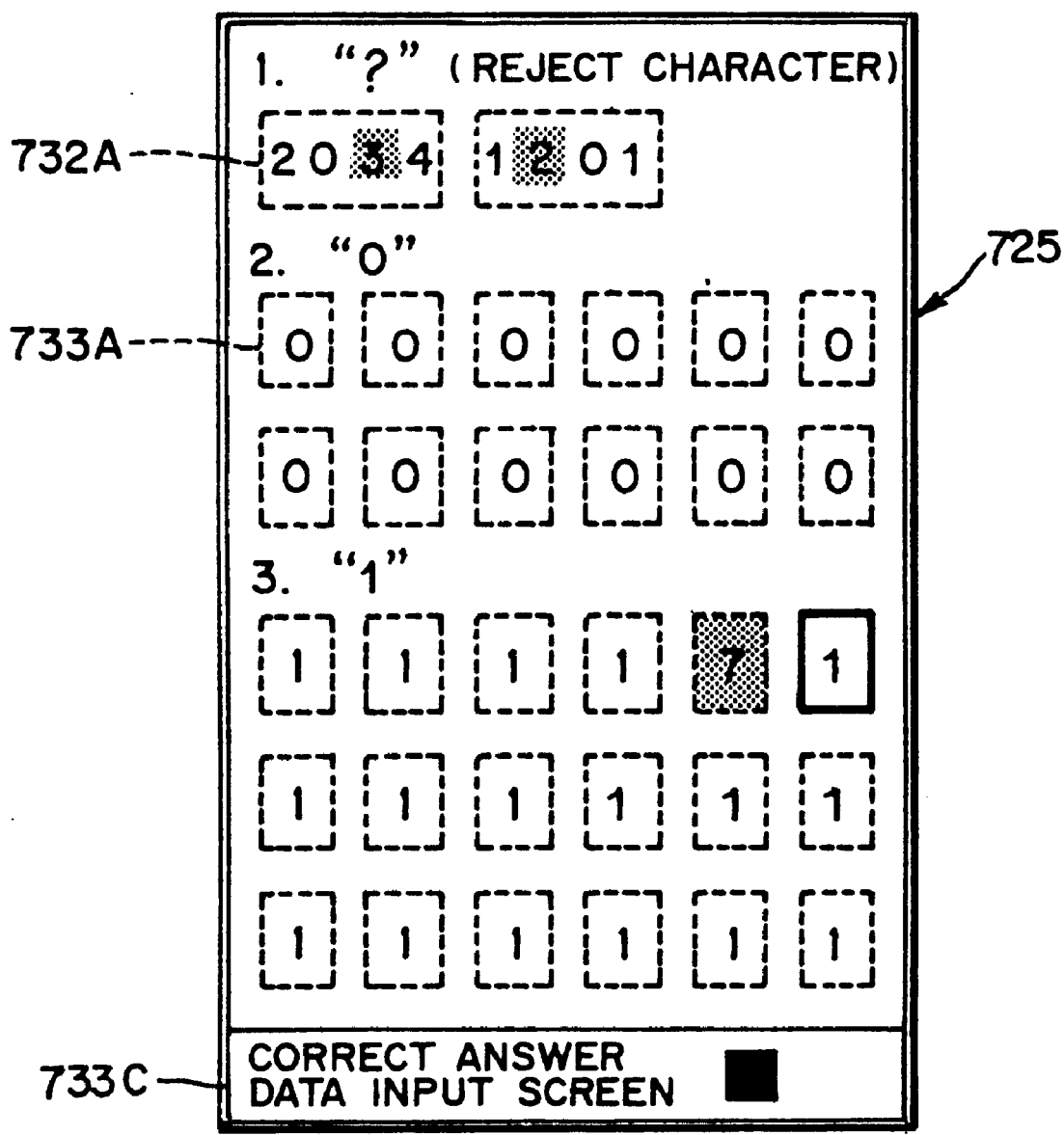

If, in such a condition of the screen F as described above, the operator inputs "7" as correct answer data using the keyboard 722 and depresses the settlement key, then "7" is displayed in the correct answer data display area 733C, and code information of the character image information of "7" is modified from "1" of erroneous recognition to "7" as seen in FIG. 104. Then, a net emphasis display indicating that modification has been performed is applied to the character image information of "7".

In particular, the recognition character information S and the association information R' are updated, and an emphasis display indicating that modification has been performed is applied to the modified character image information of "7".

Figure 97:
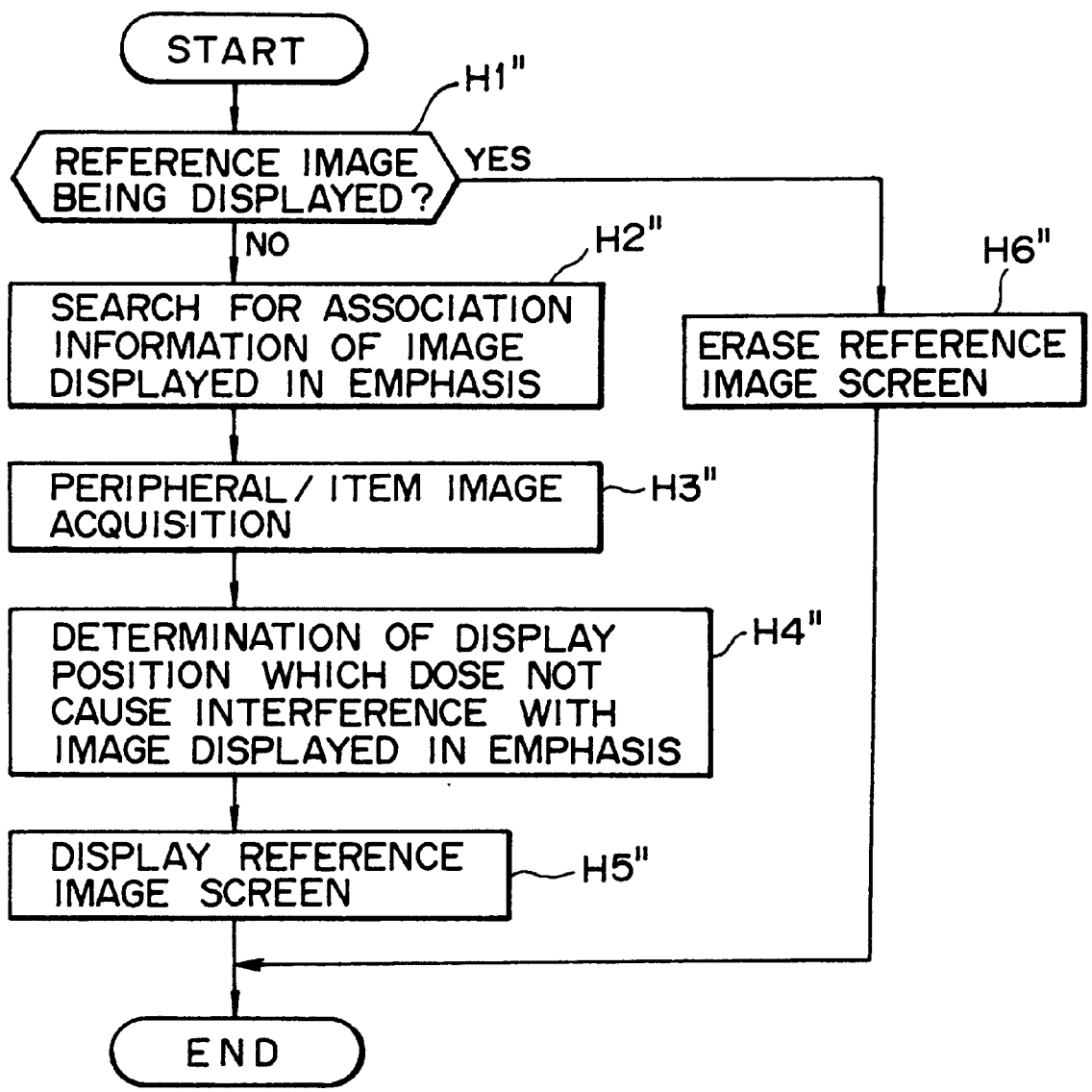

Here, such reference image displaying processing as illustrated in FIG. 89 is performed by the associated emblem image display section 731 as described hereinabove, and an operation flow in this instance will be described with reference to FIG. 97.

First, it is discriminated whether or not a reference image is displayed (step H1"). If a reference image is not displayed, then the associated emblem image display section 731 retrieves the association information R' of the character image information of an object of modification displayed in emphasis (step H2").

Then, image information around the character image information of the object of modification and/or an item is acquired (step H3"), and the position at which a reference image is to be displayed is set to a position at which the reference image does not cover the character image information of the object of modification displayed in emphasis (step H4"). Then, the reference image is displayed (step H5").

It is to be noted that, if the reference key is depressed again while the reference image is displayed, then the reference image is erased (step H6").

Here, such modification to character image information as seen in FIGS. 101 to 104 is performed by the modification information acquisition processing section 742 and the modification result reflection processing section 743 of the character recognition section 726 shown in FIGS. 87 and 88 and the emphasis display changing section 727B which serves as emphasis display changing means, and an operation flow in this instance will be described with reference to FIGS. 94 to 96.

If the operator inputs correct answer data through the keyboard 722 as seen in FIG. 88, then the correct answer data are inputted as modification information to the modification information acquisition processing section 742, and the modification result reflection processing section 743 produces recognition character information S using the modification information and association information R' and modifies and updates the association information R'. Meanwhile, the emphasis display changing section 727B refers to the modification information to apply, to an item to which the amendment has been performed, an emphasis display indicating such amendment.

Figure 94:
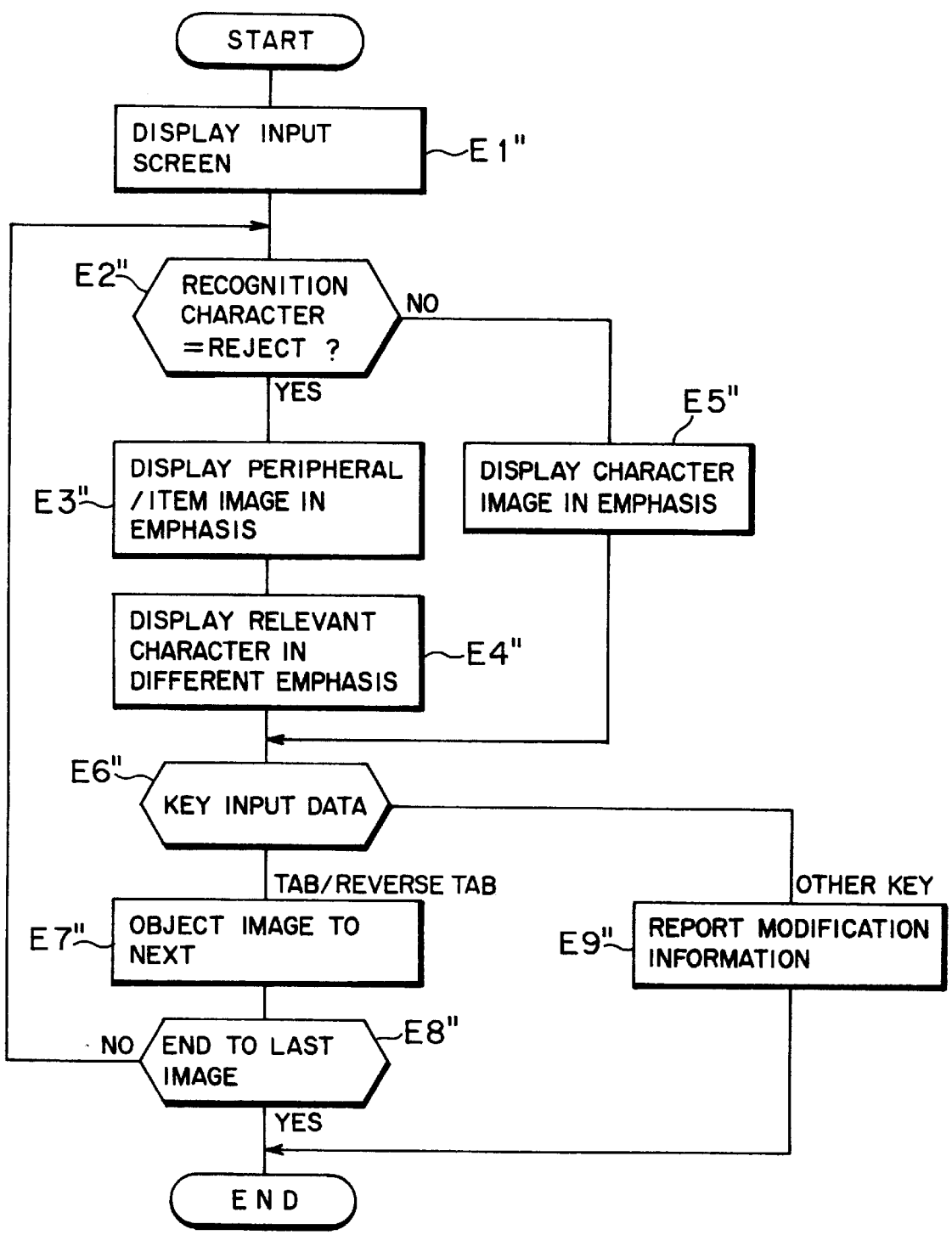

In this instance, as an input screen is displayed as seen in FIG. 94 (step E1"), the modification information acquisition processing section 742 discriminates whether or not the recognition character is a reject character which is an unrecognizable character (step E2"). If the recognition character is a reject character, then the modification information acquisition processing section 742 applies, to peripheral and/or item image information, an emphasis display of a thick frame indicting that the peripheral and/or item image information is an object item for modification (step E3") and applies, to the reject character which is the recognition character, another emphasis display of slanting lines different from the thick frame (step E4").

On the contrary, if the recognition character is not a reject character, then an emphasis display of a thick frame is applied to the character image information (step E5").

Here, if, for example, the tab key or a reverse tab key (key for moving the cursor in a direction opposite to that of a movement by the tab key) is depressed by an operation of the keyboard 722 by the operator (step E6"), then the emphasis display of the thick frame indicting an object of modification is moved so that the next character image information may be indicated as an object of modification (step E7"). If the emphasis display of the thick frame moves to the last character image information, this operation is thereafter performed beginning with the first character image information (step E8").

It is to be noted that, if some other key is depressed, then the modification information is reported to the associated information production section 741 (step E9").

Figure 95:
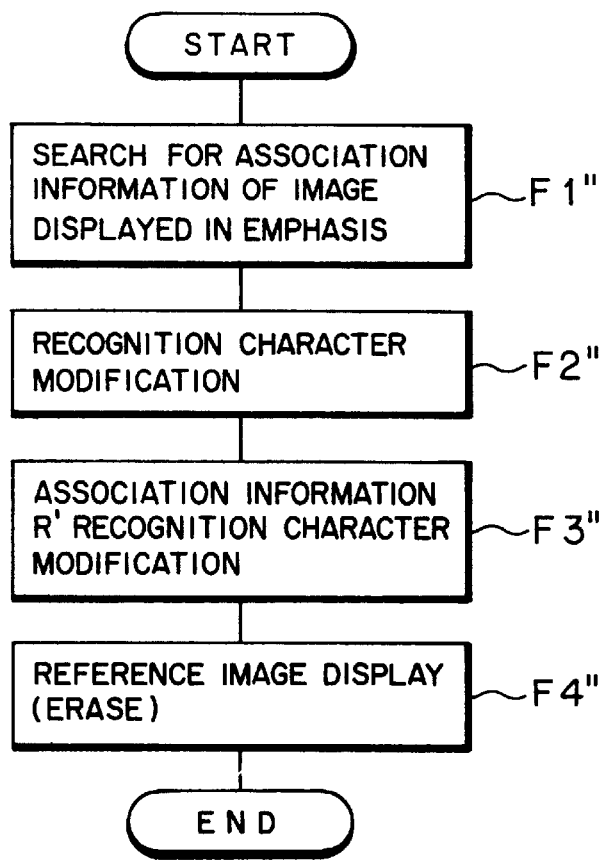

On the other hand, the modification result reflection processing section 743 shown in FIG. 88 retrieves, as seen in FIG. 95, the association information R' of the character image information being displayed in emphasis (step F1"), modifies the recognition character (unrecognizable character or erroneously recognized character) (step F2"), modifies the recognition character of the association information R' (step F3") and displays or erases the reference image (step F4").

Figure 96:
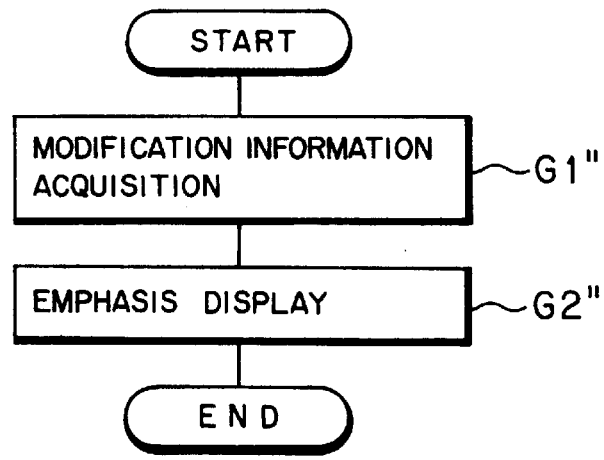

Further, the emphasis display changing section 727B shown in FIG. 88 acquires, as seen in FIG. 96, the modification information (step G1") and applies an emphasis display indicating that modification has been performed (step G2").

Figure 90:
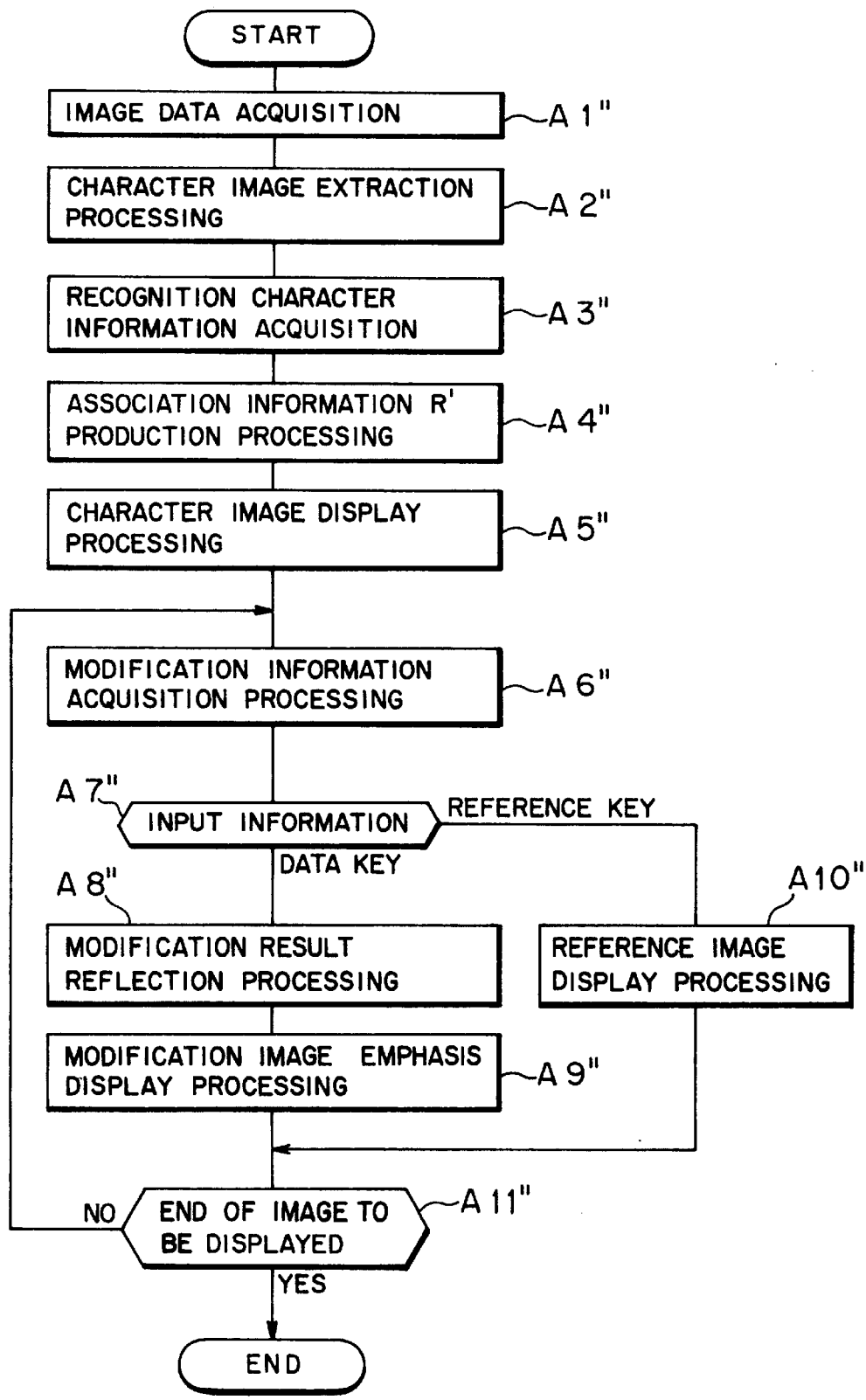
FIGS. 90 to 97 are flow charts illustrating operation of the read emblem display-recognition information modification apparatus according to the embodiment of the present invention.

As described hereinabove, display of and amendment to character image information and display of a reference image by the read emblem display-recognition information modification apparatus 740 are performed, as seen in FIG. 90, by acquisition of image data which are a full area image P (step A1"), extraction of character image information (step A2"), acquisition of recognition character image information (step A3"), production of association information R' (step A4"), display of the character image information (step A5"), acquisition of modification information (step A6"), depression of the data key or the reference key (step A7"), reflection of a result of the modification in response to the depression of the data key (step A8"), emphasis display of the modified character image information (step A9") and display of a reference image in response to the depression of the reference key (step A10") by the computer main frame 724, and this processing is performed for all character image information being displayed (step A11").

In this manner, with the read emblem display-recognition information modification apparatus 740 according to the present embodiment, image information of an unrecognizable character, which has not been recognized successfully by the computer main frame 724, is displayed in a condition of a read image together with image information of characters around the unrecognizable character on the display unit 725 and an emphasis display is applied to the image information of the unrecognizable character. Consequently, the read emblem display-recognition information modification apparatus 740 is advantageous in that, by referring to the image information of the preceding and following characters in the row of characters, a confirmation operation with a high degree of accuracy can be performed, and the labor and the time required for a confirmation operation between correct and wrong can be reduced.

Further, with the read emblem display-recognition information modification apparatus 740 according to the present embodiment, if correct answer data corresponding to image information of an unrecognizable character or an erroneously recognized character is inputted by an operation of the keyboard 722, then the correct answer data is displayed on the display unit 725, and the image information of the unrecognizable character or erroneously recognized character which has been emphatically displayed till now is displayed with a different emphasis display which signifies completion of amendment. Consequently, the read emblem display-recognition information modification apparatus 740 is advantageous in that a character for which inputting of an unrecognizable character or modification to an erroneously recognized character has been performed and another character for which such operation has not been performed can be identified readily, and accordingly, the visual discernibility is raised to prevent double modifications by an operator and so forth and the labor and the time required for a confirmation operation between correct and wrong can be reduced remarkably.

Furthermore, with the read emblem display-recognition information modification apparatus 740 according to the present embodiment, emblems are displayed in such units with which visual observation is facilitated that only same emblems are displayed in a same area on a display unit and an emphasis display is applied only to information of a desired one character image. Consequently, the read emblem display-recognition information modification apparatus 740 is advantageous in that an operator can confirm whether a result of recognition is correct or wrong only by referring to the image information without referring to information of associated peripheral character images so that movements of the eye of the operator can be reduced remarkably and also in that an emphasis display can be applied only to character image information being processed to reduce objects of comparison and the labor and the time required for a confirmation operation between correct and wrong can be reduced remarkably.

Further, with the read emblem display-recognition information modification apparatus 740 according to the present embodiment, correct answer data are displayed in a correct answer data display area different from an area in which such information of one character image as mentioned above and peripheral character image information associated with the character image information are displayed. Consequently, the read emblem display-recognition information modification apparatus 740 is advantageous in that the character image information and the inputted correct answer data can be re-confirmed by visual observation and the labor and the time required for a confirmation operation between correct and wrong can be reduced and besides the confirmation operation can be performed with a high degree of accuracy.

It is to be noted that, while, in the present embodiment, when an unrecognizable character or an erroneously recognized character is to be modified, correct answer data inputted for the unrecognizable character or erroneously recognized character is displayed in the correct answer data display area 733C of the display unit 725, an unrecognizable character or an erroneously recognized character may be modified otherwise without displaying the correct answer to the unrecognizable character or erroneously recognized character, or else, only correct answer data to either one of an unrecognizable character and an erroneously recognized character may be displayed to modify the unrecognizable character or erroneously recognized character.

Figure 105:
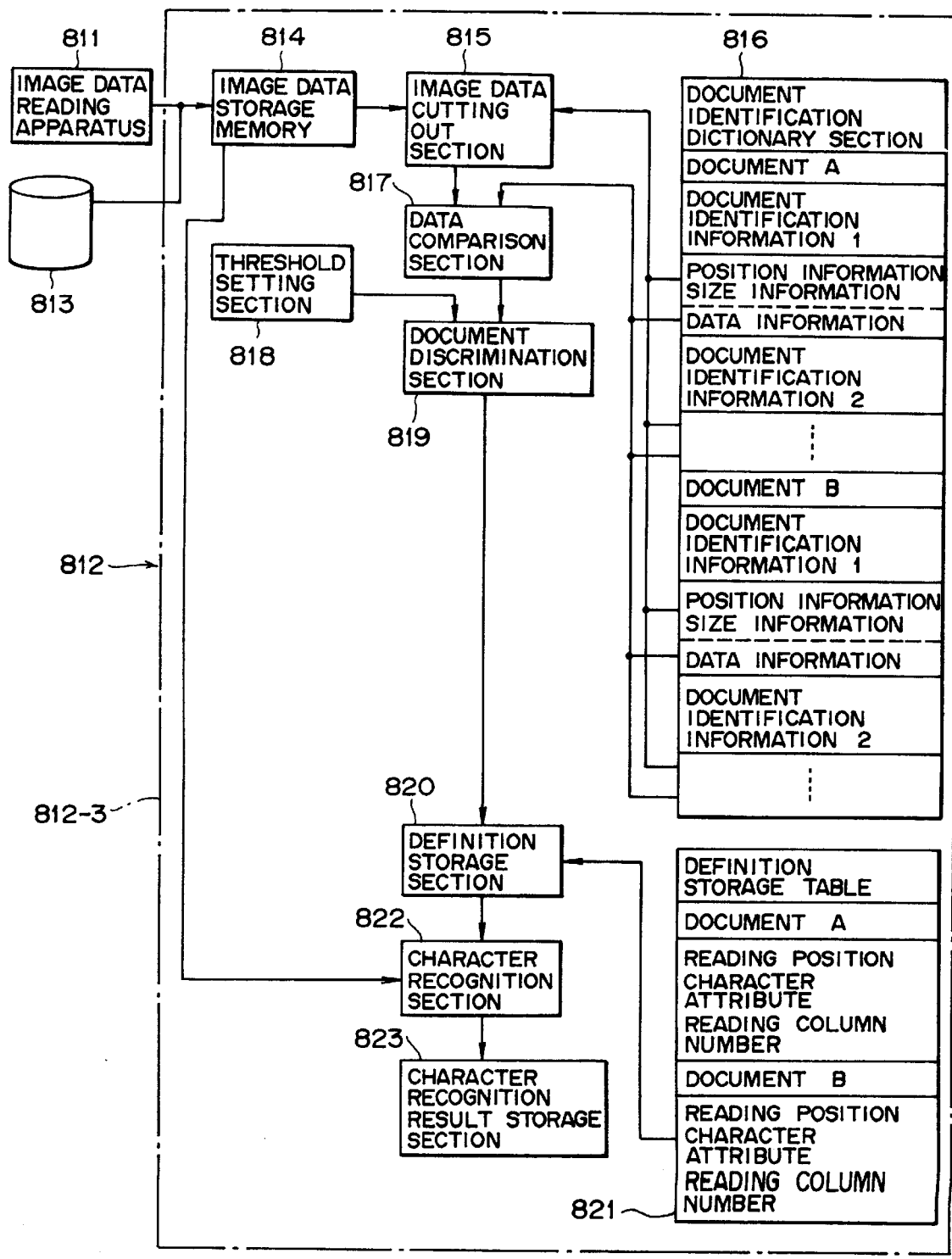
FIG. 105 is a block diagram showing a document identification apparatus according a first modification to the embodiment of the present invention.

Further, while, in the present embodiment, a document of such a table format as seen in FIG. 98 is used as a document on which paying-in data are described, the document on which paying-in data are described is not limited to this, and a document of any other format may be used instead. (b) Description of Modifications to the Embodiment of the Invention (b1) Description of a Document Identification Apparatus According to a First Modification to the Embodiment FIG. 105 is a block diagram showing a document identification apparatus according to a first modification to the embodiment of the present invention. Also the document identification apparatus shown in FIG. 105 may be composed of an image data reading apparatus 811, a computer 812 (this computer 812 includes an inputting section 812-1, a display unit 812-2 and a control section 812-3 as hereinafter described), and a hard disk 813 similar to those of FIG. 115 described hereinabove (refer to reference numerals 1001, 1002 and 1003).

Figure 115:
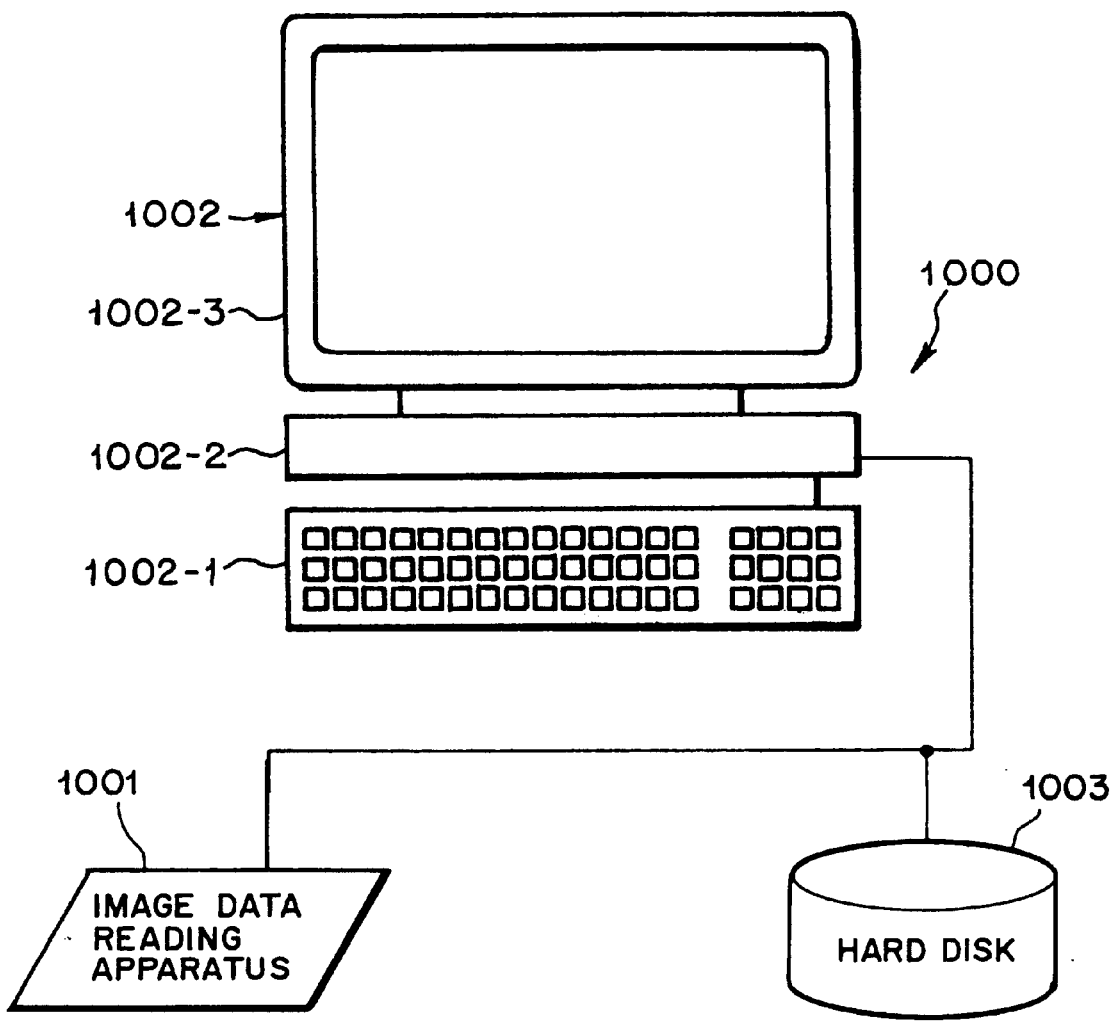
FIG. 115 is a schematic view showing a construction of a document identification apparatus.
Figure 116:
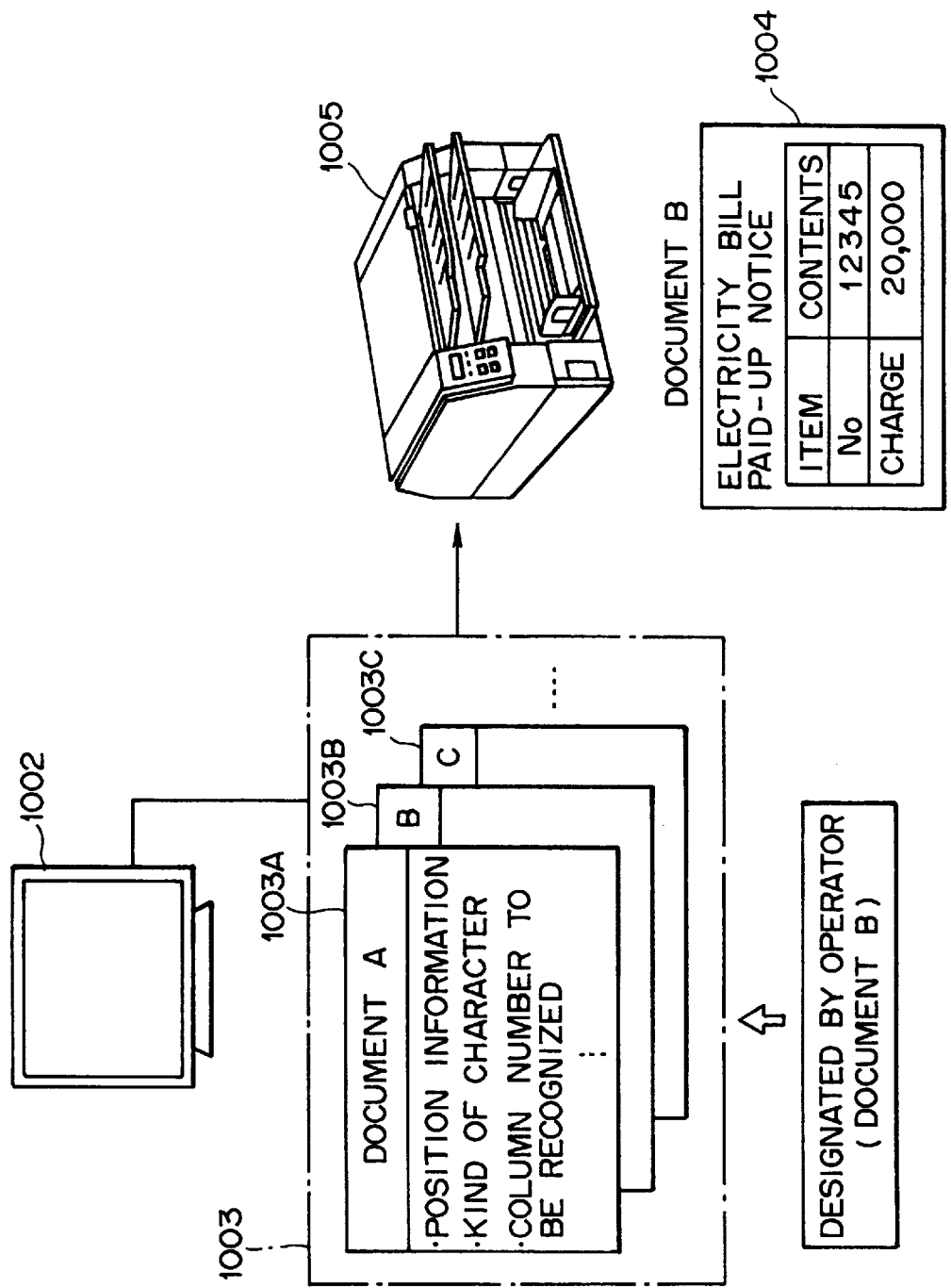
FIG. 116 is a view illustrating operation of the document identification apparatus.
Figure 118A:
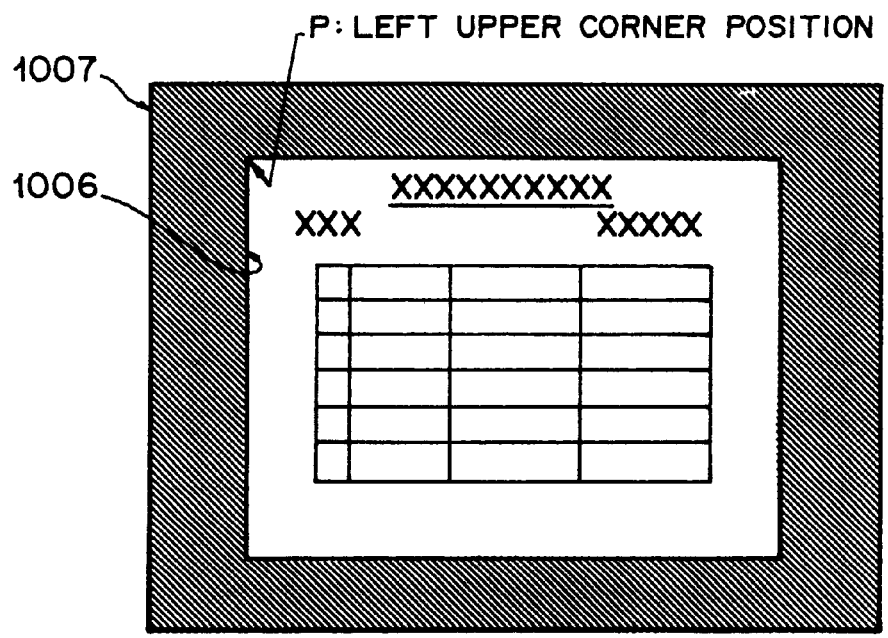
FIGS. 118(a) and 118(b) are views illustrating an extraction method of a reference point of image data.
Figure 118B:
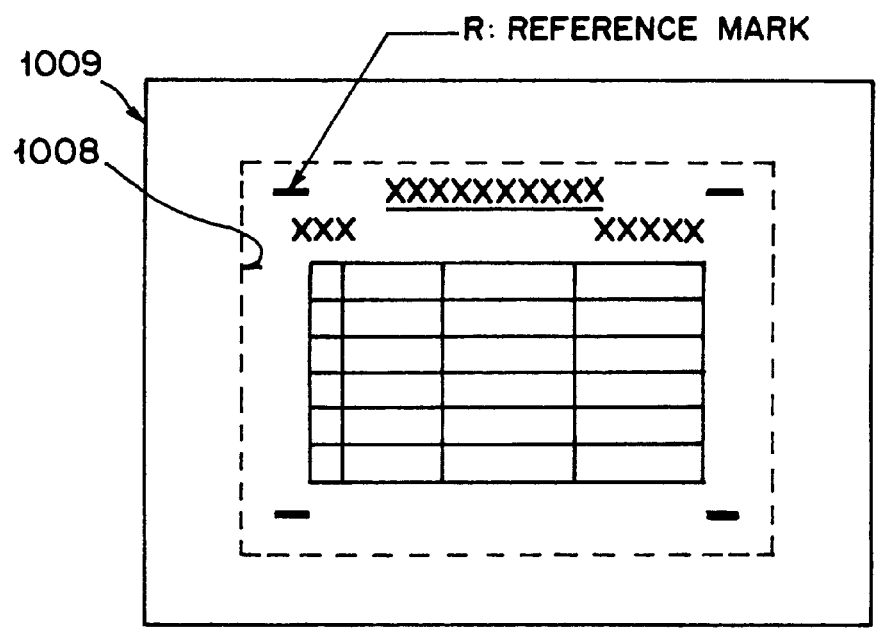
Figure 119:
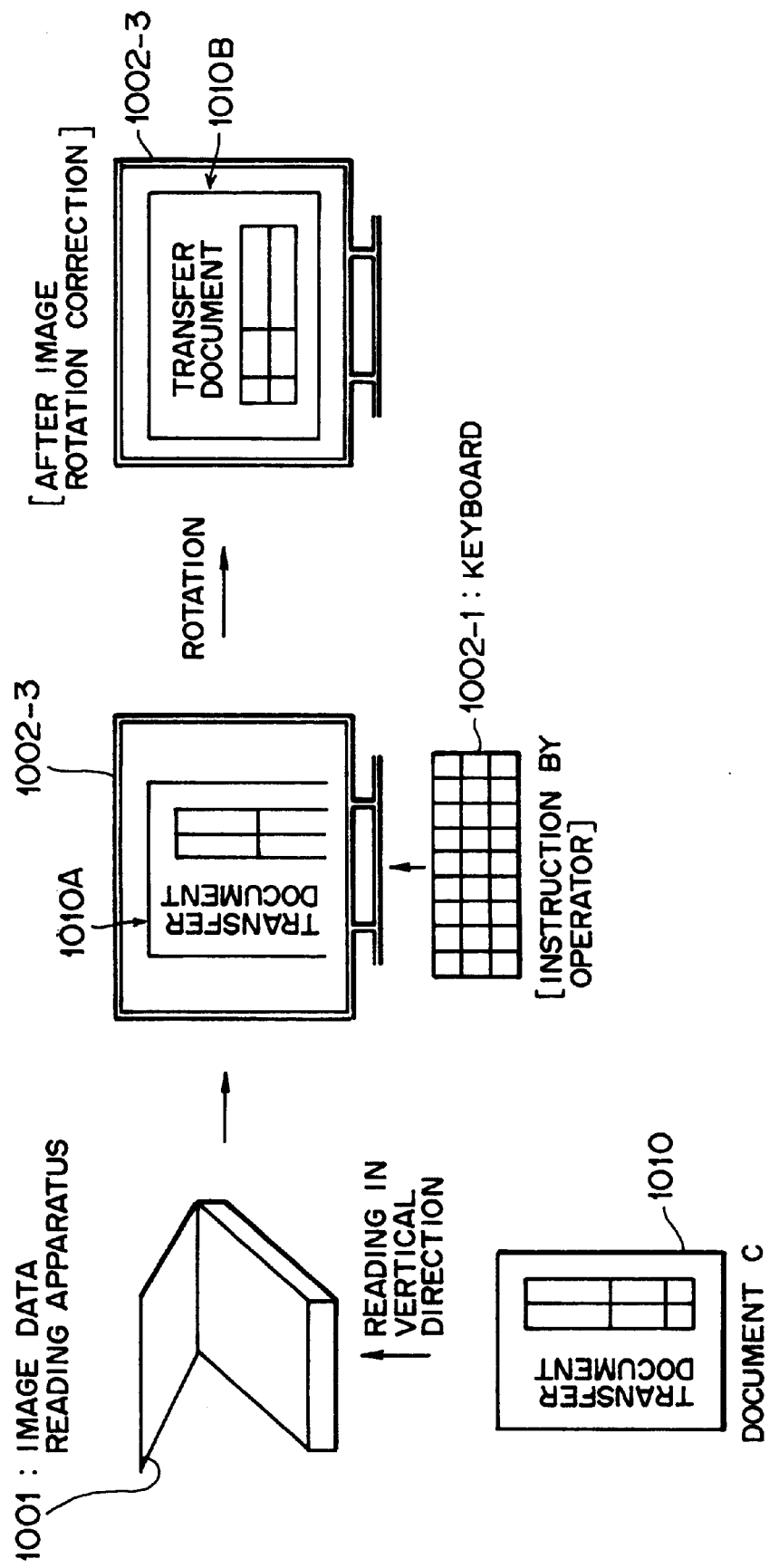
FIG. 119 is a view illustrating rotational correction processing of image data.

The image data reading apparatus 811 reads image data of a document, and for this image data reading apparatus 811, an optical character reading apparatus (OCR apparatus), an image scanner or the like similar to that described hereinabove with reference to FIG. 115 can be used.

The control section 812-3 performs, based on image data of a document read by the image data reading apparatus 811, processing as document data, and can be formed from functional portions of the computer 812 as a CPU and a memory.

Further, the control section 812-3 is connected, similarly to that described hereinabove with reference to FIG. 115, to an inputting section (refer to reference 812-1 of FIG. 106 which will be hereinafter described) such as a keyboard or a mouse for inputting data, an instruction and so forth to the control section 812-3 by an operator and also to a display unit (refer to reference symbol 812-2 of FIG. 106 which will be hereinafter described) for displaying image data and so forth read by the image data reading apparatus 811.

The hard disk (file memory) 813 stores all image data of a document read by the image data reading apparatus.

By the way, the control section 812-3 functionally includes, as shown in FIG. 105, an image data storage memory 814, an image data cutting out section 815, a document identification dictionary section 816, a data comparison section 817, a threshold setting section 818, a document discrimination section 819, a definition storage section 820, a definition storage table 821, a character recognition section 822 and a character recognition result storage section 823.

The image data storage memory 814 stores image data of a document read by the image data reading apparatus 811 once. The image data cutting out section 815 has a function as document identification information extraction means for extracting required document identification information described on a document from image data of the document stored in the image data storage memory 814 in response to an instruction of information (identification information) which is based on an operation of the inputting section 812-1 by an operator and makes an object of extraction.

When the image data cutting out section 815 described above extracts required document identification information from identification information, image data of a document read by the image data reading apparatus 811 is displayed (projected) on the display unit 812-2, and the operator can instruct identification information based on the image data displayed on the display unit 812-2.

It is to be noted that the operator can instruct, as information which makes an object of extraction by the image data cutting out section 815, for example, any described information such as character information, a mark, a seal or a ruled line described on a document, and the image data cutting out section 815 automatically extracts coordinate position information of instructed information, magnitude information of described information and data information as document identification information, for example, by software or firmware processing.

Further, the document identification dictionary section (document identification dictionary) 816 registers document identification information extracted by the image data cutting out section 815 as document identification of a particular document.

Figure 108:
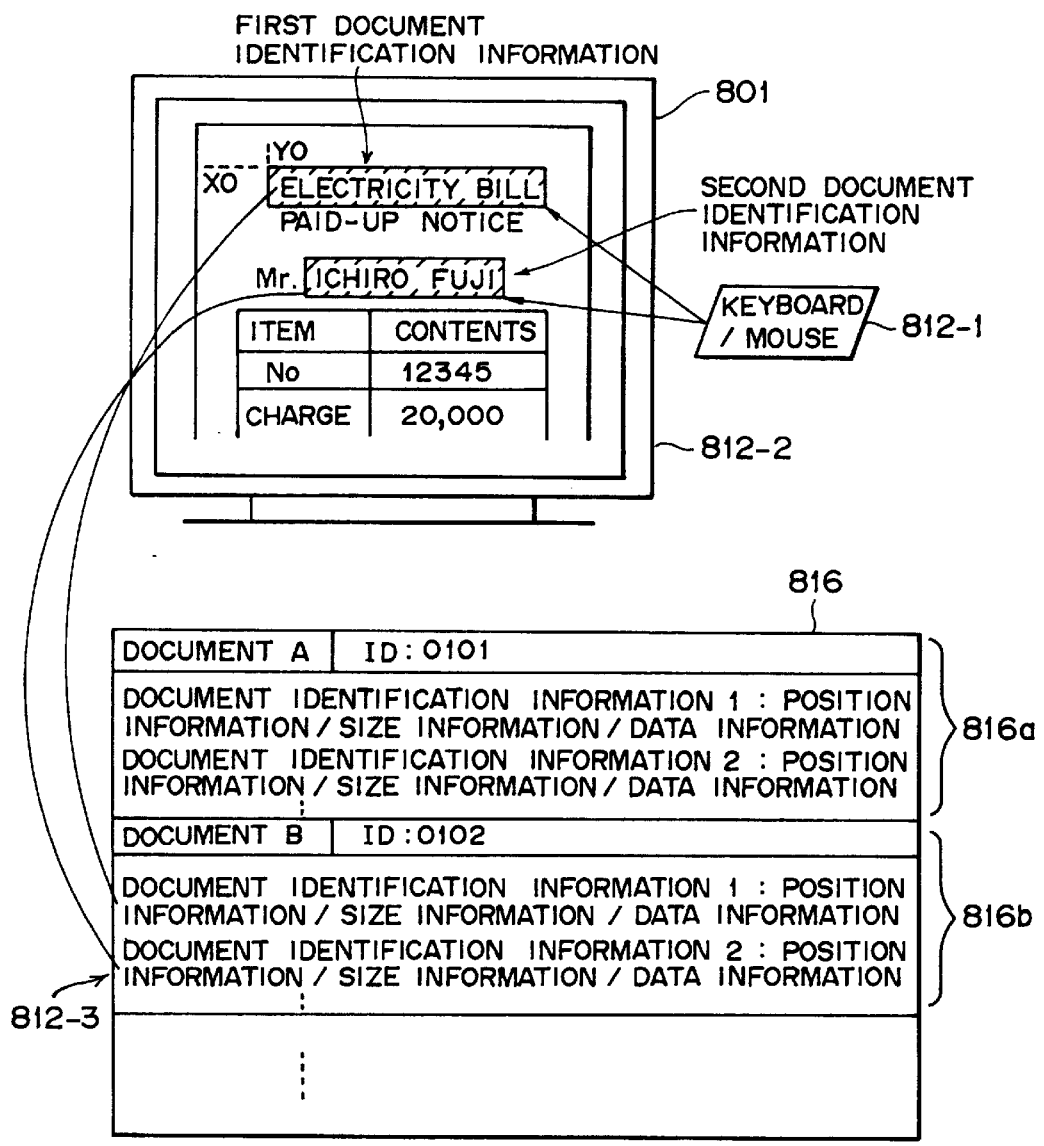
FIG. 108 is a view illustrating operation of the document identification apparatus according to the first modification to the embodiment of the present invention upon the registration step operation.

More particularly, as seen in FIG. 108, document identification information of a document kind A to which an ID number '0101'is applied is stored in a region 816a, and document identification information of another document kind B to which another ID number '0102' is applied is stored in another region 816b.

Accordingly, operation as the registration step of extracting document identification information described on a particular document from image data of the particular document read by the image data reading apparatus 811 and registering the document identification information into the document identification dictionary section 816 is performed by the image data storage memory 814, image data cutting out section 815 and document identification dictionary section 816 described above.

It is to be noted that, while image data of a document read by the image data reading apparatus 811 described above are stored once into the image data storage memory 814 when document identification information is to be registered into the document identification dictionary section 816, image data of all documents read by the image data reading apparatus 811 are stored into the hard disk 813.

The data comparison section 817 has a function as verification means for reading out image data of the particular documents stored in the image data storage memory 814 and verifying whether or not the image data of the particular documents include document identification information registered in the document identification dictionary section 816 and also has another function as reference means for detecting whether or not image data of an arbitrary document read by the image data reading apparatus 811 and stored in the image data storage memory 814 include document identification information stored in the document identification dictionary section 816, thereby simplifying the apparatus construction.

Further, the document discrimination section 819 has a function as discrimination means for discriminating whether or not recognition of a particular document is possible based on a result of verification by the data comparison section 817 serving as verification means to discriminate whether or not the particular document has been specified fully to one document with certainty and has another function as document identification means for identifying whether or not an arbitrary document is a particular document based on a result of reference by the data comparison section 817 serving as reference means, thereby simplifying the apparatus construction.

More particularly, the data comparison section 817 serving as verification means successively extracts information extracted in units of image data of a document by the image data cutting out section 815 and corresponding document identification information from the document identification dictionary s section 816 one by one image from image data regarding all documents stored on the hard disk 813 and collates them. The document discrimination section 819 serving as discriminating means discriminates based on a result of collation of document identification information from the data comparison section 817 whether or not the document can be specified uniquely without fail.

Further, the data comparison section 817 serving as reference means collates information extracted by the image data cutting out section 815 from image data inputted from the image data reading apparatus 811 with corresponding document identification information from the document identification dictionary section 816 to calculate a coincidence degree. The document discrimination section 819 serving as document identification means compares the coincidence degree of document identification information from the data comparison section 817 with a threshold value from the threshold setting section 818 to discriminate whether or not the document of the image data inputted from the image data reading apparatus 811 can be identified.

Accordingly, operation as the verification step of discriminating whether or not recognition of a particular document is possible is performed and also operation as the operation step of discriminating whether or not an arbitrary document is a particular document are performed by the document identification dictionary section 816, data comparison section 817, threshold setting section 818 and document discrimination section 819 described above.

Figure 3:
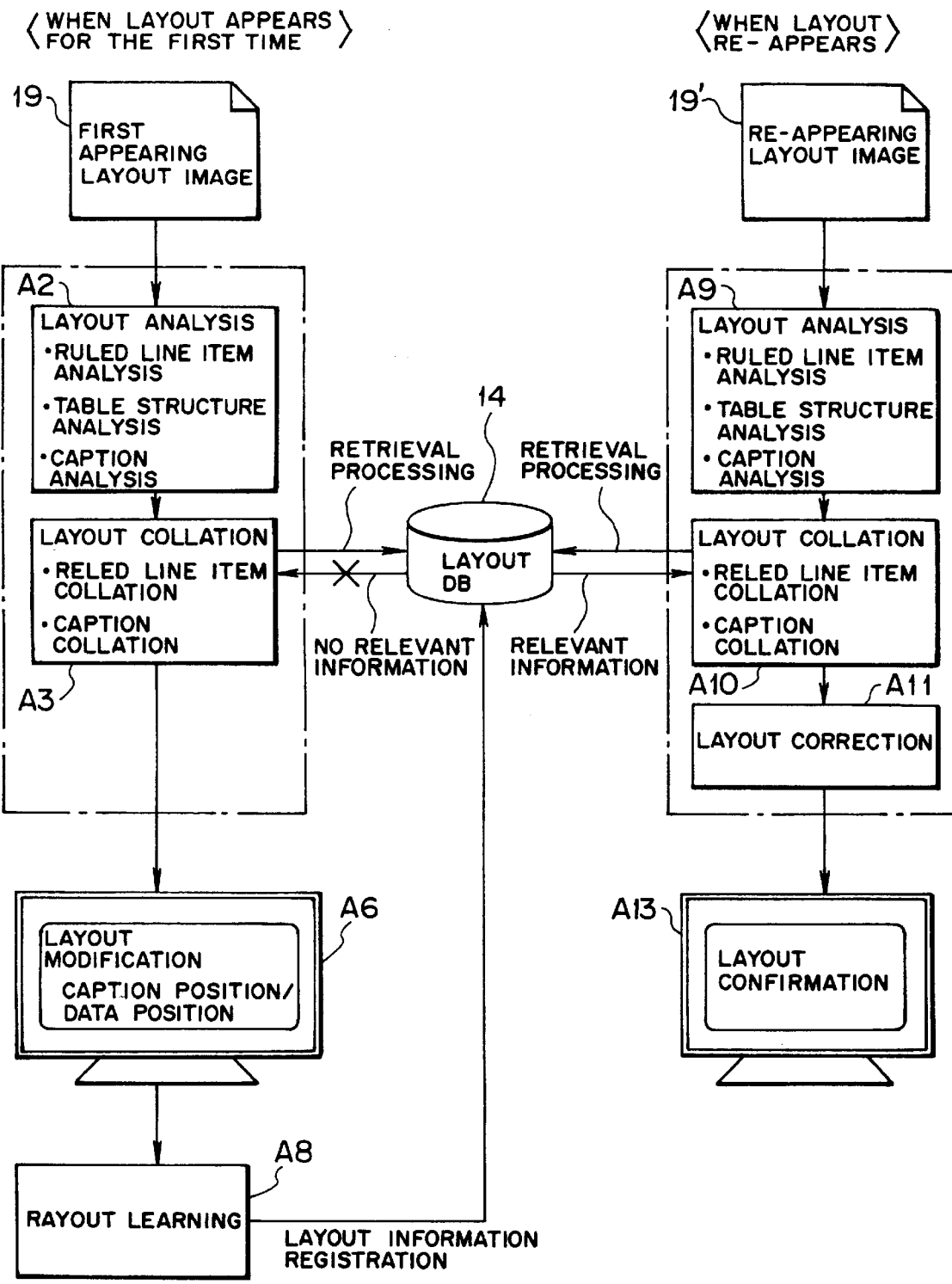

In other words, the registration step described above corresponds to the processing of <when a layout appears for the first time> of FIG. 3 (layout analysis processing A2, operator processing A6 and layout learning processing A8), and the verification step and the operation step described above correspond to the processing of <when a layout appears again> of FIG. 3 (layout analysis processing A9, layout collation processing A10 and operator processing A13).

It is to be noted that, upon discrimination of a coincidence degree by the document discrimination section 819 based on threshold value information from the threshold setting section 818 described above, the threshold value information from the threshold setting section 818 is set to such a degree that the discrimination can be performed absorbing an error upon reading operation of the image data reading apparatus 811, a print error of the document itself and so forth.

The definition storage section 820 reads out, when the document discrimination section 819 discriminates that an arbitrary document is a particular document, that is, when the document discrimination section 819 successfully recognizes, upon operation of the system, that a document whose image data have been read by the image data reading apparatus 811 is a particular document corresponding to the document identification information registered in the document identification dictionary section 816, definition information for recognition of data described on the document from the definition storage table 821 and stores the definition information once therein.

The definition storage table 821 stores definition information (for example, reading position information, character attribute information, reading column number and so forth) to be used for character recognition of contents described on a particular document corresponding to document identification information registered in the document identification dictionary section 816.

The character recognition section 822 receives image data stored in the image data storage memory 814 described hereinabove and regarding a document which has been successfully identified as a particular document registered in the document identification dictionary section 816 and definition information corresponding to image data from the definition storage section 820, and performs character recognition processing of the image data in accordance with the definition information.

Further, the character recognition result storage section 823 stores character information recognized by the character recognition section 822.

Operation of the document identification apparatus according to the first modification to the embodiment of the present invention having the construction described above will be described below in regard to the registration step, the verification step and the operation step described hereinabove.

Description of Processing in the Registration Step

Figure 106:
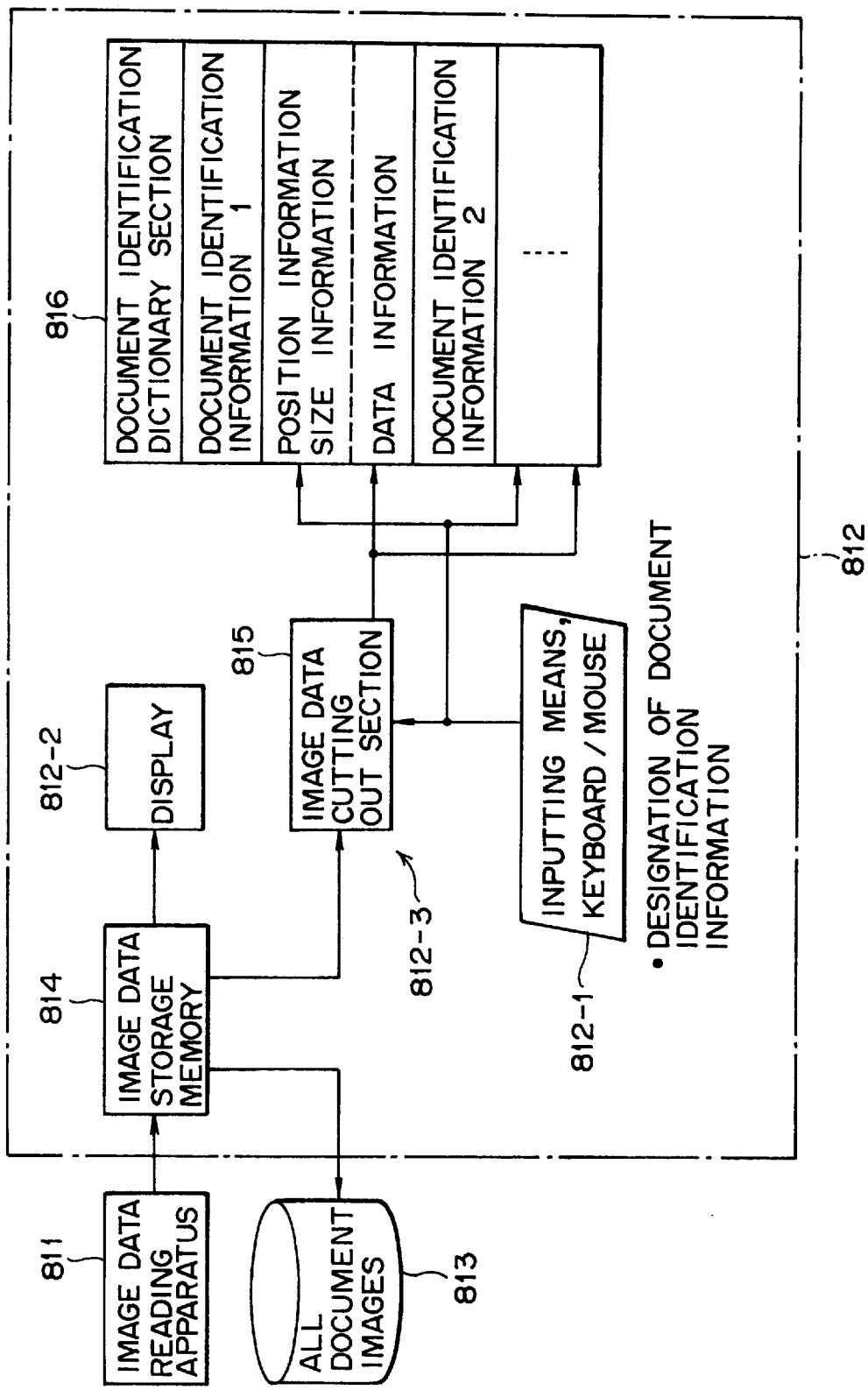
FIG. 106 is a control block diagram wherein notice is taken of operation of the document identification apparatus according to the first modification to the embodiment of the present invention upon registration step operation.

First, operation of the document identification apparatus according to the present embodiment in the registration step will be described below with reference to the control block diagram shown in FIG. 106 which takes notice of operation in the registration step, the flow chart illustrating operation in the registration step illustrated in FIG. 107 and FIG. 108.

Figure 107:
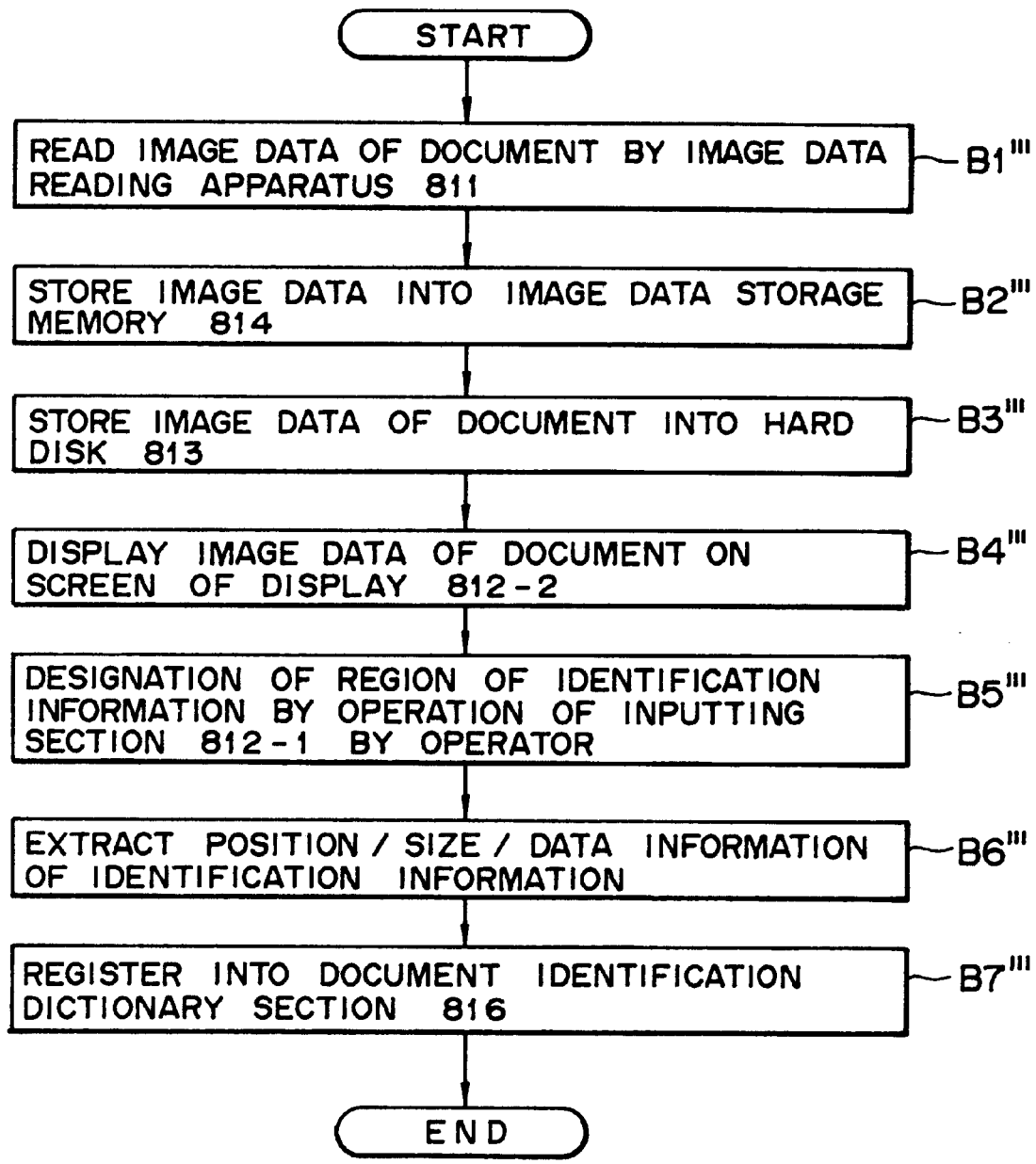
FIG. 107 is a flow chart illustrating the operation of the document identification apparatus according to the first modification to the embodiment of the present invention upon the registration step operation.

In particular, as seen in FIG. 108, if image data of a document 824B of an electricity rate paid-up notice are read by the image data reading apparatus 811 in response to an operation of an operator (step B1'" of FIG. 107), then the image data read are stored once into the image data storage memory 814 (step B2'" of FIG. 107) and the image data are stored also onto the hard disk 813 so that all of the image data read by the image data reading apparatus 811 are stored (step B3'" of FIG. 107). It is to be noted that the image data read by the image data reading apparatus 811 are displayed on the display unit 812-2 as seen in FIG. 108 (step B4'" of FIG. 107).

Here, where the image data stored in the image data storage memory 814 and the hard disk 813 are image data regarding a document read for the first time, document identification information is stored into the document identification dictionary section 816 as described below.

In particular, as the operator refers to the display unit 812-2 and operates the inputting section 812-1, a plurality of pieces of information which make an object of extraction are instructed to the image data cutting out section 815 (step B5''' of FIG. 107).

The image data cutting out section 815 automatically extracts position information, magnitude information and data information in the information described on the document from the image data of the documents stored in the image data storage memory 814 (step B6''' of FIG. 107) and registers them as document identification information into the document identification dictionary section 816 (step B''' of FIG. 107).

For example, as seen in FIG. 108, the operator operates the inputting section 812-1 to designate the "electricity rate" indicating contents of the paid-up money of the paid-up notice as first information and designate "Ichiro Fuji" indicating the name of the paying person as second information. Consequently, the image data cutting out section 815 stores position information, magnitude information and data information of the first information described above and extracts position information, magnitude information and data information of the second information.

Consequently, the extracted document identification information of the document 824B is stored into the region 816b of the document identification dictionary section 816 as document identification information of the document kind B whose ID number of "0102".

It is to be noted that, in the document identification apparatus according to the present modification, image data cut out by the image data cutting out section 815 are used only for identification of the document.

Further, in the document identification apparatus according to the present modification, by registering a plurality of pieces of document identification information regarding one document, a document can be identified in the verification step and the operation step described below without performing such normalization processing of image data as described in (a5) Characteristic Data Recognition Processing above.

Description of Processing in the Verification Step

Figure 109:
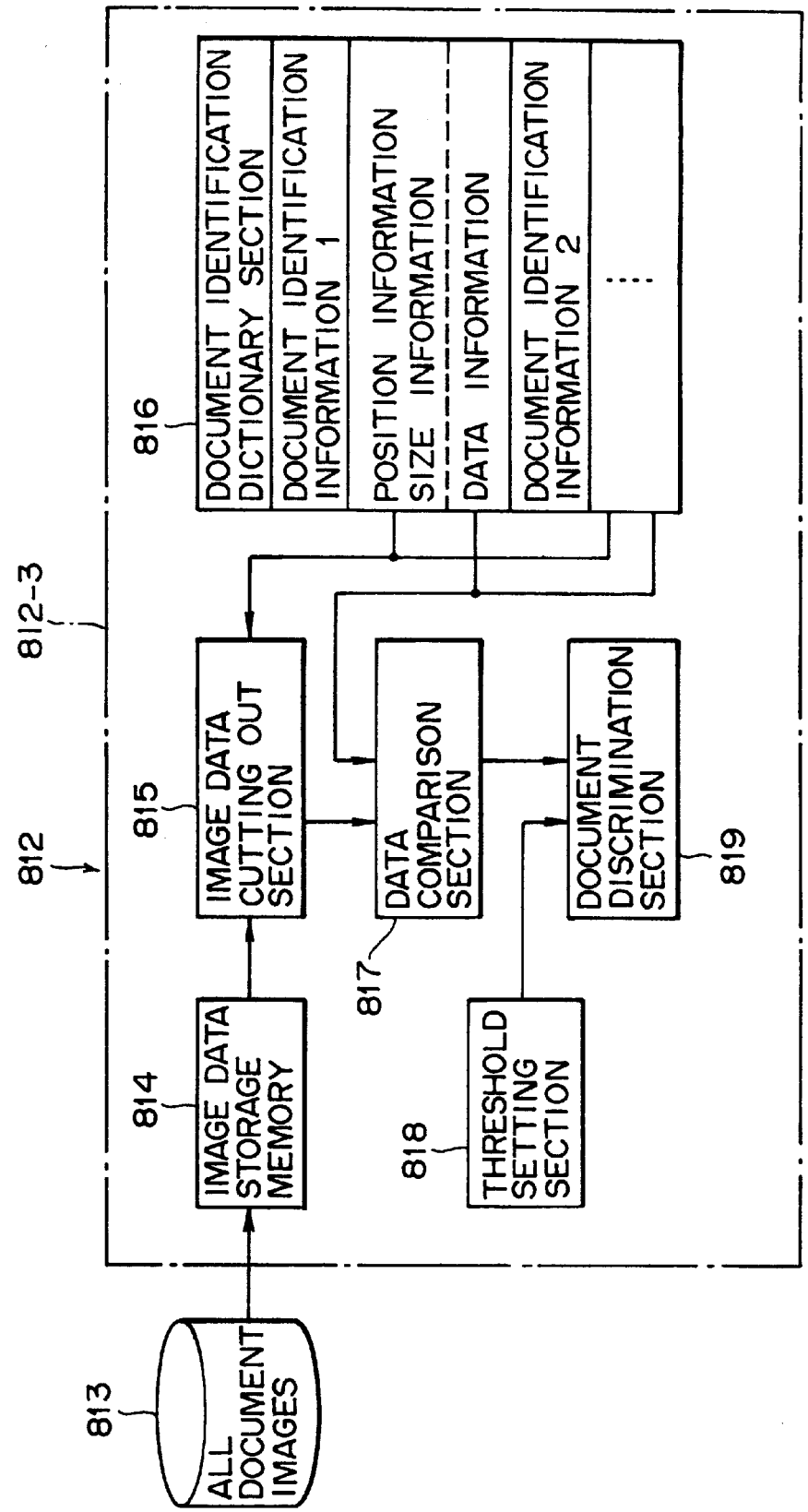
FIG. 109 is a control block diagram wherein notice is taken of operation of the document identification apparatus according to the first modification to the embodiment of the present invention upon verification step operation.
Figure 110:
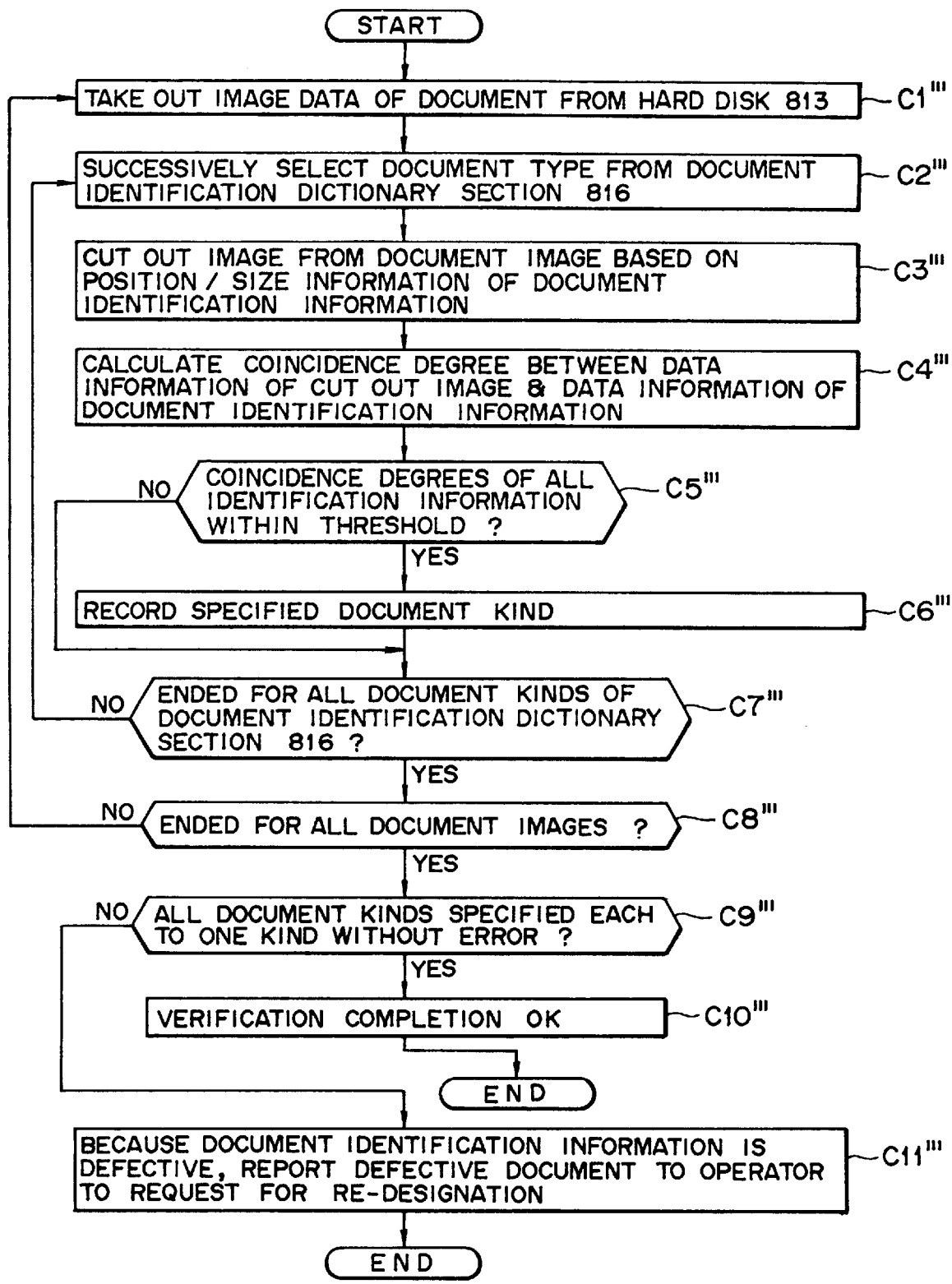
FIG. 110 is a flow chart illustrating operation of the document identification apparatus according to the first modification to the embodiment of the present invention upon the registration step operation.

Subsequently, operation of the document identification apparatus according to the present embodiment in the verification step will be described below with reference to the control block diagram shown in FIG. 109 which takes notice of operation in the verification step and the flow chart shown in FIG. 110 illustrating operation in the verification step.

As described hereinabove, in the registration step, document identification information is registered into the document identification dictionary section 816. Thereafter, operation as the verification step of verifying whether or not the images of all documents stored on the hard disk 813 can be identified with certainty using the document identification information registered in the document identification dictionary section 816 is performed.

In particular, using all images of the documents (images of the entire documents) stored upon operation of the hard disk 813 in the registration step and registered in the document identification dictionary section 816, collation with the document identification information registered in the document identification dictionary section 816 is performed for each image of a document.

More particularly, an image of a document from the hard disk 813 is outputted to the image data cutting out section 815 via the image data storage memory 814 (step C1''' of FIG. 110), and the image data cutting out section 815 extracts data for collation based on position information and magnitude information of document identification information of the corresponding document in the document identification dictionary section 816.

The data comparison section 817 receives the collation data from the image data cutting out section 815 and data information as the document identification information from the document identification dictionary section 816 (steps C2''' and C3''' of FIG. 110), and refers to a data coincidence degree between them to perform comparison and collation (step C4''' of FIG. 110).

The document discrimination section 819 receives a result of the comparison and collation from the data comparison section 817 and threshold data from the threshold setting section 818, and when the coincidence degrees of all of the document identification information are within the threshold value, since the data are coincident with each other, the document discrimination section 819 discriminates that the kind of the document extracted from the hard disk 813 can be specified uniquely and records the specified document kind (from the YES route of step C5''' to step C6''').

On the other hand, when some of coincidence degrees of the document identification information from the data comparison section 817 are not within the range of the threshold value, the data are not coincident with each other, and it is discriminated that the kind of the document cannot be specified (from the NO route of step C5''' to step C7'''). Then, if the processing described above is not completed for all of the document kinds of the document identification dictionary section 816, then similar processing is performed for the document identification information of the next document kind registered in the document identification dictionary section 816 (from the NO route of step C7''' to step C2'''). Accordingly, the processing in step C6''' is not performed unless the document is specified for all document types.

Thereafter, discrimination of the coincidence degree of document identification information is performed in a similar manner as described above for the document images of all kinds stored in the hard disk 813 (step C8''').

Further, if the document images of all kinds stored on the hard disk 813 have been specified successfully to individually different documents, it is determined that the verification is OK and the operation as the verification step comes to an end (from the YES route of step C9''' to step C10'''). In any other case, however, it is determined that the document identification information stored in the document identification dictionary section 816 is defective, and the defective document is reported to the operator to request for re-designation of document identification information for the document (from the NO route of step C9''' to step C11''').

Accordingly, if image data of a particular document are inputted, after the registration step, from the hard disk 813 again and it is verified by the data comparison section 817 whether or not the image data of the particular document inputted include document identification information registered in the document identification dictionary section 816, it can be discriminated by the image data cutting out section 815 whether or not recognition of the particular document is possible.

Description of Operation in the Operation Step

Figure 111:
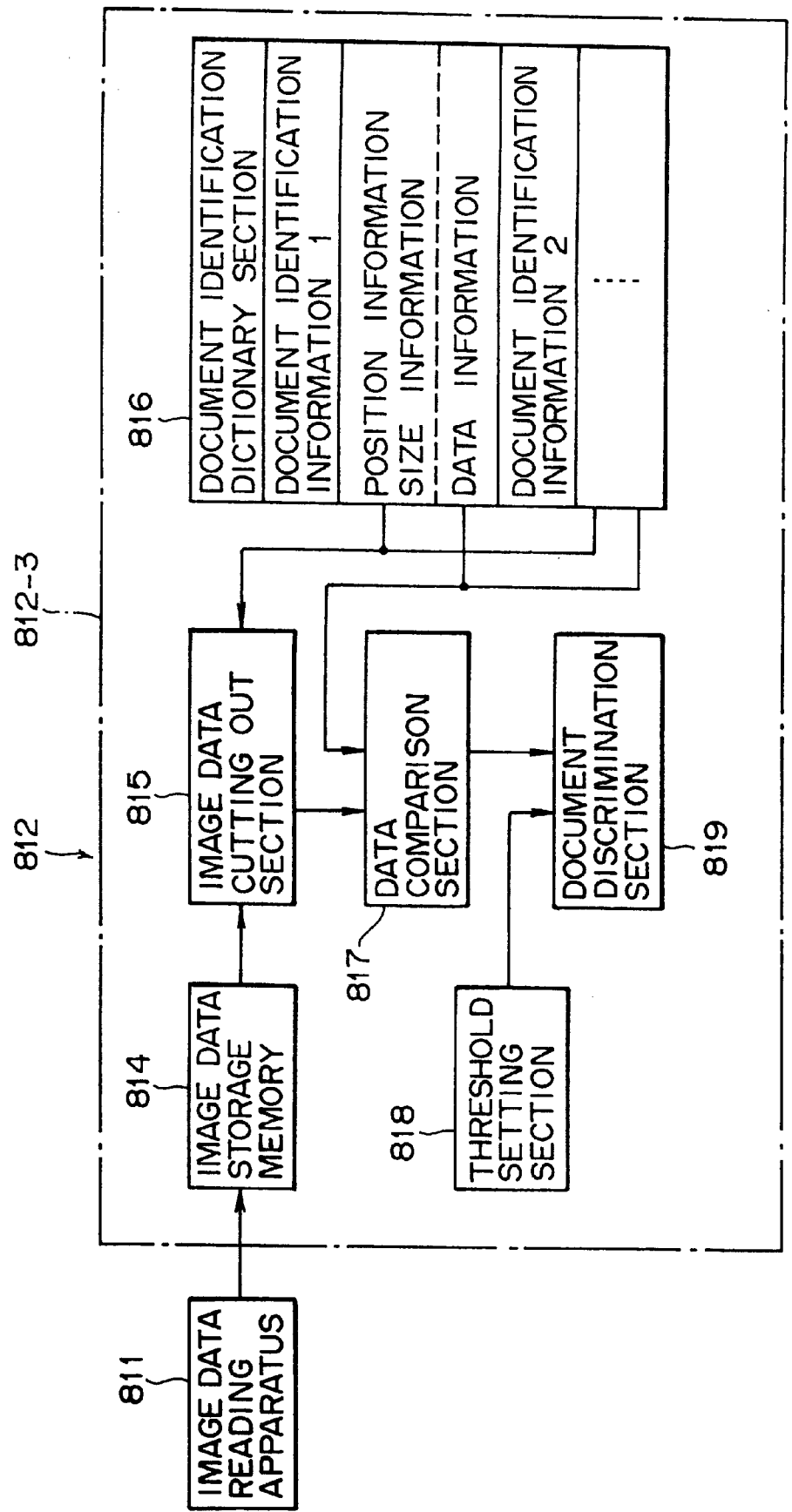
FIG. 111 is a control block diagram wherein notice is taken of operation of the document identification apparatus according to the first modification to the embodiment of the present invention upon application step operation.
Figure 112:
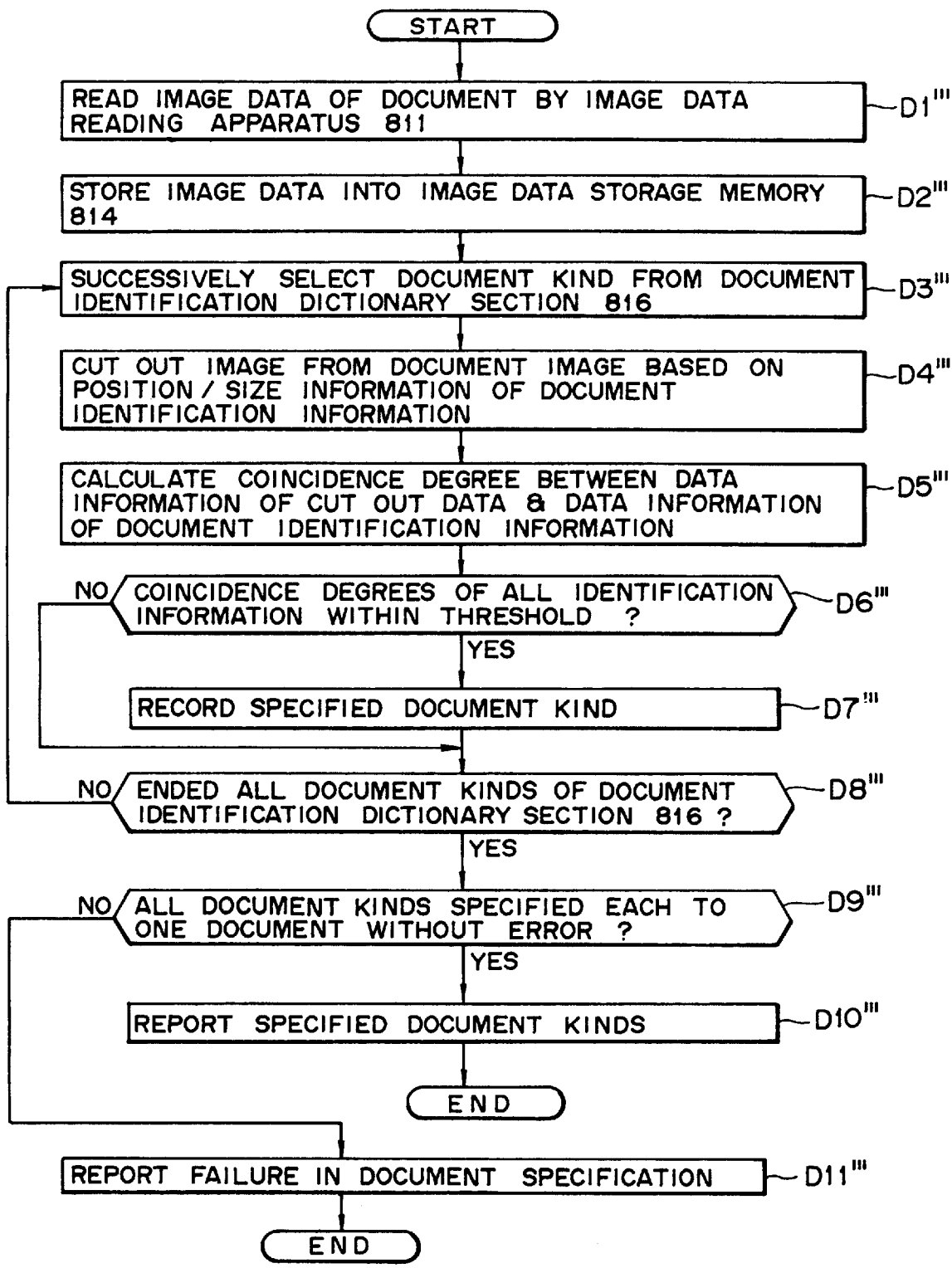
FIG. 112 is a flow chart illustrating operation of the document identification apparatus according to the first modification to the embodiment of the present invention upon the application step operation.

Subsequently, operation of the document identification apparatus according to the present embodiment in the operation step will be described with reference to the control block diagram shown in FIG. 111 which takes notice of operation in the operation step and the flow chart shown in FIG. 112 illustrating operation in the operation step.

As described hereinabove, in the verification step, it is verified whether or not images of all documents stored on the hard disk 813 can be specified using document identification information registered in the document identification dictionary section 816. After the verification comes to an end, in actual operation of the apparatus, such operation as the operation step of specifying a document kind as described below is performed for image data of an arbitrary document.

In particular, if image data of a certain document are read by an operation of the image data reading apparatus 811 by an operator (step D1'" of FIG. 112), then the read image data are stored once into the image data storage memory 814 (step D2'" of FIG. 112).

Then, the image data cutting out section 815 extracts and cut outs the image data (identification information) stored once in the image data storage memory 814 from a plurality of locations based on position information and magnitude information which constructs document identification information of the kind of the certain document (steps D3'" and D4'").

Then, the data comparison section 817 calculates coincidence degrees between data information of all image data cut out by the image data cutting out section 815 and data information constructing the document identification information to effect comparison and discrimination (step D5'").

Further, the document discrimination section 819 compares the coincidence degree calculated as a result of comparison and discrimination from the data comparison section 817 with the criterion for a coincidence degree set in the threshold setting section 818 to discriminate whether or not the kind of the document can be specified from the image data read by the image data reading apparatus 811 with the document identification information from the document identification dictionary section 816 (step D6'").

In particular, when image data of the first document kind A are read from the image data reading apparatus 811 while document identification information of the second document kind B is used as the document identification information from the document identification dictionary section 816 which makes an object of comparison, incoincidence is discriminated, and discrimination of the coincidence degree is performed using document identification information regarding another document type from the document identification dictionary section 816 (from the NO route of step D6'" to step D3'" via the NO route of step D8'").

On the other hand, for example, when image data of the first document kind A are read in from the image data reading apparatus 811, if the document identification information from the document identification dictionary section 816 which makes an object of comparison is information regarding the first document kind A, coincidence is discriminated with regard to the document identification information, and the image data read in are specified as the relevant document kind. The document kind specified in this instance is stored into a memory not shown in the control section 812-3 (from the YES route of step D6'" to step D7'").

It is to be noted that, upon the discrimination by the document discrimination section 819 described above, if any one of the image data at the plurality of locations cut out by the image data cutting out section 815 does not coincident with document identification information from the document identification dictionary section 816, it is discriminated to be a document of a different kind.

Thereafter, discrimination of a coincidence degree of document identification information from the image data read by the image data reading apparatus 811 described above similar to the discrimination described hereinabove is performed based on the document identification information of all of the individual kinds of documents stored in the document identification dictionary section 816 (step D8'").

Here, if the image data read by the image data reading apparatus 811 have been successfully specified to be data of one document kind by the discrimination of a coincidence degree described above, then the specified document kind is outputted to the definition storage section 820 (refer to FIG. 105) (from the YES route of step D9'" to step D10'"). However, if the image data have not been specified to be data of one document kind, a failure in document specification is reported to the operator, for example, by means of the display unit 812-2 (from the NO route of step D9'" to step D11'").

It is to be noted that, if a document kind specified to one kind is inputted to the definition storage section 820, then the definition storage section 820 reads out definition information (read position information, character attribute information, read column number and so forth) corresponding to the specified document kind from the definition storage table 821.

Consequently, the character recognition section 822 recognizes the definition information and the character information described on the document whose image data have been read by the image data reading apparatus 811 and stored in the image data storage memory 814, and stores the character information as a result of the recognition into the character recognition result storage section 823.

Accordingly, when a particular document has been recognized successfully in the verification step, by reading image data of an arbitrary document by means of the image data reading apparatus 811 and referring to the image data of the arbitrary document to detect whether or not the image data include document identification information registered in the document identification dictionary section 816, it can be identified whether or not the arbitrary document is a particular document and character recognition can be performed.

In this manner, with the document identification apparatus according to the first modification to the embodiment of the present invention, since it includes the image data reading apparatus 811, image data storage memory 814, hard disk 813, image data cutting out section 815, document identification dictionary section 816, data comparison section 817 and document discrimination section 819, in operation of the apparatus, the kind of a document whose image data have been read by the image data reading apparatus 811 can be automatically identified. Consequently, even if a plurality of kinds of documents to be read by the image data reading apparatus 811 are present in a mixed condition, the operator can handle the documents without being aware of a definition for each document. Accordingly, the document identification apparatus is advantageous in that a high efficiency in job can be achieved. The document identification apparatus is advantageous also in that an ID number or the like for identification of a document itself need not be described on the document and an ordinary document can be used, and the document identification apparatus can be applied readily to an existing system.

Further, upon registration of document identification information into the document identification dictionary section 816, necessary document identification information can be fetched automatically only if the operator designates it while visually observing image data of an object document for registration projected on the display unit 812-2. Consequently, production of a dictionary for identification of documents is facilitated and improvement in efficiency in job can be achieved.

Furthermore, since the document identification apparatus includes the data comparison section 817 serving as verification means and the document discrimination section 819 serving as the discrimination means, it can be verified whether or not document identification information designated by the operator is correct. Consequently, the document identification apparatus is advantageous in that an error in discrimination of a document is eliminated at all and the reliability of the apparatus is improved.

Further, where the operator instructs a plurality of locations in a document as identification information, the document can be identified with a higher degree of accuracy from document identification information extracted based on the identification information than from document identification information extracted otherwise based on identification information when a single location is designated.

Figure 113:
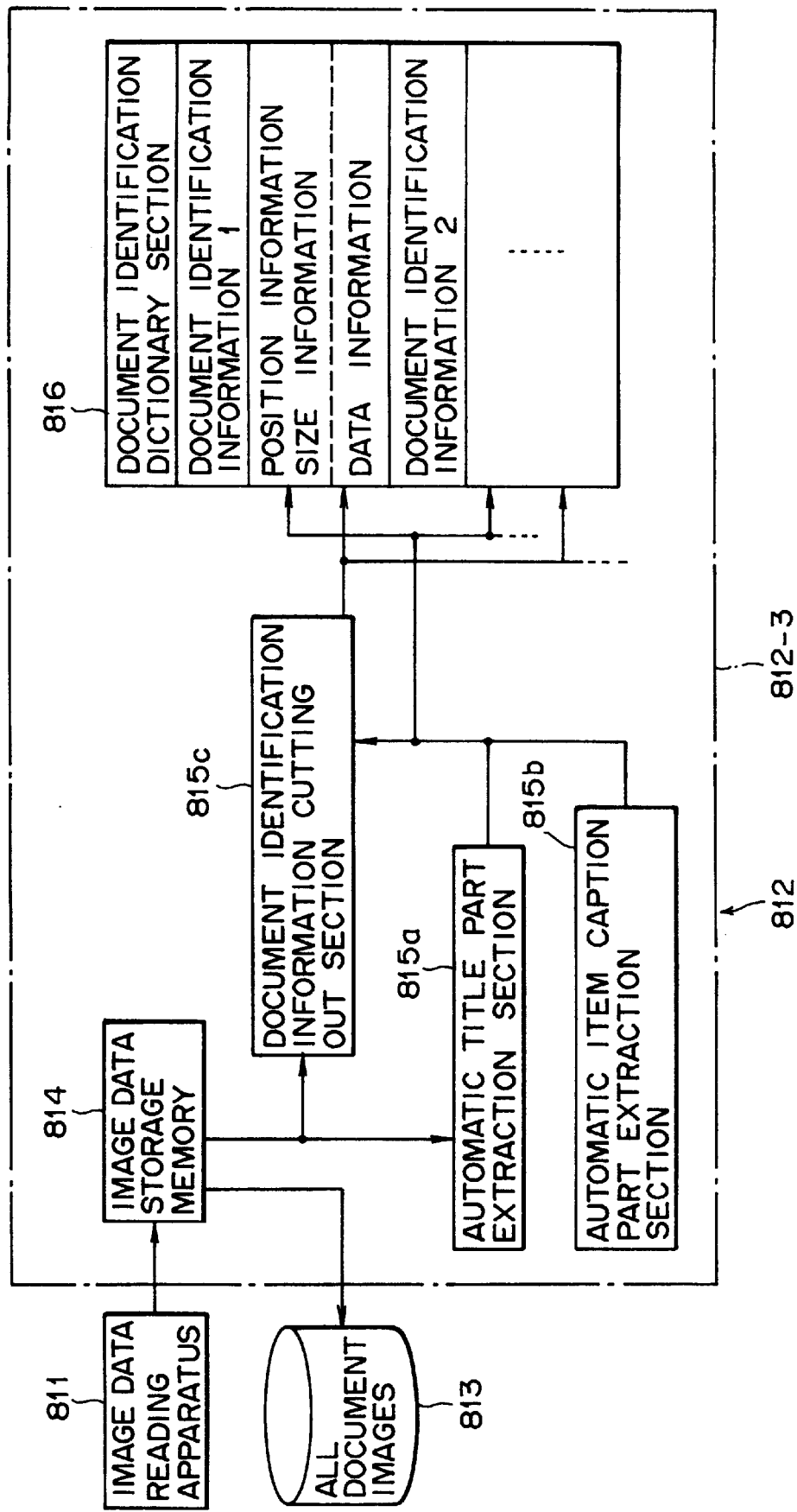
FIG. 113 is a control block diagram of a document identification apparatus according to a second modification to the embodiment of the present invention.

(b2) Description of a Document Identification Apparatus According to a Second Modification to the Embodiment FIG. 113 is a block diagram showing a document identification apparatus according to a second modification to the embodiment of the present invention, and particularly shows a control block diagram in which notice is taken of operation in the registration step.

The document identification apparatus shown in FIG. 113 has a basically similar construction to that of the document identification apparatus described hereinabove with reference to FIG. 105 except that the document identification information extraction means includes an automatic title part extraction section 815*a*, an automatic item caption part extraction section 815*b* and a document identification information cutting out section 815*c*.

The automatic title part extraction section 815*a* automatically extracts position information of that portion of image data regarding a document stored in the image data storage memory 814 which is regarded as a title part (refer to, for example, the 'electricity rate' as above-described first document identification information illustrated in FIG. 108).

The automatic item caption part extraction section 815*b* automatically extracts position information of an item part from image data regarding a document stored in the image data storage memory 814.

The document identification information cutting out section 815*c* cuts outs, from image data stored in the image data storage memory 814, magnitude information of the title part and the item part and data information as document identification information based on position information from the automatic title part extraction section 815*a* and the automatic item caption part extraction section 815*b*.

With the document identification apparatus according to the second modification to the embodiment of the present invention having the construction described above, as operation in the registration step, similarly as in the embodiment described hereinabove, if the image data reading apparatus 811 reads image data of a document in response to an operation of an operator (step E1''' of FIG. 114), then the image data storage memory 814 stores the read image data once (step E2''' of FIG. 114) and the image data are stored also onto the hard disk 813 so that all image data read by the image data reading apparatus 811 are stored (step E3''' of FIG. 114).

Figure 114:
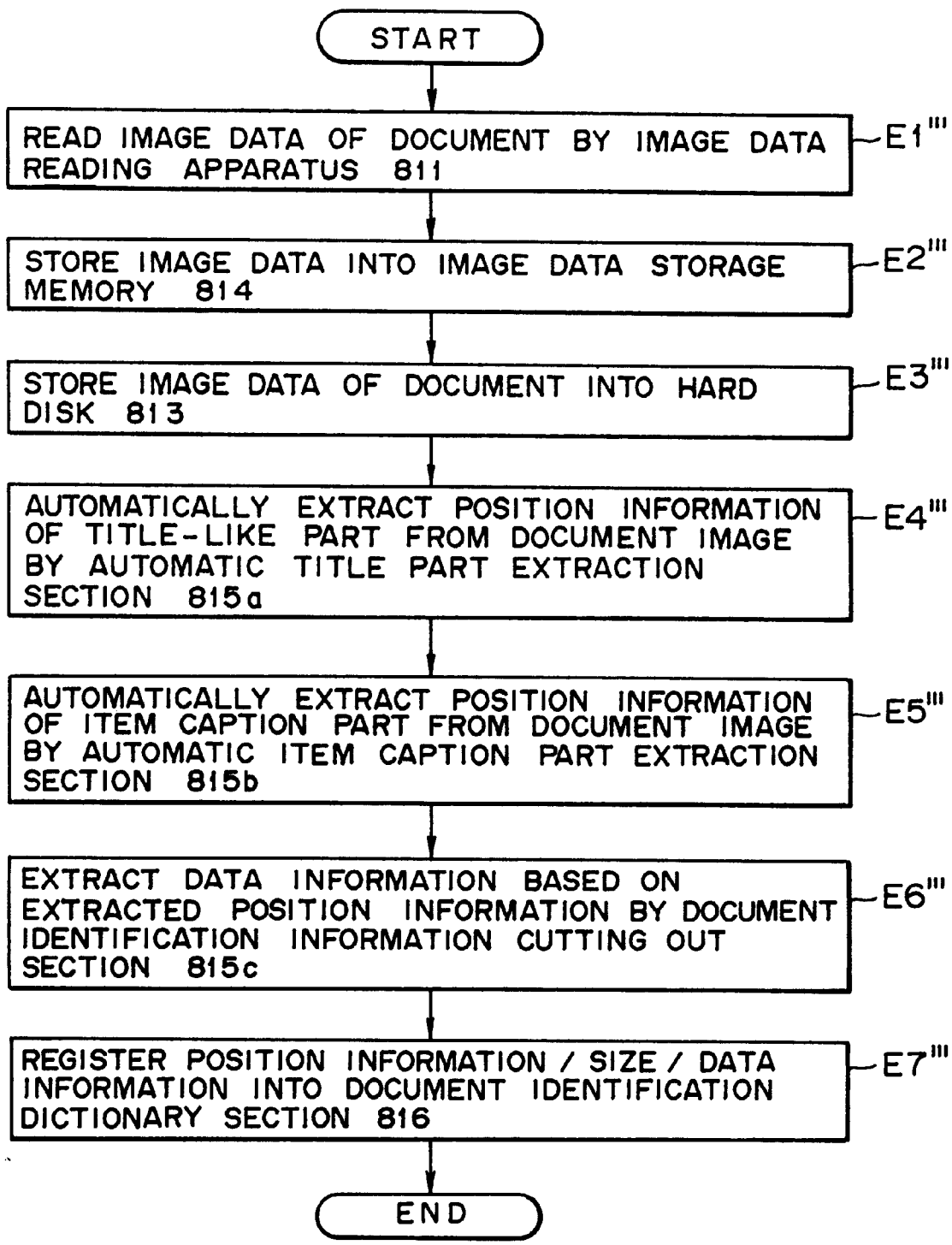
FIG. 114 is a flow chart illustrating operation of the document identification apparatus according to the second modification to the embodiment of the present invention.

Then, the automatic title part extraction section 815*a* automatically extracts position information of a portion which seems to be the title of the document (step E4''' of FIG. 114), and the automatic item caption part extraction section 815*b* automatically extracts position information of an item caption described in a ruled line item (step E5''' of FIG. 114).

The document identification information cutting out section 815*c* extracts magnitude information and data information based on the position information from the automatic title part extraction section 815*a* and the automatic item caption part extraction section 815*b* described above (step E6''' of FIG. 114) and registers the position information and magnitude information and data information corresponding to the position information as document identification information into the document identification dictionary section 816 (step E7''' of FIG. 114).

It is to be noted that operation in the verification step or the operation step is basically similar to that of the embodiment described hereinabove.

Accordingly, while, with the document identification apparatus described hereinabove with reference to FIG. 105, the operator refers to the display unit 812-2 and operates the inputting section 812-1 to designate identification information for extraction of document identification information, according to the present embodiment, particular document identification information described on a particular document can be automatically extracted from image data of the particular document read by the image data reading apparatus 811 and registered into the document identification dictionary section 816. Consequently, there is an advantage that the operation efficiency of the operator is improved remarkably.

It is to be noted that, while, in the embodiment described hereinabove with reference to FIG. 113, a title part and an item part are used as identification information for extraction of document identification information, any other portion (fixed information portion) of a document than them may be used instead.

(b3) Others

In the modifications to the embodiment of the present invention described above, the data comparison section 817 serving as verification means and the document discrimination section 819 serving as discrimination means perform operations of the verification step by verifying, when image data of a particular document are inputted again after the registration step, whether or not the image data of the inputted particular document include document identification information registered in the document identification dictionary section 816 to discriminate whether or not recognition of the particular document is possible. However, even if the operations of the verification step are omitted, at least in operation of the apparatus, since a type of a document whose image data are read by the image data reading apparatus 811 can be automatically identified, even if a plurality of kinds of documents to be read by the image data reading apparatus 811 are present in a mixed condition, the operator can handle the documents without being aware of the definition of each document. Consequently, there is an advantage that the efficiency in job can be improved. Further, an ID number or the like for identification of a document itself need not be described on the document, and ordinary documents can be used. Consequently, there is another advantage that application to an existing system is easy.

Further, upon registration of document identification information into the document identification dictionary section 816, necessary document identification information can be fetched automatically only if the operator designates while observing image data of an object document for registration projected on the display unit 812-2. Consequently, production of a dictionary for identification between documents is facilitated and improvement in efficiency in job can be achieved.

Industrial Applicability of the Invention

As described above, a data medium handling apparatus and a data medium handling method according to the present invention are suitable for use for handling of documents, for example, in financial organs, and particularly, since documents having various formats such as private documents can be handled automatically, the data medium handling apparatus and the data medium handling method are considered very high in usefulness.

What is claimed is:

1. An apparatus for recognizing at least one group of object particulars recorded on a given data medium in an arbitrary layout, each particular consisting of letters and/or numbers and/or other symbols, based on an image of the given data medium, said apparatus comprising:

(a) an analysis dictionary containing features of distinctive object particulars for comparison with features of the individual object particulars of the given data medium;

(b) a layout database containing features of distinctive layouts for comparison with features of the layout of the object particular group of the given data medium; the features of each of said distinctive layouts including data about logical relationships among the contents of the object particular group of each said distinctive layout;

(c) a layout analysis section for analyzing the layout of the object particular group in the image of the given data medium by consulting said analysis dictionary (a) and for logically representing relationships among the contents of the object particular group of the analyzed layout;

(d) a layout retrieval section for retrieving a possible candidate layout, whose features at least generally coincide with the features of the layout of the object particular group of the given data medium, by consulting said layout database (b) and using the result of the analysis by said layout analysis section (c);

(e) a layout recognition section for recognizing the object particular group in the image by using data about the logical relationships among the contents of the object particular group represented by said layout analysis section © and, if any candidate layout is retrieved by said layout retrieval section (d), by using the features of the retrieved candidate layout including data about the logical relationships among the contents of the object particular group of the retrieved candidate layout; and (f) a layout update section for updating said analysis dictionary (a) based on the result of the recognition by said layout recognition section (e) and for also updating, if no candidate layout is retrieved by said layout retrieval section (d), said layout database (b) by additionally storing in said layout database (b) the features of the analyzed layout including the data about the logical relationships among the contents of the object particular group of the analyzed layout based on the results of both the analysis by said layout analyzing section © and the recognition by said layout recognition section (e) so that said updated analysis dictionary and layout database are used by said layout analysis section, said layout retrieval section and said layout recognition section in handling a subsequently given data medium;

wherein when the object particular group of the given data medium is classified under a plurality of items, said layout analysis section (c) is operable to determine a object particular corresponding to a caption of each of the plural item and logically representing relationships among the content of the object particular group, recognize the object particular of the caption of each item and determine object particulars corresponding to each item based on the caption of each line and using data about the logical relationships among the contents of the object particular group represented in said layout analysis section (c).

2. An apparatus as set forth in claim 1, further comprising:

(g) a pre-processing section for pre-processing the image of the given data medium prior to the analysis by said layout analysis section (c).

3. An apparatus as set forth in claim 1, wherein said layout analysis section (c) includes:

(c-1) a layout-feature extraction section for extracting the features of the layout of the object particular group of the given layout; and (c-2) a layout-structure analysis section for analyzing a structure of the layout of the object particular group based on the features of the layout extracted by said layout feature extraction section (c-1).

4. An apparatus as set forth in claim 3, wherein said layout analysis section (c) includes:

(c-3) means for judging whether the image is in a predetermined direction suited for the recognition by said layout recognition section (e) based on the features of the layout extracted by said layout-feature extraction section (c-1); and (c-4) means for converting the image such that the image is in the predetermined direction if the image has been judged to be not in the predetermined direction by said judging means (c-3).

5. An apparatus as set forth in claim 3, wherein, said layout feature extraction section (c-1) is operable to extract a logical origin of the layout as one of the features of the layout, and said layout retrieval section (d) is operable to retrieve the candidate layout based on the logical origin extracted by said layout-feature extraction section (c-1).

6. An apparatus as set forth in claim 3, wherein when the layout of the object particular group of the given data medium includes a table composed of items each of which is surrounded by ruled lines, said layout-feature extraction section (c-1) is operable to extract the ruled lines in the table as features of the layout, and said layout-structure analysis section (c-2) is operable to analyze a structure of the table based on the ruled lines extracted by said layout-feature extraction section (c-1).

7. An apparatus as set forth in claim 3, wherein when the layout of the object particular group of the given data medium includes a table composed of items each of which is not surrounded by ruled lines, said layout-feature extraction section (c-1) is operable to extract object particulars corresponding to the items of the table as features of the layout, and said layout-structure analysis section (c-2) is operable to analyze a structure of the table based on the object particulars corresponding to the items extracted by said layout-feature extraction section (c-1).

8. An apparatus as set forth in claim 3, wherein said layout data base (b) is operable to store compressed features of the distinctive layouts, and said layout retrieval section (d) is operable to compress the features of the layout extracted by said layout-feature extraction section (c-1) and retrieve the candidate layouts from said layout database (b) by the compressed features of the layout.

9. A method for recognizing at least one group of object particulars recorded on a given data medium in an arbitrary layout, each particular consisting of letters and/or numbers and/or other symbols, based on an image of the given data medium, said method comprising the steps of:

(I) analyzing the layout of the object particular group in the image of the given data medium by consulting an analysis dictionary, that contains features of distinctive object particulars for comparison with features of the individual object particulars of the given data medium, and logically representing relationships among the contents of the object particular group of the analyzed layout;

(ii) retrieving a possible candidate layout, whose features at least generally coincide with features of the layout of the object particular group of the given data medium, by consulting a layout database, which contains features of distinctive layouts including data about logical relationships among the contents of the object particular group of each said distinctive layout for comparison with the features of the layout of the object particular group of the given data medium, and using the result of the analysis in said step (I) if any candidate layout is retrieved in said step (ii), (iii) recognizing the object particular group in the image by using both data about the logical relationships among the contents of the object particular group of the analyzed layout represented in said step (I) and the features of the candidate layout retrieved in said step (ii);

(iv) updating the analysis dictionary based on the results of both said analysis in said step (I) and said recognition in said step (iii);

if no candidate layout is retrieved in said step (ii), (v) recognizing the object particular group in the image by using the data about the logical relationships among the contents of the object particular group of the analyzed layout represented in said step (I); and (vi) updating the layout database by additionally storing in the layout database the features of the analyzed layout including the data about the logical relationships among the contents of the object particular group of the analyzed layout and updating the analysis dictionary based on the results of both the analysis in said step (i) and the recognition in said step (v);

wherein when the object particular group of the given data medium is classified under a plurality of items, said analyzing in said step (I) is carried out by determining a object particular corresponding to a caption of each of the plural item and logically representing relationships among the content of the object particular group, recognizing the object particular of the caption of each item and determining object particulars corresponding to each item based on the caption of each item and using data about the logical relationships among the contents of the object particular group represented in said analyzing in said step (i).

10. A method as set forth in claim 9, further comprising pre-processing the image of the given data medium for the analysis in said step (i).

11. A method as set forth in claim 9, wherein said analyzing in said step (i) includes the steps of:

(i-1) extracting the features of the layout of the object particular group of the given data medium; and (i-2) analyzing a structure of the layout of the object particular group based on the features of the layout extracted in said step (i-1).

12. A method as set forth in claim 11, wherein said analyzing in said step (i) includes the steps of:

(i-3) judging whether the image is in a predetermined direction suited for said recognizing in said step (iii) or said step (v) based on the features of the layout extracted in said step (i-1); and (i-4) converting the image such that the image is in the predetermined direction if the image has been judged to be not in the predetermined direction in said step (i-3).

13. A method as set forth in claim 11, wherein said extracting in said step (i-1) includes extracting a logical origin of the layout as a feature of the layout, and said retrieving in said step (ii) is carried out based on the logical origin extracted in said step (i-1).

14. A method as set forth in claim 11, wherein when the layout of the object particular group of the given data medium includes a table composed of items each of which is surrounded by ruled lines, said extracting in said step (i-1) includes the extracting the ruled lines in the table as features of the layout, and said analyzing in said step (i-2) includes analyzing a structure of the table based on the ruled lines extracted in said step (i-1).

15. An apparatus as set forth in claim 11, wherein when the layout of the object particular group of the given data medium includes a table composed of items each of which is not surrounded by ruled lines, said extracting in said step (i-1) includes extracting object particulars corresponding to the items of the table as features of the layout, and said analyzing in said step (i-2) includes analyzing a structure of the table based on the object particulars corresponding to the items extracted in said step (i-1).

16. A method as set forth in claim 11, wherein the layout database contains compressed features of the distinctive layouts, and said retrieving in said step (ii) includes compressing the features of the layout extracted in said step (i-1) and retrieving the candidate layouts from the layout database by the compressed features of the layout.

* * * * *

UNITED STATES PATENT AND TRADEMARK OFFICE
CERTIFICATE OF CORRECTION

PATENT NO. : 6,360,011 B1
DATED : March 19, 2002
INVENTOR(S) : Katsumata et al.

It is certified that error appears in the above-identified patent and that said Letters Patent is hereby corrected as shown below:

Title page,
Item [75], Inventors,
Please add the following inventors:

-- Shinichi Eguchi, Kawasaki, Japan;
Koichi Chiba, Kawasaki, Japan;
Hideki Matsuno, Kawasaki, Japan;
Yoshihiro Nagano, Kawasaki, Japan;
Kazuhide Ushita, Kawasaki, Japan;
Hideo Kamata, Kawasaki, Japan;
Tomohiro Matsuhashi, Kawasaki, Japan;
Hideyuki Inaoka, Kawasaki, Japan;
Satoshi Naoi, Kawasaki, Japan;
Shunji Sakane, Kawasaki, Japan;
Katsutoshi Kobara, Kawasaki, Japan; --

Please change the address of the last inventor to:
Yasutaka Machida, Maebashi, Japan.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,360,011 B1
DATED : March 19, 2002
INVENTOR(S) : Yutaka Katsumata et al.

It is certified that error appears in the above-identified patent and that said Letters Patent is hereby corrected as shown below:

Title page,
Item [75], Inventors, should read
-- Yutaka Katsumata, Kawasaki, Japan; Kazunori Yamamoto, Maebashi, Japan; Kazuhito Watanabe, Maebashi, Japan; Yoshiyuki Kijima, Maebashi, Japan; Shinichi Eguchi, Kawasaki, Japan; Koichi Chiba, Kawasaki, Japan; Hideki Matsuno, Kawasaki, Japan; Yoshihiro Nagano, Kawasaki, Japan; Kazuhide Ushita, Kawasaki, Japan; Hideo Kamata, Kawasaki, Japan; Tomohiro Matsuhashi, Kawasaki, Japan; Hideyuki Inaoka, Kawasaki, Japan; Eiichi Watanabe, Kawasaki, Japan; Satoshi Naoi, Kawasaki, Japan; Shunji Sakane, Kawasaki, Japan; Katsutoshi Kobara, Kawasaki, Japan; Yoshinori Yamazaki, Maebashi, Japan; Yasutaka Machida, Maebashi, Japan --

This certificate supersedes Certificate of Correction issued September 14, 2004.

Signed and Sealed this

Twenty-ninth Day of March, 2005

JON W. DUDAS
*Director of the United States Patent and Trademark Office*